United States Patent
Henry et al.

(10) Patent No.: US 11,029,949 B2
(45) Date of Patent: Jun. 8, 2021

(54) NEURAL NETWORK UNIT

(71) Applicant: Shanghai Zhaoxin Semiconductor Co., Ltd., Shanghai (CN)

(72) Inventors: G. Glenn Henry, Austin, TX (US);
Douglas R. Reed, Austin, TX (US);
Kim C Houck, Austin, TX (US);
Parviz Palangpour, Austin, TX (US)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 730 days.

(21) Appl. No.: 15/949,110

(22) Filed: Apr. 10, 2018

(65) Prior Publication Data
US 2018/0225116 A1    Aug. 9, 2018

Related U.S. Application Data

(63) Continuation-in-part of application No. 15/366,027, filed on Dec. 1, 2016, now Pat. No. 10,664,721, and
(Continued)

(51) Int. Cl.
*G06F 9/30* (2018.01)
*G06N 3/04* (2006.01)
(Continued)

(52) U.S. Cl.
CPC .............. *G06F 9/3001* (2013.01); *G06F 7/00* (2013.01); *G06F 9/3004* (2013.01);
(Continued)

(58) Field of Classification Search
None
See application file for complete search history.

(56) References Cited

U.S. PATENT DOCUMENTS 5,204,938 A   4/1993 Skapura et al.
5,465,375 A   11/1995 Thepaut et al.
(Continued)

FOREIGN PATENT DOCUMENTS

CN    1577257 A    2/2005
CN    1658153 B    8/2005
(Continued)

OTHER PUBLICATIONS

Extended European Search Report (EESR) dated Nov. 16, 2017 for EP application No. 17165216.7 filed on Apr. 6, 2017. pp. 1-13.
(Continued)

*Primary Examiner* — Alan Chen
(74) *Attorney, Agent, or Firm* — McClure, Qualey & Rodack, LLP

(57) ABSTRACT

A hardware processing unit is provided. The hardware processing unit includes: an accumulator; a multiplier-adder receives first and second factors and receives an addend, the multiplier-adder generates a sum of the addend and a product of the first and second factors and provides the sum; a first multiplexer receives a first operand, a positive one, and a negative one and selects one of them for provision as the first factor to the multiplier-adder; a second multiplexer receives a second operand, a positive one, and a negative one and selects one of them for provision as the second factor to the multiplier-adder; a third multiplexer, having an output, that receives the first operand and the second operand and selects one of them for provision on its output; and a fourth multiplexer receives the third multiplexer output and the sum and selects one of them for provision to the accumulator.

22 Claims, 54 Drawing Sheets

Related U.S. Application Data a continuation-in-part of application No. 15/090,701, filed on Apr. 5, 2016, now Pat. No. 10,474,628, and a continuation-in-part of application No. 15/090,665, filed on Apr. 5, 2016, now Pat. No. 10,474,627, and a continuation-in-part of application No. 15/090,801, filed on Apr. 5, 2016, now Pat. No. 10,282,348.

(60) Provisional application No. 62/484,353, filed on Apr. 11, 2017, provisional application No. 62/299,191, filed on Feb. 24, 2016, provisional application No. 62/262,104, filed on Dec. 2, 2015, provisional application No. 62/239,254, filed on Oct. 8, 2015.

(51) Int. Cl.
    G06N 3/063     (2006.01)
    G06F 9/38      (2018.01)
    G06F 7/00      (2006.01)

(52) U.S. Cl.
    CPC ...... *G06F 9/30021* (2013.01); *G06F 9/30076* (2013.01); *G06F 9/3881* (2013.01); *G06N 3/04* (2013.01); *G06N 3/0445* (2013.01); *G06N 3/0454* (2013.01); *G06N 3/063* (2013.01)

(56) References Cited

U.S. PATENT DOCUMENTS

| | | | |
|---|---|---|---|
| 5,623,628 | A | 4/1997 | Brayton et al. |
| 5,956,703 | A | 9/1999 | Turner et al. |
| 8,676,734 | B2 | 3/2014 | Aparin |
| 2007/0033152 | A1 | 2/2007 | Hahn et al. |
| 2008/0120520 | A1 | 5/2008 | Eriksson |
| 2008/0320226 | A1 | 12/2008 | Blake et al. |
| 2009/0144524 | A1 | 6/2009 | Shen et al. |
| 2009/0276638 | A1 | 11/2009 | Chen |
| 2012/0041914 | A1 | 2/2012 | Tirunagari |
| 2012/0069029 | A1 | 3/2012 | Bourd et al. |
| 2016/0062675 | A1 | 3/2016 | Yano et al. |
| 2016/0188474 | A1 | 6/2016 | Wang et al. |
| 2016/0210044 | A1 | 7/2016 | Mitkar et al. |
| 2017/0102920 | A1 | 4/2017 | Henry et al. |
| 2017/0102921 | A1 | 4/2017 | Henry et al. |
| 2017/0102940 | A1 | 4/2017 | Henry et al. |
| 2017/0102945 | A1 | 4/2017 | Henry et al. |
| 2017/0103040 | A1 | 4/2017 | Henry et al. |
| 2017/0103041 | A1 | 4/2017 | Henry et al. |
| 2017/0103300 | A1 | 4/2017 | Henry et al. |
| 2017/0103301 | A1 | 4/2017 | Henry et al. |
| 2017/0103302 | A1 | 4/2017 | Henry et al. |
| 2017/0103303 | A1 | 4/2017 | Henry et al. |
| 2017/0103304 | A1 | 4/2017 | Henry et al. |
| 2017/0103305 | A1 | 4/2017 | Henry et al. |
| 2017/0103306 | A1 | 4/2017 | Henry et al. |
| 2017/0103307 | A1 | 4/2017 | Henry et al. |
| 2017/0103310 | A1 | 4/2017 | Henry et al. |
| 2017/0103311 | A1 | 4/2017 | Henry et al. |
| 2017/0103312 | A1 | 4/2017 | Henry et al. |
| 2017/0103319 | A1 | 4/2017 | Henry et al. |
| 2017/0103320 | A1 | 4/2017 | Henry et al. |
| 2017/0103321 | A1 | 4/2017 | Henry et al. |
| 2017/0153892 | A1 | 6/2017 | Linksy |

FOREIGN PATENT DOCUMENTS

| EP | 0 846 287 A1 | 6/1998 |
|---|---|---|
| WO | 2016/182674 | 11/2016 |

OTHER PUBLICATIONS

Sharma, Hardik et al. "From High-level Deep Neural Models to FPGAs." 2016 49th AnnuaiiEEE/ACM International Symposium on Microarchitecture (MICRO), IEEE. Oct. 15, 2016. pp. 1-12.

Chen, Yu-Hsin, et al.; "Eyeriss: A Spatial Architecture for Energy-Efficient Dataflow for Convolutional Neural Networks" 2016 ACM/IEEE 43rd Annual International Symposium on Computer Architecture (ISCA). Jun. 1, 2016. pp. 367-379. XP055381052.

Means, Robert W., et al. "Extensible Linear Floating Point SIMD Neurocomputer Array Processor." International Joint Conference on Neural Networks. New York, IEEE. vol. 1, Jul. 8, 1991. pp. 587-592.

Kim, Dongsun et al. "A SIMD Neural Network Processor for Image Processing." Network and Parallel Computing. Jan. 1, 2005. vol. 3497. pp. 665-672.

Anonymous. "Victim Cache." Nov. 22, 2016 pp. 1-3. Retrieved from the internet: https://en.wikipedia.org/w/index.php?title=Victim_cache&oldid=750969097. Retrieved on Jun. 22, 2017.

Oh, Kyoung-Us, et al. "GPU Implementation of Neural Networks." Pattern Recognition The Journal of the Pattern Recognition Society. vol. 37, No. 6, Jun. 2, 2004. pp. 1311-1314 XP004505331.

Pemeen, Maurce, et al. "Memory-Centric Accelerator Design for Convolutional Neural Networks." 2013 IEEE 31st International Conference on Computer Design (ICCD). Oct. 1, 2013. pp. 13-19. XP055195589.

Gupta, Suyog et al. "Deep Learning with Limited Numerical Precision." arxiv.org, Cornell University Library, 201 Olin Library Cornell University Ithaca, NY 14853. Feb. 9, 2015. XP080677454. pp. 1-10.

Convolutional neural network—Wikipedia.pdf; Retrieved on Oct. 17, 2016 from https://en.wikipedia.org/wiki/Convolutional_neural_network. pp. 1-19.

CS231n Convolutional Neural Networks for Visual Recognition. pdf; Retrieved on Oct. 17, 2016 from http://sc231n.github.io/convolutional-networks. pp. 1-26.

Convolutional Neural Networks (LeNet)—DeepLearning 0.1 documenation.pdf; Retrieved on Oct. 17, 2017 from http://deeplearning.net/tutorial/lenet.html.

Chellapilla, K., et al. "High performace convolutional neural networks for document processing." 2006. In Tenth International Workshop on Frontiers in Handwriting Recognition. Suvisoft. pp. 1-7.

Mathieu, M. et al. "Fast training of convolutional networks through FFTs." arXiv:1312.5851 [cs.CV]. Mar. 6, 2014. pp. 1-9.

Liu, S. "Cambricon: An Instruction Set Architecture for Neural Networks" 2016 ACMIIEEE 43rd International Symposium on Computer Architecture. IEEE Press. pp. 393-405.

Selivanov, S.G., et al. "The use of Artificial Intelligence Methods of Technological Preparation of Engine-Building Jroduction." American Journal of Industrial Engineering, 2014, vol. 2 No. 1, 10-14.

Artificial Neural Network in Wikipedia. Retrieved Jun. 1, 2015 from http://en.wikipedia.org/wiki/artificial_neural_network pp. 1-19.

Chen, T., et al. "DianNao: A Small-Footprint High-Throughput Accelerator for Ubiquitous Machine-Learning." ASPLOS 14. pp. 269-284.

Ovtcharov, K., et al. "Accelerating Deep Convolutional Neural Networks Using Specialized Hardware." CNN Whitepaper. Feb. 22, 2015. pp. 1-4.

Computational RAM in Wikipedia. Retrieved May 31, 2015 from http//en.wikipedia.org.wiki/Computationai_RAM pp. 1-3.

"Elman Networks". Retrieved Dec. 29, 2015 from http://mnemstudio.org/neural-networks-elman.htm. pp. 1-6.

Gers, F. et al. "Learning to Forget: Continual Prediction with LSTM." Neural Computation, 2000. pp. 1-20 Retrieved from ftp://ftp.idsia.ch/pub/juergen/FgGates-NC.pdf.

Klaus, G., et al. "LSTM: A Search Space Odyssey." Cornell University Library. Mar. 13, 2015. pp. 1-18.

Ovtcharov, K., et al. "Toward Accelerating Deep Learning at Scale Using Specialized Hardware in the Datacenter." Microsoft Research. Aug. 17, 2015. pp. 1-38.

Hochreiter, S. et al. "Long Short-Term Memory." Neural Computation 9(8). 1997. pp. 1735-1780.

(56) References Cited

OTHER PUBLICATIONS

Krizhevsky, A. "ImageNet Classification with Deep Convolutional Neural Networks." Advances in Neural Information Processing Systems Conference. NIPS 2012. pp. 1-9.

Vanhoucke, V., et al. "Improving the Speed of Neural Networks on CPUs." Deep Learning and Unsupervised Feature Learning Workshop. NIPS 2011. pp. 1-8.

Clarke, Peter. "Intel Follows Qualcomm Down Neural Network Path." IHS Electromcs 360. Jun. 23, 2014. pp. 1-3.

Kumar, Samir. "Introducing Qualcomm Zeroth Processors: Brain-Inspired Computing." Qualcomm OnQ Blog. Oct. 10, 2013. pp. 1-11.

Jordan, Michael I. "Serial Order: A Parallel Distributed Processing Approach." ICS Report 8604. May 1986. pp. 1-46.

Blelloch, Guy. Lecture "Parallel Algorithms." Jan. 15, 2009. pp. 1-5.

"LSTM Networks for Sentiment Analysis." DeepLearning 0.1 Documentation. Presented at the Hot Chips Symposium in Cupertino, CA, Aug. 23-25, 2015 pp. 1-5.

"Microsoft Neural Network Algorithm Technical Reference." Microsoft Developer Network. Retrieved May 26, 2015 from htttps://msdn.Microsoft.com/en-us/cc645901 pp. 1-5.

Non-Final Office Action dated Apr. 1, 2019, issued in U.S. Appl. No. 15/090,701 (copy not provided).

FIG. 4

| ADDRESS | INSTRUCTION | CLOCKS |
|---|---|---|
| 0 | INITIALIZE NPU | 1 |
| 1 | MULT-ACCUM  DR ROW 17, WR ROW 0 | 1 |
| 2 | MULT-ACCUM  ROTATE, WR ROW +1, COUNT = 511 | 511 |
| 3 | ACTIVATION FUNCTION | 1 |
| 4 | WRITE AFU OUTPUT TO DR ROW 16 | 1 |

FIG. 5

| CLK | NPU 0 | NPU 1 | ... | NPU 511 |
|---|---|---|---|---|
| 0 | ACC = 0 | ACC = 0 | | ACC = 0 |
| 1 | ACC += DR:17,0 * WR:0,0 | ACC += DR:17,1 * WR:0,1 | | ACC += DR:17,511 * WR:0,511 |
| 2 | ACC += MREG:511 * WR:1,0 | ACC += MREG:0 * WR:1,1 | | ACC += MREG:510 * WR:1,511 |
| 3 | ACC += MREG:511 * WR:2,0 | ACC += MREG:0 * WR:2,1 | | ACC += MREG:510 * WR:2,511 |
| | | ... | | |
| 512 | ACC += MREG:511 * WR:511,0 | ACC += MREG:0 * WR:511,1 | | ACC += MREG:510  * WR:511,511 |
| 513 | AFU (ACC) | AFU (ACC) | | AFU (ACC) |
| 514 | WRITE AFU OUTP TO DR:16,0 | WRITE AFU OUTP TO DR:16,1 | | WRITE AFU OUTP TO DR:16,511 |

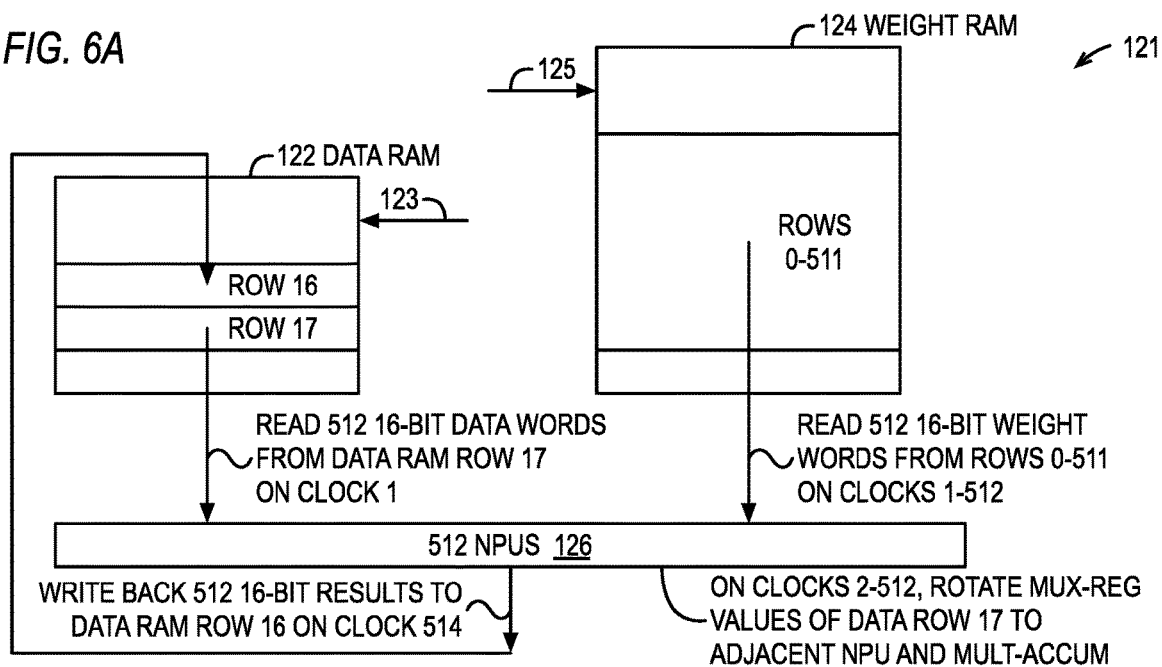

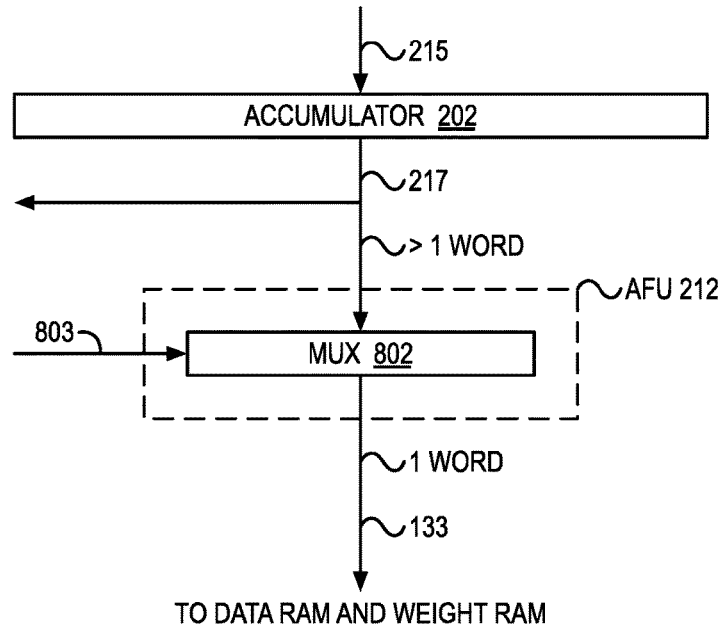

FIG. 9

| ADDRESS | INSTRUCTION | CLOCKS |
|---|---|---|
| 0 | INITIALIZE NPU | 1 |
| 1 | MULT-ACCUM DR ROW 17, WR ROW 0 | 1 |
| 2 | MULT-ACCUM ROTATE, WR ROW +1, COUNT = 511 | 511 |
| 3 | WRITE ACC TO DR ROW 16 | 1 |
| 4 | WRITE ACC TO DR ROW 17 | 1 |
| 5 | WRITE ACC TO DR ROW 18 | 1 |

FIG. 10

| CLK | NPU 0 | NPU 1 | ... | NPU 511 |
|---|---|---|---|---|
| 0 | ACC = 0 | ACC = 0 | | ACC = 0 |
| 1 | ACC += DR:17,0 * WR:0,0 | ACC += DR:17,1 * WR:0,1 | | ACC += DR:17,511 * WR:0,511 |
| 2 | ACC += MREG:511 * WR:1,0 | ACC += MREG:0 * WR:1,1 | | ACC += MREG:510 * WR:1,511 |
| 3 | ACC += MREG:511 * WR:2,0 | ACC += MREG:0 * WR:2,1 | | ACC += MREG:510 * WR:2,511 |
| | | ... | | |
| 512 | ACC += MREG:511 * WR:511,0 | ACC += MREG:0 * WR:511,1 | | ACC += MREG:510 * WR:511,511 |
| 513 | WRITE ACC[15:00] TO DATA RAM ROW 16 | | | |
| 514 | WRITE ACC[31:16] TO DATA RAM ROW 17 | | | |
| 515 | WRITE ACC[47:32] TO DATA RAM ROW 18 | | | |

FIG. 20

| ADDRESS | INSTRUCTION | CLOCKS |
|---|---|---|
| 0 | INITIALIZE NPU NARROW | 1 |
| 1 | MULT-ACCUM  DR ROW 17, WR ROW 0 | 1 |
| 2 | MULT-ACCUM  ROTATE, WR ROW +1, COUNT = 1023 | 1023 |
| 3 | ACTIVATION FUNCTION | 1 |
| 4 | WRITE AFU OUTPUT TO DR ROW 16 | 1 |

FIG. 21

| CLK | NPU 0-A | NPU 0-B | ••• | NPU 511-B |
|---|---|---|---|---|
| 0 | ACC = 0 | ACC = 0 | | ACC = 0 |
| 1 | ACC += DR:17,0 * WR:0,0 | ACC += DR:17,1 * WR:0,1 | | ACC += DR:17,1023 * WR:0,1023 |
| 2 | ACC += MREGB:511 * WR:1,0 | ACC += MREGA:0 * WR:1,1 | | ACC += MREGA:511 * WR:1,1023 |
| 3 | ACC += MREGB:511 * WR:2,0 | ACC += MREGA:0 * WR:2,1 | | ACC += MREGA:511 * WR:2,1023 |
| | | ••• | | |
| 1024 | ACC += MREGB:511 * WR:1023,0 | ACC += MREGA:0 * WR:1023,1 | | ACC += MREGA:511*WR:1023,1023 |
| 1025 | AFU (ACC) | AFU (ACC) | | AFU (ACC) |
| 1026 | WRITE AFU OUTP TO DR:16,0 | WRITE AFU OUTP TO DR:16,1 | | WRITE AFU OUTP TO DR:16,1023 |

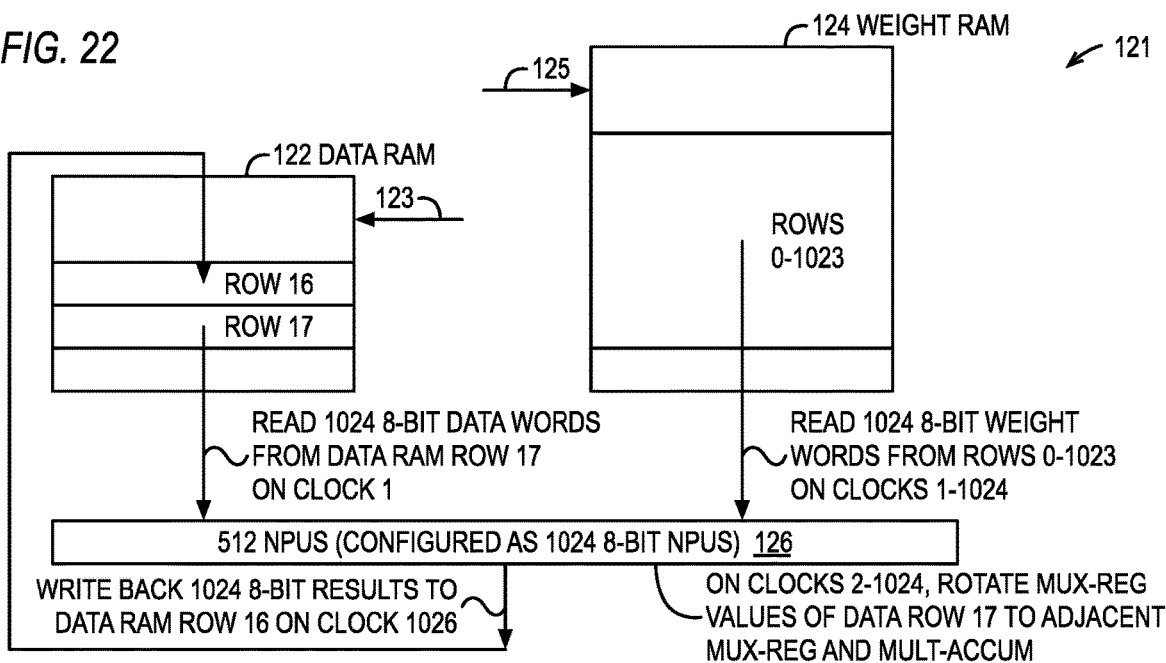

| ADDRESS | INSTRUCTION | CLOCKS |
|---|---|---|
| 0 | INITIALIZE NPU, WR ROW = 0, OUTROW = WR 900, LOOPCNT = 400 | 1 |
| 1 | MULT-ACCUM  DR ROW 0 | 1 |
| 2 | MULT-ACCUM  DR ROW +1, W ROTATE, COUNT = 2 | 2 |
| 3 | MULT-ACCUM  DR ROW +1, WR ROW +1 | 1 |
| 4 | MULT-ACCUM  DR ROW +1, W ROTATE, COUNT = 2 | 2 |
| 5 | MULT-ACCUM  DR ROW +1, WR ROW +1 | 1 |
| 6 | MULT-ACCUM  DR ROW +1, W ROTATE, COUNT = 2 | 2 |
| 7 | ACTIVATION FUNCTION, PASS THROUGH | 1 |
| 8 | WRITE AFU OUTPUT TO OUTROW +1 | 1 |
| 9 | DECREMENT WR ROW | 1 |
| 10 | LOOP TO 1 | 1 |

| |
|---|
| ADDRESS OF MOST RECENTLY WRITTEN WEIGHT RAM ROW  2602 |
| ADDRESS OF MOST RECENTLY READ WEIGHT RAM ROW  2604 |
| ADDRESS OF MOST RECENTLY WRITTEN DATA RAM ROW  2606 |
| ADDRESS OF MOST RECENTLY READ DATA RAM ROW  2608 |

FIG. 27

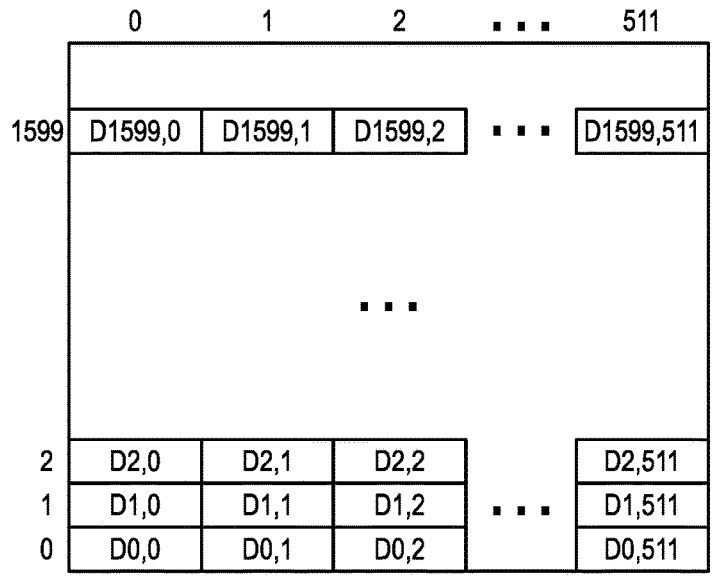

FIG. 28

| ADDRESS | INSTRUCTION | CLOCKS |
|---|---|---|
| 0 | INITIALIZE NPU, WR ROW = 0, OUTROW = WR 0, LOOPCNT = 400 | 1 |
| 1 | MAXWACC | 1 |
| 2 | MAXWACC  W ROTATE, COUNT = 3 | 2 |
| 3 | MAXWACC  WR ROW +1 | 1 |
| 4 | MAXWACC  W ROTATE, COUNT = 3 | 2 |
| 5 | MAXWACC  WR ROW +1 | 1 |
| 6 | MAXWACC  W ROTATE, COUNT = 3 | 2 |
| 7 | MAXWACC  WR ROW +1 | 1 |
| 8 | MAXWACC  W ROTATE, COUNT = 3 | 2 |
| 9 | ACTIVATION FUNCTION, PASS THROUGH | 1 |
| 10 | WRITE AFU OUTPUT TO OUTROW +1 | 1 |
| 11 | LOOP TO 1 | 1 |

* ONLY EVERY FOURTH NPU (I.E., 0, 4, 8, ETC.) PRODUCES A VALID RESULT, AND THE NUMBER OF OUTPUT ROWS IS ONE-FOURTH THE NUMBER OF INPUT ROWS, AND THE DATA RAM IS NOT USED

FIG. 29A  ← 127

| CONFIGURATION (NARROW, WIDE, FUNNEL) 2902 |
|---|
| SIGNED DATA 2912 |
| SIGNED WEIGHT 2914 |
| DATA BINARY POINT 2922 |
| WEIGHT BINARY POINT 2924 |
| ALU FUNCTION 2926 |
| ROUND CONTROL 2932 |
| ACTIVATION FUNCTION 2934 |
| RECIPROCAL 2942 |
| SHIFT AMOUNT 2944 |
| OUTPUT RAM 2952 |
| OUTPUT BINARY POINT 2954 |
| OUTPUT COMMAND 2956 |

FIG. 29B  ← 127

| ACCUMULATOR BINARY POINT 2923 |
|---|

FIG. 29C  ← 2942

| NUMBER OF SUPPRESSED LEADING ZEROES 2962 |
|---|
| LEADING ZERO-SUPPRESSED RECIPROCAL 2964 |

FIG. 31

```
CONFIGURATION = NARROW (8-BIT), SIGNED DATA = TRUE, SIGNED WEIGHT = TRUE
DATA BINARY POINT = 7 (FIRST DATA WORD)                              0.1001110
WEIGHT BINARY POINT = 3 (FIRST WEIGHT WORD)                          00001.010
IMPLIED MULTIPLY FORMAT (VALUE AFTER FIRST MULTIPLY)        000000.1100001100
ACCUMULATOR AFTER ALL MULTIPLY-ACCUMULATES     00000000000000001.1101010100
OUTPUT BINARY POINT = 7, ROUNDED AND COMPRESSED TO CANONICAL FORM
                                                             000000001.1101011
         ROUND CONTROL = STOCHASTIC, AND RANDOM BIT WAS TRUE, SO ROUND UP

ACTIVATION FUNCTION = SIGMOID, SO COMPRESS TO 3.4 FORM                001.1101
SIGMOID OUTPUT IN CANONICAL FORM                          000000000000.1101110
OUTPUT COMMAND = NARROW WORD SIZE                                     01101110
```

FIG. 32

```
CONFIGURATION = NARROW (8-BIT)
ACCUMULATOR AFTER ALL ALU OPERATIONS (ACCUMULATOR BINARY POINT = 10)
                                                 000001100000011011.1101111010
OUTPUT BINARY POINT = 4, SATURATED AND COMPRESSED TO CANONICAL FORM
                                                              11111111111.1111
ACTIVATION FUNCTION = PASS-THROUGH CANONICAL
    OUTPUT COMMAND = CANONICAL FORM SIZE, LOWER WORD                  11111111
    OUTPUT COMMAND = CANONICAL FORM SIZE, UPPER WORD                  11111111
```

FIG. 33

```
CONFIGURATION = WIDE (16-BIT)
ACCUMULATOR AFTER ALL ALU OPERATIONS (ACCUMULATOR BINARY POINT = 8)
                                 00100000000000000001100000011011.11011110
ACTIVATION FUNCTION = PASS-THROUGH FULL RAW ACCUMULATOR
    OUTPUT COMMAND = LOWER WORD                           0001101111011110
    OUTPUT COMMAND = MIDDLE WORD                          0000000000011000
    OUTPUT COMMAND = UPPER WORD                           0000000001000000
```

/ 127

| ADDRESS OF MOST RECENTLY WRITTEN WEIGHT RAM ROW  2602 |
| ADDRESS OF MOST RECENTLY READ WEIGHT RAM ROW  2604 |
| ADDRESS OF MOST RECENTLY WRITTEN DATA RAM ROW  2606 |
| ADDRESS OF MOST RECENTLY READ DATA RAM ROW  2608 |
| NNU PROGRAM COUNTER  3912 |
| LOOP COUNT  3914 |
| ITERATION COUNT  3916 |

FIG. 41

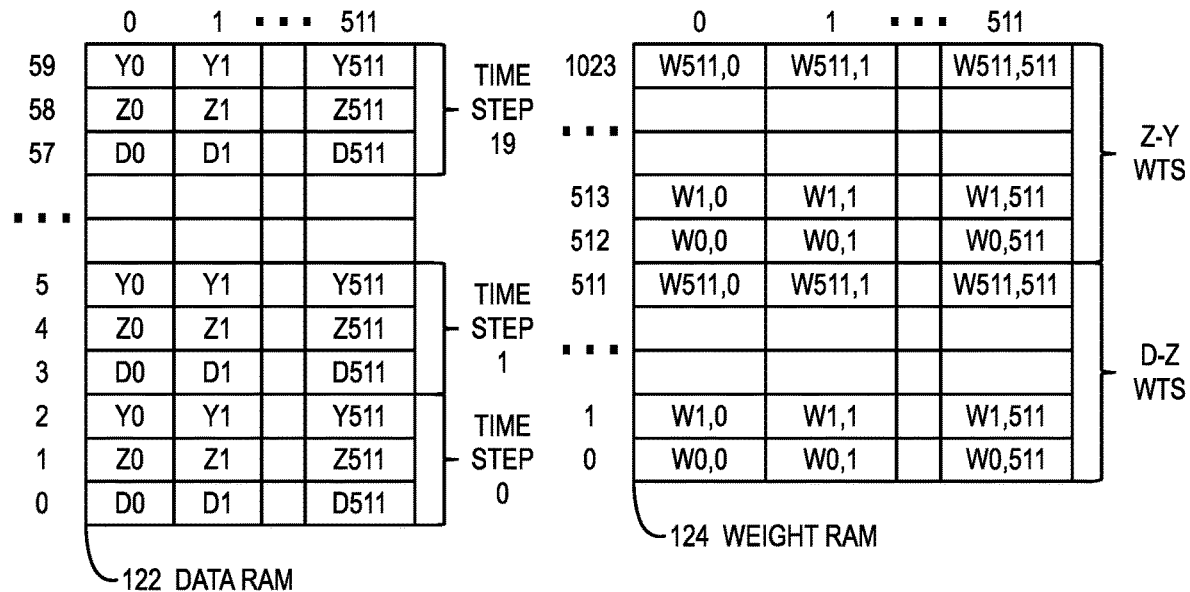

*THE Z VALUES OF A TIME STEP ARE THE C VALUES FOR THE NEXT TIME STEP

FIG. 42

ADDR INSTRUCTION
0   INITIALIZE NPU, LOOPCNT = 20        // 20 TIME STEPS; ASSUME INITIAL C NODES ARE ZERO
1   MULT-ACCUM DR ROW 0, WR ROW 0        // COMPUTE INITIAL Z LAYER
2   MULT-ACCUM ROTATE, WR ROW +1, COUNT = 511
3   OUTPUT PASSTHRU, DR OUT ROW 1, CLR ACC    // OUTPUT INITIAL Z LAYER TO DRAM
4   MULT-ACCUM DR ROW +1, WR ROW 512        // COMPUTE Y LAYER
5   MULT-ACCUM ROTATE, WR ROW +1, COUNT = 511
6   OUTPUT ACTIVATION FUNCTION, DR OUT ROW +1, CLR ACC    // OUTPUT Y LAYER TO DRAM
7   ADD_D_ACC DR ROW +0        // ACCUMULATE CONTEXT NODES; ASSUME WEIGHTS ARE ONE
8   ADD_D_ACC ROTATE, COUNT = 511        // DO NOT CLEAR ACC
9   MULT-ACCUM DR ROW +2, WR ROW 0        // ACCUMULATE D TO COMPUTE Z LAYER
10  MULT-ACCUM ROTATE, WR ROW +1, COUNT = 511
11  OUTPUT PASSTHRU, DR OUT ROW +2, CLR ACC    // OUTPUT Z LAYER TO DRAM
12  LOOP 4

FIG. 44

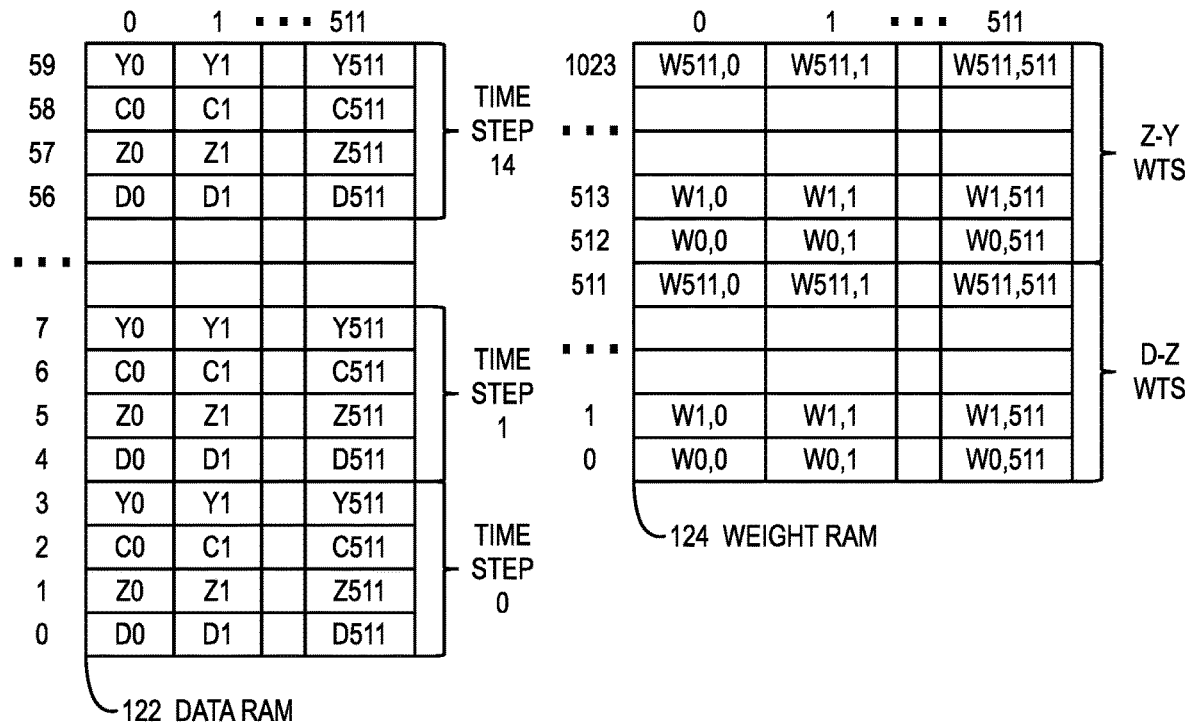

FIG. 45

ADDR INSTRUCTION

0   INITIALIZE NPU, LOOPCNT = 15          // 15 TIME STEPS; ASSUME INITIAL C NODES ARE ZERO
1   MULT-ACCUM  DR ROW 0, WR ROW 0         // COMPUTE INITIAL Z LAYER
2   MULT-ACCUM  ROTATE, WR ROW +1, COUNT = 511
3   OUTPUT PASSTHRU, DR OUT ROW 1, CLR ACC     // OUTPUT INITIAL Z LAYER TO DRAM
4   MULT-ACCUM  DR ROW +1, WR ROW 512       // COMPUTE Y LAYER
5   MULT-ACCUM  ROTATE, WR ROW +1, COUNT = 511
6   OUTPUT PASSTHRU, DR OUT ROW +1     // OUTPUT C LAYER TO DRAM; DO NOT CLEAR ACC
7   OUTPUT ACTIVATION FUNCTION, DR OUT ROW +1, CLR ACC   // OUTPUT Y LAYER TO DRAM
8   ADD_D_ACC DR ROW +1        // ACCUMULATE CONTEXT NODES; ASSUME WEIGHTS ARE ONE
9   ADD_D_ACC  ROTATE, COUNT = 511
10  MULT-ACCUM  DR ROW +2, WR ROW 0        // ACCUMULATE D TO COMPUTE Z LAYER
11  MULT-ACCUM  ROTATE, WR ROW +1, COUNT = 511
12  OUTPUT PASSTHRU, DR OUT ROW +2, CLR ACC            // OUTPUT Z LAYER TO DRAM
13  LOOP 4

*FIG. 46*

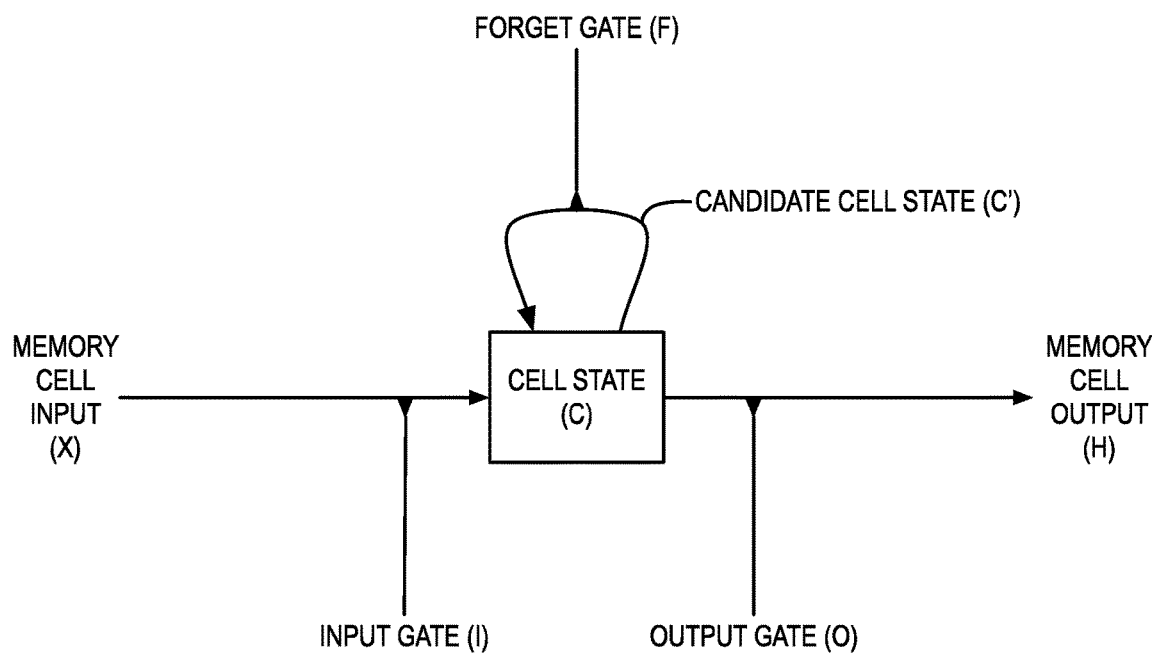

(1)  $I = SIGMOID(W_i * X + U_i * H + B_i)$
(2)  $F = SIGMOID(W_f * X + U_f * H + B_f)$
(3)  $C' = TANH(W_c * X + U_c * H + B_c)$
(4)  $C = I * C' + F * C$ (I.E., COMPUTE NEW CELL STATE USING CURRENT CELL STATE AS INPUT)
(5)  $O = SIGMOID(W_o * X + U_o * H + B_o)$
(6)  $H = O * TANH(C)$

Wi AND Ui ARE WEIGHTS ASSOCIATED WITH INPUT GATE.
Wf AND Uf ARE WEIGHTS ASSOCIATED WITH FORGET GATE.
Wo AND Uo ARE WEIGHTS ASSOCIATED WITH OUTPUT GATE.
Bi, Bf and Bo ARE BIAS INPUTS ASSOCIATED WITH RESPECTIVE INPUT, FORGET AND OUTPUT GATES.

*FIG. 48*

| ADDR | INSTRUCTION | |
|---|---|---|
| 0 | INITIALIZE NPU, CLR ACC, LOOPCNT = 12, DR IN ROW = -1, DR OUT ROW = 2 | // 12 TIME STEPS |
| 1 | MULT-ACCUM DR ROW +1, WR ROW 0 | // COMPUTE AND WRITE INPUT GATE: |
| 2 | MULT-ACCUM DR ROW +1, WR ROW 1 | // I = SIGMOID (Wi * X + Ui * H + Bi) |
| 3 | ADD_W_ACC WR ROW 2 | |
| 4 | OUTPUT SIGMOID, DR OUT ROW +0, CLR ACC | |
| 5 | MULT-ACCUM DR ROW -1, WR ROW 3 | // COMPUTE AND WRITE FORGET GATE: |
| 6 | MULT-ACCUM DR ROW +1, WR ROW 4 | // F = SIGMOID (Wf * X + Uf * H + Bf) |
| 7 | ADD_W_ACC WR ROW 5 | |
| 8 | OUTPUT SIGMOID, DR OUT ROW +1, CLR ACC | |
| 9 | MULT-ACCUM DR ROW -1, WR ROW 6 | // COMPUTE AND WRITE CANDIDATE: |
| 10 | MULT-ACCUM DR ROW +1, WR ROW 7 | // C' = TAHN (Wc * X + Uc * H + Bc) |
| 11 | ADD_W_ACC WR ROW 8 | |
| 12 | OUTPUT TANH, WR OUT ROW 9, CLR ACC | |
| 13 | MULT-ACCUM DR ROW +1, WR ROW 9 | // COMPUTE AND WRITE NEW CELL STATE: |
| 14 | MULT-ACCUM DR ROW +1, WR ROW 11 | // C = I * C' + F * C |
| 15 | OUTPUT PASSTHRU, WR OUT ROW 11 | // OUTPUT C FOR USE IN NEXT TIME STEP |
| 16 | OUTPUT TANH, WR OUT ROW 10, CLR ACC | // OUTPUT TANH(C) FOR H CALCULATION |
| 17 | MULT-ACCUM DR ROW -3, WR ROW 12 | // COMPUTE AND WRITE OUTPUT GATE: |
| 18 | MULT-ACCUM DR ROW +1, WR ROW 13 | // O = SIGMOID (Wo * X + Uo * H + Bo) |
| 19 | ADD_W_ACC WR ROW 14 | |
| 20 | OUTPUT SIGMOID, DR OUT ROW +1, CLR ACC | |
| 21 | MULT-ACCUM DR ROW +3, WR ROW 10 | // COMPUTE AND WRITE CELL OUTPUT: |
| 22 | OUTPUT PASSTHRU, DR OUT ROW +2, CLR ACC | // H = O * TANH(C) |
| 23 | LOOP 1 | |

FIG. 50

122 DATA RAM

| | LSTM CELL 0 | | | | LSTM CELL 1 | | | | ... | LSTM CELL 127 | | | | TIME STEP |
|---|---|---|---|---|---|---|---|---|---|---|---|---|---|---|
| | 0 | 1 | 2 | 3 | 4 | 5 | 6 | 7 | | 508 | 509 | 510 | 511 | |
| 63 | H0 | H0 | H0 | H0 | H1 | H1 | H1 | H1 | | H127 | H127 | H127 | H127 | 30 |
| 62 | X0 | X0 | X0 | X0 | X1 | X1 | X1 | X1 | | X127 | X127 | X127 | X127 | |
| ... | | | | | | | | | | | | | | |
| 5 | H0 | H0 | H0 | H0 | H1 | H1 | H1 | H1 | | H127 | H127 | H127 | H127 | 1 |
| 4 | X0 | X0 | X0 | X0 | X1 | X1 | X1 | X1 | | X127 | X127 | X127 | X127 | |
| 3 | H0 | H0 | H0 | H0 | H1 | H1 | H1 | H1 | | H127 | H127 | H127 | H127 | 0 |
| 2 | X0 | X0 | X0 | X0 | X1 | X1 | X1 | X1 | | X127 | X127 | X127 | X127 | |
| 1 | - | - | - | - | - | - | - | - | | - | - | - | - | UNUSED |
| 0 | H0 | H0 | H0 | H0 | H1 | H1 | H1 | H1 | | H127 | H127 | H127 | H127 | INITIAL VAL. |

124 WEIGHT RAM

| | LSTM CELL 0 | | | | LSTM CELL 1 | | | | ... | LSTM CELL 127 | | | |
|---|---|---|---|---|---|---|---|---|---|---|---|---|---|
| | 0 | 1 | 2 | 3 | 4 | 5 | 6 | 7 | | 508 | 509 | 510 | 511 |
| 6 | - | - | - | C0 | - | - | - | C1 | | - | - | - | C127 |
| 5 | Bi0 | Bf0 | Bo0 | - | Bi1 | Bf1 | Bo1 | - | | Bi127 | Bf127 | Bo127 | - |
| 4 | Ui0 | Uf0 | Uo0 | - | Ui1 | Uf1 | Uo1 | - | | Ui127 | Uf127 | Uo127 | - |
| 3 | Wi0 | Wf0 | Wo0 | - | Wi1 | Wf1 | Wo1 | - | | Wi127 | Wf127 | Wo127 | - |
| 2 | - | - | - | Bc0 | - | - | - | Bc1 | | - | - | - | Bc127 |
| 1 | - | - | - | Uc0 | - | - | - | Uc1 | | - | - | - | Uc127 |
| 0 | - | - | - | Wc0 | - | - | - | Wc1 | | - | - | - | Wc127 |

1104 OUTPUT BUFFER

| | LSTM CELL 0 | | | | LSTM CELL 1 | | | | ... | LSTM CELL 127 | | | | OUTPUT BUFFER CONTENTS AFTER EXECUTION OF INSTRUCTION AT THIS ADDRESS:  |
|---|---|---|---|---|---|---|---|---|---|---|---|---|---|---|
| | 0 | 1 | 2 | 3 | 4 | 5 | 6 | 7 | | 508 | 509 | 510 | 511 | |
| | H0 | H0 | H0 | H0 | H1 | H1 | H1 | H1 | | H127 | H127 | H127 | H127 | 2 |
| | H0 | H0 | H0 | C'0 | H1 | H1 | H1 | C'1 | | H127 | H127 | H127 | C'127 | 6 |
| | I0 | F0 | O0 | C'0 | I1 | F1 | O1 | C'1 | | I127 | F127 | O127 | C'127 | 10 |
| | I0 | F0 | O0 | C0 | I1 | F1 | O1 | C1 | | I127 | F127 | O127 | C127 | 13 |
| | I0 | F0 | O0 | TANH(C0) | I1 | F1 | O1 | TANH(C1) | | I127 | F127 | O127 | TANH(C127) | 14 |
| | H0 | H0 | H0 | H0 | H1 | H1 | H1 | H1 | | H127 | H127 | H127 | H127 | 16 |

FIG. 51

| ADDR | INSTRUCTION | |
|---|---|---|
| 0 | INITIALIZE NPU, CLR ACC, LOOPCNT = 31, DR OUT ROW = 1 | // 31 TIME STEPS |
| 1 | ADD_D_ACC DR ROW 0 | // PUT INITIAL OUTPUT IN ACCUMULATOR |
| 2 | OUTPUT PASSTHRU, NOP, CLR ACC | // PUT INITIAL OUTPUT IN OUTPUT BUFFER |
| 3 | MULT-ACCUM DR ROW +2, WR ROW 0 | // C' = Wc * X |
| 4 | MULT-ACCUM OUTBUF[0], WR ROW 1 | // C' = Wc * X + Uc * H |
| 5 | ADD_W_ACC WR ROW 2 | // C' = Wc * X + Uc * H + Bc |
| 6 | OUTPUT TANH, NOP, MASK[0:2], CLR ACC | // OUTPUT C' TO OUTPUT BUFFER ONLY |
| 7 | MULT-ACCUM DR ROW +0, WR ROW 3 | // I = Wi*X;   F = Wf*X;   O = Wo*X |
| 8 | MULT-ACCUM OUTBUF[0], WR ROW 4 | // I = Wi*X+Ui*H;   F = Wf*X+Uf*H;   O = Wo*X+Uo*H |
| 9 | ADD_W_ACC WR ROW 5 | // I = Wi*X+Ui*H+Bi; F = Wf*X+Uf*H+Bf; O = Wo*X+Uo*H+Bo |
| 10 | OUTPUT SIGMOID, NOP, MASK[3], CLR ACC | // OUTPUT I, F, O TO OUTPUT BUFFER ONLY |
| 11 | MULT-ACCUM OUTBUF[0], OUTBUF[3] | // C = I * C' |
| 12 | MULT-ACCUM OUTBUF[1], WR ROW 6 | // C = I * C' + F * C |
| 13 | OUTPUT PASSTHRU, WR OUT ROW 6, MASK[0:2] | // OUTPUT C (FOR NEXT TS); DON'T CLEAR ACC |
| 14 | OUTPUT TANH, NOP, MASK[0:2], CLR ACC | // OUTPUT TANH(C) TO OUTPUT BUFFER ONLY |
| 15 | MULT-ACCUM OUTBUF[2], OUTBUF[3] | // H = O * TANH(C) |
| 16 | OUTPUT PASSTHRU, DR OUT ROW +2, CLR ACC | |
| 17 | LOOP 3 | |

*FIG. 54*

| ADDR | INSTRUCTION | |
|---|---|---|
| 0 | INITIALIZE NPU, CLR ACC, LOOPCNT = 31, DR OUT ROW = 1 | // 31 TIME STEPS |
| 1 | ADD_D_ACC DR ROW 0 | // PUT INITIAL OUTPUT IN ACCUMULATOR |
| 2 | OUTPUT PASSTHRU, NOP, CLR ACC | // PUT INITIAL OUTPUT IN OUTPUT BUFFER |
| 3 | MULT-ACCUM DR ROW +2, WR ROW 0 | // I=Wi*X;  F=Wf*X;  O=Wo*X;  C'=Wc*X |
| 4 | MULT-ACCUM OUTBUF[0], WR ROW 1 | // I=Wi*X+Ui*H; F=Wf*X+Uf*H; O=Wo*X+Uo*H; C'=Wc*X+Uc*H |
| 5 | ADD_W_ACC WR ROW 2 | // I=Wi*X+Ui*H+Bi; F=Wf*X+Uf*H+Bf; O=Wo*X+Uo*H+Bo; C'=Wc*X+Uc*H+Bc |
| 6 | OUTPUT TANH, NOP, MASK[0:2] | // OUTPUT C' TO OUTPUT BUFFER ONLY; DON'T CLEAR ACC |
| 7 | OUTPUT SIGMOID, NOP, MASK[3], CLR ACC | // OUTPUT I, F, O TO OUTPUT BUFFER ONLY |
| 8 | MULT-ACCUM OUTBUF[0], OUTBUF[3] | // C = I * C' |
| 9 | MULT-ACCUM OUTBUF[1], WR ROW 3 | // C = I * C' + F * C (I.E.,CURRENT CELL STATE) |
| 10 | OUTPUT PASSTHRU, WR OUT ROW 3, MASK[0:2] | // OUTPUT C (FOR NEXT TS); DON'T CLEAR ACC |
| 11 | OUTPUT TANH, NOP, MASK[0:2], CLR ACC | // OUTPUT TANH(C) TO OUTPUT BUFFER ONLY |
| 12 | MULT-ACCUM OUTBUF[2], OUTBUF[3] | // H = O * TANH(C) |
| 13 | OUTPUT PASSTHRU, DR OUT ROW +2, CLR ACC | |
| 14 | LOOP 3 | |

FIG. 55

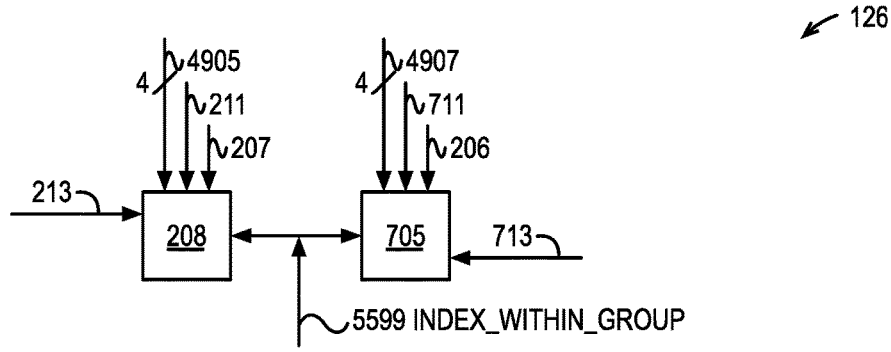

FIG. 56

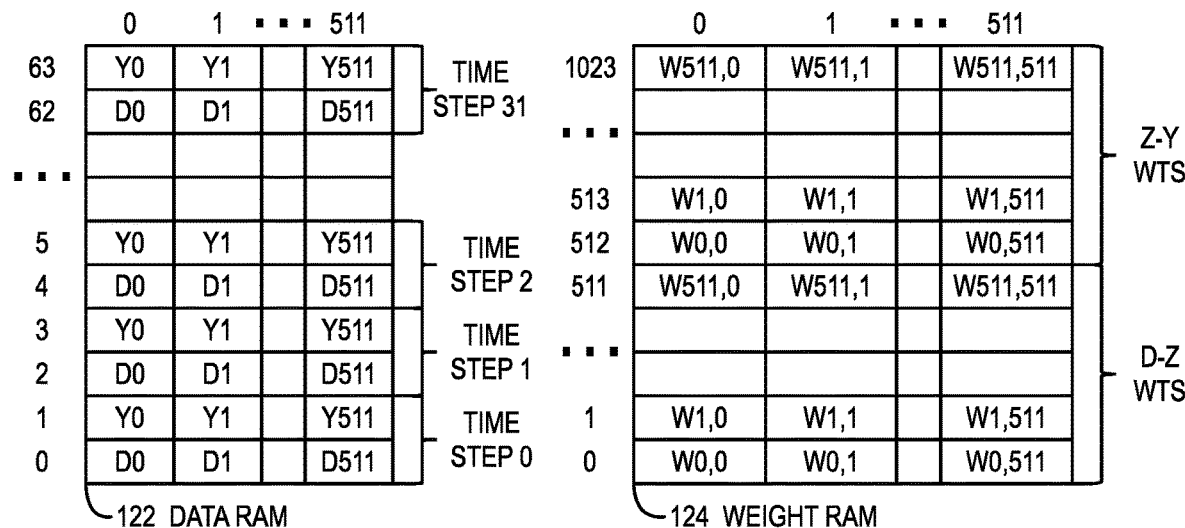

FIG. 57

| ADDR | INSTRUCTION | |
|---|---|---|
| 0 | INITIALIZE NPU, LOOPCNT = 32, DR ROW = -2, DR OUT ROW = -1, CLR_ACC | // 32 TIME STEPS |
| 1 | OUTPUT PASSTHRU, NOP, CLR ACC | // PUT INITIAL C VALUES (ZERO) IN OUTBUF |
| 2 | ADD_D_ACC OUTBUF[SELF] | // ACCUMULATE C VALUES THAT ARE IN OUTBUF |
| 3 | ADD_D_ACC ROTATE, COUNT = 511 | // DO NOT CLEAR ACC |
| 4 | MULT-ACCUM DR ROW +2, WR ROW 0 | // COMPUTE Z: ACCUMULATE D WITH ACCUMULATED C |
| 5 | MULT-ACCUM ROTATE, WR ROW +1, COUNT = 511 | |
| 6 | OUTPUT PASSTHRU, NOP, CLR ACC | // PUT Z IN OUTBUF |
| 7 | MULT-ACCUM OUTBUF[SELF], WR ROW 512 | // COMPUTE Y AND C |
| 8 | MULT-ACCUM ROTATE, WR ROW +1, COUNT = 511 | |
| 9 | OUTPUT ACTIVATION FUNCTION, DR OUT ROW +2 | // WRITE Y TO DATA RAM |
| 10 | OUTPUT PASSTHRU, NOP, CLR ACC | // PUT NEW C VALUES IN OUTBUF |
| 11 | LOOP 2 | // OUTPUT Z LAYER TO DRAM |

FIG. 71

| BASE REGISTER 0 7198-0 | BASE REGISTER 1 7198-1 | BASE REGISTER 2 7198-2 | BASE REGISTER 3 7198-3 |
|---|---|---|---|

7104 DMA CONTROL WORD (DCW)

| RING BUS ADDRESS 7112 | RAM ADDRESS 7114 | MEMORY SPACE 7116 | DIRECTION 7118 | COUNT 7122 | COHERENT 7124 | INTERRUPT 7126 | WAIT TAG 7128 |
|---|---|---|---|---|---|---|---|

NEURAL NETWORK UNIT

CROSS REFERENCE TO RELATED APPLICATIONS

The present application is a continuation-in-part of U.S. patent application Ser. No. 15/090,665 filed Apr. 5, 2016, which claims priority to provisional applications: Ser. No. 62/299,191, filed Feb. 24, 2016, Ser. No. 62/262,104, filed Dec. 2, 2015, and Ser. No. 62/239,254, filed Oct. 8, 2015.

The present application is also a continuation-in-part of U.S. patent application Ser. No. 15/090,701 filed Apr. 5, 2016, which claims priority to provisional applications: Ser. No. 62/299,191, filed Feb. 24, 2016, Ser. No. 62/262,104, filed Dec. 2, 2015, and Ser. No. 62/239,254, filed Oct. 8, 2015.

The present application is also a continuation-in-part of U.S. patent application Ser. No. 15/090,801 filed Apr. 5, 2016, which claims priority to provisional applications: Ser. No. 62/299,191, filed Feb. 24, 2016, Ser. No. 62/262,104, filed Dec. 2, 2015, and Ser. No. 62/239,254, filed Oct. 8, 2015.

The present application is also a continuation-in-part of U.S. patent application Ser. No. 15/366,027 filed Dec. 1, 2016.

Finally, the present application claims priority to U.S. Provisional Application Ser. No. 62/484,353, filed on Apr. 11, 2017.

The entire disclosures of each of the above-referenced applications are incorporated herein by reference.

BACKGROUND

Technical Field

The disclosure relates to a hardware processing unit, and a neural network unit and a computer program product encoded in at least one non-transitory computer usable medium for use with a computing device.

Description of the Related Art

Recently, there has been a resurgence of interest in artificial neural networks (ANN), and such research has commonly been termed deep learning, computer learning and similar terms. The increase in general-purpose processor computation power has given rise to the renewed interest that waned a couple of decades ago. Recent applications of ANNs have included speech and image recognition, along with others. There appears to be an increasing demand for improved performance and efficiency of computations associated with ANNs.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A hardware processing unit, and a neural network unit and a computer program product encoded in at least one non-transitory computer usable medium for use with a computing device are provided in the disclosure.

In one exemplary embodiment, a hardware processing unit, comprising: an accumulator having an input and an output; a multiplier-adder, having an output and first, second and third inputs, that receives on the first and second inputs respective first and second factors and that receives on the third input an addend, the multiplier-adder generates a sum of the addend and a product of the first and second factors and provides the sum on its output; a first multiplexer, having an output coupled to the multiplier-adder first input and that receives a first operand, a positive one, and a negative one and selects one of them for provision as the first factor to the multiplier-adder; a second multiplexer, having an output coupled to the multiplier-adder second input and that receives a second operand, a positive one, and a negative one and selects one of them for provision as the second factor to the multiplier-adder; a third multiplexer, having an output, that receives the first operand and the second operand and selects one of them for provision on its output; and a fourth multiplexer, having an output coupled to the accumulator input, that receives the third multiplexer output and the sum and selects one of them for provision to the accumulator.

In one exemplary embodiment, a neural network unit, comprising: an array of N hardware processing units, each comprising: an accumulator having an input and an output; a multiplier-adder, having an output and first, second and third inputs, that receives on the first and second inputs respective first and second factors and that receives on the third input an addend, the multiplier-adder generates a sum of the addend and a product of the first and second factors and provides the sum on its output; a first multiplexer, having an output coupled to the multiplier-adder first input and that receives a first operand, a positive one, and a negative one and selects one of them for provision as the first factor to the multiplier-adder; a second multiplexer, having an output coupled to the multiplier-adder second input and that receives a second operand, a positive one, and a negative one and selects one of them for provision as the second factor to the multiplier-adder; a third multiplexer, having an output, that receives the first operand and the second operand and selects one of them for provision on its output; and a fourth multiplexer, having an output coupled to the accumulator input, that receives the third multiplexer output and the sum and selects one of them for provision to the accumulator; and wherein N is at least 1024.

In one exemplary embodiment, a computer program product encoded in at least one non-transitory computer usable medium for use with a computing device, the computer program product comprising: computer usable program code embodied in said medium, for specifying a hardware processing unit, the computer usable program code comprising: first program code for specifying an accumulator having an input and an output; second program code for specifying a multiplier-adder, having an output and first, second and third inputs, that receives on the first and second inputs respective first and second factors and that receives on the third input an addend, the multiplier-adder generates a sum of the addend and a product of the first and second factors and provides the sum on its output; third program code for specifying a first multiplexer, having an output coupled to the multiplier-adder first input and that receives a first operand, a positive one, and a negative one and selects one of them for provision as the first factor to the multiplier-adder; fourth program code for specifying a second multiplexer, having an output coupled to the multiplier-adder second input and that receives a second operand, a positive one, and a negative one and selects one of them for provision as the second factor to the multiplier-adder; fifth program code for specifying a third multiplexer, having an output, that receives the first operand and the second operand and selects one of them for provision on its output; and sixth program code for specifying a fourth multiplexer, having an output coupled to the accumulator input, that receives the third multiplexer output and the sum and selects one of them for provision to the accumulator.

BRIEF DESCRIPTION OF THE DRAWINGS

The present disclosure can be more fully understood by reading the subsequent detailed description and examples with references made to the accompanying drawings, wherein:

FIG. 4 is a table illustrating a program for storage in the program memory of and execution by the NNU of FIG. 1.

FIG. 5 is a timing diagram illustrating the execution of the program of FIG. 4 by the NNU.

FIG. 6A is a block diagram illustrating the NNU of FIG. 1 to execute the program of FIG. 4.

FIG. 8 is a block diagram illustrating a NPU of FIG. 1 according to an alternate embodiment.

FIG. 9 is a table illustrating a program for storage in the program memory of and execution by the NNU of FIG. 1.

FIG. 10 is a timing diagram illustrating the execution of the program of FIG. 9 by the NNU.

FIG. 20 is a table illustrating a program for storage in the program memory of and execution by the NNU of FIG. 1 having NPUs according to the embodiment of FIG. 18.

FIG. 21 is a timing diagram illustrating the execution of the program of FIG. 20 by the NNU that includes NPUs of FIG. 18 operating in a narrow configuration.

FIG. 22 is a block diagram illustrating the NNU of FIG. 1 including the NPUs of FIG. 18 to execute the program of FIG. 20.

FIG. 26A is a program listing of an NNU program that performs a convolution of a data matrix with the convolution kernel of FIG. 24 and writes it back to the weight RAM.

FIG. 26B is a block diagram illustrating certain fields of the control register of the NNU of FIG. 1 according to one embodiment.

FIG. 27 is a block diagram illustrating an example of the weight RAM of FIG. 1 populated with input data upon which a pooling operation is performed by the NNU of FIG. 1.

FIG. 28 is a program listing of an NNU program that performs a pooling operation of the input data matrix of FIG. 27 and writes it back to the weight RAM.

FIG. 29A is a block diagram illustrating an embodiment of the control register of FIG. 1.

FIG. 29B is a block diagram illustrating an embodiment of the control register of FIG. 1 according to an alternate embodiment.

FIG. 29C is a block diagram illustrating an embodiment of the reciprocal of FIG. 29A stored as two parts according to one embodiment.

FIG. 31 is an example of operation of the AFU of FIG. 30.

FIG. 32 is a second example of operation of the AFU of FIG. 30.

FIG. 33 is a third example of operation of the AFU of FIG. 30.

FIG. 41 is a block diagram illustrating an example of the layout of data within the data RAM and weight RAM of the NNU as it performs calculations associated with the Elman RNN of FIG. 40.

FIG. 42 is a table illustrating a program for storage in the program memory of and execution by the NNU to accomplish an Elman RNN and using data and weights according to the arrangement of FIG. 41.

FIG. 44 is a block diagram illustrating an example of the layout of data within the data RAM and weight RAM of the NNU as it performs calculations associated with the Jordan RNN of FIG. 43.

FIG. 45 is a table illustrating a program for storage in the program memory of and execution by the NNU to accomplish a Jordan RNN and using data and weights according to the arrangement of FIG. 44.

FIG. 46 is a block diagram illustrating an embodiment of an LSTM cell.

FIG. 48 is a table illustrating a program for storage in the program memory of and execution by the NNU to accomplish computations associated with an LSTM cell layer and using data and weights according to the arrangement of FIG. 47.

FIG. 50 is a block diagram illustrating an example of the layout of data within the data RAM, weight RAM and output buffer of the NNU of FIG. 49 as it performs calculations associated with a layer of LSTM cells of FIG. 46.

FIG. 51 is a table illustrating a program for storage in the program memory of and execution by the NNU of FIG. 49 to accomplish computations associated with an LSTM cell layer and using data and weights according to the arrangement of FIG. 50.

FIG. 54 is a table illustrating a program for storage in the program memory of and execution by the NNU of FIG. 49 to accomplish computations associated with an LSTM cell layer and using data and weights according to the arrangement of FIG. 53.

FIG. 55 is a block diagram illustrating portions of an NPU according to an alternate embodiment.

FIG. 56 is a block diagram illustrating an example of the layout of data within the data RAM and weight RAM of the NNU as it performs calculations associated with the Jordan RNN of FIG. 43 but employing the benefits afforded by the embodiments of FIG. 55.

FIG. 57 is a table illustrating a program for storage in the program memory of and execution by the NNU to accomplish a Jordan RNN and using data and weights according to the arrangement of FIG. 56.

FIG. 71 is a block diagram illustrating base address registers and a DMA control word (DCW).

DETAILED DESCRIPTION OF THE EMBODIMENTS

Processor with Architectural Neural Network Unit

Figure 1:
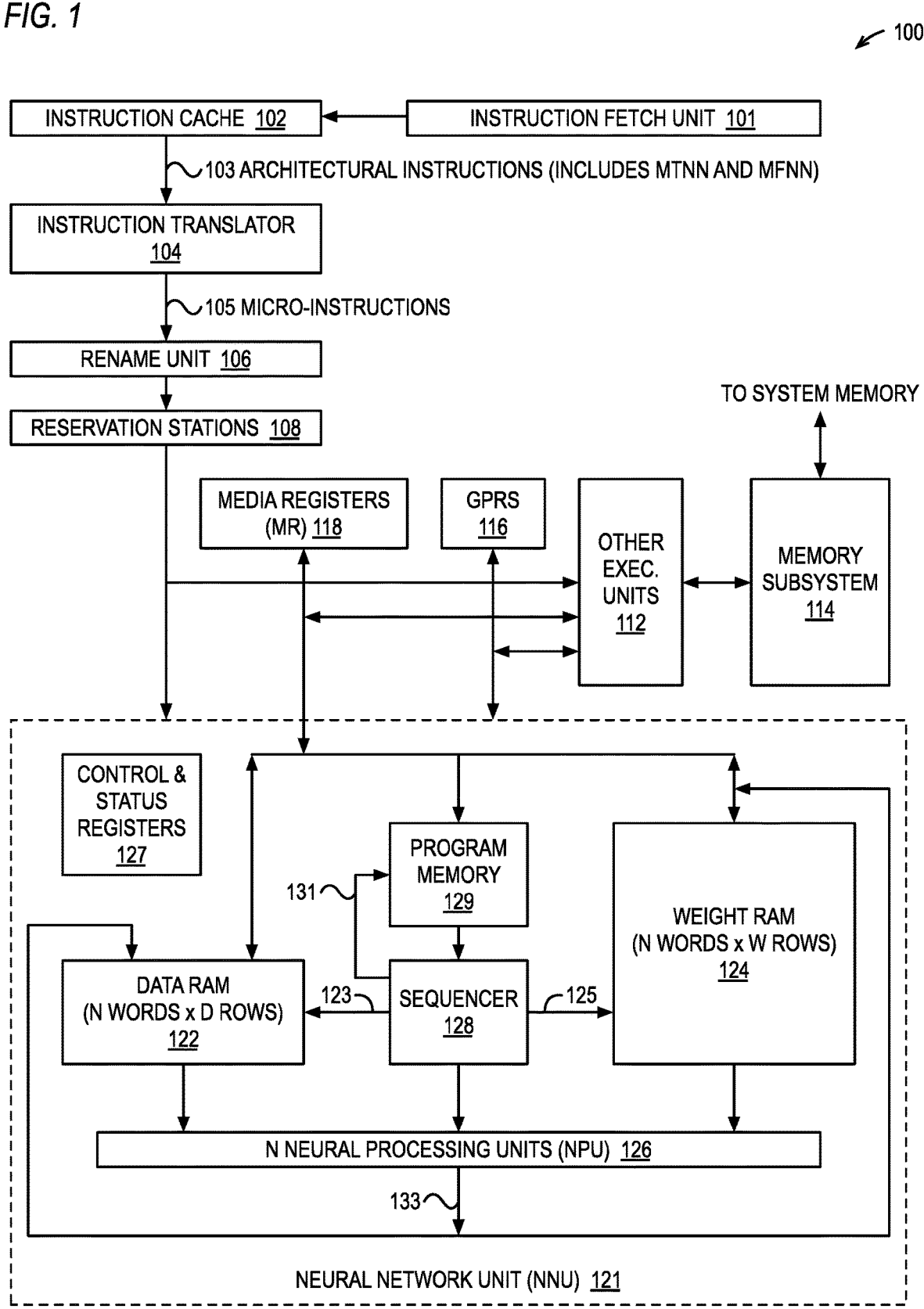
FIG. 1 is a block diagram illustrating a processor that includes a neural network unit (NNU).

Referring now to FIG. 1, a block diagram illustrating a processor 100 that includes a neural network unit (NNU) 121 is shown. The processor 100 includes an instruction fetch unit 101, an instruction cache 102, and instruction translator 104, a rename unit 106, reservation stations 108, media registers 118, general purpose registers (GPR) 116, execution units 112 other than the NNU 121, and a memory subsystem 114.

The processor 100 is an electronic device that functions as a central processing unit (CPU) on an integrated circuit. The processor 100 receives digital data as input, processes the data according to instructions fetched from a memory, and generates results of operations prescribed by the instructions as output. The processor 100 may be employed in a desktop, mobile, or tablet computer, and is employed for uses such as computation, text editing, multimedia display, and Internet browsing. The processor 100 may also be disposed in an embedded system to control a wide variety of devices including appliances, mobile telephones, smart phones, automobiles and industrial control devices. A CPU is the electronic circuits (i.e., "hardware") that execute the instructions of a computer program (also known as a "computer application" or "application") by performing operations on data that include arithmetic operations, logical operations, and input/output operations. An integrated circuit (IC) is a set of electronic circuits fabricated on a small piece of semiconductor material, typically silicon. An IC is also referred to as a chip, a microchip, or a die.

The instruction fetch unit 101 controls the fetching of architectural instructions 103 from system memory (not shown) into the instruction cache 102. The instruction fetch unit 101 provides a fetch address to the instruction cache 102 that specifies a memory address at which the processor 100 fetches a cache line of architectural instruction bytes into the instruction cache 102. The fetch address is based on the current value of the instruction pointer (not shown), or program counter, of the processor 100. Normally, the program counter is incremented sequentially by the size of an instruction unless a control instruction is encountered in the instruction stream, such as a branch, call or return instruction, or an exception condition occurs, such as an interrupt, trap, exception or fault, in which case the program counter is updated with a non-sequential address, such as a branch target address, return address or exception vector. Generally speaking, the program counter is updated in response to the execution of instructions by the execution units 112/121. The program counter may also be updated in response to detection of an exception condition such as the instruction translator 104 encountering an instruction 103 that is not defined by the instruction set architecture of the processor 100.

The instruction cache 102 caches the architectural instructions 103 fetched from a system memory that is coupled to the processor 100. The architectural instructions 103 include a move to neural network (MTNN) instruction and a move from neural network (MFNN) instruction, which are described in more detail below. In one embodiment, the architectural instructions 103 are instructions of the x86 instruction set architecture (ISA), with the addition of the MTNN and MFNN instructions. In the context of the present disclosure, an x86 ISA processor as a processor that generates the same results at the instruction set architecture level that an Intel® 80386® processor generates when it executes the same machine language instructions. However, other embodiments contemplate other instruction set architectures, such as Advanced RISC Machines (ARM)®, Sun SPARC®, or PowerPC®. The instruction cache 102 provides the architectural instructions 103 to the instruction translator 104, which translates the architectural instructions 103 into microinstructions 105.

The microinstructions 105 are provided to the rename unit 106 and eventually executed by the execution units 112/121. The microinstructions 105 implement the architectural instructions. Preferably, the instruction translator 104 includes a first portion that translates frequently executed and/or relatively less complex architectural instructions 103 into microinstructions 105. The instruction translator 104 also includes a second portion that includes a microcode unit (not shown). The microcode unit includes a microcode memory that holds microcode instructions that implement complex and/or infrequently used instructions of the architectural instruction set. The microcode unit also includes a microsequencer that provides a non-architectural microprogram counter (micro-PC) to the microcode memory. Preferably, the microcode instructions are translated by a microtranslator (not shown) into the microinstructions 105. A selector selects the microinstructions 105 from either the first portion or the second portion for provision to the rename unit 106, depending upon whether or not the microcode unit currently has control.

The rename unit 106 renames architectural registers specified in the architectural instructions 103 to physical registers of the processor 100. Preferably, the processor 100 includes a reorder buffer (not shown). The rename unit 106 allocates, in program order, an entry in the reorder buffer for each microinstruction 105. This enables the processor 100 to retire the microinstructions 105, and their corresponding architectural instructions 103, in program order. In one embodiment, the media registers 118 are 256 bits wide and the GPR 116 are 64 bits wide. In one embodiment, the media registers 118 are x86 media registers, such as Advanced Vector Extensions (AVX) registers.

In one embodiment, each entry in the reorder buffer includes storage for the result of the microinstruction 105; additionally, the processor 100 includes an architectural register file that includes a physical register for each of the architectural registers, e.g., the media registers 118 and the GPR 116 and other architectural registers. (Preferably, there are separate register files for the media registers 118 and GPR 116, for example, since they are different sizes.) For each source operand of a microinstruction 105 that specifies an architectural register, the rename unit populates the source operand field in the microinstruction 105 with the reorder buffer index of the newest older microinstruction 105 that writes to the architectural register. When the execution unit 112/121 completes execution of the microinstruction 105, it writes the result to the microinstruction's 105 reorder buffer entry. When the microinstruction 105 retires, a retire unit (not shown) writes the result from the microinstruction's reorder buffer entry to the register of the physical register file associated with the architectural destination register specified by the retiring microinstruction 105.

In another embodiment, the processor 100 includes a physical register file that includes more physical registers than the number of architectural registers, but does not include an architectural register file, and the reorder buffer entries do not include result storage. (Preferably, there are separate physical register files for the media registers 118 and GPR 116, for example, since they are different sizes.) The processor 100 also includes a pointer table with an associated pointer for each architectural register. For the operand of a microinstruction 105 that specifies an architectural register, the rename unit populates the destination operand field in the microinstruction 105 with a pointer to a free register in the physical register file. If no registers are free in the physical register file, the rename unit 106 stalls the pipeline. For each source operand of a microinstruction 105 that specifies an architectural register, the rename unit populates the source operand field in the microinstruction 105 with a pointer to the register in the physical register file assigned to the newest older microinstruction 105 that writes to the architectural register. When the execution unit 112/121 completes execution of the microinstruction 105, it writes the result to a register of the physical register file pointed to by the microinstruction's 105 destination operand field. When the microinstruction 105 retires, the retire unit copies the microinstruction's 105 destination operand field value to the pointer in the pointer table associated with the architectural destination register specified by the retiring microinstruction 105.

The reservation stations 108 hold microinstructions 105 until they are ready to be issued to an execution unit 112/121 for execution. A microinstruction 105 is ready to be issued when all of its source operands are available and an execution unit 112/121 is available to execute it. The execution units 112/121 receive register source operands from the reorder buffer or the architectural register file in the first embodiment or from the physical register file in the second embodiment described above. Additionally, the execution units 112/121 may receive register source operands directly from the execution units 112/121 via result forwarding buses (not shown). Additionally, the execution units 112/121 may receive from the reservation stations 108 immediate operands specified by the microinstructions 105. As discussed in more detail below, the MTNN and MFNN architectural instructions 103 include an immediate operand that specifies a function to be performed by the NNU 121 that is provided in one of the one or more microinstructions 105 into which the MTNN and MFNN architectural instructions 103 are translated.

The execution units 112 include one or more load/store units (not shown) that load data from the memory subsystem 114 and store data to the memory subsystem 114. Preferably, the memory subsystem 114 includes a memory management unit (not shown), which may include, e.g., translation lookaside buffers and a tablewalk unit, a level-1 data cache (and the instruction cache 102), a level-2 unified cache, and a bus interface unit that interfaces the processor 100 to system memory. In one embodiment, the processor 100 of FIG. 1 is representative of a processing core that is one of multiple processing cores in a multi-core processor that share a last-level cache memory. The execution units 112 may also include integer units, media units, floating-point units and a branch unit.

The NNU 121 includes a weight random access memory (RAM) 124, a data RAM 122, N neural processing units (NPUs) 126, a program memory 129, a sequencer 128 and control and status registers 127. The NPUs 126 function conceptually as neurons in a neural network. The weight RAM 124, data RAM 122 and program memory 129 are all writable and readable via the MTNN and MFNN architectural instructions 103, respectively. The weight RAM 124 is arranged as W rows of N weight words, and the data RAM 122 is arranged as D rows of N data words. Each data word and each weight word is a plurality of bits, preferably 8 bits, 9 bits, 12 bits or 16 bits. Each data word functions as the output value (also sometimes referred to as an activation) of a neuron of the previous layer in the network, and each weight word functions as a weight associated with a connection coming into a neuron of the instant layer of the network. Although in many uses of the NNU 121 the words, or operands, held in the weight RAM 124 are in fact weights associated with a connection coming into a neuron, it should be understood that in other uses of the NNU 121 the words held in the weight RAM 124 are not weights, but are nevertheless referred to as "weight words" because they are stored in the weight RAM 124. For example, in some uses of the NNU 121, e.g., the convolution example of FIGS. 24 through 26A or the pooling example of FIGS. 27 through 28, the weight RAM 124 may hold non-weights, such as elements of a data matrix, e.g., image pixel data. Similarly, although in many uses of the NNU 121 the words, or operands, held in the data RAM 122 are in fact the output value, or activation, of a neuron, it should be understood that in other uses of the NNU 121 the words held in the data RAM 122 are not such, but are nevertheless referred to as "data words" because they are stored in the data RAM 122. For example, in some uses of the NNU 121, e.g., the convolution example of FIGS. 24 through 26A, the data RAM 122 may hold non-neuron outputs, such as elements of a convolution kernel.

In one embodiment, the NPUs 126 and sequencer 128 comprise combinatorial logic, sequential logic, state machines, or a combination thereof. An architectural instruction (e.g., MFNN instruction 1500) loads the contents of the status register 127 into one of the GPR 116 to determine the status of the NNU 121, e.g., that the NNU 121 has completed a command or completed a program the NNU 121 was running from the program memory 129, or that the NNU 121 is free to receive a new command or start a new NNU program.

Advantageously, the number of NPUs 126 may be increased as needed, and the size of the weight RAM 124 and data RAM 122 may be extended in both width and depth accordingly. Preferably, the weight RAM 124 is larger since in a classic neural network layer there are many connections, and therefore weights, associated with each neuron. Various embodiments are described herein regarding the size of the data and weight words and the sizes of the weight RAM 124 and data RAM 122 and the number of NPUs 126. In one embodiment, a NNU 121 with a 64 KB (8192 bits×64 rows) data RAM 122, a 2 MB (8192 bits×2048 rows) weight RAM 124, and 512 NPUs 126 is implemented in a Taiwan Semiconductor Manufacturing Company, Limited (TSMC) 16 nm process and occupies approximately a 3.3 mm$^2$ area.

The sequencer 128 fetches instructions from the program memory 129 and executes them, which includes, among other things, generating address and control signals for provision to the data RAM 122, weight RAM 124 and NPUs 126. The sequencer 128 generates a memory address 123 and a read command for provision to the data RAM 122 to select one of the D rows of N data words for provision to the N NPUs 126. The sequencer 128 also generates a memory address 125 and a read command for provision to the weight RAM 124 to select one of the W rows of N weight words for provision to the N NPUs 126. The sequence of the addresses 123 and 125 generated by the sequencer 128 for provision to the NPUs 126 determines the "connections" between neurons. The sequencer 128 also generates a memory address 123 and a write command for provision to the data RAM 122 to select one of the D rows of N data words for writing from the N NPUs 126. The sequencer 128 also generates a memory address 125 and a write command for provision to the weight RAM 124 to select one of the W rows of N weight words for writing from the N NPUs 126. The sequencer 128 also generates a memory address 131 to the program memory 129 to select a NNU instruction that is provided to the sequencer 128, such as described below. The memory address 131 corresponds to a program counter (not shown) that the sequencer 128 generally increments through sequential locations of the program memory 129 unless the sequencer 128 encounters a control instruction, such as a loop instruction (see, for example, FIG. 26A), in which case the sequencer 128 updates the program counter to the target address of the control instruction. The sequencer 128 also generates control signals to the NPUs 126 to instruct them to perform various operations or functions, such as initialization, arithmetic/logical operations, rotate and shift operations, activation functions and write back operations, examples of which are described in more detail below (see, for example, micro-operations 3418 of FIG. 34).

The N NPUs 126 generate N result words 133 that may be written back to a row of the weight RAM 124 or to the data RAM 122. Preferably, the weight RAM 124 and the data RAM 122 are directly coupled to the N NPUs 126. More specifically, the weight RAM 124 and data RAM 122 are dedicated to the NPUs 126 and are not shared by the other execution units 112 of the processor 100, and the NPUs 126 are capable of consuming a row from one or both of the weight RAM 124 and data RAM 122 each clock cycle in a sustained manner, preferably in a pipelined fashion. In one embodiment, each of the data RAM 122 and the weight RAM 124 is capable of providing 8192 bits to the NPUs 126 each clock cycle. The 8192 bits may be consumed as 512 16-bit words or as 1024 8-bit words, as described in more detail below.

Advantageously, the size of the data set that may be processed by the NNU 121 is not limited to the size of the weight RAM 124 and data RAM 122, but is rather only limited by the size of system memory since data and weights may be moved between system memory and the weight RAM 124 and data RAM 122 using the MTNN and MFNN instructions (e.g., through the media registers 118). In one embodiment, the data RAM 122 is dual-ported to enable data words to be written to the data RAM 122 while data words are concurrently read from or written to the data RAM 122. Furthermore, the large memory hierarchy of the memory subsystem 114, including the cache memories, provides very high data bandwidth for the transfers between the system memory and the NNU 121. Still further, preferably, the memory subsystem 114 includes hardware data prefetchers that track memory access patterns, such as loads of neural data and weights from system memory, and perform data prefetches into the cache hierarchy to facilitate high bandwidth and low latency transfers to the weight RAM 124 and data RAM 122.

Although embodiments are described in which one of the operands provided to each NPU 126 is provided from a weight memory and is denoted a weight, which are commonly used in neural networks, it should be understood that the operands may be other types of data associated with calculations whose speed may be improved by the apparatuses described.

Figure 2:
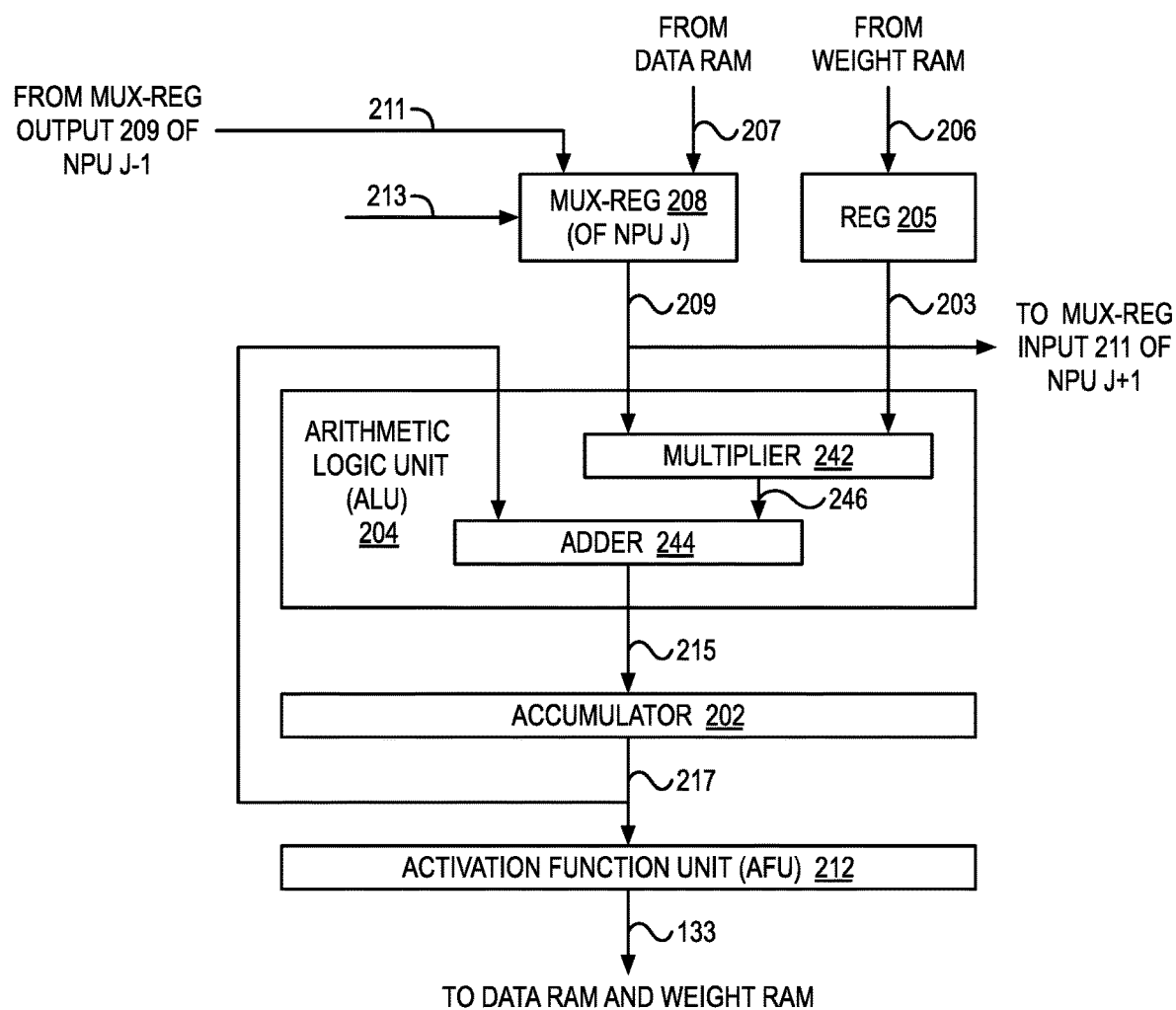
FIG. 2 is a block diagram illustrating a NPU of FIG. 1.

Referring now to FIG. 2, a block diagram illustrating a NPU 126 of FIG. 1 is shown. The NPU 126 operates to perform many functions, or operations. In particular, advantageously the NPU 126 is configured to operate as a neuron, or node, in an artificial neural network to perform a classic multiply-accumulate function, or operation. That is, generally speaking, the NPU 126 (neuron) is configured to: (1) receive an input value from each neuron having a connection to it, typically but not necessarily from the immediately previous layer of the artificial neural network; (2) multiply each input value by a corresponding weight value associated with the connection to generate a product; (3) add all the products to generate a sum; and (4) perform an activation function on the sum to generate the output of the neuron. However, rather than performing all the multiplies associated with all the connection inputs and then adding all the products together as in a conventional manner, advantageously each neuron is configured to perform, in a given clock cycle, the weight multiply operation associated with one of the connection inputs and then add (accumulate) the product with the accumulated value of the products associated with connection inputs processed in previous clock cycles up to that point. Assuming there are M connections to the neuron, after all M products have been accumulated (which takes approximately M clock cycles), the neuron performs the activation function on the accumulated value to generate the output, or result. This has the advantage of requiring fewer multipliers and a smaller, simpler and faster adder circuit (e.g., a 2-input adder) in the neuron than an adder that would be required to add all, or even a subset of, the products associated with all the connection inputs. This, in turn, has the advantage of facilitating a very large number (N) of neurons (NPUs 126) in the NNU 121 so that after approximately M clock cycles, the NNU 121 has generated the output for all of the large number (N) of neurons. Finally, the NNU 121 constructed of such neurons has the advantage of efficiently performing as an artificial neural network layer for a large number of different connection inputs. That is, as M increases or decreases for different layers, the number of clock cycles required to generate the neuron outputs correspondingly increases or decreases, and the resources (e.g., multipliers and accumulators) are fully utilized; whereas, in a more conventional design, some of the multipliers and a portion of the adder may not be utilized for smaller values of M. Thus, the embodiments described herein have the benefit of flexibility and efficiency with respect to the number of connection inputs to the neurons of the NNU 121, and provide extremely high performance.

The NPU 126 includes a register 205, a 2-input multiplexed register (mux-reg) 208, an arithmetic logic unit (ALU) 204, an accumulator 202, and an activation function unit (AFU) 212. The register 205 receives a weight word 206 from the weight RAM 124 and provides its output 203 on a subsequent clock cycle. The mux-reg 208 selects one of its inputs 207 or 211 to store in its register and then to provide on its output 209 on a subsequent clock cycle. One input 207 receives a data word from the data RAM 122. The other input 211 receives the output 209 of the adjacent NPU 126. The NPU 126 shown in FIG. 2 is denoted NPU J from among the N NPUs 126 of FIG. 1. That is, NPU J is a representative instance of the N NPUs 126. Preferably, the mux-reg 208 input 211 of NPU J receives the mux-reg 208 output 209 of NPU 126 instance J−1, and the mux-reg 208 output 209 of NPU J is provided to the mux-reg 208 input 211 of NPU 126 instance J+1. In this manner, the mux-regs 208 of the N NPUs 126 collectively operate as an N-word rotater, or circular shifter, as described in more detail below with respect to FIG. 3. A control input 213 controls which of the two inputs the mux-reg 208 selects to store in its register and that is subsequently provided on the output 209.

The ALU 204 has three inputs. One input receives the weight word 203 from the register 205. Another input receives the output 209 of the mux-reg 208. The other input receives the output 217 of the accumulator 202. The ALU 204 performs arithmetic and/or logical operations on its inputs to generate a result provided on its output. Preferably, the arithmetic and/or logical operations to be performed by the ALU 204 are specified by instructions stored in the program memory 129. For example, the multiply-accumulate instruction of FIG. 4 specifies a multiply-accumulate operation, i.e., the result 215 is the sum of the accumulator 202 value 217 and the product of the weight word 203 and the data word of the mux-reg 208 output 209. Other operations that may be specified include, but are not limited to: the result 215 is the passed-through value of the mux-reg output 209; the result 215 is the passed-through value of the weight word 203; the result 215 is zero; the result 215 is the passed-through value of the weight word 203; the result 215 is the sum of the accumulator 202 value 217 and the weight word 203; the result 215 is the sum of the accumulator 202 value 217 and the mux-reg output 209; the result 215 is the maximum of the accumulator 202 value 217 and the weight word 203; the result 215 is the maximum of the accumulator 202 value 217 and the mux-reg output 209.

The ALU 204 provides its output 215 to the accumulator 202 for storage therein. The ALU 204 includes a multiplier 242 that multiplies the weight word 203 and the data word of the mux-reg 208 output 209 to generate a product 246. In one embodiment, the multiplier 242 multiplies two 16-bit operands to generate a 32-bit result. The ALU 204 also includes an adder 244 that adds the product 246 to the accumulator 202 output 217 to generate a sum, which is the result 215 accumulated in the accumulator 202 for storage in the accumulator 202. In one embodiment, the adder 244 adds the 32-bit result of the multiplier 242 to a 41-bit value 217 of the accumulator 202 to generate a 41-bit result. In this manner, using the rotater aspect of the mux-reg 208 over the course of multiple clock cycles, the NPU 126 accomplishes a sum of products for a neuron as required by neural networks. The ALU 204 may also include other circuit elements to perform other arithmetic/logical operations such as those above. In one embodiment, a second adder subtracts the weight word 203 from the data word of the mux-reg 208 output 209 to generate a difference, which the adder 244 then adds to the accumulator 202 output 217 to generate a sum 215, which is the result accumulated in the accumulator 202. In this manner, over the course of multiple clock cycles, the NPU 126 may accomplish a sum of differences. Preferably, although the weight word 203 and the data word 209 are the same size (in bits), they may have different binary point locations, as described in more detail below. Preferably, the multiplier 242 and adder 244 are integer multipliers and adders, as described in more detail below, to advantageously accomplish less complex, smaller, faster and lower power consuming ALUs 204 than floating-point counterparts. However, it should be understood that in other embodiments the ALU 204 performs floating-point operations.

Although FIG. 2 shows only a multiplier 242 and adder 244 in the ALU 204, preferably the ALU 204 includes other elements to perform the other operations described above. For example, preferably the ALU 204 includes a comparator (not shown) for comparing the accumulator 202 with a data/weight word and a mux (not shown) that selects the larger (maximum) of the two values indicated by the comparator for storage in the accumulator 202. For another example, preferably the ALU 204 includes selection logic (not shown) that bypasses the multiplier 242 with a data/weight word to enable the adder 244 to add the data/weight word to the accumulator 202 value 217 to generate a sum for storage in the accumulator 202. These additional operations are described in more detail below, for example, with respect to FIGS. 18 through 29A, and may be useful for performing convolution and pooling operations, for example.

The AFU 212 receives the output 217 of the accumulator 202. The AFU 212 performs an activation function on the accumulator 202 output 217 to generate a result 133 of FIG. 1. Generally speaking, the activation function in a neuron of an intermediate layer of an artificial neural network may serve to normalize the accumulated sum of products, preferably in a non-linear fashion. To "normalize" the accumulated sum, the activation function of an instant neuron produces a resulting value within a range of values that neurons connected to the instant neuron expect to receive as input. (The normalized result is sometimes referred to as an "activation" that, as described herein, is the output of an instant node that a receiving node multiplies by a weight associated with the connection between the outputting node and the receiving node to generate a product that is accumulated with other products associated with the other input connections to the receiving node.) For example, the receiving/connected neurons may expect to receive as input a value between 0 and 1, in which case the outputting neuron may need to non-linearly squash and/or adjust (e.g., upward shift to transform negative to positive values) the accumulated sum that is outside the 0 to 1 range to a value within the expected range. Thus, the AFU 212 performs an operation on the accumulator 202 value 217 to bring the result 133 within a known range. The results 133 of all of the N NPUs 126 may be written back concurrently to either the data RAM 122 or to the weight RAM 124. Preferably, the AFU 212 is configured to perform multiple activation functions, and an input, e.g., from the control register 127, selects one of the activation functions to perform on the accumulator 202 output 217. The activation functions may include, but are not limited to, a step function, a rectify function, a sigmoid function, a hyperbolic tangent (tan h) function and a softplus function (also referred to as smooth rectify). The softplus function is the analytic function $f(x)=\ln(1+e^x)$, that is, the natural logarithm of the sum of one and $e^x$, where "e" is Euler's number and x is the input 217 to the function. Preferably, the activation functions may also include a pass-through function that passes through the accumulator 202 value 217, or a portion thereof, as described in more detail below. In one embodiment, circuitry of the AFU 212 performs the activation function in a single clock cycle. In one embodiment, the AFU 212 comprises tables that receive the accumulated value and output a value that closely approximates the value that the true activation function would provide for some of the activation functions, e.g., sigmoid, hyperbolic tangent, softplus.

Preferably, the width (in bits) of the accumulator 202 is greater than the width of the AFU 212 output 133. For example, in one embodiment, the accumulator is 41 bits wide, to avoid loss of precision in the accumulation of up to 512 32-bit products (as described in more detail below, e.g., with respect to FIG. 30), and the result 133 is 16 bits wide. In one embodiment, an example of which is described in more detail below with respect to FIG. 8, during successive clock cycles different portions of the "raw" accumulator 202 output 217 value are passed through the AFU 212 and written back to the data RAM 122 or weight RAM 124. This enables the raw accumulator 202 values to be loaded back to the media registers 118 via the MFNN instruction so that instructions executing on other execution units 112 of the processor 100 may perform complex activation functions that the AFU 212 is not capable of performing, such as the well-known softmax activation function, also referred to as the normalized exponential function. In one embodiment, the processor 100 instruction set architecture includes an instruction that performs the exponential function, commonly referred to as $e^x$ or exp(x), which may be used to speed up the performance of the softmax activation function by the other execution units 112 of the processor 100.

In one embodiment, the NPU 126 is pipelined. For example, the NPU 126 may include registers of the ALU 204, such as a register between the multiplier and the adder and/or other circuits of the ALU 204, and a register that holds the output of the AFU 212. Other embodiments of the NPU 126 are described below.

Figure 3:
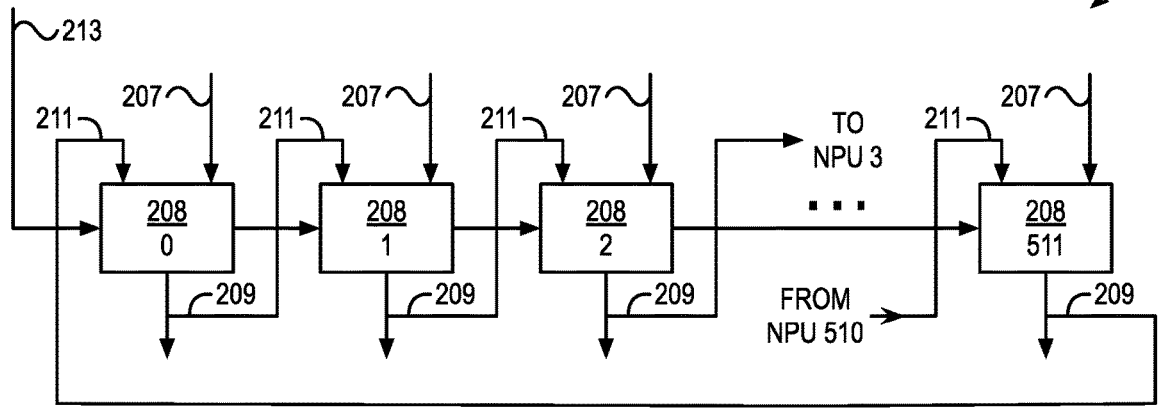
FIG. 3 is a block diagram illustrating an embodiment of the arrangement of the N mux-regs of the N NPUs of the NNU of FIG. 1 to illustrate their operation as an N-word rotater, or circular shifter, for a row of data words received from the data RAM of FIG. 1.

Referring now to FIG. 3, a block diagram illustrating an embodiment of the arrangement of the N mux-regs 208 of the N NPUs 126 of the NNU 121 of FIG. 1 to illustrate their operation as an N-word rotater, or circular shifter, for a row of data words 207 received from the data RAM 122 of FIG. 1 is shown. In the embodiment of FIG. 3, N is 512 such that the NNU 121 has 512 mux-regs 208, denoted 0 through 511, corresponding to 512 NPUs 126, as shown. Each mux-reg 208 receives its corresponding data word 207 of one row of the D rows of the data RAM 122. That is, mux-reg 0 receives data word 0 of the data RAM 122 row, mux-reg 1 receives data word 1 of the data RAM 122 row, mux-reg 2 receives data word 2 of the data RAM 122 row, and so forth to mux-reg 511 receives data word 511 of the data RAM 122 row. Additionally, mux-reg 1 receives on its other input 211 the output 209 of mux-reg 0, mux-reg 2 receives on its other input 211 the output 209 of mux-reg 1, mux-reg 3 receives on its other input 211 the output 209 of mux-reg 2, and so forth to mux-reg 511 that receives on its other input 211 the output 209 of mux-reg 510, and mux-reg 0 receives on its other input 211 the output 209 of mux-reg 511. Each of the mux-regs 208 receives the control input 213 that controls whether to select the data word 207 or the rotated input 211. As described in more detail below, in one mode of operation, on a first clock cycle, the control input 213 controls each of the mux-regs 208 to select the data word 207 for storage in the register and for subsequent provision to the ALU 204; and during subsequent clock cycles (e.g., M−1 clock cycles as described above), the control input 213 controls each of the mux-regs 208 to select the rotated input 211 for storage in the register and for subsequent provision to the ALU 204.

Although FIG. 3 (and FIGS. 7 and 19 below) describe an embodiment in which the NPUs 126 are configured to rotate the values of the mux-regs 208/705 to the right, i.e., from NPU J to NPU J+1, embodiments are contemplated (such as with respect to the embodiment of FIGS. 24 through 26) in which the NPUs 126 are configured to rotate the values of the mux-regs 208/705 to the left, i.e., from NPU J to NPU J−1. Furthermore, embodiments are contemplated in which the NPUs 126 are configured to rotate the values of the mux-regs 208/705 selectively to the left or to the right, e.g., as specified by the NNU instructions.

Referring now to FIG. 4, a table illustrating a program for storage in the program memory 129 of and execution by the NNU 121 of FIG. 1 is shown. The example program performs the calculations associated with a layer of an artificial neural network as described above. In the table of FIG. 4, four rows and three columns are shown. Each row corresponds to an address of the program memory 129 denoted in the first column. The second column specifies the instruction, and the third column indicates the number of clock cycles associated with the instruction. Preferably, the number of clock cycles indicates the effective number of clocks in a clocks-per-instruction type value in a pipelined embodiment, rather than the latency of the instruction. As shown, each of the instructions has an associated one clock cycle due to the pipelined nature of the NNU 121, with the exception of the instruction at address 2 which requires 511 clocks because it effectively repeats itself 511 times, as described in more detail below.

For each instruction of the program, all of the NPUs 126 perform the instruction in parallel. That is, all N NPUs 126 performs the instruction in the first row in the same clock cycle(s), all N NPUs 126 performs the instruction in the second row in the same clock cycle(s), and so forth. However, other embodiments are described below in which some of the instructions are performed in a partially parallel and partially sequential fashion, e.g., the activation function and output instructions at addresses 3 and 4 in an embodiment in which NPUs 126 share an activation function unit, e.g., with respect to the embodiment of FIG. 11. The example of FIG. 4 assumes 512 neurons (NPUs 126) of a layer, each having 512 connection inputs from a previous layer of 512 neurons, for a total of 256K connections. Each neuron receives a 16-bit data value from each connection input and multiplies the 16-bit data value by an appropriate 16-bit weight value.

The first row, at address 0 (although other addresses may be specified), specifies an initialize NPU instruction. The initialize instruction clears the accumulator 202 value to zero. In one embodiment, the initialize instruction can also specify to load the accumulator 202 with the corresponding word of a row of the data RAM 122 or weight RAM 124 whose address is specified by the instruction. The initialize instruction also loads configuration values into the control register 127, as described in more detail below with respect to FIGS. 29A and 29B. For example, the width of the data word 207 and weight word 209 may be loaded, which may be used by the ALU 204 to determine the sizes of the operations performed by the circuits and may affect the result 215 stored in the accumulator 202. In one embodiment, the NPU 126 includes a circuit that saturates the ALU 204 output 215 before being stored in the accumulator 202, and the initialize instruction loads a configuration value into the circuit to affect the saturation. In one embodiment, the accumulator 202 may also be cleared to a zero value by so specifying in an ALU function instruction (e.g., multiply-accumulate instruction at address 1) or an output instruction, such as the write AFU output instruction at address 4.

The second row, at address 1, specifies a multiply-accumulate instruction that instructs the 512 NPUs 126 to load a respective data word from a row of the data RAM 122 and to load a respective weight word from a row of the weight RAM 124, and to perform a first multiply-accumulate operation on the data word input 207 and weight word input 206, which is accumulated with the initialized accumulator 202 zero value. More specifically, the instruction instructs the sequencer 128 to generate a value on the control input 213 to select the data word input 207. In the example of FIG. 4, the specified data RAM 122 row is row 17, and the specified weight RAM 124 row is row 0, which instructs the sequencer 128 to output a data RAM address 123 value of 17 and to output a weight RAM address 125 value of 0. Consequently, the 512 data words from row 17 of the data RAM 122 are provided to the corresponding data input 207 of the 512 NPUs 126 and the 512 weight words from row 0 of the weight RAM 124 are provided to the corresponding weight input 206 of the 512 NPUs 126.

The third row, at address 2, specifies a multiply-accumulate rotate instruction with a count of 511, which instructs each of the 512 NPUs 126 to perform 511 multiply-accumulate operations. The instruction instructs the 512 NPUs 126 that the data word 209 input to the ALU 204 for each of the 511 multiply-accumulate operations is to be the rotated value 211 from the adjacent NPU 126. That is, the instruction instructs the sequencer 128 to generate a value on the control input 213 to select the rotated value 211. Additionally, the instruction instructs the 512 NPUs 126 to load a respective weight word for each of the 511 multiply-accumulate operations from the "next" row of the weight RAM 124. That is, the instruction instructs the sequencer 128 to increment the weight RAM address 125 by one relative to its value in the previous clock cycle, which in the example would be row 1 on the first clock cycle of the instruction, row 2 on the next clock cycle, row 3 on the next clock cycle, and so forth to row 511 on the $511^{th}$ clock cycle. For each of the 511 multiply-accumulate operations, the product of the rotated input 211 and weight word input 206 is accumulated with the previous value in the accumulator 202. The 512 NPUs 126 perform the 511 multiply-accumulate operations in 511 clock cycles, in which each NPU 126 performs a multiply-accumulate operation on a different data word from row 17 of the data RAM 122—namely, the data word operated on by the adjacent NPU 126 in the previous cycle—and a different weight word associated with the data word, which is conceptually a different connection input to the neuron. In the example, it is assumed that the number of connection inputs to each NPU 126 (neuron) is 512, thus involving 512 data words and 512 weight words. Once the last iteration of the multiply-accumulate rotate instruction of row 2 is performed, the accumulator 202 contains the sum of products for all 512 of the connection inputs. In one embodiment, rather than having a separate instruction for each type of ALU operation (e.g., multiply-accumulate, maximum of accumulator and weight word, etc. as described above), the NPU 126 instruction set includes an "execute" instruction that instructs the ALU 204 to perform an ALU operation specified by the initialize NPU instruction, such as specified in the ALU function 2926 of FIG. 29A.

The fourth row, at address 3, specifies an activation function instruction. The activation function instruction instructs the AFU 212 to perform the specified activation function on the accumulator 202 value 217 to generate the result 133. The activation functions according to one embodiment are described in more detail below.

The fifth row, at address 4, specifies a write AFU output instruction that instructs the 512 NPUs 126 to write back their AFU 212 output as results 133 to a row of the data RAM 122, which is row 16 in the example. That is, the instruction instructs the sequencer 128 to output a data RAM address 123 value of 16 and a write command (in contrast to a read command in the case of the multiply-accumulate instruction at address 1). Preferably the execution of the write AFU output instruction may be overlapped with the execution of other instructions in a pipelined nature such that the write AFU output instruction effectively executes in a single clock cycle.

Preferably, each NPU 126 is configured as a pipeline that includes the various functional elements, e.g., the mux-reg 208 (and mux-reg 705 of FIG. 7), ALU 204, accumulator 202, AFU 212, mux 802 (of FIG. 8), row buffer 1104 and AFUs 1112 (of FIG. 11), etc., some of which may themselves be pipelined. In addition to the data words 207 and weight words 206, the pipeline receives the instructions from the program memory 129. The instructions flow down the pipeline and control the various functional units. In an alternate embodiment, the activation function instruction is not included in the program. Rather, the initialize NPU instruction specifies the activation function to be performed on the accumulator 202 value 217, and a value indicating the specified activation function is saved in a configuration register for later use by the AFU 212 portion of the pipeline once the final accumulator 202 value 217 has been generated, i.e., once the last iteration of the multiply-accumulate rotate instruction at address 2 has completed. Preferably, for power savings purposes, the AFU 212 portion of the pipeline is inactive until the write AFU output instruction reaches it, at which time the AFU 212 is powered up and performs the activation function on the accumulator 202 output 217 specified by the initialize instruction.

Referring now to FIG. 5, a timing diagram illustrating the execution of the program of FIG. 4 by the NNU 121 is shown. Each row of the timing diagram corresponds to a successive clock cycle indicated in the first column. Each of the other columns corresponds to a different one of the 512 NPUs 126 and indicates its operation. For simplicity and clarity of illustration, the operations only for NPUs 0, 1 and 511 are shown.

At clock 0, each of the 512 NPUs 126 performs the initialization instruction of FIG. 4, which is illustrated in FIG. 5 by the assignment of a zero value to the accumulator 202.

At clock 1, each of the 512 NPUs 126 performs the multiply-accumulate instruction at address 1 of FIG. 4. NPU 0 accumulates the accumulator 202 value (which is zero) with the product of data RAM 122 row 17 word 0 and weight RAM 124 row 0 word 0; NPU 1 accumulates the accumulator 202 value (which is zero) with the product of data RAM 122 row 17 word 1 and weight RAM 124 row 0 word 1; and so forth to NPU 511 accumulates the accumulator 202 value (which is zero) with the product of data RAM 122 row 17 word 511 and weight RAM 124 row 0 word 511, as shown.

At clock 2, each of the 512 NPUs 126 performs a first iteration of the multiply-accumulate rotate instruction at address 2 of FIG. 4. NPU 0 accumulates the accumulator 202 value with the product of the rotated data word 211 received from the mux-reg 208 output 209 of NPU 511 (which was data word 511 received from the data RAM 122) and weight RAM 124 row 1 word 0; NPU 1 accumulates the accumulator 202 value with the product of the rotated data word 211 received from the mux-reg 208 output 209 of NPU 0 (which was data word 0 received from the data RAM 122) and weight RAM 124 row 1 word 1; and so forth to NPU 511 accumulates the accumulator 202 value with the product of the rotated data word 211 received from the mux-reg 208 output 209 of NPU 510 (which was data word 510 received from the data RAM 122) and weight RAM 124 row 1 word 511, as shown.

At clock 3, each of the 512 NPUs 126 performs a second iteration of the multiply-accumulate rotate instruction at address 2 of FIG. 4. NPU 0 accumulates the accumulator 202 value with the product of the rotated data word 211 received from the mux-reg 208 output 209 of NPU 511 (which was data word 510 received from the data RAM 122) and weight RAM 124 row 2 word 0; NPU 1 accumulates the accumulator 202 value with the product of the rotated data word 211 received from the mux-reg 208 output 209 of NPU 0 (which was data word 511 received from the data RAM 122) and weight RAM 124 row 2 word 1; and so forth to NPU 511 accumulates the accumulator 202 value with the product of the rotated data word 211 received from the mux-reg 208 output 209 of NPU 510 (which was data word 509 received from the data RAM 122) and weight RAM 124 row 2 word 511, as shown. As indicated by the ellipsis of FIG. 5, this continues for each of the following 509 clock cycles until . . . .

At clock 512, each of the 512 NPUs 126 performs a $511^{th}$ iteration of the multiply-accumulate rotate instruction at address 2 of FIG. 4. NPU 0 accumulates the accumulator 202 value with the product of the rotated data word 211 received from the mux-reg 208 output 209 of NPU 511 (which was data word 1 received from the data RAM 122) and weight RAM 124 row 511 word 0; NPU 1 accumulates the accumulator 202 value with the product of the rotated data word 211 received from the mux-reg 208 output 209 of NPU 0 (which was data word 2 received from the data RAM 122) and weight RAM 124 row 511 word 1; and so forth to NPU 511 accumulates the accumulator 202 value with the product of the rotated data word 211 received from the mux-reg 208 output 209 of NPU 510 (which was data word 0 received from the data RAM 122) and weight RAM 124 row 511 word 511, as shown. In one embodiment, multiple clock cycles are required to read the data words and weight words from the data RAM 122 and weight RAM 124 to perform the multiply-accumulate instruction at address 1 of FIG. 4; however, the data RAM 122 and weight RAM 124 and NPUs 126 are pipelined such that once the first multiply-accumulate operation is begun (e.g., as shown during clock 1 of FIG. 5), the subsequent multiply accumulate operations (e.g., as shown during clocks 2-512) are begun in successive clock cycles. Preferably, the NPUs 126 may briefly stall in response to an access of the data RAM 122 and/or weight RAM 124 by an architectural instruction, e.g., MTNN or MFNN instruction (described below with respect to FIGS. 14 and 15) or a microinstruction into which the architectural instructions are translated.

At clock 513, the AFU 212 of each of the 512 NPUs 126 performs the activation function instruction at address 3 of FIG. 4. Finally, at clock 514, each of the 512 NPUs 126 performs the write AFU output instruction at address 4 of FIG. 4 by writing back its result 133 to its corresponding word of row 16 of the data RAM 122, i.e., the result 133 of NPU 0 is written to word 0 of the data RAM 122, the result 133 of NPU 1 is written to word 1 of the data RAM 122, and so forth to the result 133 of NPU 511 is written to word 511 of the data RAM 122. The operation described above with respect to FIG. 5 is also shown in block diagram form in FIG. 6A.

Referring now to FIG. 6A, a block diagram illustrating the NNU 121 of FIG. 1 to execute the program of FIG. 4 is shown. The NNU 121 includes the 512 NPUs 126, the data RAM 122 that receives its address input 123, and the weight RAM 124 that receives its address input 125. Although not shown, on clock 0 the 512 NPUs 126 perform the initialization instruction. As shown, on clock 1, the 512 16-bit data words of row 17 are read out of the data RAM 122 and provided to the 512 NPUs 126. On clocks 1 through 512, the 512 16-bit weight words of rows 0 through 511, respectively, are read out of the weight RAM 124 and provided to the 512 NPUs 126. Although not shown, on clock 1, the 512 NPUs 126 perform their respective multiply-accumulate operations on the loaded data words and weight words. On clocks 2 through 512, the mux-regs 208 of the 512 NPUs 126 operate as a 512 16-bit word rotater to rotate the previously loaded data words of row 17 of the data RAM 122 to the adjacent NPU 126, and the NPUs 126 perform the multiply-accumulate operation on the respective rotated data word and the respective weight word loaded from the weight RAM 124. Although not shown, on clock 513, the 512 AFUs 212 perform the activation instruction. On clock 514, the 512 NPUs 126 write back their respective 512 16-bit results 133 to row 16 of the data RAM 122.

As may be observed, the number clocks required to generate the result words (neuron outputs) produced and written back to the data RAM 122 or weight RAM 124 is approximately the square root of the number of data inputs (connections) received by the current layer of the neural network. For example, if the currently layer has 512 neurons that each has 512 connections from the previous layer, the total number of connections is 256K and the number of clocks required to generate the results for the current layer is slightly over 512. Thus, the NNU 121 provides extremely high performance for neural network computations.

Figure 6B:
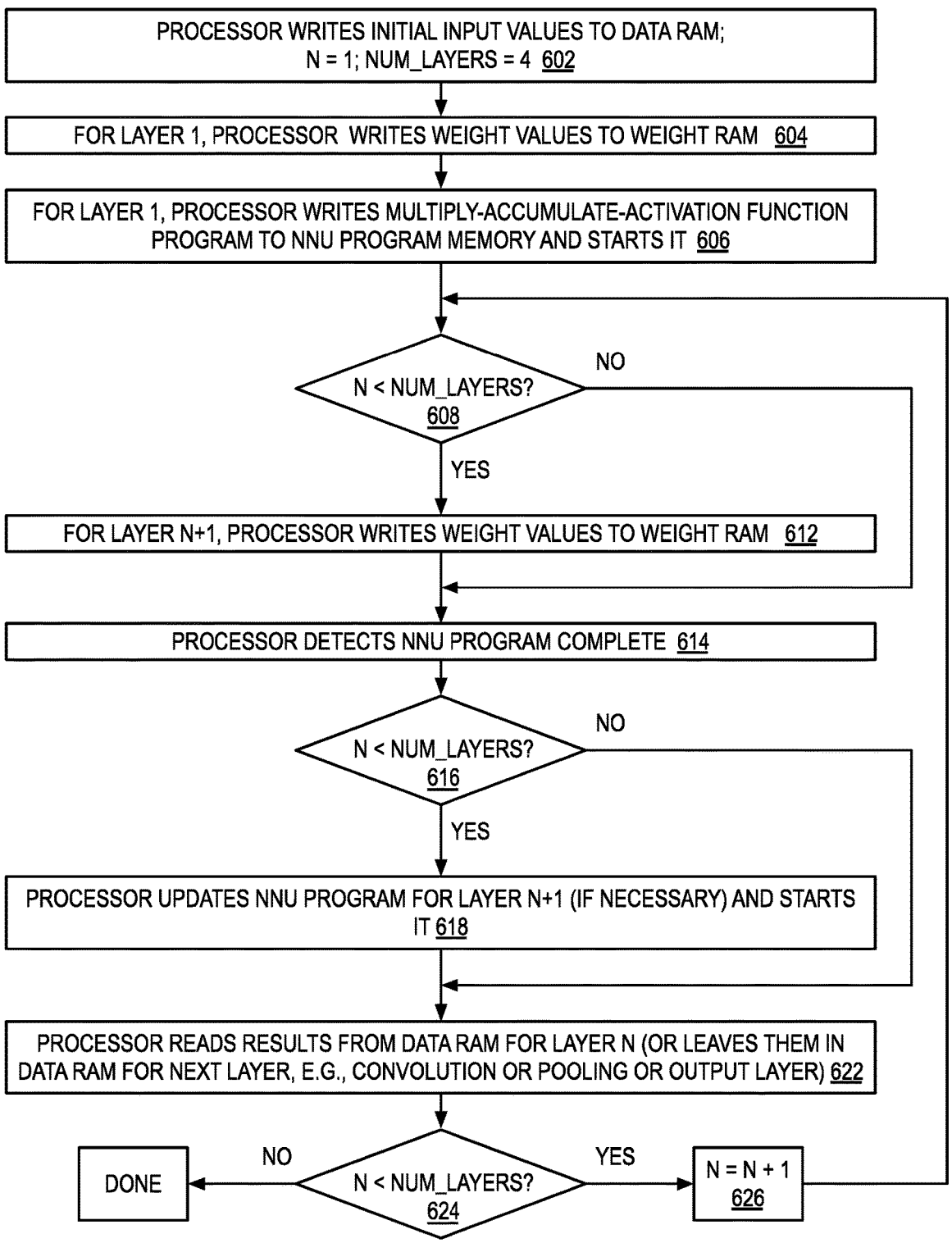
FIG. 6B is a flowchart illustrating operation of the processor of FIG. 1 to perform an architectural program that uses the NNU to perform multiply-accumulate-activation function computations classically associated with neurons of hidden layers of an artificial neural network such as performed by the program of FIG. 4.

Referring now to FIG. 6B, a flowchart illustrating operation of the processor 100 of FIG. 1 to perform an architectural program that uses the NNU 121 to perform multiply-accumulate-activation function computations classically associated with neurons of hidden layers of an artificial neural network such as performed by the program of FIG. 4, for example. The example of FIG. 6B assumes computations for 4 hidden layers (signified by the initialization of the NUM_LAYERS variable at block 602), each having 512 neurons each fully connected to 512 neurons of the previous layer (by use of the program of FIG. 4). However, it should be understood that these numbers of layers and neurons are selected for illustration purposes, and the NNU 121 may be employed to perform similar computations for different numbers of hidden layers and different numbers of neurons per layer and for non-fully connected neurons. In one embodiment, the weight values may be set to zero for non-existent neurons in a layer or for non-existent connections to a neuron. Preferably, the architectural program writes a first set of weights to the weight RAM 124 and starts the NNU 121, and while the NNU 121 is performing the computations associated with the first layer, the architectural program writes a second set of weights to the weight RAM 124 so that as soon as the NNU 121 completes the computations for the first hidden layer, the NNU 121 can start the computations for the second layer. In this manner, the architectural program ping-pongs back and forth between the two regions of the weight RAM 124 in order to keep the NNU 121 fully utilized. Flow begins at block 602.

At block 602, the processor 100, i.e., the architectural program running on the processor 100, writes the input values to the current hidden layer of neurons to the data RAM 122, e.g., into row 17 of the data RAM 122, as shown and described with respect to FIG. 6A. Alternatively, the values may already be in row 17 of the data RAM 122 as results 133 of the operation of the NNU 121 for a previous layer (e.g., convolution, pooling or input layer). Additionally, the architectural program initializes a variable N to a value of 1. The variable N denotes the current layer of the hidden layers being processed by the NNU 121. Additionally, the architectural program initializes a variable NUM_LAYERS to a value of 4 since there are 4 hidden layers in the example. Flow proceeds to block 604.

At block 604, the processor 100 writes the weight words for layer 1 to the weight RAM 124, e.g., to rows 0 through 511, as shown in FIG. 6A. Flow proceeds to block 606.

At block 606, the processor 100 writes a multiply-accumulate-activation function program (e.g., of FIG. 4) to the NNU 121 program memory 129, using MTNN 1400 instructions that specify a function 1432 to write the program memory 129. The processor 100 then starts the NNU program using a MTNN 1400 instruction that specifies a function 1432 to start execution of the program. Flow proceeds to decision block 608.

At decision block 608, the architectural program determines whether the value of variable N is less than NUM_LAYERS. If so, flow proceeds to block 612; otherwise, flow proceeds to block 614.

At block 612, the processor 100 writes the weight words for layer N+1 to the weight RAM 124, e.g., to rows 512 through 1023. Thus, advantageously, the architectural program writes the weight words for the next layer to the weight RAM 124 while the NNU 121 is performing the hidden layer computations for the current layer so that the NNU 121 can immediately start performing the hidden layer computations for the next layer once the computations for the current layer are complete, i.e., written to the data RAM 122. Flow proceeds to block 614.

At block 614, the processor 100 determines that the currently running NNU program (started at block 606 in the case of layer 1, and started at block 618 in the case of layers 2 through 4) has completed. Preferably, the processor 100 determines this by executing a MFNN 1500 instruction to read the NNU 121 status register 127. In an alternate embodiment, the NNU 121 generates an interrupt to indicate it has completed the multiply-accumulate-activation function layer program. Flow proceeds to decision block 616.

At decision block 616, the architectural program determines whether the value of variable N is less than NUM_LAYERS. If so, flow proceeds to block 618; otherwise, flow proceeds to block 622.

At block 618, the processor 100 updates the multiply-accumulate-activation function program so that it can perform the hidden layer computations for layer N+1. More specifically, the processor 100 updates the data RAM 122 row value of the multiply-accumulate instruction at address 1 of FIG. 4 to the row of the data RAM 122 to which the previous layer wrote its results (e.g., to row 16) and also updates the output row (e.g., to row 15). The processor 100 then starts the updated NNU program. Alternatively, the program of FIG. 4 specifies the same row in the output instruction of address 4 as the row specified in the multiply-accumulate instruction at address 1 (i.e., the row read from the data RAM 122). In this embodiment, the current row of input data words is overwritten (which is acceptable as long as the row of data words is not needed for some other purpose, because the row of data words has already been read into the mux-regs 208 and is being rotated among the NPUs 126 via the N-word rotater). In this case, no update of the NNU program is needed at block 618, but only a re-start of it. Flow proceeds to block 622.

At block 622, the processor 100 reads the results of the NNU program from the data RAM 122 for layer N. However, if the results are simply to be used by the next layer, then the architectural program may not need to read the results from the data RAM 122, but instead leave them in the data RAM 122 for the next hidden layer computations. Flow proceeds to decision block 624.

At decision block 624, the architectural program determines whether the value of variable N is less than NUM_LAYERS. If so, flow proceeds to block 626; otherwise, flow ends.

At block 626, the architectural program increments N by one. Flow returns to decision block 608.

As may be determined from the example of FIG. 6B, approximately every 512 clock cycles, the NPUs 126 read once from and write once to the data RAM 122 (by virtue of the operation of the NNU program of FIG. 4). Additionally, the NPUs 126 read the weight RAM 124 approximately every clock cycle to read a row of the weight words. Thus, the entire bandwidth of the weight RAM 124 is consumed by the hybrid manner in which the NNU 121 performs the hidden layer operation. Additionally, assuming an embodiment that includes a write and read buffer such as the buffer 1704 of FIG. 17, concurrently with the NPU 126 reads, the processor 100 writes the weight RAM 124 such that the buffer 1704 performs one write to the weight RAM 124 approximately every 16 clock cycles to write the weight words. Thus, in a single-ported embodiment of the weight RAM 124 (such as described with respect to FIG. 17), approximately every 16 clock cycles, the NPUs 126 must be stalled from reading the weight RAM 124 to enable the buffer 1704 to write the weight RAM 124. However, in an embodiment in which the weight RAM 124 is dual-ported, the NPUs 126 need not be stalled.

Figure 7:
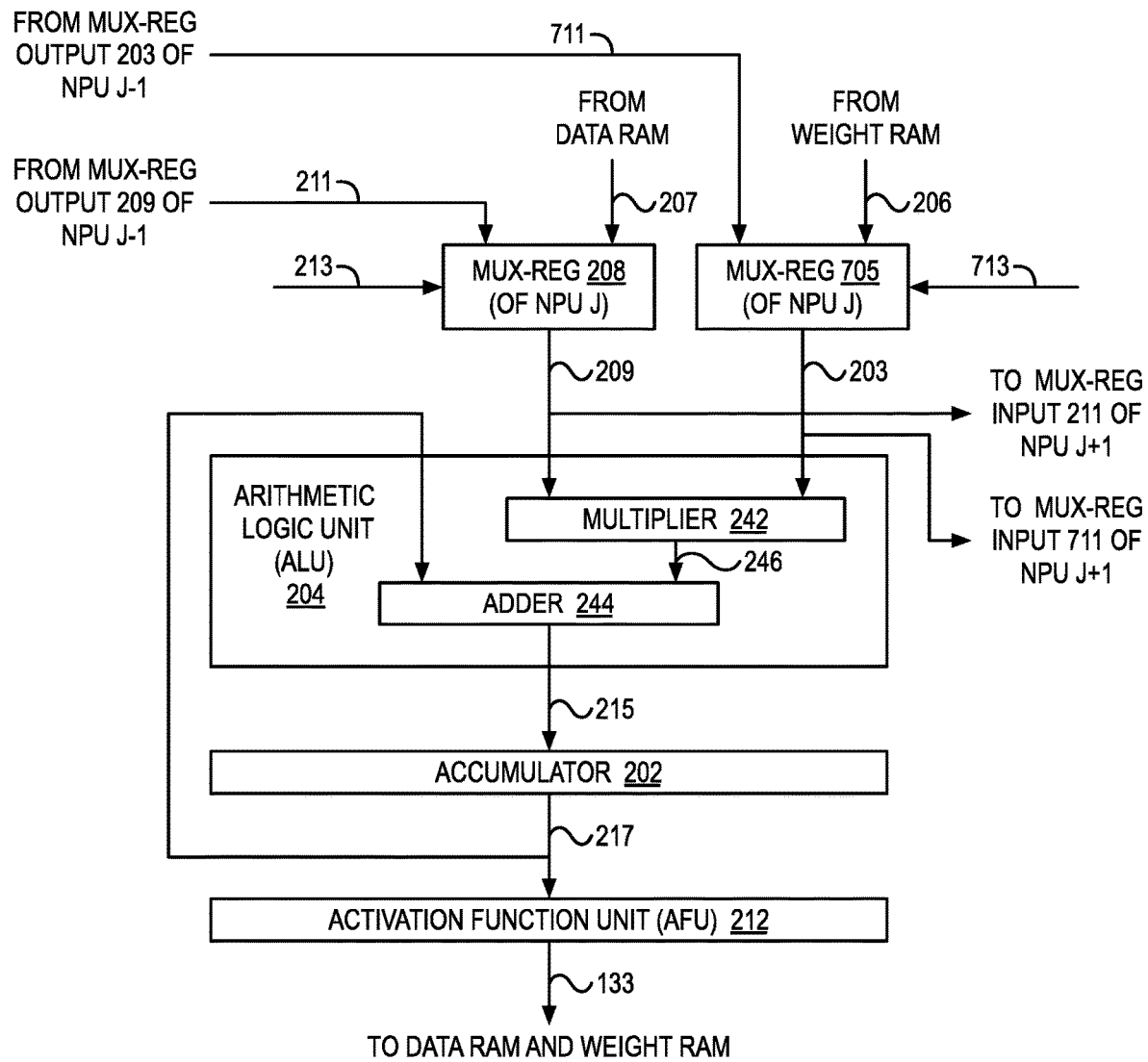
FIG. 7 is a block diagram illustrating a NPU of FIG. 1 according to an alternate embodiment.

Referring now to FIG. 7, a block diagram illustrating a NPU 126 of FIG. 1 according to an alternate embodiment is shown. The NPU 126 of FIG. 7 is similar in many respects to the NPU 126 of FIG. 2. However, the NPU 126 of FIG. 7 additionally includes a second 2-input mux-reg 705. The mux-reg 705 selects one of its inputs 206 or 711 to store in its register and then to provide on its output 203 on a subsequent clock cycle. Input 206 receives the weight word from the weight RAM 124. The other input 711 receives the output 203 of the second mux-reg 705 of the adjacent NPU 126. Preferably, the mux-reg 705 input 711 of NPU J receives the mux-reg 705 output 203 of NPU 126 instance J−1, and the output of NPU J is provided to the mux-reg 705 input 711 of NPU 126 instance J+1. In this manner, the mux-regs 705 of the N NPUs 126 collectively operate as an N-word rotater, similar to the manner described above with respect to FIG. 3, but for the weight words rather than for the data words. A control input 713 controls which of the two inputs the mux-reg 705 selects to store in its register and that is subsequently provided on the output 203.

Including the mux-regs 208 and/or mux-regs 705 (as well as the mux-regs of other embodiments, such as of FIGS. 18 and 23) to effectively form a large rotater that rotates the data/weights of a row received from the data RAM 122 and/or weight RAM 124 has an advantage that the NNU 121 does not require an extremely large mux that would otherwise be required between the data RAM 122 and/or weight RAM 124 in order to provide the necessary data/weight words to the appropriate NPU 121.

Writing Back Accumulator Values in Addition to Activation Function Result

Figure 15:
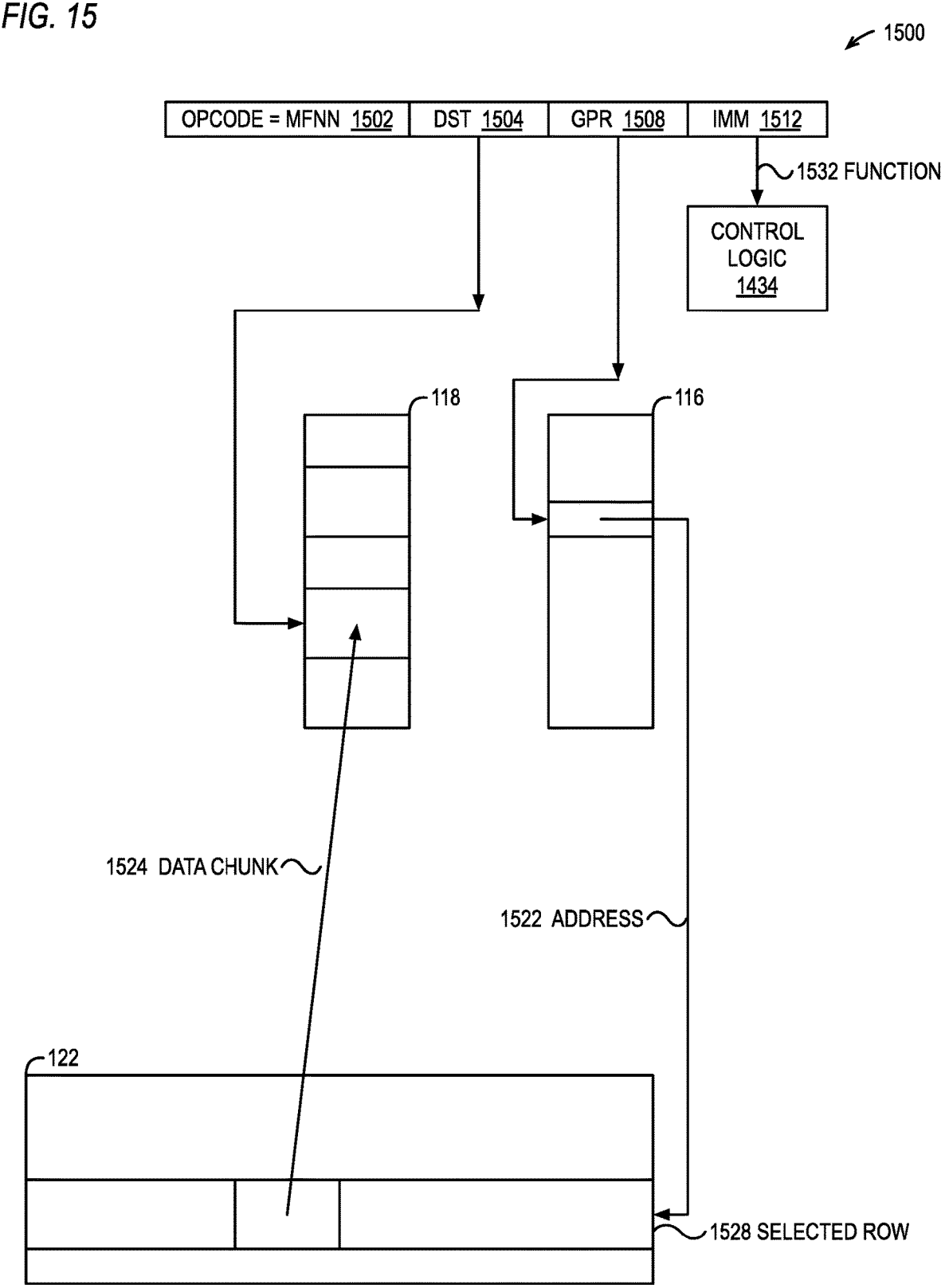
FIG. 15 is a block diagram illustrating a move from neural network (MFNN) architectural instruction and its operation with respect to portions of the NNU of FIG. 1.

In some applications, it is useful for the processor 100 to receive back (e.g., to the media registers 118 via the MFNN instruction of FIG. 15) the raw accumulator 202 value 217 upon which instructions executing on other execution units 112 can perform computations. For example, in one embodiment, in order to reduce the complexity of the AFU 212, it is not configured to perform the softmax activation function. Consequently, the NNU 121 may output the raw accumulator 202 value 217, or a subset thereof, to the data RAM 122 or weight RAM 124, which the architectural program subsequently reads from the data RAM 122 or weight RAM 124 and performs computations on the raw values. However, use of the raw accumulator 202 value 217 is not limited to performance of softmax, and other uses are contemplated.

Referring now to FIG. 8, a block diagram illustrating a NPU 126 of FIG. 1 according to an alternate embodiment is shown. The NPU 126 of FIG. 8 is similar in many respects to the NPU 126 of FIG. 2. However, the NPU 126 of FIG. 8 includes a multiplexer (mux) 802 in the AFU 212 that has a control input 803. The width (in bits) of the accumulator 202 is greater than the width of a data word. The mux 802 has multiple inputs that receive data word-width portions of the accumulator 202 output 217. In one embodiment, the width of the accumulator 202 is 41 bits and the NPU 126 is configured to output a result word 133 that is 16 bits; thus, for example, the mux 802 (or mux 3032 and/or mux 3037 of FIG. 30) includes three inputs that receive bits [15:0], bits [31:16], and bits [47:32] of the accumulator 202 output 217, respectively. Preferably, output bits not provided by the accumulator 202 (e.g., bits [47:41]) are forced to zero value bits.

The sequencer 128 generates a value on the control input 803 to control the mux 802 to select one of the words (e.g., 16 bits) of the accumulator 202 in response to a write ACC instruction such as the write ACC instructions at addresses 3 through 5 of FIG. 9 described below. Preferably, the mux 802 also has one or more inputs that receive the output of activation function circuits (e.g., elements 3022, 3024, 3026, 3018, 3014, and 3016 of FIG. 30) that generate outputs that are the width of a data word. The sequencer 128 generates a value on the control input 803 to control the mux 802 to select one of the activation function circuit outputs, rather than one of the words of the accumulator 202, in response to an instruction such as the write AFU output instruction at address 4 of FIG. 4.

Referring now to FIG. 9, a table illustrating a program for storage in the program memory 129 of and execution by the NNU 121 of FIG. 1 is shown. The example program of FIG. 9 is similar in many respects to the program of FIG. 4. Specifically, the instructions at addresses 0 through 2 are identical. However, the instructions at addresses 3 and 4 of FIG. 4 are replaced in FIG. 9 by write ACC instructions that instruct the 512 NPUs 126 to write back their accumulator 202 output 217 as results 133 to three rows of the data RAM 122, which is rows 16 through 18 in the example. That is, the write ACC instruction instructs the sequencer 128 to output a data RAM address 123 value of 16 and a write command in a first clock cycle, to output a data RAM address 123 value of 17 and a write command in a second clock cycle, and to output a data RAM address 123 value of 18 and a write command in a third clock cycle. Preferably the execution of the write ACC instruction may be overlapped with the execution of other instructions such that the write ACC instruction effectively executes in three clock cycles, one for each row written to in the data RAM 122. In one embodiment, the user specifies values of the activation function 2934 and output command 2956 fields in the control register 127 (of FIG. 29A) to accomplish the writing of the desired portions of the accumulator 202 to the data RAM 122 or weight RAM 124. Alternatively, rather than writing back the entire contents of the accumulator 202, the write ACC instruction may optionally write back a subset of the accumulator 202. In one embodiment, a canonical form of the accumulator 202 may written back, as described in more detail below with respect to FIGS. 29 through 31.

Referring now to FIG. 10, a timing diagram illustrating the execution of the program of FIG. 9 by the NNU 121 is shown. The timing diagram of FIG. 10 is similar to the timing diagram of FIG. 5, and clocks 0 through 512 are the same. However, at clocks 513-515, the AFU 212 of each of the 512 NPUs 126 performs one of the write ACC instructions at addresses 3 through 5 of FIG. 9. Specifically, at clock 513, each of the 512 NPUs 126 writes back as its result 133 to its corresponding word of row 16 of the data RAM 122 bits [15:0] of the accumulator 202 output 217; at clock 514, each of the 512 NPUs 126 writes back as its result 133 to its corresponding word of row 17 of the data RAM 122 bits [31:16] of the accumulator 202 output 217; and at clock 515, each of the 512 NPUs 126 writes back as its result 133 to its corresponding word of row 18 of the data RAM 122 bits [40:32] of the accumulator 202 output 217. Preferably, bits [47:41] are forced to zero values.

Shared AFUs

Figure 11:
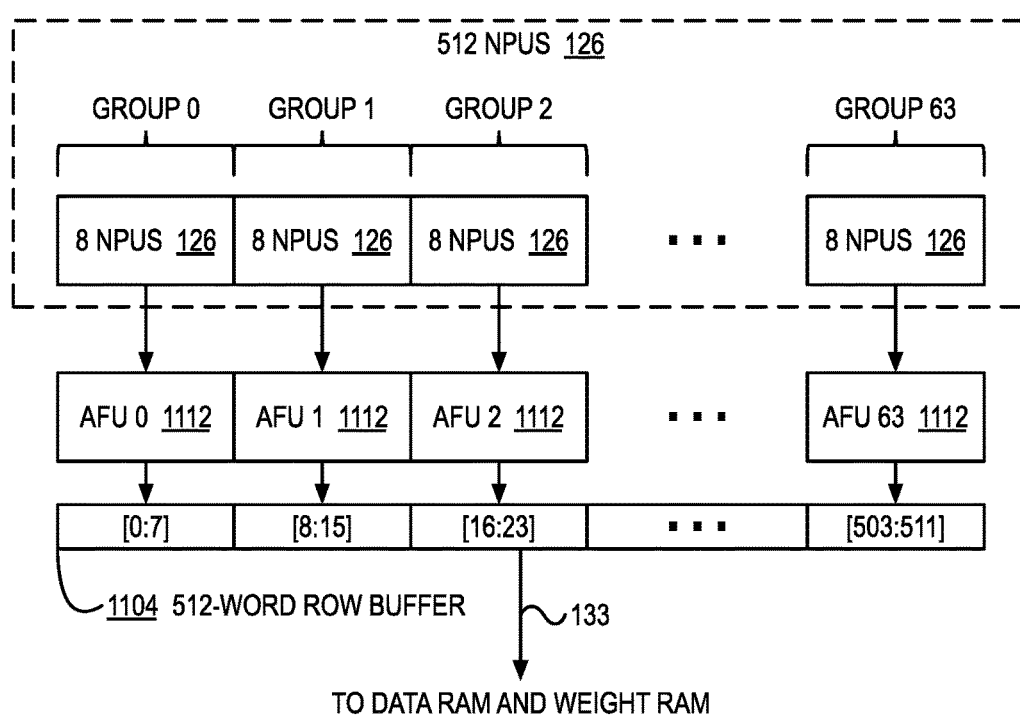
FIG. 11 is a block diagram illustrating an embodiment of the NNU of FIG. 1 is shown. In the embodiment of FIG. 11, a neuron is split into two portions, the activation function unit portion and the ALU portion (which also includes the shift register portion), and each activation function unit portion is shared by multiple ALU portions.

Referring now to FIG. 11, a block diagram illustrating an embodiment of the NNU 121 of FIG. 1 is shown. In the embodiment of FIG. 11, a neuron is split into two portions, the activation function unit portion and the ALU portion (which also includes the shift register portion), and each activation function unit portion is shared by multiple ALU portions. In FIG. 11, the ALU portions are referred to as NPUs 126 and the shared activation function unit portions are referred to as AFUs 1112. This is in contrast to the embodiment of FIG. 2, for example, in which each neuron includes its own AFU 212. Hence, for example, in one embodiment the NPUs 126 (ALU portions) of the embodiment of FIG. 11 include the accumulator 202, ALU 204, mux-reg 208 and register 205 of FIG. 2, but not the AFU 212. In the embodiment of FIG. 11, the NNU 121 includes 512 NPUs 126 as an example; however, other embodiments with other numbers of NPUs 126 are contemplated. In the example of FIG. 11, the 512 NPUs 126 are grouped into 64 groups of eight NPUs 126 each, referred to as groups 0 through 63 in FIG. 11.

The NNU 121 also includes a row buffer 1104 and a plurality of shared AFUs 1112 coupled between the NPUs 126 and the row buffer 1104. The row buffer 1104 is the same width (in bits) as a row of the data RAM 122 or weight RAM 124, e.g., 512 words. There is one AFU 1112 per NPU 126 group, i.e., each AFU 1112 has a corresponding NPU 126 group; thus, in the embodiment of FIG. 11 there are 64 AFUs 1112 that correspond to the 64 NPU 126 groups. Each of the eight NPUs 126 in a group shares the corresponding AFU 1112. Other embodiments with different numbers of AFUs 1112 and NPUs 126 per group are contemplated. For example, other embodiments are contemplated in which two or four or sixteen NPUs 126 in a group share an AFU 1112.

A motivation for sharing AFUs 1112 is to reduce the size of the NNU 121. The size reduction is obtained at the cost of a performance reduction. That is, it may take several clocks longer, depending upon the sharing ratio, to generate the results 133 for the entire array of NPUs 126, as demonstrated in FIG. 12 below, for example, in which seven additional clock cycles are required because of the 8:1 sharing ratio. However, generally speaking, the additional number of clocks (e.g., 7) is relatively small compared to the number of clocks required to generate the accumulated sum (e.g., 512 clocks for a layer that has 512 connections per neuron). Hence, the relatively small performance impact (e.g., one percent increase in computation time) may be a worthwhile tradeoff for the reduced size of the NNU 121.

In one embodiment, each of the NPUs 126 includes an AFU 212 that performs relatively simple activation functions, thus enabling the simple AFUs 212 to be relatively small and therefore included in each NPU 126; whereas, the shared, or complex, AFUs 1112 perform relatively complex activation functions and are thus relatively significantly larger than the simple AFUs 212. In such an embodiment, the additional clock cycles are only required when a complex activation function is specified that requires sharing of a complex AFU 1112, but not when an activation function is specified that the simple AFU 212 is configured to perform.

Figure 12:
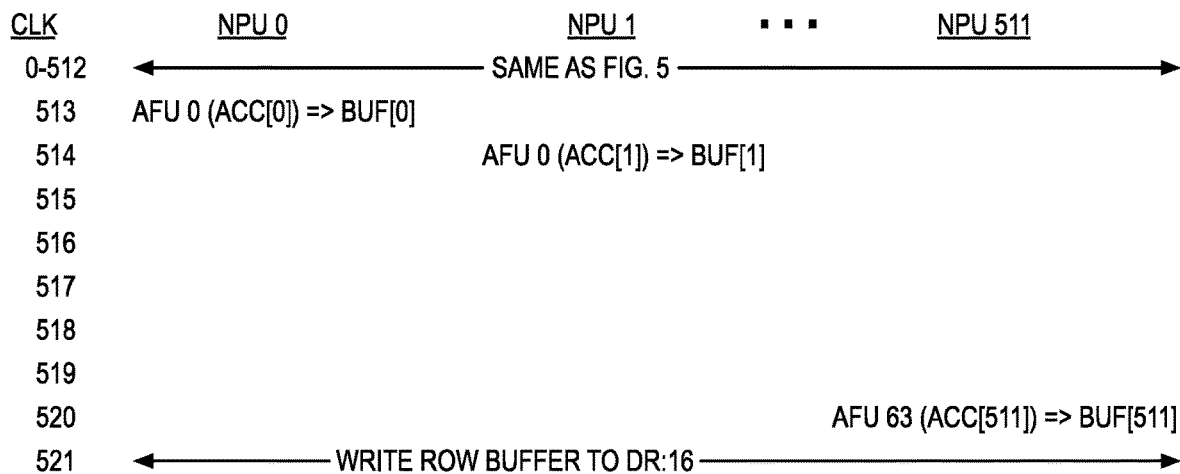
FIG. 12 is a timing diagram illustrating the execution of the program of FIG. 4 by the NNU of FIG. 11.
Figure 13:
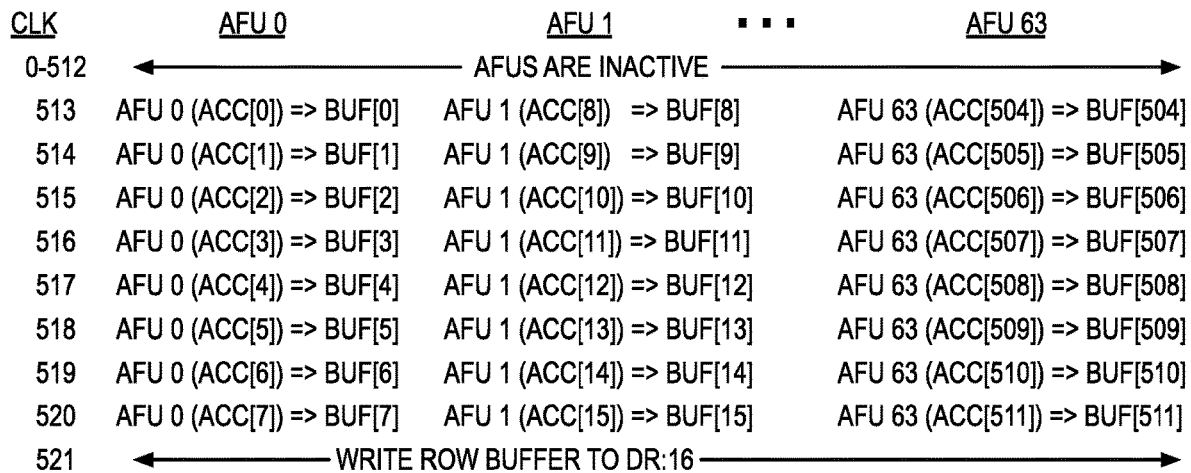
FIG. 13 is a timing diagram illustrating the execution of the program of FIG. 4 by the NNU of FIG. 11.

Referring now to FIGS. 12 and 13, two timing diagrams illustrating the execution of the program of FIG. 4 by the NNU 121 of FIG. 11 is shown. The timing diagram of FIG. 12 is similar to the timing diagram of FIG. 5, and clocks 0 through 512 are the same. However, at clock 513, operation is different than described in the timing diagram of FIG. 5 because the NPUs 126 of FIG. 11 share the AFUs 1112; that is, the NPUs 126 of a group share the AFU 1112 associated with the group, and FIG. 11 illustrates the sharing.

Each row of the timing diagram of FIG. 13 corresponds to a successive clock cycle indicated in the first column. Each of the other columns corresponds to a different one of the 64 AFUs 1112 and indicates its operation. For simplicity and clarity of illustration, the operations only for AFUs 0, 1 and 63 are shown. The clock cycles of FIG. 13 correspond to the clock cycles of FIG. 12 but illustrate the sharing of the AFUs 1112 by the NPUs 126 in a different manner. At clocks 0-512, each of the 64 AFUs 1112 is inactive, as shown in FIG. 13, while the NPUs 126 perform the initialize NPU and multiply-accumulate and multiply-accumulate rotate instructions.

As shown in both FIGS. 12 and 13, at clock 513, AFU 0 (the AFU 1112 associated with group 0) begins to perform the specified activation function on the accumulator 202 value 217 of NPU 0, which is the first NPU 126 in group 0, and the output of AFU 0 will be stored to row buffer 1104 word 0. Also at clock 513, each of the AFUs 1112 begins to perform the specified activation function on the accumulator 202 of the first NPU 126 in its corresponding group of NPUs 126. Thus, in clock 513, as shown in FIG. 13, AFU 0 begins to perform the specified activation function on the accumulator 202 of NPU 0 to generate a result that will be stored to row buffer 1104 word 0; AFU 1 begins to perform the specified activation function on the accumulator 202 of NPU 8 to generate a result that will be stored to row buffer 1104 word 8; and so forth to AFU 63 begins to perform the specified activation function on the accumulator 202 of NPU 504 to generate a result that will be stored to row buffer 1104 word 504.

At clock 514, AFU 0 (the AFU 1112 associated with group 0) begins to perform the specified activation function on the accumulator 202 value 217 of NPU 1, which is the second NPU 126 in group 0, and the output of AFU 0 will be stored to row buffer 1104 word 1, as shown. Also at clock 514, each of the AFUs 1112 begins to perform the specified activation function on the accumulator 202 of the second NPU 126 in its corresponding group of NPUs 126. Thus, in clock 514, as shown in FIG. 13, AFU 0 begins to perform the specified activation function on the accumulator 202 of NPU 1 to generate a result that will be stored to row buffer 1104 word 1; AFU 1 begins to perform the specified activation function on the accumulator 202 of NPU 9 to generate a result that will be stored to row buffer 1104 word 9; and so forth to AFU 63 begins to perform the specified activation function on the accumulator 202 of NPU 505 to generate a result that will be stored to row buffer 1104 word 505. This pattern continues until at clock cycle 520, AFU 0 (the AFU 1112 associated with group 0) begins to perform the specified activation function on the accumulator 202 value 217 of NPU 7, which is the eighth (last) NPU 126 in group 0, and the output of AFU 0 will be stored to row buffer 1104 word 7, as shown. Also at clock 520, each of the AFUs 1112 begins to perform the specified activation function on the accumulator 202 of the eighth NPU 126 in its corresponding group of NPUs 126. Thus, in clock 520, as shown in FIG. 13, AFU 0 begins to perform the specified activation function on the accumulator 202 of NPU 7 to generate a result that will be stored to row buffer 1104 word 7; AFU 1 begins to perform the specified activation function on the accumulator 202 of NPU 15 to generate a result that will be stored to row buffer 1104 word 15; and so forth to AFU 63 begins to perform the specified activation function on the accumulator 202 of NPU 511 to generate a result that will be stored to row buffer 1104 word 511.

At clock 521, once all 512 results associated with the 512 NPUs 126 have been generated and written to the row buffer 1104, the row buffer 1104 begins to write its contents to the data RAM 122 or weight RAM 124. In this fashion, the AFU 1112 of each of the 64 groups of NPUs 126 performs a portion of the activation function instruction at address 3 of FIG. 4.

Embodiments such as that of FIG. 11 that share AFUs 1112 among groups of ALUs 204 may be particularly advantageous in conjunction with integer ALUs 204, as described more below, e.g., with respect to FIGS. 29A through 33.

MTNN and MFNN Architectural Instructions

Figure 14:
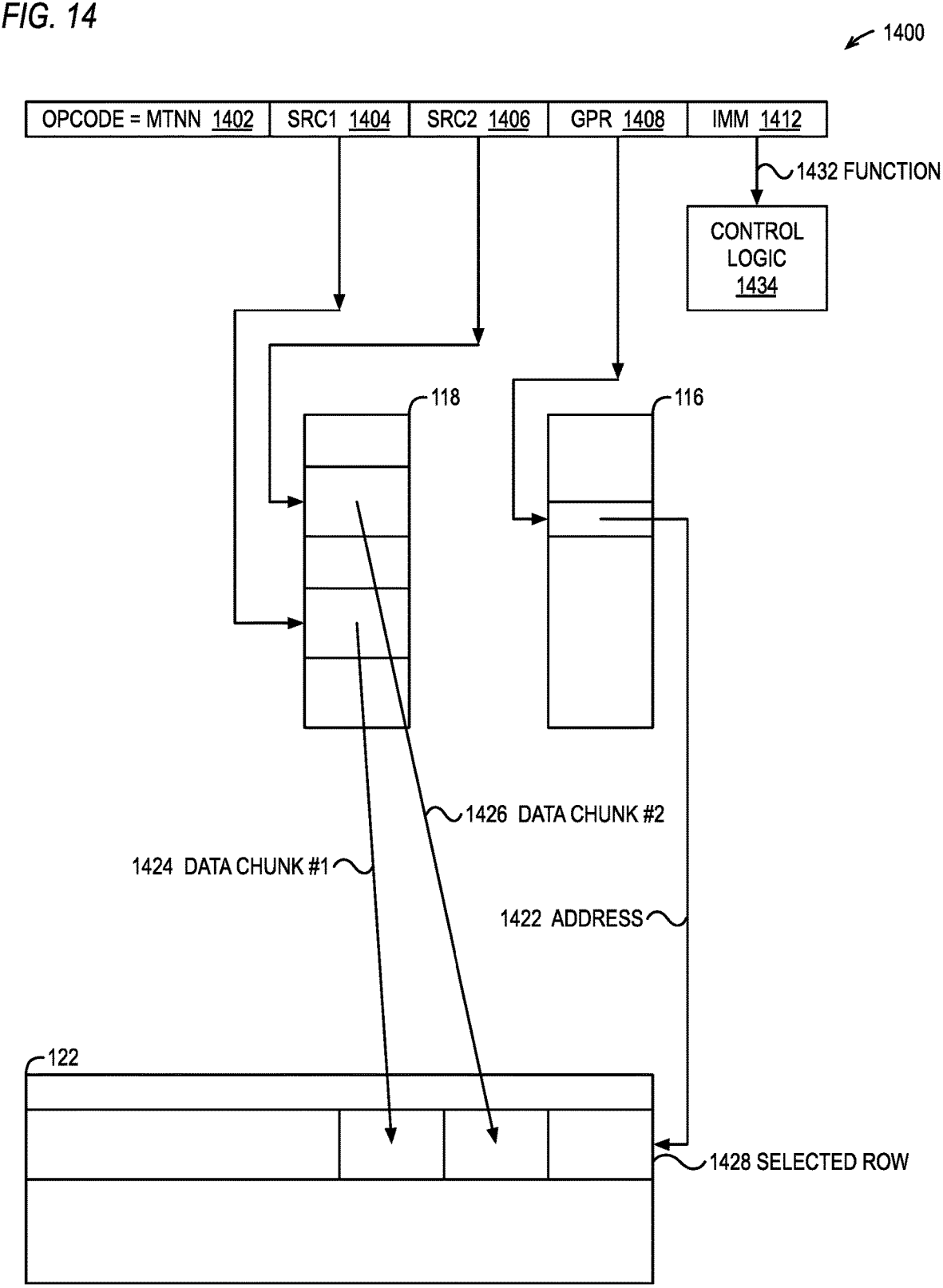
FIG. 14 is a block diagram illustrating a move to neural network (MTNN) architectural instruction and its operation with respect to portions of the NNU of FIG. 1.

Referring now to FIG. 14, a block diagram illustrating a move to neural network (MTNN) architectural instruction 1400 and its operation with respect to portions of the NNU 121 of FIG. 1 is shown. The MTNN instruction 1400 includes an opcode field 1402, a src1 field 1404, a src2 field 1406, a gpr field 1408, and an immediate field 1412. The MTNN instruction 1400 is an architectural instruction, i.e., it is included in the instruction set architecture of the processor 100. Preferably, the instruction set architecture associates a predetermined value of the opcode field 1402 with the MTNN instruction 1400 to distinguish it from other instructions in the instruction set architecture. The MTNN instruction 1400 opcode 1402 may or may not include prefixes, such as are common, for example, in the x86 architecture.

The immediate field 1412 provides a value that specifies a function 1432 to control logic 1434 of the NNU 121. Preferably, the function 1432 is provided as an immediate operand of a microinstruction 105 of FIG. 1. The functions 1432 that may be performed by the NNU 121 include, but are not limited to, writing to the data RAM 122, writing to the weight RAM 124, writing to the program memory 129, writing to the control register 127, starting execution of a program in the program memory 129, pausing the execution of a program in the program memory 129, request notification (e.g., interrupt) of completion of the execution of a program in the program memory 129, and resetting the NNU 121. Preferably, the NNU instruction set includes an instruction whose result indicates the NNU program is complete. Alternatively, the NNU instruction set includes an explicit generate interrupt instruction. Preferably, resetting the NNU 121 includes effectively forcing the NNU 121 back to a reset state (e.g., internal state machines are cleared and set to an idle state), except the contents of the data RAM 122, weight RAM 124, program memory 129 are left intact. Additionally, internal registers such as the accumulator 202 are not affected by the reset function and must be explicitly cleared, e.g., by an initialize NPU instruction at address 0 of FIG. 4. In one embodiment, the function 1432 may include a direct execution function in which the first source register contains a micro-operation (see for example micro-operation 3418 of FIG. 34). The direct execution function instructs the NNU 121 to directly execute the specified micro-operation. In this manner, an architectural program may directly control the NNU 121 to perform operations, rather than writing instructions to the program memory 129 and then instructing the NNU 121 to execute the instructions in the program memory or by executing an MTNN instruction 1400 (or an MFNN instruction 1500 of FIG. 15). FIG. 14 illustrates an example of the function 1432 of writing to the data RAM 122.

The gpr field 1408 specifies one of the GPR in the general purpose register file 116. In one embodiment, each GPR is 64 bits. The general purpose register file 116 provides the value from the selected GPR to the NNU 121, as shown, which uses the value as an address 1422. The address 1422 selects a row of the memory specified in the function 1432. In the case of the data RAM 122 or weight RAM 124, the address 1422 additionally selects a chunk that is twice the size of a media register (e.g., 512 bits) location within the selected row. Preferably, the location is on a 512-bit boundary. In one embodiment, a multiplexer selects either the address 1422 (or address 1422 in the case of a MFNN instruction 1400 described below) or the address 123/125/131 from the sequencer 128 for provision to the data RAM 122/weight RAM 124/program memory 129. In one embodiment, as described in more detail below, the data RAM 122 is dual-ported to allow the NPUs 126 to read/write the data RAM 122 concurrently with the media registers 118 reading/writing the data RAM 122. In one embodiment, the weight RAM 124 is also dual-ported for a similar purpose.

The src1 field 1404 and src2 field 1406 each specify a media register in the media register file 118. In one embodiment, each media register 118 is 256 bits. The media register file 118 provides the concatenated data (e.g., 512 bits) from the selected media registers to the data RAM 122 (or weight RAM 124 or program memory 129) for writing into the selected row 1428 specified by the address 1422 and into the location specified by the address 1422 within the selected row 1428, as shown. Advantageously, by executing a series of MTNN instructions 1400 (and MFNN instructions 1400 described below), an architectural program executing on the processor 100 can populate rows of the data RAM 122 and rows of the weight RAM 124 and write a program to the program memory 129, such as the programs described herein (e.g., of FIGS. 4 and 9) to cause the NNU 121 to perform operations on the data and weights at extremely high speeds to accomplish an artificial neural network. In one embodiment, the architectural program directly controls the NNU 121 rather than writing a program into the program memory 129.

In one embodiment, rather than specifying two source registers (e.g., 1404 and 1406), the MTNN instruction 1400 specifies a start source register and a number of source registers, Q. This form of the MTNN instruction 1400 instructs the processor 100 to write the media register 118 specified as the start source register as well as the next Q−1 sequential media registers 118 to the NNU 121, i.e., to the data RAM 122 or weight RAM 124 specified. Preferably, the instruction translator 104 translates the MTNN instruction 1400 into as many microinstructions as needed to write all the Q specified media registers 118. For example, in one embodiment, when the MTNN instruction 1400 specifies a start source register as MR4 and Q is 8, then the instruction translator 104 translates the MTNN instruction 1400 into four microinstructions, the first of which writes MR4 and MR5, the second of which writes MR6 and MR7, the third of which writes MR8 and MR9, and the fourth of which writes MR10 and MR11. In an alternate embodiment in which the data path from the media registers 118 to the NNU 121 is 1024 bits rather than 512, the instruction translator 104 translates the MTNN instruction 1400 into two microinstructions, the first of which writes MR4 through MR7, and the second of which writes MR8 through MR11. A similar embodiment is contemplated in which the MFNN instruction 1500 specifies a start destination register and a number of destination registers, to enable reading larger chunks of a row of the data RAM 122 or weight RAM 124 per MFNN instruction 1500 than a single media register 118.

Referring now to FIG. 15, a block diagram illustrating a move from neural network (MFNN) architectural instruction 1500 and its operation with respect to portions of the NNU 121 of FIG. 1 is shown. The MFNN instruction 1500 includes an opcode field 1502, a dst field 1504, a gpr field 1508, and an immediate field 1512. The MFNN instruction 1500 is an architectural instruction, i.e., it is included in the instruction set architecture of the processor 100. Preferably, the instruction set architecture associates a predetermined value of the opcode field 1502 with the MFNN instruction 1500 to distinguish it from other instructions in the instruction set architecture. The MFNN instruction 1500 opcode 1502 may or may not include prefixes, such as are common, for example, in the x86 architecture.

The immediate field 1512 provides a value that specifies a function 1532 to the control logic 1434 of the NNU 121. Preferably, the function 1532 is provided as an immediate operand of a microinstruction 105 of FIG. 1. The functions 1532 that may be performed by the NNU 121 include, but are not limited to, reading from the data RAM 122, reading from the weight RAM 124, reading from the program memory 129, and reading from the status register 127. FIG. 15 illustrates an example of the function 1532 of reading from the data RAM 122.

The gpr field 1508 specifies one of the GPR in the general purpose register file 116. The general purpose register file 116 provides the value from the selected GPR to the NNU 121, as shown, which uses the value as an address 1522 that operates in a manner similar to the address 1422 of FIG. 14 to select a row of the memory specified in the function 1532 and, in the case of the data RAM 122 or weight RAM 124, the address 1522 additionally selects a chunk that is the size of a media register (e.g., 256 bits) location within the selected row. Preferably, the location is on a 256-bit boundary.

The dst field 1504 specifies a media register in the media register file 118. The media register file 118 receives the data (e.g., 256 bits) into the selected media register from the data RAM 122 (or weight RAM 124 or program memory 129) read from the selected row 1528 specified by the address 1522 and from the location specified by the address 1522 within the selected row 1528, as shown.

NNU Internal RAM Port Configurations

Figure 16:
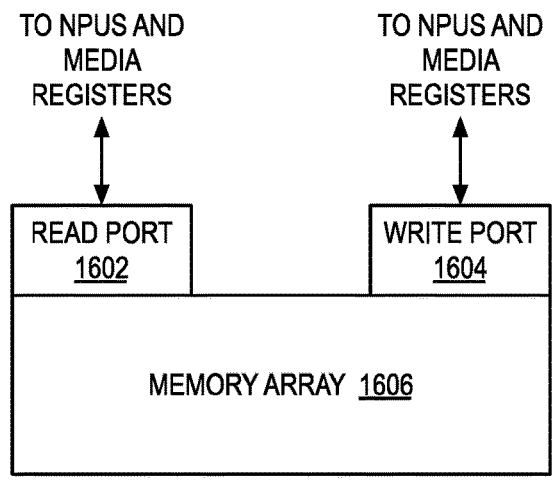
FIG. 16 is a block diagram illustrating an embodiment of the data RAM of FIG. 1.

Referring now to FIG. 16, a block diagram illustrating an embodiment of the data RAM 122 of FIG. 1 is shown. The data RAM 122 includes a memory array 1606, a read port 1602 and a write port 1604. The memory array 1606 holds the data words and is preferably arranged as D rows of N words, as described above. In one embodiment, the memory array 1606 comprises an array of 64 horizontally arranged static RAM cells in which each cell is 128 bits wide and 64 tall to provide a 64 KB data RAM 122 that is 8192 bits wide and has 64 rows, and the data RAM 122 occupies approximately 0.2 square millimeters of die area. However, other embodiments are contemplated.

The read port 1602 is coupled, preferably in a multiplexed fashion, to the NPUs 126 and to the media registers 118. (More precisely, the media registers 118 may be coupled to the read port 1602 via result busses that may also provide data to a reorder buffer and/or result forwarding busses to the other execution units 112). The NPUs 126 and media registers 118 share the read port 1602 to read the data RAM 122. The write port 1604 is also coupled, preferably in a multiplexed fashion, to the NPUs 126 and to the media registers 118. The NPUs 126 and media registers 118 shared the write port 1604 to write the data RAM 122. Thus, advantageously, the media registers 118 can concurrently write to the data RAM 122 while the NPUs 126 are also reading from the data RAM 122, or the NPUs 126 can concurrently write to the data RAM 122 while the media registers 118 are reading from the data RAM 122. This may advantageously provide improved performance. For example, the NPUs 126 can read the data RAM 122 (e.g., to continue to perform calculations) while the media registers 118 write more data words to the data RAM 122. For another example, the NPUs 126 can write calculation results to the data RAM 122 while the media registers 118 read calculation results from the data RAM 122. In one embodiment, the NPUs 126 can write a row of calculation results to the data RAM 122 while the NPUs 126 also read a row of data words from the data RAM 122. In one embodiment, the memory array 1606 is configured in banks. When the NPUs 126 access the data RAM 122, all of the banks are activated to access an entire row of the memory array 1606; whereas, when the media registers 118 access the data RAM 122, only the specified banks are activated. In one embodiment, each bank is 128 bits wide and the media registers 118 are 256 bits wide, hence two banks are activated per media register 118 access, for example. In one embodiment, one of the ports 1602/1604 is a read/write port. In one embodiment, both the ports 1602 and 1604 are read/write ports.

An advantage of the rotater capability of the NPUs 126 as described herein is that it facilitates the ability for the memory array 1606 of the data RAM 122 to have significantly fewer rows, and therefore be relatively much smaller, than might otherwise be needed in order to insure that the NPUs 126 are highly utilized, which requires the architectural program (via the media registers 118) to be able to continue to provide data to the data RAM 122 and to retrieve results from it while the NPUs 126 are performing computations.

Internal RAM Buffer

Figure 17:
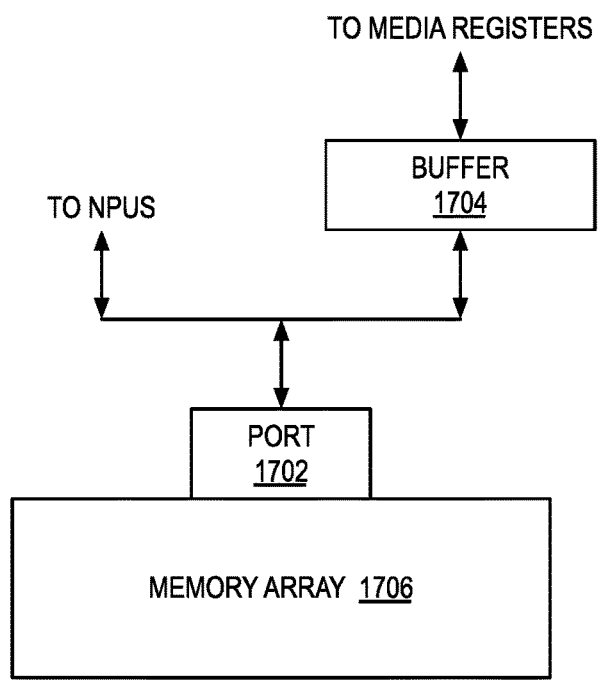
FIG. 17 is a block diagram illustrating an embodiment of the weight RAM of FIG. 1 and a buffer.

Referring now to FIG. 17, a block diagram illustrating an embodiment of the weight RAM 124 of FIG. 1 and a buffer 1704 is shown. The weight RAM 124 includes a memory array 1706 and a port 1702. The memory array 1706 holds the weight words and is preferably arranged as W rows of N words, as described above. In one embodiment, the memory array 1706 comprises an array of 128 horizontally arranged static RAM cells in which each cell is 64 bits wide and 2048 tall to provide a 2 MB weight RAM 124 that is 8192 bits wide and has 2048 rows, and the weight RAM 124 occupies approximately 2.4 square millimeters of die area. However, other embodiments are contemplated.

The port 1702 is coupled, preferably in a multiplexed fashion, to the NPUs 126 and to the buffer 1704. The NPUs 126 and buffer 1704 read and write the weight RAM 124 via the port 1702. The buffer 1704 is also coupled to the media registers 118 of FIG. 1 such that the media registers 118 read and write the weight RAM 124 through the buffer 1704. Thus, advantageously, the media registers 118 can concurrently write to or read from the buffer 1704 while the NPUs 126 are also reading from or writing to the weight RAM 124 (although preferably the NPUs 126 stall, if they are currently executing, to avoid accessing the weight RAM 124 while the buffer 1704 is accessing the weight RAM 124). This may advantageously provide improved performance, particularly since the reads/writes by the media registers 118 to the weight RAM 124 are relatively much smaller than the reads/writes by the NPUs 126 to the weight RAM 124. For example, in one embodiment, the NPUs 126 read/write 8192 bits (one row) at a time, whereas the media registers 118 are 256 bits wide, and each MTNN instructions 1400 writes two media registers 118, i.e., 512 bits. Thus, in the case where the architectural program executes sixteen MTNN instructions 1400 to populate the buffer 1704, a conflict occurs between the NPUs 126 and the architectural program for access to the weight RAM 124 only less than approximately six percent of the time. In an alternate embodiment, the instruction translator 104 translates a MTNN instruction 1400 into two microinstructions 105, each of which writes a single media register 118 to the buffer 1704, in which case a conflict occurs between the NPUs 126 and the architectural program for access to the weight RAM 124 even less frequently.

In one embodiment that includes the buffer 1704, writing to the weight RAM 124 by an architectural program requires multiple MTNN instructions 1400. One or more MTNN instructions 1400 specify a function 1432 to write to specified chunks of the buffer 1704 followed by an MTNN instruction 1400 that specifies a function 1432 that instructs the NNU 121 to write the contents of the buffer 1704 to a specified row of the weight RAM 124, where the size of a chunk is twice the number of bits of a media register 118 and chunks are naturally aligned within the buffer 1704. In one embodiment, in each of the MTNN instructions 1400 that specify a function 1432 to write to specified chunks of the buffer 1704, a bitmask is included that has a bit corresponding to each chunk of the buffer 1704. The data from the two specified source registers 118 is written to each chunk of the buffer 1704 whose corresponding bit in the bitmask is set. This may be useful for repeated data values within a row of the weight RAM 124. For example, in order to zero out the buffer 1704 (and subsequently a row of the weight RAM 124), the programmer may load the source registers with zero and set all bits of the bitmask. Additionally, the bitmask enables the programmer to only write to selected chunks of the buffer 1704 and thereby retain the previous data in the other chunks.

In one embodiment that includes the buffer 1704, reading from the weight RAM 124 by an architectural program requires multiple MFNN instructions 1500. An initial MFNN instruction 1500 specifies a function 1532 to load the buffer 1704 from a specified row of the weight RAM 124 followed by one or more MFNN instructions 1500 that specify a function 1532 to read a specified chunk of the buffer 1704 into the destination register, where the size of a chunk is the number of bits of a media register 118 and chunks are naturally aligned within the buffer 1704. Other embodiments are contemplated in which the weight RAM 124 includes multiple buffers 1704 to further reduce contention between the NPUs 126 and the architectural program for access to the weight RAM 124 by increasing the number of accesses that can be made by the architectural program while the NPUs 126 are executing, which may increase the likelihood that the accesses by the buffers 1704 can be performed during clock cycles in which the NPUs 126 do not need to access the weight RAM 124.

Although FIG. 16 describes a dual-ported data RAM 122, other embodiments are contemplated in which the weight RAM 124 is also dual-ported. Furthermore, although FIG. 17 describes a buffer for use with the weight RAM 124, other embodiments are contemplated in which the data RAM 122 also has an associated buffer similar to buffer 1704.

Dynamically Configurable NPUs

Figure 18:
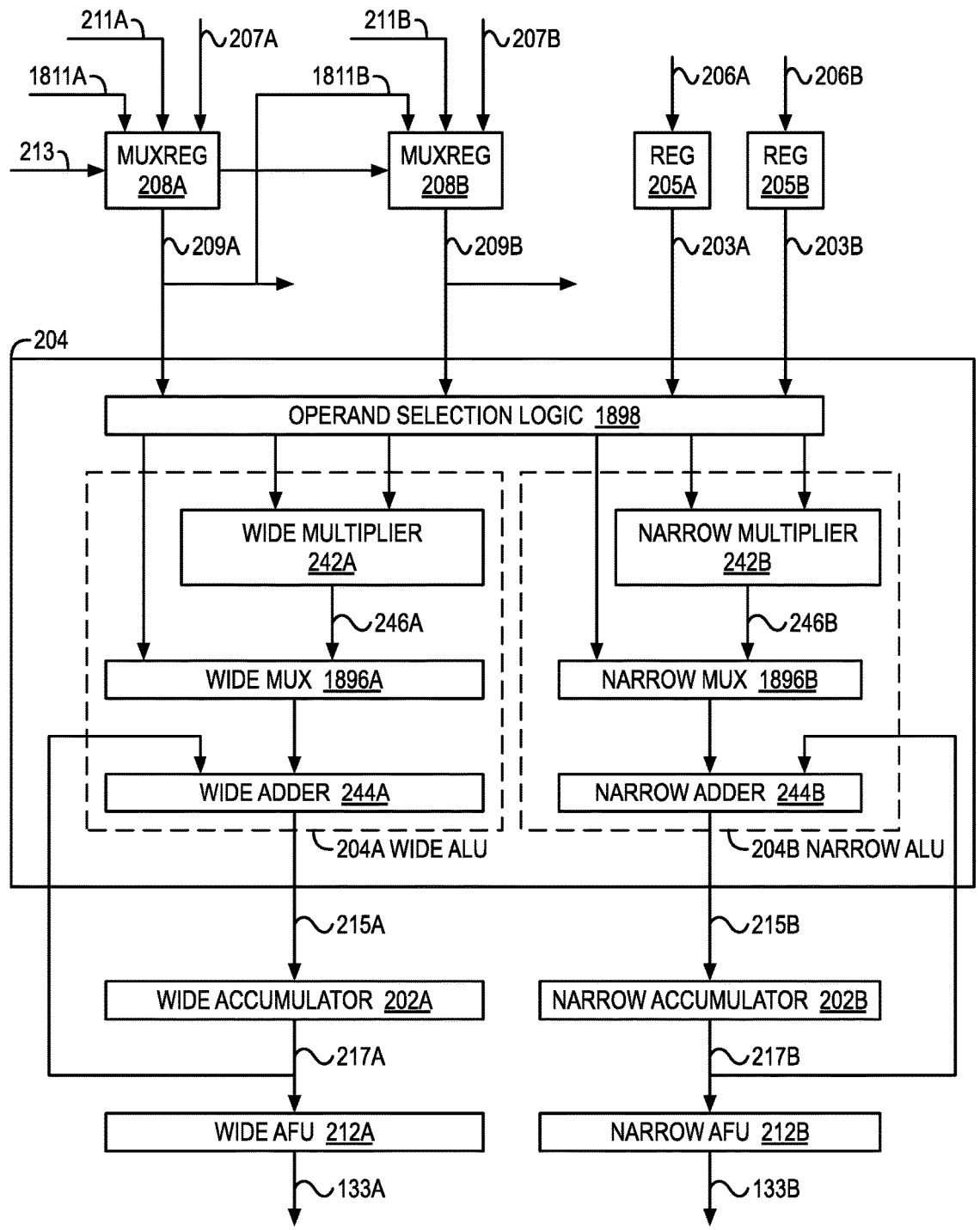
FIG. 18 is a block diagram illustrating a dynamically configurable NPU of FIG. 1.

Referring now to FIG. 18, a block diagram illustrating a dynamically configurable NPU 126 of FIG. 1 is shown. The NPU 126 of FIG. 18 is similar in many respects to the NPU 126 of FIG. 2. However, the NPU 126 of FIG. 18 is dynamically configurable to operate in one of two different configurations. In a first configuration, the NPU 126 of FIG. 18 operates similar to the NPU 126 of FIG. 2. That is, in the first configuration, referred to herein as "wide" configuration or "single" configuration, the ALU 204 of the NPU 126 performs operations on a single wide data word and a single wide weight word (e.g., 16 bits) to generate a single wide result. In contrast, in the second configuration, referred to herein as "narrow" configuration or "dual" configuration, the NPU 126 performs operations on two narrow data words and two respective narrow weight words (e.g., 8 bits) to generate two respective narrow results. In one embodiment, the configuration (wide or narrow) of the NPU 126 is made by the initialize NPU instruction (e.g., at address 0 of FIG. 20, described below). Alternatively, the configuration is made by an MTNN instruction whose function 1432 specifies to configure the NPU 126 to the configuration (wide or narrow). Preferably, configuration registers are populated by the program memory 129 instruction or the MTNN instruction that determine the configuration (wide or narrow). For example, the configuration register outputs are provided to the ALU 204, AFU 212 and logic that generates the mux-reg control signal 213. Generally speaking, the elements of the NPUs 126 of FIG. 18 perform similar functions to their like-numbered elements of FIG. 2 and reference should be made thereto for an understanding of FIG. 18. However, the embodiment of FIG. 18 will now be described, including differences from FIG. 2.

The NPU 126 of FIG. 18 includes two registers 205A and 205B, two 3-input mux-regs 208A and 208B, an ALU 204, two accumulators 202A and 202B, and two AFUs 212A and 212B. Each of the registers 205A/205B is separately half the width (e.g., 8 bits) of register 205 of FIG. 2. Each of the registers 205A/205B receives a respective narrow weight word 206A/206B (e.g., 8 bits) from the weight RAM 124 and provides its output 203A/203B on a subsequent clock cycle to operand selection logic 1898 of the ALU 204. When the NPU 126 is in a wide configuration, the registers 205A/205B effectively function together to receive a wide weight word 206A/206B (e.g., 16 bits) from the weight RAM 124, similar to the manner of the register 205 of the embodiment of FIG. 2; and when the NPU 126 is in a narrow configuration, the registers 205A/205B effectively function individually to each receive a narrow weight word 206A/206B (e.g., 8 bits) from the weight RAM 124 such that the NPU 126 is effectively two separate narrow NPUs. Nevertheless, the same output bits of the weight RAM 124 are coupled to and provided to the registers 205A/205B, regardless of the configuration of the NPU 126. For example, the register 205A of NPU 0 receives byte 0 the register 205B of NPU 0 receives byte 1, the register 205A of NPU 1 receives byte 2, the register 205B of NPU 1 receives byte 3, and so forth to the register 205B of NPU 511 receives byte 1023.

Each of the mux-regs 208A/208B is separately half the width (e.g., 8 bits) of register 208 of FIG. 2. The mux-reg 208A selects one of its inputs 207A or 211A or 1811A to store in its register and then to provide on its output 209A on a subsequent clock cycle, and the mux-reg 208B selects one of its inputs 207B or 211B or 1811B to store in its register and then to provide on its output 209B on a subsequent clock cycle to the operand selection logic 1898. The input 207A receives a narrow data word (e.g., 8 bits) from the data RAM 122, and the input 207B receives a narrow data word from the data RAM 122. When the NPU 126 is in a wide configuration, the mux-regs 208A/208B effectively function together to receive a wide data word 207A/207B (e.g., 16 bits) from the data RAM 122, similar to the manner of the mux-reg 208 of the embodiment of FIG. 2; and when the NPU 126 is in a narrow configuration, the mux-regs 208A/208B effectively function individually to each receive a narrow data word 207A/207B (e.g., 8 bits) from the data RAM 122 such that the NPU 126 is effectively two separate narrow NPUs. Nevertheless, the same output bits of the data RAM 122 are coupled to and provided to the mux-regs 208A/208B, regardless of the configuration of the NPU 126. For example, the mux-reg 208A of NPU 0 receives byte 0, the mux-reg 208B of NPU 0 receives byte 1, the mux-reg 208A of NPU 1 receives byte 2, the mux-reg 208B of NPU 1 receives byte 3, and so forth to the mux-reg 208B of NPU 511 receives byte 1023.

The input 211A receives the output 209A of mux-reg 208A of the adjacent NPU 126, and the input 211B receives the output 209B of mux-reg 208B of the adjacent NPU 126. The input 1811A receives the output 209B of mux-reg 208B of the adjacent NPU 126, and the input 1811B receives the output 209A of mux-reg 208A of the instant NPU 126, as shown. The NPU 126 shown in FIG. 18 is denoted NPU J from among the N NPUs 126 of FIG. 1. That is, NPU J is a representative instance of the N NPUs 126. Preferably, the mux-reg 208A input 211A of NPU J receives the mux-reg 208A output 209A of NPU 126 instance J−1, the mux-reg 208A input 1811A of NPU J receives the mux-reg 208B output 209B of NPU 126 instance J−1, and the mux-reg 208A output 209A of NPU J is provided both to the mux-reg 208A input 211A of NPU 126 instance J+1 and to the mux-reg 208B input 211B of NPU 126 instance J; and the mux-reg 208B input 211B of NPU J receives the mux-reg 208B output 209B of NPU 126 instance J−1, the mux-reg 208B input 1811B of NPU J receives the mux-reg 208A output 209A of NPU 126 instance J, and the mux-reg 208B output 209B of NPU J is provided to both the mux-reg 208A input 1811A of NPU 126 instance J+1 and to the mux-reg 208B input 211B of NPU 126 instance J+1.

The control input 213 controls which of the three inputs each of the mux-regs 208A/208B selects to store in its respective register and that is subsequently provided on the respective outputs 209A/209B. When the NPU 126 is instructed to load a row from the data RAM 122 (e.g., as by the multiply-accumulate instruction at address 1 of FIG. 20, described below), regardless of whether the NPU 126 is in a wide or narrow configuration, the control input 213 controls each of the mux-regs 208A/208B to select a respective narrow data word 207A/207B (e.g., 8 bits) from the corresponding narrow word of the selected row of the data RAM 122.

When the NPU 126 is instructed to rotate the previously received data row values (e.g., as by the multiply-accumulate rotate instruction at address 2 of FIG. 20, described below), if the NPU 126 is in a narrow configuration, the control input 213 controls each of the mux-regs 208A/208B to select the respective input 1811A/1811B. In this case, the mux-regs 208A/208B function individually effectively such that the NPU 126 is effectively two separate narrow NPUs. In this manner, the mux-regs 208A and 208B of the N NPUs 126 collectively operate as a 2N-narrow-word rotater, as described in more detail below with respect to FIG. 19.

When the NPU 126 is instructed to rotate the previously received data row values, if the NPU 126 is in a wide configuration, the control input 213 controls each of the mux-regs 208A/208B to select the respective input 211A/211B. In this case, the mux-regs 208A/208B function together effectively as if the NPU 126 is a single wide NPU 126. In this manner, the mux-regs 208A and 208B of the N NPUs 126 collectively operate as an N-wide-word rotater, similar to the manner described with respect to FIG. 3.

The ALU 204 includes the operand selection logic 1898, a wide multiplier 242A, a narrow multiplier 242B, a wide two-input mux 1896A, a narrow two-input mux 1896B, a wide adder 244A and a narrow adder 244B. Effectively, the ALU 204 comprises the operand selection logic 1898, a wide ALU 204A (comprising the wide multiplier 242A, the wide mux 1896A and the wide adder 244A) and a narrow ALU 204B (comprising the narrow multiplier 242B, the narrow mux 1896B and the narrow adder 244B). Preferably, the wide multiplier 242A multiplies two wide words and is similar to the multiplier 242 of FIG. 2, e.g., a 16-bit by 16-bit multiplier. The narrow multiplier 242B multiplies two narrow words, e.g., an 8-bit by 8-bit multiplier that generates a 16-bit result. When the NPU 126 is in a narrow configuration, the wide multiplier 242A is effectively used, with the help of the operand selection logic 1898, as a narrow multiplier to multiply two narrow words so that the NPU 126 effectively functions as two narrow NPUs. Preferably, the wide adder 244A adds the output of the wide mux 1896A and the wide accumulator 202A output 217A to generate a sum 215A for provision to the wide accumulator 202A and is similar to the adder 244 of FIG. 2. The narrow adder 244B adds the output of the narrow mux 1896B and the narrow accumulator 202B output 217B to generate a sum 215B for provision to the narrow accumulator 202B. In one embodiment, the narrow accumulator 202B is 28 bits wide to avoid loss of precision in the accumulation of up to 1024 16-bit products. When the NPU 126 is in a wide configuration, the narrow multiplier 242B, narrow mux 1896B, narrow adder 244B, narrow accumulator 202B and narrow AFU 212B are preferably inactive to reduce power consumption.

The operand selection logic 1898 selects operands from 209A, 209B, 203A and 203B to provide to the other elements of the ALU 204, as described in more detail below. Preferably, the operand selection logic 1898 also performs other functions, such as performing sign extension of signed-valued data words and weight words. For example, if the NPU 126 is in a narrow configuration, the operand selection logic 1898 sign extends the narrow data word and weight word to the width of a wide word before providing them to the wide multiplier 242A. Similarly, if the ALU 204 is instructed to pass through a narrow data/weight word (bypass the wide multiplier 242A via wide mux 1896A), the operand selection logic 1898 sign extends the narrow data/weight word to the width of a wide word before providing it to the wide adder 244A. Preferably, logic is also present in the ALU 204 of the NPU 126 of FIG. 2 to perform the sign-extension function.

The wide mux 1896A receives the output of the wide multiplier 242A and an operand from the operand selection logic 1898 and selects one of the inputs for provision to the wide adder 244A, and the narrow mux 1896B receives the output of the narrow multiplier 242B and an operand from the operand selection logic 1898 and selects one of the inputs for provision to the narrow adder 244B.

The operands provided by the operand selection logic 1898 depend upon the configuration of the NPU 126 and upon the arithmetic and/or logical operations to be performed by the ALU 204 based on the function specified by the instruction being executed by the NPU 126. For example, if the instruction instructs the ALU 204 to perform a multiply-accumulate and the NPU 126 is in a wide configuration, the operand selection logic 1898 provides to the wide multiplier 242A on one input a wide word that is the concatenation of outputs 209A and 209B and on the other input a wide word that is the concatenation of outputs 203A and 203B, and the narrow multiplier 242B is inactive, so that the NPU 126 functions as a single wide NPU 126 similar to the NPU 126 of FIG. 2. Whereas, if the instruction instructs the ALU 204 to perform a multiply-accumulate and the NPU 126 is in a narrow configuration, the operand selection logic 1898 provides to the wide multiplier 242A on one input an extended, or widened, version of the narrow data word 209A and on the other input an extended version of the narrow weight word 203A; additionally, the operand selection logic 1898 provides to the narrow multiplier 242B on one input the narrow data words 209B and on the other input the narrow weight word 203B. To extend, or widen, a narrow word, if the narrow word is signed, then the operand selection logic 1898 sign-extends the narrow word, whereas if the narrow word is unsigned, the operand selection logic 1898 pads the narrow word with zero-valued upper bits For another example, if the NPU 126 is in a wide configuration and the instruction instructs the ALU 204 to perform an accumulate of the weight word, the wide multiplier 242A is bypassed and the operand selection logic 1898 provides the concatenation of outputs 203A and 203B to the wide mux 1896A for provision to the wide adder 244A. Whereas, if the NPU 126 is in a narrow configuration and the instruction instructs the ALU 204 to perform an accumulate of the weight word, the wide multiplier 242A is bypassed and the operand selection logic 1898 provides an extended version of the output 203A to the wide mux 1896A for provision to the wide adder 244A; and the narrow multiplier 242B is bypassed and the operand selection logic 1898 provides an extended version of the output 203B to the narrow mux 1896B for provision to the narrow adder 244B.

For another example, if the NPU 126 is in a wide configuration and the instruction instructs the ALU 204 to perform an accumulate of the data word, the wide multiplier 242A is bypassed and the operand selection logic 1898 provides the concatenation of outputs 209A and 209B to the wide mux 1896A for provision to the wide adder 244A. Whereas, if the NPU 126 is in a narrow configuration and the instruction instructs the ALU 204 to perform an accumulate of the data word, the wide multiplier 242A is bypassed and the operand selection logic 1898 provides an extended version of the output 209A to the wide mux 1896A for provision to the wide adder 244A; and the narrow multiplier 242B is bypassed and the operand selection logic 1898 provides an extended version of the output 209B to the narrow mux 1896B for provision to the narrow adder 244B. The accumulation of weight/data words may be useful for performing averaging operations that are used in pooling layers of some artificial neural network applications, such as image processing.

Preferably, the NPU 126 also includes a second wide mux (not shown) for bypassing the wide adder 244A to facilitate loading the wide accumulator 202A with a wide data/weight word in wide configuration or an extended narrow data/weight word in narrow configuration, and a second narrow mux (not shown) for bypassing the narrow adder 244B to facilitate loading the narrow accumulator 202B with a narrow data/weight word in narrow configuration. Preferably, the ALU 204 also includes wide and narrow comparator/mux combinations (not shown) that receive the respective accumulator value 217A/217B and respective mux 1896A/1896B output to select the maximum value between the accumulator value 217A/217B and a data/weight word 209A/B/203A/B, an operation that is used in pooling layers of some artificial neural network applications, as described in more detail below, e.g., with respect to FIGS. 27 and 28. Additionally, the operand selection logic 1898 is configured to provide zero-valued operands (for addition with zero or for clearing the accumulators) and to provide one-valued operands (for multiplication by one).

The narrow AFU 212B receives the output 217B of the narrow accumulator 202B and performs an activation function on it to generate a narrow result 133B, and the wide AFU 212A receives the output 217A of the wide accumulator 202A and performs an activation function on it to generate a wide result 133A. When the NPU 126 is in a narrow configuration, the wide AFU 212A considers the output 217A of the wide accumulator 202A accordingly and performs an activation function on it to generate a narrow result, e.g., 8 bits, as described in more detail below with respect to FIGS. 29A through 30, for example.

As may observed from the above description, advantageously the single NPU 126 operates effectively as two narrow NPUs when in a narrow configuration, thus providing, for smaller words, approximately up to twice the throughput as when in the wide configuration. For example, assume a neural network layer having 1024 neurons each receiving 1024 narrow inputs from the previous layer (and having narrow weight words), resulting in 1 Mega-connections. An NNU 121 having 512 NPUs 126 in a narrow configuration (1024 narrow NPU) compared to an NNU 121 having 512 NPUs 126 in a wide configuration is capable of processing four times the number of connections (1 Mega-connections vs. 256K connections) in approximately half the time (approx. 1026 clocks vs. 514 clocks), albeit for narrow words rather than wide words.

In one embodiment, the dynamically configurable NPU 126 of FIG. 18 includes 3-input multiplexed-registers similar to mux-regs 208A and 208B in place of the registers 205A and 205B to accomplish a rotater for a row of weight words received from the weight RAM 124 somewhat similar to the manner described with respect to the embodiment of FIG. 7 but in a dynamically configurable fashion as described with respect to FIG. 18.

Figure 19:
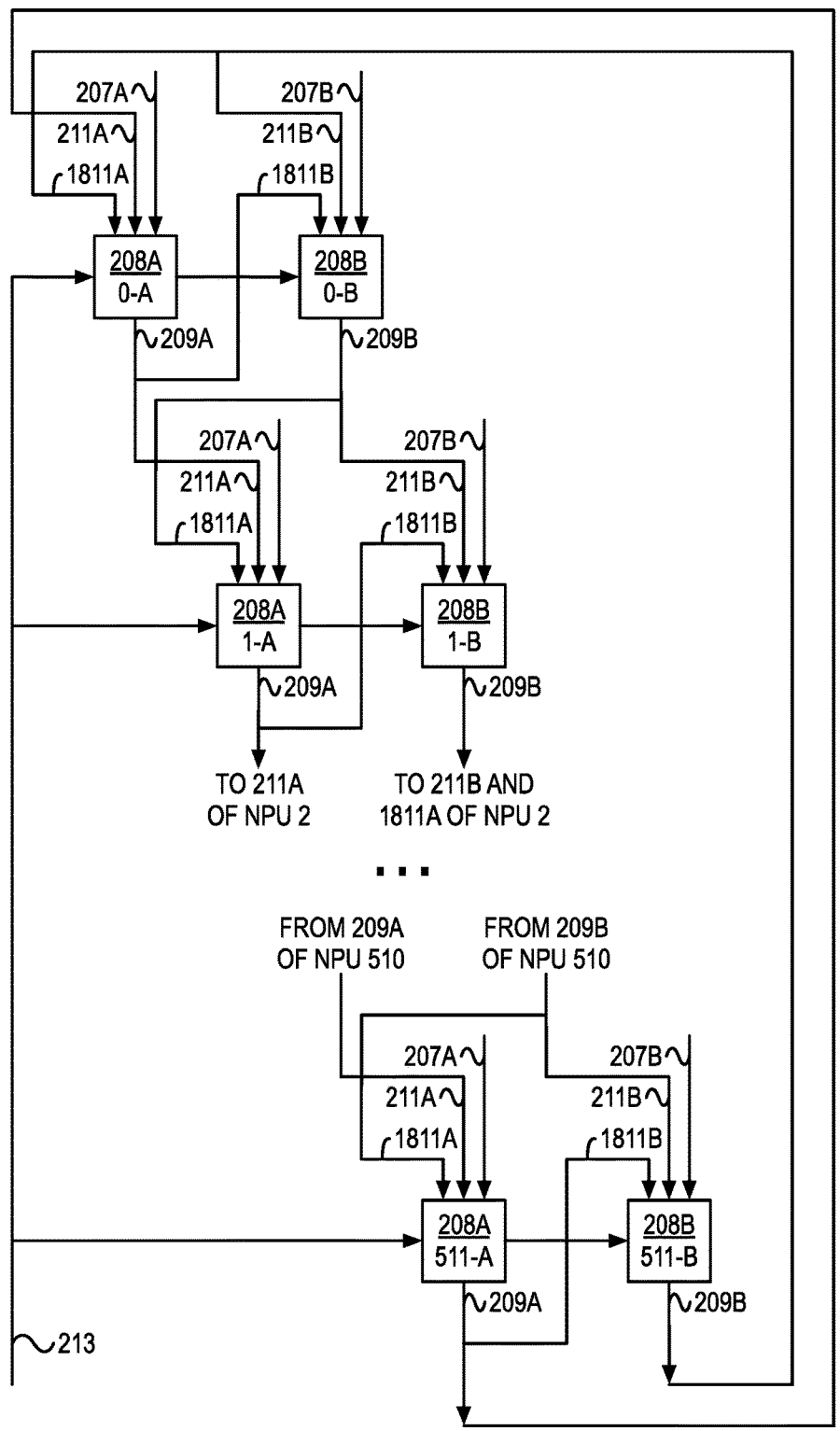
FIG. 19 is a block diagram illustrating an embodiment of the arrangement of the 2N mux-regs of the N NPUs of the NNU of FIG. 1 according to the embodiment of FIG. 18 to illustrate their operation as a rotater for a row of data words received from the data RAM of FIG. 1.

Referring now to FIG. 19, a block diagram illustrating an embodiment of the arrangement of the 2N mux-regs 208A/208B of the N NPUs 126 of the NNU 121 of FIG. 1 according to the embodiment of FIG. 18 to illustrate their operation as a rotater for a row of data words 207 received from the data RAM 122 of FIG. 1 is shown. In the embodiment of FIG. 19, N is 512 such that the NNU 121 has 1024 mux-regs 208A/208B, denoted 0 through 511, corresponding to 512 NPUs 126 and effectively 1024 narrow NPUs, as shown. The two narrow NPUs within a NPU 126 are denoted A and B, and within each of the mux-regs 208, the designation of the corresponding narrow NPU is shown. More specifically, mux-reg 208A of NPU 126 0 is designated 0-A, mux-reg 208B of NPU 126 0 is designated 0-B, mux-reg 208A of NPU 126 1 is designated 1-A, mux-reg 208B of NPU 126 1 is designated 1-B, mux-reg 208A of NPU 126 511 is designated 511-A, and mux-reg 208B of NPU 126 511 is designated 0-B, which values also correspond to the narrow NPUs of FIG. 21 described below.

Each mux-reg 208A receives its corresponding narrow data word 207A of one row of the D rows of the data RAM 122, and each mux-reg 208B receives its corresponding narrow data word 207B of one row of the D rows of the data RAM 122. That is, mux-reg 0A receives narrow data word 0 of the data RAM 122 row, mux-reg 0B receives narrow data word 1 of the data RAM 122 row, mux-reg 1A receives narrow data word 2 of the data RAM 122 row, mux-reg 1B receives narrow data word 3 of the data RAM 122 row, and so forth to mux-reg 511A receives narrow data word 1022 of the data RAM 122 row, and mux-reg 511B receives narrow data word 1023 of the data RAM 122 row. Additionally, mux-reg 1A receives on its input 211A the output 209A of mux-reg 0A, mux-reg 1B receives on its input 211B the output 209B of mux-reg 0B, and so forth to mux-reg 511A that receives on its input 211A the output 209A of mux-reg 510A and mux-reg 511B that receives on its input 211B the output 209B of mux-reg 510B, and mux-reg 0A receives on its input 211A the output 209A of mux-reg 511A and mux-reg 0B receives on its input 211B the output 209B of mux-reg 511B. Each of the mux-regs 208A/208B receives the control input 213 that controls whether to select the data word 207A/207B or the rotated input 211A/211B or the rotated input 1811A/1811B. Finally, mux-reg 1A receives on its input 1811A the output 209B of mux-reg 0B, mux-reg 1B receives on its input 1811B the output 209A of mux-reg 1A, and so forth to mux-reg 511A that receives on its input 1811A the output 209B of mux-reg 510B and mux-reg 511B that receives on its input 1811B the output 209A of mux-reg 511A, and mux-reg 0A receives on its input 1811A the output 209B of mux-reg 511B and mux-reg 0B receives on its input 1811B the output 209A of mux-reg 0A. Each of the mux-regs 208A/208B receives the control input 213 that controls whether to select the data word 207A/207B or the rotated input 211A/211B or the rotated input 1811A/1811B. As described in more detail below, in one mode of operation, on a first clock cycle, the control input 213 controls each of the mux-regs 208A/208B to select the data word 207A/207B for storage in the register and for subsequent provision to the ALU 204; and during subsequent clock cycles (e.g., M−1 clock cycles as described above), the control input 213 controls each of the mux-regs 208A/208B to select the rotated input 1811A/1811B for storage in the register and for subsequent provision to the ALU 204.

Referring now to FIG. 20, a table illustrating a program for storage in the program memory 129 of and execution by the NNU 121 of FIG. 1 having NPUs 126 according to the embodiment of FIG. 18 is shown. The example program of FIG. 20 is similar in many ways to the program of FIG. 4. However, differences will now be described. The initialize NPU instruction at address 0 specifies that the NPU 126 is to be in a narrow configuration. Additionally, the multiply-accumulate rotate instruction at address 2 specifies a count of 1023 and requires 1023 clock cycles, as shown. This is because the example of FIG. 20 assumes effectively 1024 narrow (e.g., 8-bit) neurons (NPUs) of a layer, each having 1024 connection inputs from a previous layer of 1024 neurons, for a total of 1024K connections. Each neuron receives an 8-bit data value from each connection input and multiplies the 8-bit data value by an appropriate 8-bit weight value.

Referring now to FIG. 21, a timing diagram illustrating the execution of the program of FIG. 20 by the NNU 121 that includes NPUs 126 of FIG. 18 operating in a narrow configuration is shown. The timing diagram of FIG. 21 is similar in many ways to the timing diagram of FIG. 5; however, differences will now be described.

In the timing diagram of FIG. 21, the NPUs 126 are in a narrow configuration because the initialize NPU instruction at address 0 initializes them to a narrow configuration. Consequently, the 512 NPUs 126 effectively operate as 1024 narrow NPUs (or neurons), which are designated in the columns as NPU 0-A and NPU 0-B (the two narrow NPUs of NPU 126 0), NPU 1-A and NPU 1-B (the two narrow NPUs of NPU 126 1) and so forth through NPU 511-A and NPU 511-B (the two narrow NPUs of NPU 126 511). For simplicity and clarity of illustration, the operations only for narrow NPUs 0-A, 0-B and 511-B are shown. Due to the fact that the multiply-accumulate rotate at address 2 specifies a count of 1023, which requires 1023 clocks, the rows of the timing diagram of FIG. 21 include up to clock cycle 1026.

At clock 0, each of the 1024 NPUs performs the initialization instruction of FIG. 4, which is illustrated in FIG. 5 by the assignment of a zero value to the accumulator 202.

At clock 1, each of the 1024 narrow NPUs performs the multiply-accumulate instruction at address 1 of FIG. 20. Narrow NPU 0-A accumulates the accumulator 202A value (which is zero) with the product of data RAM 122 row 17 narrow word 0 and weight RAM 124 row 0 narrow word 0; narrow NPU 0-B accumulates the accumulator 202B value (which is zero) with the product of data RAM 122 row 17 narrow word 1 and weight RAM 124 row 0 narrow word 1; and so forth to narrow NPU 511-B accumulates the accumulator 202B value (which is zero) with the product of data RAM 122 row 17 narrow word 1023 and weight RAM 124 row 0 narrow word 1023, as shown.

At clock 2, each of the 1024 narrow NPUs performs a first iteration of the multiply-accumulate rotate instruction at address 2 of FIG. 20. Narrow NPU 0-A accumulates the accumulator 202A value 217A with the product of the rotated narrow data word 1811A received from the mux-reg 208B output 209B of narrow NPU 511-B (which was narrow data word 1023 received from the data RAM 122) and weight RAM 124 row 1 narrow word 0; narrow NPU 0-B accumulates the accumulator 202B value 217B with the product of the rotated narrow data word 1811B received from the mux-reg 208A output 209A of narrow NPU 0-A (which was narrow data word 0 received from the data RAM 122) and weight RAM 124 row 1 narrow word 1; and so forth to narrow NPU 511-B accumulates the accumulator 202B value 217B with the product of the rotated narrow data word 1811B received from the mux-reg 208A output 209A of narrow NPU 511-A (which was narrow data word 1022 received from the data RAM 122) and weight RAM 124 row 1 narrow word 1023, as shown.

At clock 3, each of the 1024 narrow NPUs performs a second iteration of the multiply-accumulate rotate instruction at address 2 of FIG. 20. Narrow NPU 0-A accumulates the accumulator 202A value 217A with the product of the rotated narrow data word 1811A received from the mux-reg 208B output 209B of narrow NPU 511-B (which was narrow data word 1022 received from the data RAM 122) and weight RAM 124 row 2 narrow word 0; narrow NPU 0-B accumulates the accumulator 202B value 217B with the product of the rotated narrow data word 1811B received from the mux-reg 208A output 209A of narrow NPU 0-A (which was narrow data word 1023 received from the data RAM 122) and weight RAM 124 row 2 narrow word 1; and so forth to narrow NPU 511-B accumulates the accumulator 202B value 217B with the product of the rotated narrow data word 1811B received from the mux-reg 208A output 209A of narrow NPU 511-A (which was narrow data word 1021 received from the data RAM 122) and weight RAM 124 row 2 narrow word 1023, as shown. As indicated by the ellipsis of FIG. 21, this continues for each of the following 1021 clock cycles until . . . .

At clock 1024, each of the 1024 narrow NPUs performs a $1023^{rd}$ iteration of the multiply-accumulate rotate instruction at address 2 of FIG. 20. Narrow NPU 0-A accumulates the accumulator 202A value 217A with the product of the rotated narrow data word 1811A received from the mux-reg 208B output 209B of narrow NPU 511-B (which was narrow data word 1 received from the data RAM 122) and weight RAM 124 row 1023 narrow word 0; NPU 0-B accumulates the accumulator 202B value 217B with the product of the rotated narrow data word 1811B received from the mux-reg 208A output 209A of NPU 0-A (which was narrow data word 2 received from the data RAM 122) and weight RAM 124 row 1023 narrow word 1; and so forth to NPU 511-B accumulates the accumulator 202B value with the product of the rotated narrow data word 1811B received from the mux-reg 208A output 209A of NPU 511-A (which was narrow data word 0 received from the data RAM 122) and weight RAM 124 row 1023 narrow word 1023, as shown.

At clock 1025, the AFU 212A/212B of each of the 1024 narrow NPUs performs the activation function instruction at address 3 of FIG. 20. Finally, at clock 1026, each of the 1024 narrow NPUs performs the write AFU output instruction at address 4 of FIG. 20 by writing back its narrow result 133A/133B to its corresponding narrow word of row 16 of the data RAM 122, i.e., the narrow result 133A of NPU 0-A is written to narrow word 0 of the data RAM 122, the narrow result 133B of NPU 0-B is written to narrow word 1 of the data RAM 122, and so forth to the narrow result 133 of NPU 511-B is written to narrow word 1023 of the data RAM 122. The operation described above with respect to FIG. 21 is also shown in block diagram form in FIG. 22.

Referring now to FIG. 22, a block diagram illustrating the NNU 121 of FIG. 1 including the NPUs 126 of FIG. 18 to execute the program of FIG. 20 is shown. The NNU 121 includes the 512 NPUs 126, i.e., 1024 narrow NPUs, the data RAM 122 that receives its address input 123, and the weight RAM 124 that receives its address input 125. Although not shown, on clock 0 the 1024 narrow NPUs perform the initialization instruction of FIG. 20. As shown, on clock 1, the 1024 8-bit data words of row 17 are read out of the data RAM 122 and provided to the 1024 narrow NPUs. On clocks 1 through 1024, the 1024 8-bit weight words of rows 0 through 1023, respectively, are read out of the weight RAM 124 and provided to the 1024 narrow NPUs. Although not shown, on clock 1, the 1024 narrow NPUs perform their respective multiply-accumulate operations on the loaded data words and weight words. On clocks 2 through 1024, the mux-regs 208A/208B of the 1024 narrow NPUs operate as a 1024 8-bit word rotater to rotate the previously loaded data words of row 17 of the data RAM 122 to the adjacent narrow NPU, and the narrow NPUs perform the multiply-accumulate operation on the respective rotated data narrow word and the respective narrow weight word loaded from the weight RAM 124. Although not shown, on clock 1025, the 1024 narrow AFUs 212A/212B perform the activation instruction. On clock 1026, the 1024 narrow NPUs write back their respective 1024 8-bit results 133A/133B to row 16 of the data RAM 122.

As may be observed, the embodiment of FIG. 18 may be advantageous over the embodiment of FIG. 2, for example, because it provides the flexibility for the programmer to perform computations using wide data and weight words (e.g., 16-bits) when that amount of precision is needed by the particular application being modeled and narrow data and weight words (e.g., 8-bits) when that amount of precision is needed by the application. From one perspective, the embodiment of FIG. 18 provides double the throughput over the embodiment of FIG. 2 for narrow data applications at the cost of the additional narrow elements (e.g., mux-reg 208B, reg 205B, narrow ALU 204B, narrow accumulator 202B, narrow AFU 212B), which is approximately a 50% increase in area of the NPU 126.

Tri-Mode NPUs

Figure 23:
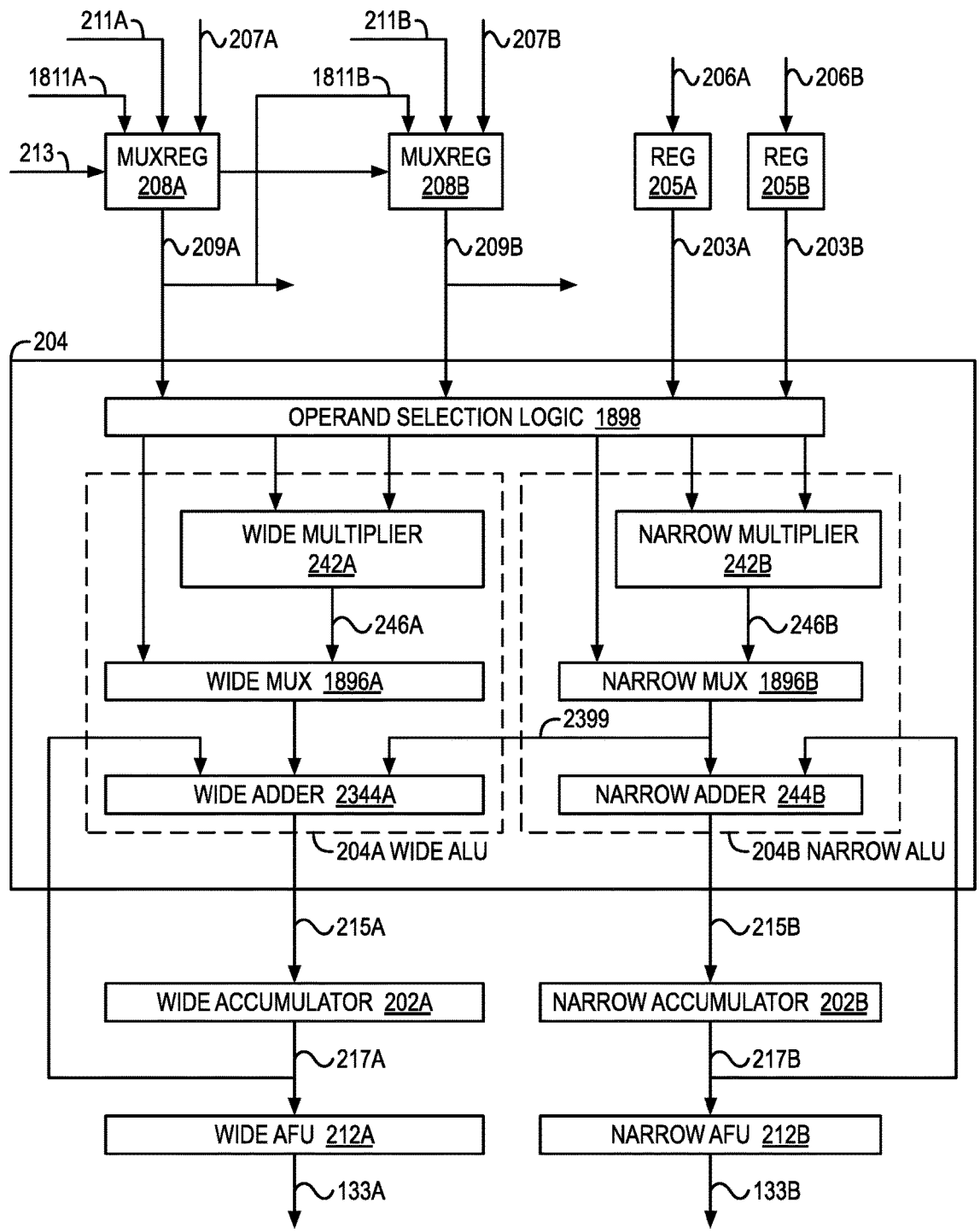
FIG. 23 is a block diagram illustrating a dynamically configurable NPU of FIG. 1 according to an alternate embodiment.

Referring now to FIG. 23, a block diagram illustrating a dynamically configurable NPU 126 of FIG. 1 according to an alternate embodiment is shown. The NPU 126 of FIG. 23 is configurable not only in wide and narrow configurations, but also in a third configuration referred to herein as a "funnel" configuration. The NPU 126 of FIG. 23 is similar in many respects to the NPU 126 of FIG. 18. However, the wide adder 244A of FIG. 18 is replaced in the NPU 126 of FIG. 23 with a 3-input wide adder 2344A that receives a third addend 2399 that is an extended version of the output of the narrow mux 1896B. A program for operating an NNU 121 having the NPUs 126 of FIG. 23 is similar in most respects to the program of FIG. 20. However, the initialize NPU instruction at address 0 initializes the NPUs 126 to a funnel configuration, rather than a narrow configuration. Additionally, the count of the multiply-accumulate rotate instruction at address 2 is 511 rather than 1023.

When in the funnel configuration, the NPU 126 operates similarly to when in the narrow configuration when executing a multiply-accumulate instruction such as at address 1 of FIG. 20 in that it receives two narrow data words 207A/207B and two narrow weight words 206A/206B; the wide multiplier 242A multiplies data word 209A and weight word 203A to generate product 246A which the wide mux 1896A selects; and the narrow multiplier 242B multiplies data word 209B and weight word 203B to generate product 246B which the narrow mux 1896B selects. However, the wide adder 2344A adds both the product 246A (selected by wide mux 1896A) and the product 246B/2399 (selected by wide mux 1896B) to the wide accumulator 202A value 217A, and narrow adder 244B and narrow accumulator 202B are inactive. Furthermore, when in the funnel configuration, when executing a multiply-accumulate rotate instruction such as at address 2 of FIG. 20, the control input 213 causes the mux-regs 208A/208B to rotate by two narrow words (e.g., 16-bits), i.e., the mux-regs 208A/208B select their respective 211A/211B inputs as if they were in a wide configuration. However, the wide multiplier 242A multiplies data word 209A and weight word 203A to generate product 246A which the wide mux 1896A selects; and the narrow multiplier 242B multiplies data word 209B and weight word 203B to generate product 246B which the narrow mux 1896B selects; and the wide adder 2344A adds both the product 246A (selected by wide mux 1896A) and the product 246B/2399 (selected by wide mux 1896B) to the wide accumulator 202A value 217A, and the narrow adder 244B and narrow accumulator 202B are inactive as described above. Finally, when in the funnel configuration, when executing an activation function instruction such as at address 3 of FIG. 20, the wide AFU 212A performs the activation function on the resulting sum 215A to generate a narrow result 133A and the narrow AFU 212B is inactive. Hence, only the A narrow NPUs generate a narrow result 133A, and the narrow results 133B generated by the B narrow NPUs are invalid. Consequently, the row of results written back (e.g., to row 16 as at the instruction at address 4 of FIG. 20) includes holes since only the narrow results 133A are valid and the narrow results 133B are invalid. Thus, conceptually, each clock cycle each neuron (NPU 126 of FIG. 23) processes two connection data inputs, i.e., multiplies two narrow data words by their respective weights and accumulates the two products, in contrast to the embodiments of FIGS. 2 and 18 which each process a single connection data input per clock cycle.

As may be observed with respect to the embodiment of FIG. 23, the number of result words (neuron outputs) produced and written back to the data RAM 122 or weight RAM 124 is half the square root of the number of data inputs (connections) received and the written back row of results has holes, i.e., every other narrow word result is invalid, more specifically, the B narrow NPU results are not meaningful. Thus, the embodiment of FIG. 23 may be particularly efficient in neural networks having two successive layers in which, for example, the first layer has twice as many neurons as the second layer (e.g., the first layer has 1024 neurons fully connected to a second layer of 512 neurons). Furthermore, the other execution units 112 (e.g., media units, such as x86 AVX units) may perform pack operations on a disperse row of results (i.e., having holes) to make compact it (i.e., without holes), if necessary, for use in subsequent computations while the NNU 121 is performing other computations associated with other rows of the data RAM 122 and/or weight RAM 124.

Hybrid NNU Operation; Convolution and Pooling Capabilities

Figure 24:
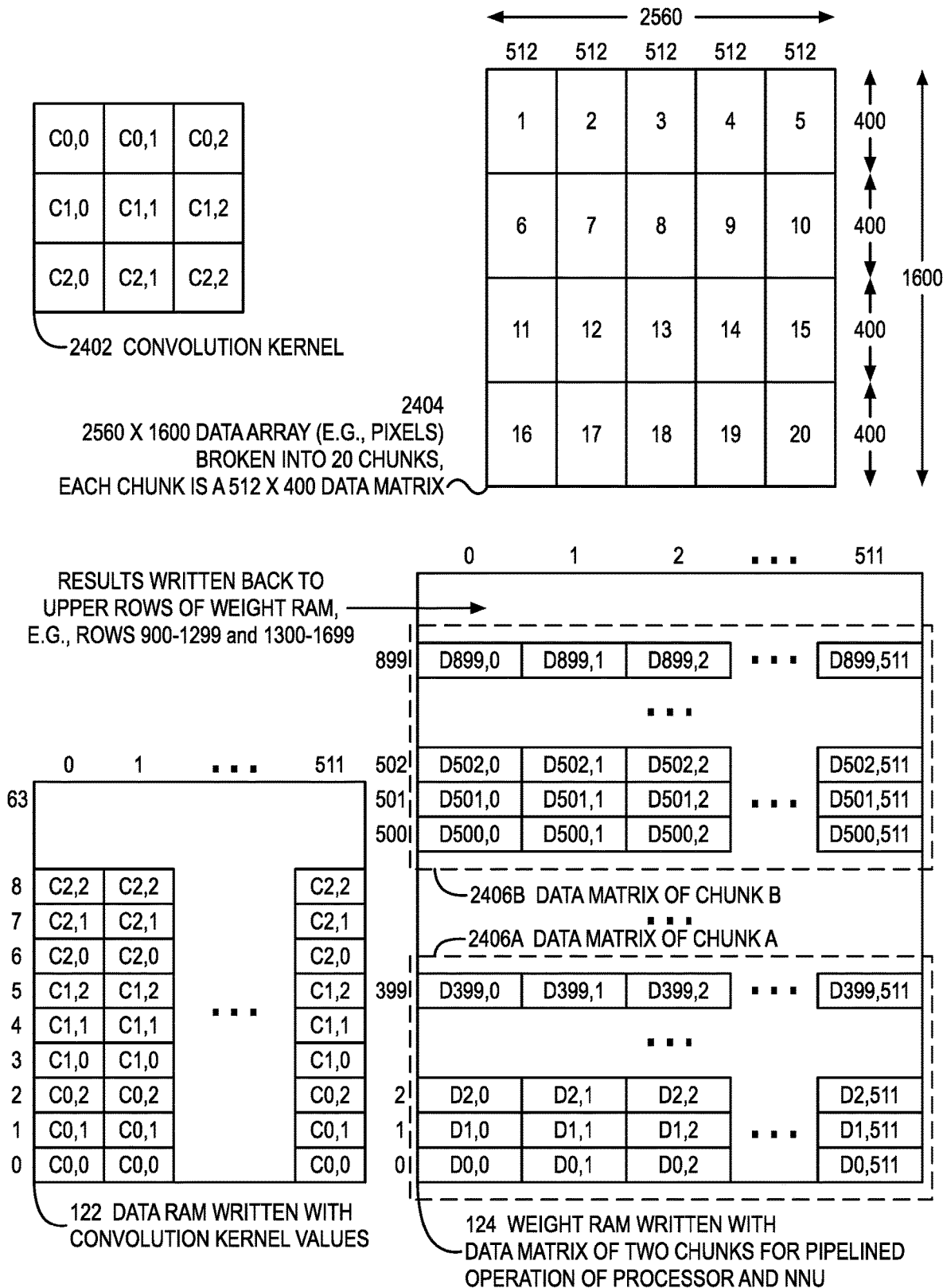
FIG. 24 is a block diagram illustrating an example of data structures used by the NNU of FIG. 1 to perform a convolution operation.
Figure 25:
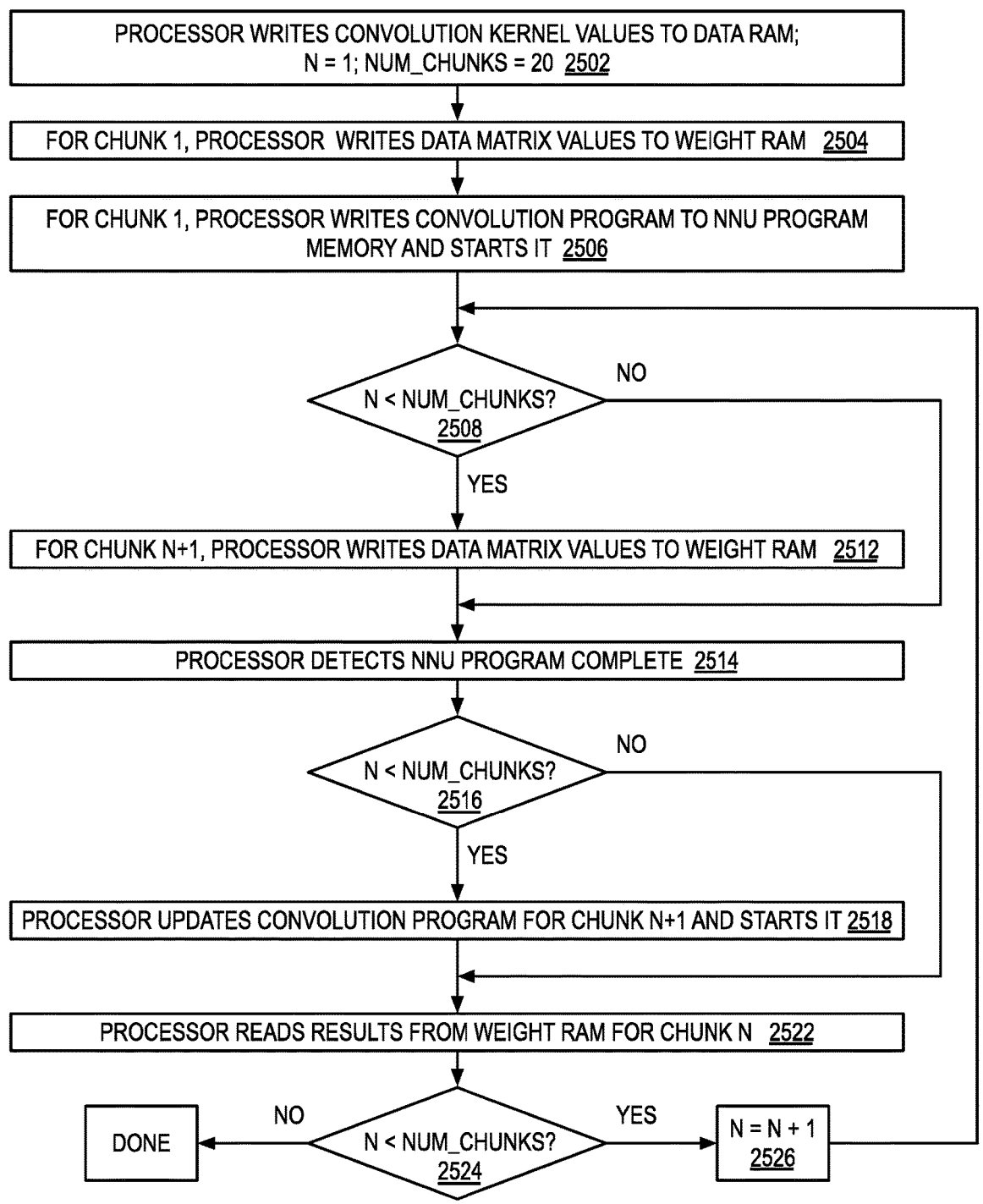
FIG. 25 is a flowchart illustrating operation of the processor of FIG. 1 to perform an architectural program that uses the NNU to perform a convolution of the convolution kernel with the data array of FIG. 24.

An advantage of the NNU 121 according to embodiments described herein is that the NNU 121 is capable of concurrently operating in a fashion that resembles a coprocessor in that it executes its own internal program and operating in a fashion that resembles an execution unit of a processor in that it executes architectural instructions (or microinstructions translated therefrom) issued to it. The architectural instructions are of an architectural program being performed by the processor that includes the NNU 121. In this manner, the NNU 121 operates in a hybrid fashion, which is advantageous because it provides the ability to sustain high utilization of the NNU 121. For example, the FIGS. 24 through 26 illustrate the operation of the NNU 121 to perform a convolution operation in which the NNU 121 is highly utilized, and FIGS. 27 through 28 illustrate the operation of the NNU 121 to perform a pooling operation, which are required for convolution layers and pooling layers and other digital data computing applications, such as image processing (e.g., edge detection, sharpening, blurring, recognition/classification). However, the hybrid operation of the NNU 121 is not limited to performing a convolution or pooling operation, rather the hybrid feature may be used to perform other operations, such as classic neural network multiply-accumulate and activation function operations as described above with respect to FIGS. 4 through 13. That is, the processor 100 (more specifically, the reservation stations 108) issue MTNN 1400 and MFNN 1500 instructions to the NNU 121 in response to which the NNU 121 writes data to the memories 122/124/129 and reads results from the memories 122/124 written there by the NNU 121, while concurrently the NNU 121 reads and writes the memories 122/124/129 in response to executing programs written to the program memory 129 by the processor 100 (via MTNN 1400 instructions).

Referring now to FIG. 24, a block diagram illustrating an example of data structures used by the NNU 121 of FIG. 1 to perform a convolution operation are shown. The block diagram includes a convolution kernel 2402, a data array 2404, and the data RAM 122 and weight RAM 124 of FIG. 1. Preferably, the data array 2404 (e.g., of image pixels) is held in system memory (not shown) attached to the processor 100 and loaded into the weight RAM 124 of the NNU 121 by the processor 100 executing MTNN instructions 1400. A convolution operation is an operation that convolves a first matrix with a second matrix, the second matrix referred to as a convolution kernel herein. As understood in the context of the present disclosure, a convolution kernel is a matrix of coefficients, which may also be referred to as weights, parameters, elements or values. Preferably, the convolution kernel 2042 is static data of the architectural program being executed by the processor 100.

The data array 2404 is a two-dimensional array of data values, and each data value (e.g., an image pixel value) is the size of a word of the data RAM 122 or weight RAM 124 (e.g., 16 bits or 8 bits). In the example, the data values are 16-bit words and the NNU 121 is configured as 512 wide configuration NPUs 126. Additionally, in the embodiment, the NPUs 126 include mux-regs for receiving the weight words 206 from the weight RAM 124, such as mux-reg 705 of FIG. 7, in order to perform the collective rotater operation of a row of data values received from the weight RAM 124, as described in more detail below. In the example, the data array 2404 is a 2560 column×1600 row pixel array. When the architectural program convolves the data array 2404 with the convolution kernel 2402, it breaks the data array 2404 into 20 chunks, each chunk being a 512×400 data matrix 2406, as shown.

The convolution kernel 2402, in the example, is a 3×3 matrix of coefficients, or weights, or parameters, or elements. The first row of coefficients are denoted C0,0; C0,1; and C0,2; the second row of coefficients are denoted C1,0; C1,1; and C1,2; and the third row of coefficients are denoted C2,0; C2,1; and C2,2. For example, a convolution kernel that may be used for performing edge detection has the following coefficients: 0, 1, 0, 1, −4, 1, 0, 1, 0. For another example, a convolution kernel that may be used to Gaussian blur an image has the following coefficients: 1, 2, 1, 2, 4, 2, 1, 2, 1. In this case, a divide is typically performed on the final accumulated value, where the divisor is the sum of the absolute values of the elements of the convolution kernel 2402, which is 16 in this example. For another example, the divisor is the number of elements of the convolution kernel 2402. For another example, the divisor is a value that compresses the convolutions back within a desired range of values, and the divisor is determined from the values of the elements of the convolution kernel 2402 and the desired range and the range of the input values of the matrix being convolved.

As shown in FIG. 24 and described in more detail with respect to FIG. 25, the architectural program writes the data RAM 122 with the coefficients of the convolution kernel 2402. Preferably, all the words of each of nine (the number of elements in the convolution kernel 2402) consecutive rows of the data RAM 122 are written with a different element of the convolution kernel 2402 in row-major order. That is, each word of one row is written with the first coefficient C0,0; the next row is written with the second coefficient C0,1; the next row is written with the third coefficient C0,2; the next row is written with the fourth coefficient C1,0; and so forth until each word of the ninth row is written with the ninth coefficient C2,2, as shown. To convolve a data matrix 2406 of a chunk of the data array 2404, the NPUs 126 repeatedly read, in order, the nine rows of the data RAM 122 that hold the convolution kernel 2402 coefficients, as described in more detail below, particularly with respect to FIG. 26A.

As shown in FIG. 24 and described in more detail with respect to FIG. 25, the architectural program writes the weight RAM 124 with the values of a data matrix 2406. As the NNU program performs the convolution, it writes back the resulting matrix to the weight RAM 124. Preferably, the architectural program writes a first data matrix 2406 to the weight RAM 124 and starts the NNU 121, and while the NNU 121 is convolving the first data matrix 2406 with the convolution kernel 2042, the architectural program writes a second data matrix 2406 to the weight RAM 124 so that as soon as the NNU 121 completes the convolution of the first data matrix 2406, the NNU 121 can start convolving the second data matrix 2406, as described in more detail with respect to FIG. 25. In this manner, the architectural program ping-pongs back and forth between the two regions of the weight RAM 124 in order to keep the NNU 121 fully utilized. Thus, the example of FIG. 24 shows a first data matrix 2406A corresponding to a first chunk occupying rows 0 through 399 of the weight RAM 124, and a second data matrix 2406B corresponding to a second chunk occupying rows 500 through 899 of the weight RAM 124. Furthermore, as shown, the NNU 121 writes back the results of the convolutions to rows 900-1299 and 1300-1699 of the weight RAM 124, which the architectural program subsequently reads out of the weight RAM 124. The data values of the data matrix 2406 held in the weight RAM 124 are denoted "Dx,y" where "x" is the weight RAM 124 row number and "y" is the word, or column, number of the weight RAM 124. Thus, for example, data word 511 in row 399 is denoted D399, 511 in FIG. 24, which is received by the mux-reg 705 of NPU 511.

Referring now to FIG. 25, a flowchart illustrating operation of the processor 100 of FIG. 1 to perform an architectural program that uses the NNU 121 to perform a convolution of the convolution kernel 2402 with the data array 2404 of FIG. 24. Flow begins at block 2502.

At block 2502, the processor 100, i.e., the architectural program running on the processor 100, writes the convolution kernel 2042 of FIG. 24 to the data RAM 122 in the manner shown and described with respect to FIG. 24. Additionally, the architectural program initializes a variable N to a value of 1. The variable N denotes the current chunk of the data array 2404 being processed by the NNU 121. Additionally, the architectural program initializes a variable NUM_CHUNKS to a value of 20. Flow proceeds to block 2504.

At block 2504, the processor 100 writes the data matrix 2406 for chunk 1 to the weight RAM 124, as shown in FIG. 24 (e.g., data matrix 2406A of chunk 1). Flow proceeds to block 2506.

At block 2506, the processor 100 writes a convolution program to the NNU 121 program memory 129, using MTNN 1400 instructions that specify a function 1432 to write the program memory 129. The processor 100 then starts the NNU convolution program using a MTNN 1400 instruction that specifies a function 1432 to start execution of the program. An example of the NNU convolution program is described in more detail with respect to FIG. 26A. Flow proceeds to decision block 2508.

At decision block 2508, the architectural program determines whether the value of variable N is less than NUM_CHUNKS. If so, flow proceeds to block 2512; otherwise, flow proceeds to block 2514.

At block 2512, the processor 100 writes the data matrix 2406 for chunk N+1 to the weight RAM 124, as shown in FIG. 24 (e.g., data matrix 2406B of chunk 2). Thus, advantageously, the architectural program writes the data matrix 2406 for the next chunk to the weight RAM 124 while the NNU 121 is performing the convolution on the current chunk so that the NNU 121 can immediately start performing the convolution on the next chunk once the convolution of the current chunk is complete, i.e., written to the weight RAM 124. Flow proceeds to block 2514.

At block 2514, the processor 100 determines that the currently running NNU program (started at block 2506 in the case of chunk 1, and started at block 2518 in the case of chunks 2-20) has completed. Preferably, the processor 100 determines this by executing a MFNN 1500 instruction to read the NNU 121 status register 127. In an alternate embodiment, the NNU 121 generates an interrupt to indicate it has completed the convolution program. Flow proceeds to decision block 2516.

At decision block 2516, the architectural program determines whether the value of variable N is less than NUM_CHUNKS. If so, flow proceeds to block 2518; otherwise, flow proceeds to block 2522.

At block 2518, the processor 100 updates the convolution program so that it can convolve chunk N+1. More specifically, the processor 100 updates the weight RAM 124 row value of the initialize NPU instruction at address 0 to the first row of the data matrix 2406 (e.g., to row 0 for data matrix 2406A or to row 500 for data matrix 2406B) and updates the output row (e.g., to 900 or 1300). The processor 100 then starts the updated NNU convolution program. Flow proceeds to block 2522.

At block 2522, the processor 100 reads the results of the NNU convolution program from the weight RAM 124 for chunk N. Flow proceeds to decision block 2524.

At decision block 2524, the architectural program determines whether the value of variable N is less than NUM_CHUNKS. If so, flow proceeds to block 2526; otherwise, flow ends.

At block 2526, the architectural program increments N by one. Flow returns to decision block 2508.

Referring now to FIG. 26A, a program listing of an NNU program that performs a convolution of a data matrix 2406 with the convolution kernel 2042 of FIG. 24 and writes it back to the weight RAM 124 is shown. The program loops a number of times through a loop body of instructions at addresses 1 through 9. An initialize NPU instruction at address 0 specifies the number of times each NPU 126 executes the loop body, which in the example of FIG. 26A has a loop count value of 400, corresponding to the number of rows in a data matrix 2406 of FIG. 24, and a loop instruction at the end of the loop (at address 10) decrements the current loop count value and if the result is non-zero causes control to return to the top of the loop body (i.e., to the instruction at address 1). The initialize NPU instruction also clears the accumulator 202 to zero. Preferably, the loop instruction at address 10 also clears the accumulator 202 to zero. Alternatively, as described above, the multiply-accumulate instruction at address 1 may specify to clear the accumulator 202 to zero.

For each execution of the loop body of the program, the 512 NPUs 126 concurrently perform 512 convolutions of the 3×3 convolution kernel 2402 and 512 respective 3×3 sub-matrices of a data matrix 2406. The convolution is the sum of the nine products of an element of the convolution kernel 2402 and its corresponding element of the respective sub-matrix. In the embodiment of FIG. 26A, the origin (center element) of each of the 512 respective 3×3 sub-matrices is the data word Dx+1,y+1 of FIG. 24, where y (column number) is the NPU 126 number, and x (row number) is the current weight RAM 124 row number that is read by the multiply-accumulate instruction at address 1 of the program of FIG. 26A (also, the row number is initialized by the initialize NPU instruction at address 0, incremented at each of the multiply-accumulate instructions at addresses 3 and 5, and updated by the decrement instruction at address 9). Thus, for each loop of the program, the 512 NPUs 126 compute the 512 convolutions and write the 512 convolution results back to a specified row of the weight RAM 124. In the present description, edge handling is ignored for simplicity, although it should be noted that the use of the collective rotating feature of the NPUs 126 will cause wrapping for two of the columns from one vertical edge of the data matrix 2406 (e.g., of the image in the case of image processing) to the other vertical edge (e.g., from the left edge to the right edge or vice versa). The loop body will now be described.

At address 1 is a multiply-accumulate instruction that specifies row 0 of the data RAM 122 and implicitly uses the current weight RAM 124 row, which is preferably held in the sequencer 128 (and which is initialized to zero by the instruction at address 0 for the first pass through the loop body). That is, the instruction at address 1 causes each of the NPUs 126 to read its corresponding word from row 0 of the data RAM 122 and read its corresponding word from the current weight RAM 124 row and perform a multiply-accumulate operation on the two words. Thus, for example, NPU 5 multiplies C0,0 and Dx,5 (where "x" is the current weight RAM 124 row), adds the result to the accumulator 202 value 217 and writes the sum back to the accumulator 202.

At address 2 is a multiply-accumulate instruction that specifies to increment the data RAM 122 row (i.e., to row 1) and then read the row from the data RAM 122 at the incremented address. The instruction also specifies to rotate the values in the mux-reg 705 of each NPU 126 to the adjacent NPU 126, which in this case is the row of data matrix 2406 values just read from the weight RAM 124 in response to the instruction at address 1. In the embodiment of FIGS. 24 through 26, the NPUs 126 are configured to rotate the values of the mux-regs 705 to the left, i.e., from NPU J to NPU J−1, rather than from NPU J to NPU J+1 as described above with respect to FIGS. 3, 7 and 19. It should be understood that in an embodiment in which the NPUs 126 are configured to rotate right, the architectural program may write the convolution kernel 2402 coefficient values to the data RAM 122 in a different order (e.g., rotated around its central column) in order to accomplish a similar convolution result. Furthermore, the architectural program may perform additional pre-processing (e.g., transposition) of the convolution kernel 2402 as needed. Additionally, the instruction specifies a count value of 2. Thus, the instruction at address 2 causes each of the NPUs 126 to read its corresponding word from row 1 of the data RAM 122 and receive the rotated word into the mux-reg 705 and perform a multiply-accumulate operation on the two words. Due to the count value of 2, the instruction also causes each of the NPUs 126 to repeat the operation just described. That is, the sequencer 128 increments the data RAM 122 row address 123 (i.e., to row 2) and each NPU 126 reads its corresponding word from row 2 of the data RAM 122 and receives the rotated word into the mux-reg 705 and performs a multiply-accumulate operation on the two words. Thus, for example, assuming the current weight RAM 124 row is 27, after executing the instruction at address 2, NPU 5 will have accumulated into its accumulator 202 the product of C0,1 and D27,6 and the product of C0,2 and D27,7. Thus, after the completion of the instructions at addresses 1 and 2, the product of C0,0 and D27,5, the product of C0,1 and D27,6, and the product of C0,2 and D27,7 will have been accumulated into the accumulator 202, along with all the other accumulated values from previous passes through the loop body.

The instructions at addresses 3 and 4 perform a similar operation as the instructions at addresses 1 and 2, however for the next row of the weight RAM 124, by virtue of the weight RAM 124 row increment indicator, and for the next three rows of the data RAM 122, i.e., rows 3 through 5. That is, with respect to NPU 5, for example, after the completion of the instructions at addresses 1 through 4, the product of C0,0 and D27,5, the product of C0,1 and D27,6, the product of C0,2 and D27,7, the product of C1,0 and D28,5, the product of C1,1 and D28,6, and the product of C1,2 and D28,7 will have been accumulated into the accumulator 202, along with all the other accumulated values from previous passes through the loop body.

The instructions at addresses 5 and 6 perform a similar operation as the instructions at addresses 3 and 4, however for the next row of the weight RAM 124, and for the next three rows of the data RAM 122, i.e., rows 6 through 8. That is, with respect to NPU 5, for example, after the completion of the instructions at addresses 1 through 6, the product of C0,0 and D27,5, the product of C0,1 and D27,6, the product of C0,2 and D27,7, the product of C1,0 and D28,5, the product of C1,1 and D28,6, the product of C1,2 and D28,7, the product of C2,0 and D29,5, the product of C2,1 and D29,6, and the product of C2,2 and D29,7 will have been accumulated into the accumulator 202, along with all the other accumulated values from previous passes through the loop body. That is, after the completion of the instructions at addresses 1 through 6, and assuming the weight RAM 124 row at the beginning of the loop body was 27, NPU 5, for example, will have used the convolution kernel 2402 to convolve the following 3×3 sub-matrix:

$D27,5 \quad D27,6 \quad D27,7$
$D28,5 \quad D28,6 \quad D28,7$
$D29,5 \quad D29,6 \quad D29,7$ More generally, after the completion of the instructions at addresses 1 through 6, each of the 512 NPUs 126 will have used the convolution kernel 2402 to convolve the following 3×3 sub-matrix:

$$\begin{array}{ccc} D_{r,n} & D_{r,n+1} & D_{r,n+2} \\ D_{r+1,n} & D_{r+1,n+1} & D_{r+1,n+2} \\ D_{r+2,n} & D_{r+2,n+1} & D_{r+2,n+2} \end{array}$$

where r is the weight RAM 124 row address value at the beginning of the loop body, and n is the NPU 126 number.

The instruction at address 7 passes through the accumulator 202 value 217 through the AFU 212. The pass through function passes through a word that is the size (in bits) of the words read from the data RAM 122 and weight RAM 124 (i.e., in the example, 16 bits). Preferably, the user may specify the format of the output, e.g., how many of the output bits are fractional bits, as described in more detail below. Alternatively, rather than specifying a pass through activation function, a divide activation function is specified that divides the accumulator 202 value 217 by a divisor, such as described herein, e.g., with respect to FIGS. 29A and 30, e.g., using one of the "dividers" 3014/3016 of FIG. 30. For example, in the case of a convolution kernel 2402 with a coefficient, such as the one-sixteenth coefficient of the Gaussian blur kernel described above, rather than a pass through function, the activation function instruction at address 7 may specify a divide (e.g., by 16) activation function. Alternatively, the architectural program may perform the divide by 16 on the convolution kernel 2402 coefficients before writing them to the data RAM 122 and adjust the location of the binary point accordingly for the convolution kernel 2402 values, e.g., using the data binary point 2922 of FIG. 29, described below.

The instruction at address 8 writes the output of the AFU 212 to the row of the weight RAM 124 specified by the current value of the output row register, which was initialized by the instruction at address 0 and which is incremented each pass through the loop by virtue of the increment indicator in the instruction.

As may be determined from the example of FIGS. 24 through 26 having a 3×3 convolution kernel 2402, the NPUs 126 read the weight RAM 124 approximately every third clock cycle to read a row of the data matrix 2406 and write the weight RAM 124 approximately every 12 clock cycles to write the convolution result matrix. Additionally, assuming an embodiment that includes a write and read buffer such as the buffer 1704 of FIG. 17, concurrently with the NPU 126 reads and writes, the processor 100 reads and writes the weight RAM 124 such that the buffer 1704 performs one write and one read of the weight RAM 124 approximately every 16 clock cycles to write the data matrices 2406 and to read the convolution result matrices, respectively. Thus, approximately half the bandwidth of the weight RAM 124 is consumed by the hybrid manner in which the NNU 121 performs the convolution operation. Although the example includes a 3×3 convolution kernel 2402, other size convolution kernels may be employed, such as 2×2, 4×4, 5×5, 6×6, 7×7, 8×8, etc. matrices, in which case the NNU program will vary. In the case of a larger convolution kernel, a smaller percentage of the weight RAM 124 bandwidth is consumed since the NPUs 126 read the weight RAM 124 a smaller percentage of the time because the count in the rotating versions of the multiply-accumulate instructions is larger (e.g., at addresses 2, 4 and 6 of the program of FIG. 26A and additional such instructions that would be needed for a larger convolution kernel).

Alternatively, rather than writing back the results of the convolutions to different rows of the weight RAM 124 (e.g., 900-1299 and 1300-1699), the architectural program configures the NNU program to overwrite rows of the input data matrix 2406 after the rows are no longer needed. For example, in the case of a 3×3 convolution kernel, rather than writing the data matrix 2406 into rows 0-399 of the weight RAM 124, the architectural program writes the data matrix 2406 into rows 2-401, and the NNU program is configured to write the convolution results to the weight RAM 124 beginning at row 0 and incrementing each pass through the loop body. In this fashion, the NNU program is overwriting only rows that are no longer needed. For example, after the first pass through the loop body (or more specifically after the execution of the instruction at address 1 which loads in row 0 of the weight RAM 124), the data in row 0 can now be overwritten, although the data in rows 1-3 will be needed in the second pass through the loop body and are therefore not overwritten by the first pass through the loop body; similarly, after the second pass through the loop body, the data in row 1 can now be overwritten, although the data in rows 2-4 will be needed in the second pass through the loop body and are therefore not overwritten by the second pass through the loop body; and so forth. In such an embodiment, the height of each data matrix 2406 (chunk) may be larger (e.g., 800 rows), resulting in fewer chunks.

Alternatively, rather than writing back the results of the convolutions to the weight RAM 124, the architectural program configures the NNU program to write back the results of the convolutions to rows of the data RAM 122 above the convolution kernel 2402 (e.g., above row 8), and the architectural program reads the results from the data RAM 122 as the NNU 121 writes them (e.g., using the address of the most recently written data RAM 122 row 2606 of FIG. 26B, described below). This alternative may be advantageous in an embodiment in which the weight RAM 124 is single-ported and the data RAM 122 is dual-ported.

As may be observed from the operation of the NNU 121 according to the embodiment of FIGS. 24 through 26A, each execution of the program of FIG. 26A takes approximately 5000 clock cycles and, consequently, the convolving of the entire 2560×1600 data array 2404 of FIG. 24 takes approximately 100,000 clock cycles, which may be considerably less than the number of clock cycles required to perform a similar task by conventional methods.

Referring now to FIG. 26B, a block diagram illustrating certain fields of the control register 127 of the NNU 121 of FIG. 1 according to one embodiment is shown. The status register 127 includes a field 2602 that indicates the address of the most recent row of the weight RAM 124 written by the NPUs 126; a field 2606 that indicates the address of the most recent row of the data RAM 122 written by the NPUs 126; a field 2604 that indicates the addresses of the most recent row of the weight RAM 124 read by the NPUs 126; and a field 2608 that indicates the addresses of the most recent row of the data RAM 122 read by the NPUs 126. This enables the architectural program executing on the processor 100 to determine the progress of the NNU 121 as it marches through reading and/or writing the data RAM 122 and/or weight RAM 124. Employing this capability, along with the choice to overwrite the input data matrix as described above (or to write the results to the data RAM 122, as mentioned above), the data array 2404 of FIG. 24 may be processed as 5 chunks of 512×1600 rather than 20 chunks of 512×400, for example, as follows. The processor 100 writes a first 512× 1600 chunk into the weight RAM 124 starting at row 2 and starts the NNU program (which has a loop count of 1600 and an initialized weight RAM 124 output row of 0). As the NNU 121 executes the NNU program, the processor 100 monitors the location/address of the weight RAM 124 output in order to (1) read (using MFNN 1500 instructions) the rows of the weight RAM 124 that have valid convolution results written by the NNU 121 (beginning at row 0), and (2) to write the second 512×1600 data matrix 2406 (beginning at row 2) over the valid convolution results once they have already been read, so that when the NNU 121 completes the NNU program on the first 512×1600 chunk, the processor 100 can immediately update the NNU program as needed and start it again to process the second 512×1600 chunk. This process is repeated three more times for the remaining three 512×1600 chunks to accomplish high utilization of the NNU 121.

Advantageously, in one embodiment, the AFU 212 includes the ability to efficiently perform an effective division of the accumulator 202 value 217, as described in more detail below, particularly with respect to FIGS. 29A and 29B and 30. For example, an activation function NNU instruction that divides the accumulator 202 value 217 by 16 may be used for the Gaussian blurring matrix described above.

Although the convolution kernel 2402 used in the example of FIG. 24 is a small static convolution kernel applied to the entire data array 2404, in other embodiments the convolution kernel may be a large matrix that has unique weights associated with the different data values of the data array 2404, such as is commonly found in convolutional neural networks. When the NNU 121 is used in such a manner, the architectural program may swap the locations of the data matrix and the convolution kernel, i.e., place the data matrix in the data RAM 122 and the convolution kernel in the weight RAM 124, and the number of rows that may be processed by a given execution of the NNU program may be relatively smaller.

Referring now to FIG. 27, a block diagram illustrating an example of the weight RAM 124 of FIG. 1 populated with input data upon which a pooling operation is performed by the NNU 121 of FIG. 1. A pooling operation, performed by a pooling layer of an artificial neural network, reduces the dimensions of a matrix of input data (e.g., an image or convolved image) by taking sub-regions, or sub-matrices, of the input matrix and computing either the maximum or average value of the sub-matrices, and the maximum or average values become a resulting matrix, or pooled matrix. In the example of FIGS. 27 and 28, the pooling operation computes the maximum value of each sub-matrix. Pooling operations are particularly useful in artificial neural networks that perform object classification or detection, for example. Generally, a pooling operation effectively reduces the size of its input matrix by a factor of the number of elements in the sub-matrix examined, and in particular, reduces the input matrix in each dimension by the number of elements in the corresponding dimension of the sub-matrix. In the example of FIG. 27, the input data is a 512×1600 matrix of wide words (e.g., 16 bits) stored in rows 0 through 1599 of the weight RAM 124. In FIG. 27, the words are denoted by their row, column location, e.g., the word in row 0 and column 0 is denoted D0,0; the word in row 0 and column 1 is denoted D0,1; the word in row 0 and column 2 is denoted D0,2; and so forth to the word in row 0 and column 511 is denoted D0,511. Similarly, the word in row 1 and column 0 is denoted D1,0; the word in row 1 and column 1 is denoted D1,1; the word in row 1 and column 2 is denoted D1,2; and so forth to the word in row 1 and column 511 is denoted D1,511; and so forth to the word in row 1599 and column 0 is denoted D1599,0; the word in row 1599 and column 1 is denoted D1599,1; the word in row 1599 and column 2 is denoted D1599,2; and so forth to the word in row 1599 and column 511 is denoted D1599,511.

Referring now to FIG. 28, a program listing of an NNU program that performs a pooling operation of the input data matrix of FIG. 27 and writes it back to the weight RAM 124 is shown. In the example of FIG. 28, the pooling operation computes the maximum value of respective 4×4 sub-matrices of the input data matrix. The program loops a number of times through a loop body of instructions at addresses 1 through 10. An initialize NPU instruction at address 0 specifies the number of times each NPU 126 executes the loop body, which in the example of FIG. 28 has a loop count value of 400, and a loop instruction at the end of the loop (at address 11) decrements the current loop count value and if the result is non-zero causes control to return to the top of the loop body (i.e., to the instruction at address 1). The input data matrix in the weight RAM 124 is effectively treated by the NNU program as 400 mutually exclusive groups of four adjacent rows, namely rows 0-3, rows 4-7, rows 8-11 and so forth to rows 1596-1599. Each group of four adjacent rows includes 128 4×4 sub-matrices, namely the 4×4 sub-matrices of elements formed by the intersection of the four rows of a group and four adjacent columns, namely columns 0-3, 4-7, 8-11 and so forth to columns 508-511. Of the 512 NPUs 126, every fourth NPU 126 of the 512 NPUs 126 (i.e., 128) performs a pooling operation on a respective 4×4 sub-matrix, and the other three-fourths of the NPUs 126 are unused. More specifically, NPUs 0, 4, 8, and so forth to NPU 508 each perform a pooling operation on their respective 4×4 sub-matrix whose left-most column number corresponds to the NPU number and whose lower row corresponds to the current weight RAM 124 row value, which is initialized to zero by the initialize instruction at address 0 and is incremented by four upon each iteration of the loop body, as described in more detail below. The 400 iterations of the loop body correspond to the number of groups of 4×4 sub-matrices of the input data matrix of FIG. 27 (the 1600 rows of the input data matrix divided by 4). The initialize NPU instruction also clears the accumulator 202 to zero. Preferably, the loop instruction at address 11 also clears the accumulator 202 to zero. Alternatively, the maxwacc instruction at address 1 specifies to clear the accumulator 202 to zero.

For each iteration of the loop body of the program, the 128 used NPUs 126 concurrently perform 128 pooling operations of the 128 respective 4×4 sub-matrices of the current 4-row group of the input data matrix. More specifically, the pooling operation determines the maximum-valued element of the sixteen elements of the 4×4 sub-matrix. In the embodiment of FIG. 28, for each NPU y of the used 128 NPUs 126, the lower left element of the 4×4 sub-matrix is element Dx,y of FIG. 27, where x is the current weight RAM 124 row number at the beginning of the loop body, which is read by the maxwacc instruction at address 1 of the program of FIG. 28 (also, the row number is initialized by the initialize NPU instruction at address 0, and incremented at each of the maxwacc instructions at addresses 3, 5 and 7). Thus, for each loop of the program, the used 128 NPUs 126 write back to a specified row of the weight RAM 124 the corresponding maximum-valued element of the respective 128 4×4 sub-matrices of the current group of rows. The loop body will now be described.

At address 1 is a maxwacc instruction that implicitly uses the current weight RAM 124 row, which is preferably held in the sequencer 128 (and which is initialized to zero by the instruction at address 0 for the first pass through the loop body). The instruction at address 1 causes each of the NPUs 126 to read its corresponding word from the current row of the weight RAM 124, compare the word to the accumulator 202 value 217, and store in the accumulator 202 the maximum of the two values. Thus, for example, NPU 8 determines the maximum value of the accumulator 202 value 217 and data word Dx,8 (where "x" is the current weight RAM 124 row) and writes the maximum value back to the accumulator 202.

At address 2 is a maxwacc instruction that specifies to rotate the values in the mux-reg 705 of each NPU 126 to the adjacent NPU 126, which in this case is the row of input data matrix values just read from the weight RAM 124 in response to the instruction at address 1. In the embodiment of FIGS. 27 through 28, the NPUs 126 are configured to rotate the values of the mux-regs 705 to the left, i.e., from NPU J to NPU J−1, as described above with respect to FIGS. 24 through 26. Additionally, the instruction specifies a count value of 3. Thus, the instruction at address 2 causes each of the NPUs 126 to receive the rotated word into the mux-reg 705 and determine the maximum value of the rotated word and the accumulator 202 value 217, and then to repeat this operation two more times. That is, each NPU 126 receives the rotated word into the mux-reg 705 and determines the maximum value of the rotated word and the accumulator 202 value 217 three times. Thus, for example, assuming the current weight RAM 124 row at the beginning of the loop body is 36, after executing the instruction at addresses 1 and 2, NPU 8, for example, will have stored in its accumulator 202 the maximum value of the accumulator 202 at the beginning of the loop body and the four weight RAM 124 words D36,8 and D36,9 and D36,10 and D36,11.

The maxwacc instructions at addresses 3 and 4 perform a similar operation as the instructions at addresses 1 and 2, however for the next row of the weight RAM 124, by virtue of the weight RAM 124 row increment indicator. That is, assuming the current weight RAM 124 row at the beginning of the loop body is 36, after the completion of the instructions at addresses 1 through 4, NPU 8, for example, will have stored in its accumulator 202 the maximum value of the accumulator 202 at the beginning of the loop body and the eight weight RAM 124 words D36,8 and D36,9 and D36,10 and D36,11 and D37,8 and D37,9 and D37,10 and D37,11.

The maxwacc instructions at addresses 5 through 8 perform a similar operation as the instructions at addresses 3 and 4, however for the next two rows of the weight RAM 124. That is, assuming the current weight RAM 124 row at the beginning of the loop body is 36, after the completion of the instructions at addresses 1 through 8, NPU 8, for example, will have stored in its accumulator 202 the maximum value of the accumulator 202 at the beginning of the loop body and the sixteen weight RAM 124 words D36,8 and D36,9 and D36,10 and D36,11 and D37,8 and D37,9 and D37,10 and D37,11 and D38,8 and D38,9 and D38,10 and D38,11 and D39,8 and D39,9 and D39,10 and D39,11. That is, after the completion of the instructions at addresses 1 through 8, and assuming the weight RAM 124 row at the beginning of the loop body was 36, NPU 8, for example, will have determined the maximum value of the following 4×4 sub-matrix:

$$D36,8 \quad D36,9 \quad D36,10 \quad D36,11$$
$$D37,8 \quad D37,9 \quad D37,10 \quad D37,11$$
$$D38,8 \quad D38,9 \quad D38,10 \quad D38,11$$
$$D39,8 \quad D39,9 \quad D39,10 \quad D39,11$$

More generally, after the completion of the instructions at addresses 1 through 8, each of the used 128 NPUs 126 will have determined the maximum value of the following 4×4 sub-matrix:

$$Dr,n \quad Dr,n+1 \quad Dr,n+2 \quad Dr,n+3$$
$$Dr+1,n \quad Dr+1,n+1 \quad Dr+1,n+2 \quad Dr+1,n+3$$
$$Dr+2,n \quad Dr+2,n+1 \quad Dr+2,n+2 \quad Dr+2,n+3$$
$$Dr+3,n \quad Dr+3,n+1 \quad Dr+3,n+2 \quad Dr+3,n+3$$

where r is the weight RAM 124 row address value at the beginning of the loop body, and n is the NPU 126 number.

The instruction at address 9 passes through the accumulator 202 value 217 through the AFU 212. The pass through function passes through a word that is the size (in bits) of the words read from the weight RAM 124 (i.e., in the example, 16 bits). Preferably, the user may specify the format of the output, e.g., how many of the output bits are fractional bits, as described in more detail below.

The instruction at address 10 writes the accumulator 202 value 217 to the row of the weight RAM 124 specified by the current value of the output row register, which was initialized by the instruction at address 0 and which is incremented each pass through the loop by virtue of the increment indicator in the instruction. More specifically, the instruction at address 10 writes a wide word (e.g., 16 bits) of the accumulator 202 to the weight RAM 124. Preferably, the instruction writes the 16 bits as specified by the output binary point 2916, as describe in more detail below with respect to FIGS. 29A and 29B below.

As may be observed, each row written to the weight RAM 124 by an iteration of the loop body includes holes that have invalid data. That is, the resulting 133 wide words 1 through 3, 5 through 7, 9 through 11 and so forth to wide words 509 through 511 are invalid, or unused. In one embodiment, the AFU 212 includes a mux that enables packing of the results into adjacent words of a row buffer, such as the row buffer 1104 of FIG. 11, for writing back to the output weight RAM 124 row. Preferably, the activation function instruction specifies the number of words in each hole, and the number of words in the hole is used to control the mux to pack the results. In one embodiment, the number of holes may be specified as values from 2 to 6 in order to pack the output of pooling 3×3, 4×4, 5×5, 6×6 or 7×7 sub-matrices. Alternatively, the architectural program executing on the processor 100 reads the resulting sparse (i.e., including holes) result rows from the weight RAM 124 and performs the packing function using other execution units 112, such as a media unit using architectural pack instructions, e.g., x86 SSE instructions. Advantageously, in a concurrent manner similar to those described above and exploiting the hybrid nature of the NNU 121, the architectural program executing on the processor 100 may read the status register 127 to monitor the most recently written row of the weight RAM 124 (e.g., field 2602 of FIG. 26B) to read a resulting sparse row, pack it, and write it back to the same row of the weight RAM 124 so that it is ready to be used as an input data matrix for a next layer of the neural network, such as a convolution layer or a classic neural network layer (i.e., multiply-accumulate layer). Furthermore, although an embodiment is described that performs pooling operations on 4×4 sub-matrices, the NNU program of FIG. 28 may be modified to perform pooling operations on other size sub-matrices such as 3×3, 5×5, 6×6 or 7×7 sub-matrices.

As may also be observed, the number of result rows written to the weight RAM 124 is one-fourth the number of rows of the input data matrix. Finally, in the example, the data RAM 122 is not used. However, alternatively, the data RAM 122 may be used rather than the weight RAM 124 to perform a pooling operation.

In the example of FIGS. 27 and 28, the pooling operation computes the maximum value of the sub-region. However, the program of FIG. 28 may be modified to compute the average value of the sub-region by, for example, replacing the maxwacc instructions with sumwacc instructions (sum the weight word with the accumulator 202 value 217) and changing the activation function instruction at address 9 to divide (preferably via reciprocal multiply, as described below) the accumulated results by the number of elements of each sub-region, which is sixteen in the example.

As may be observed from the operation of the NNU 121 according to the embodiment of FIGS. 27 and 28, each execution of the program of FIG. 28 takes approximately 6000 clock cycles to perform a pooling operation of the entire 512×1600 data matrix of FIG. 27, which may be considerably less than the number of clock cycles required to perform a similar task by conventional methods.

Alternatively, rather than writing back the results of the pooling operation to the weight RAM 124, the architectural program configures the NNU program to write back the results to rows of the data RAM 122, and the architectural program reads the results from the data RAM 122 as the NNU 121 writes them (e.g., using the address of the most recently written data RAM 122 row 2606 of FIG. 26B). This alternative may be advantageous in an embodiment in which the weight RAM 124 is single-ported and the data RAM 122 is dual-ported.

Fixed-Point Arithmetic with User-Supplied Binary Points, Full Precision Fixed-Point Accumulation, User-Specified Reciprocal Value, Stochastic Rounding of Accumulator Value, and Selectable Activation/Output Functions Generally speaking, hardware units that perform arithmetic in digital computing devices may be divided into what are commonly termed "integer" units and "floating-point" units, because they perform arithmetic operations on integer and floating-point numbers, respectively. A floating-point number has a magnitude (or mantissa) and an exponent, and typically a sign. The exponent is an indication of the location of the radix point (typically binary point) with respect to the magnitude. In contrast, an integer number has no exponent, but only a magnitude, and frequently a sign. An advantage of a floating-point unit is that it enables a programmer to work with numbers that can take on different values within on an enormously large range, and the hardware takes care of adjusting the exponent values of the numbers as needed without the programmer having to do so. For example, assume the two floating-point numbers $0.111 \times 10^{29}$ and $0.81 \times 10^{31}$ are multiplied. (A decimal, or base 10, example is used here, although floating-point units most commonly work with base 2 floating-point numbers.) The floating-point unit automatically takes care of multiplying the mantissa, adding the exponents, and then normalizing the result back to a value of $0.8991 \times 10^{59}$. For another example, assume the same two floating-point numbers are added. The floating-point unit automatically takes care of aligning the binary points of the mantissas before adding them to generate a resulting sum with a value of $0.81111 \times 10^{31}$.

However, the complexity and consequent increase in size, power consumption and clocks per instruction and/or lengthened cycle times associated with floating-point units is well known. Indeed, for this reason many devices (e.g., embedded processors, microcontrollers and relatively low cost and/or low power microprocessors) do not include a floating-point unit. As may be observed from the example above, some of the complexities of floating-point units include logic that performs exponent calculations associated with floating-point addition and multiplication/division (adders to add/subtract exponents of operands to produce resulting exponent value for floating-point multiplication/division, subtracters to determine subtract exponents of operands to determine binary point alignment shift amounts for floating-point addition), shifters that accomplish binary point alignment of the mantissas for floating-point addition, shifters that normalize floating-point results. Additionally, flow proceeds to block units typically require logic to perform rounding of floating-point results, logic to convert between integer and floating-point formats or between different floating-point precision formats (e.g., extended precision, double precision, single precision, half precision), leading zero and leading one detectors, and logic to deal with special floating-point numbers, such as denormal numbers, NANs and infinity.

Furthermore, there is the disadvantage of the significant complexity in verification of the correctness of a floating-point unit largely due to the increased number space over which the design must be verified, which may lengthen the product development cycle and time to market. Still further, as described above, floating-point arithmetic implies the storage and use of separate mantissa and exponent fields for each floating-point number involved in the computation, which may increase the amount of storage required and/or reduce precision given an equal amount of storage to store integer numbers. Many of these disadvantages are avoided by the use of integer units that perform arithmetic operations on integer numbers.

Frequently, programmers write programs that process fractional numbers, i.e., numbers that are not whole numbers. The programs may run on processors that do not have a floating-point unit or, if they do, the integer instructions executed by the integer units of the processor may be faster. To take advantage of potential performance advantages associated with integer units, the programmer employs what is commonly known as fixed-point arithmetic on fixed-point numbers. Such programs include instructions that execute on integer units to process integer numbers, or integer data. The software is aware that the data is fractional and includes instructions that perform operations on the integer data to deal with the fact that the data is actually fractional, e.g., alignment shifts. Essentially, the fixed-point software manually performs some or all of the functionality that a floating-point unit performs.

As used in the present disclosure, a "fixed-point" number (or value or operand or input or output) is a number whose bits of storage are understood to include bits that represent a fractional portion of the fixed-point number, referred to herein as "fractional bits." The bits of storage of the fixed-point number are comprised in a memory or register, e.g., an 8-bit or 16-bit word in a memory or register. Furthermore, the bits of storage of the fixed-point number are all used to represent a magnitude, and in some cases a bit is used to represent a sign, but none of the storage bits of the fixed-point number are used to represent an exponent of the number. Furthermore, the number of fractional bits, or binary point location, of the fixed-point number is specified in storage that is distinct from the storage bits of the fixed-point number and that in a shared, or global, fashion indicates the number of fractional bits, or binary point location, for a set of fixed-point numbers to which the fixed-point number belongs, such as the set of input operands, accumulated values or output results of an array of processing units, for example.

Advantageously, embodiments are described herein in which the ALUs are integer units, but the activation function units include fixed-point arithmetic hardware assist, or acceleration. This enables the ALU portions to be smaller and faster, which facilitates having more ALUs within a given space on the die. This implies more neurons per die space, which is particularly advantageous in a neural network unit.

Furthermore advantageously, in contrast to floating-point numbers that require exponent storage bits for each floating-point number, embodiments are described in which fixed-point numbers are represented with an indication of the number of bits of storage that are fractional bits for an entire set of numbers, however, the indication is located in a single, shared storage that globally indicates the number of fractional bits for all the numbers of the entire set, e.g., a set of inputs to a series of operations, a set of accumulated values of the series, a set of outputs. Preferably, the user of the NNU is enabled to specify the number of fractional storage bits for the set of numbers. Thus, it should be understood that although in many contexts (e.g., common mathematics) the term "integer" refers to a signed whole number, i.e., a number not having a fractional portion, the term "integer" in the present context may refer to numbers having a fractional portion. Furthermore, the term "integer" in the present context is intended to distinguish from floating-point numbers for whom a portion of the bits of their individual storage are used to represent an exponent of the floating-point number. Similarly, an integer arithmetic operation, such as an integer multiply or add or compare performed by an integer unit, assumes the operands do not have an exponent and therefore the integer elements of the integer unit, e.g., integer multiplier, integer adder, integer comparator, do not include logic to deal with exponents, e.g., do not shift mantissas to align binary points for addition or compare operations, do not add exponents for multiply operations.

Additionally, embodiments are described herein that include a large hardware integer accumulator to accumulate a large series of integer operations (e.g., on the order of 1000 multiply-accumulates) without loss of precision. This enables the NNU to avoid dealing with floating-point numbers while at the same time retaining full precision in the accumulated values without having to saturate them or incur inaccurate results due to overflows. Once the series of integer operations has accumulated a result into the full precision accumulator, the fixed-point hardware assist performs the necessary scaling and saturating to convert the full-precision accumulated value to an output value using the user-specified indications of the number of fractional bits of the accumulated value and the desired number of fractional bits in the output value, as described in more detail below.

As described in more detail below, preferably the activation function units may selectively perform stochastic rounding on the accumulator value when compressing it from its full precision form for use as an input to an activation function or for being passed through. Finally, the NPUs may be selectively instructed to apply different activation functions and/or output a variety of different forms of the accumulator value as dictated by the different needs of a given layer of a neural network.

Referring now to FIG. 29A, a block diagram illustrating an embodiment of the control register 127 of FIG. 1 is shown. The control register 127 may include a plurality of control registers 127. The control register 127 includes the following fields, as shown: configuration 2902, signed data 2912, signed weight 2914, data binary point 2922, weight binary point 2924, ALU function 2926, round control 2932, activation function 2934, reciprocal 2942, shift amount 2944, output RAM 2952, output binary point 2954, and output command 2956. The control register 127 values may be written by both an MTNN instruction 1400 and an instruction of an NNU program, such as an initiate instruction.

The configuration 2902 value specifies whether the NNU 121 is in a narrow configuration, a wide configuration or a funnel configuration, as described above. The configuration 2902 implies the size of the input words received from the data RAM 122 and the weight RAM 124. In the narrow and funnel configurations, the size of the input words is narrow (e.g., 8 bits or 9 bits), whereas in the wide configuration, the size of the input words is wide (e.g., 12 bits or 16 bits). Furthermore, the configuration 2902 implies the size of the output result 133, which is the same as the input word size.

The signed data value 2912, if true, indicates the data words received from the data RAM 122 are signed values, and if false, indicates they are unsigned values. The signed weight value 2914, if true, indicates the weight words received from the weight RAM 124 are signed values, and if false, indicates they are unsigned values.

The data binary point 2922 value indicates the location of the binary point for the data words received from the data RAM 122. Preferably, the data binary point 2922 value indicates the number of bit positions from the right for the location of the binary point. Stated alternatively, the data binary point 2922 indicates how many of the least significant bits of the data word are fractional bits, i.e., to the right of the binary point. Similarly, the weight binary point 2924 value indicates the location of the binary point for the weight words received from the weight RAM 124. Preferably, when the ALU function 2926 is a multiply and accumulate or output accumulator, then the NPU 126 determines the number of bits to the right of the binary point for the value held in the accumulator 202 as the sum of the data binary point 2922 and the weight binary point 2924. Thus, for example, if the value of the data binary point 2922 is 5 and the value of the weight binary point 2924 is 3, then the value in the accumulator 202 has 8 bits to the right of the binary point. When the ALU function 2926 is a sum/maximum accumulator and data/weight word or pass through data/weight word, the NPU 126 determines the number of bits to the right of the binary point for the value held in the accumulator 202 as the data/weight binary point 2922/2924, respectively. In an alternate embodiment, described below with respect to FIG. 29B, rather than specifying an individual data binary point 2922 and weight binary point 2924, a single accumulator binary point 2923 is specified.

The ALU function 2926 specifies the function performed by the ALU 204 of the NPU 126. As described above, the ALU functions 2926 may include, but are not limited to: multiply data word 209 and weight word 203 and accumulate product with accumulator 202; sum accumulator 202 and weight word 203; sum accumulator 202 and the data word 209; maximum of accumulator 202 and data word 209; maximum of accumulator 202 and weight word 203; output accumulator 202; pass through data word 209; pass through weight word 203; output zero. In one embodiment, the ALU function 2926 is specified by an NNU initiate instruction and used by the ALU 204 in response to an execute instruction (not shown). In one embodiment, the ALU function 2926 is specified by individual NNU instructions, such as the multiply-accumulate and maxwacc instructions described above.

Figure 30:
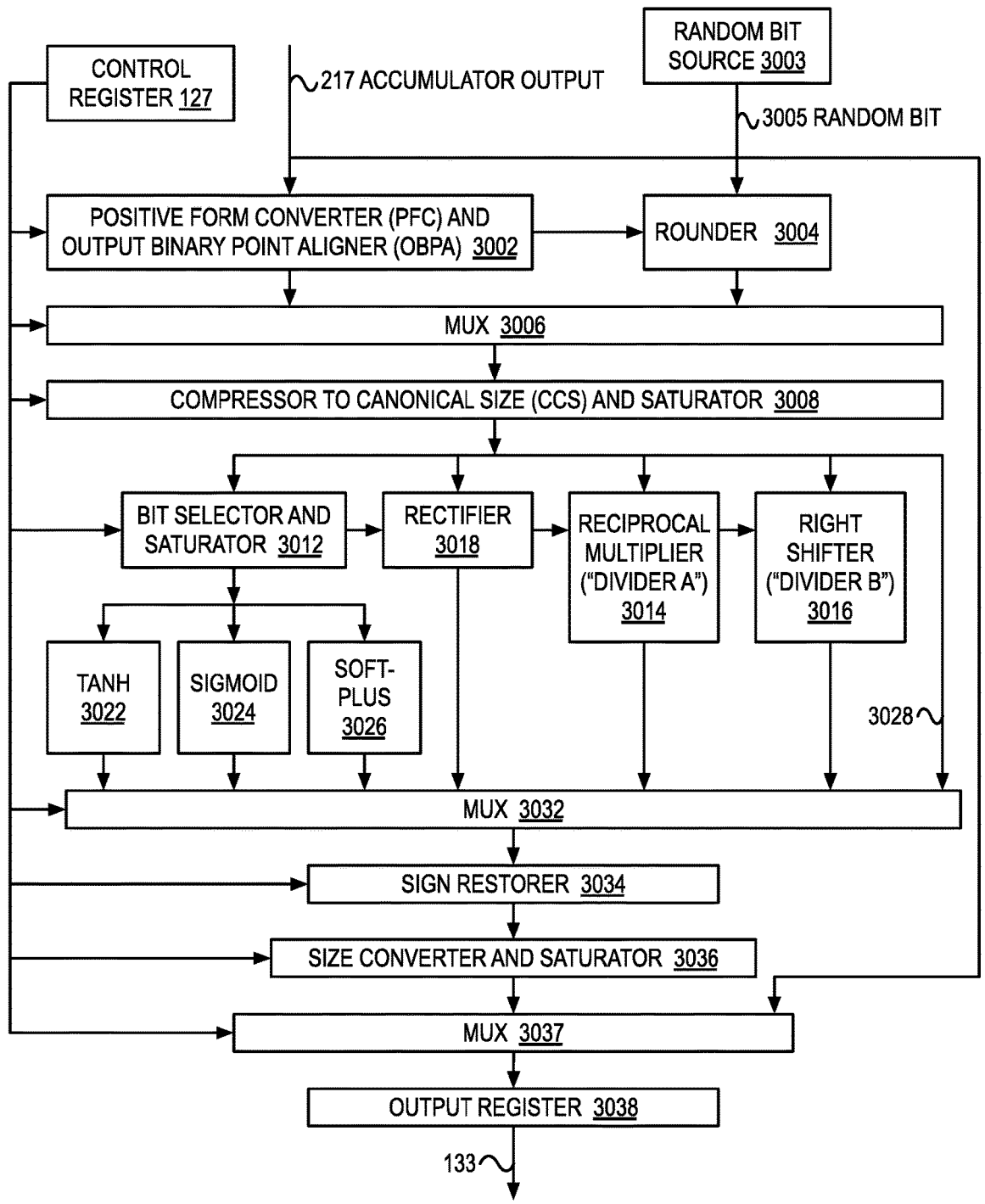
FIG. 30 is a block diagram illustrating in more detail an embodiment of an AFU of FIG. 2.

The round control 2932 specifies which form of rounding is to be used by the rounder 3004 (of FIG. 30). In one embodiment, the rounding modes that may be specified include, but are not limited to: no rounding, round to nearest, and stochastic rounding. Preferably, the processor 100 includes a random bit source 3003 (of FIG. 30) that generates random bits 3005 that are sampled and used to perform the stochastic rounding to reduce the likelihood of a rounding bias. In one embodiment, when the round bit 3005 is one and the sticky bit is zero, the NPU 126 rounds up if the sampled random bit 3005 is true and does not round up if the random bit 3005 is false. In one embodiment, the random bit source 3003 generates the random bits 3005 based on a sampling of random electrical characteristics of the processor 100, such as thermal noise across a semiconductor diode or resistor, although other embodiments are contemplated.

The activation function 2934 specifies the function applied to the accumulator 202 value 217 to generate the output 133 of the NPU 126. As described above and below in more detail, the activation functions 2934 include, but are not limited to: sigmoid; hyperbolic tangent; softplus; rectify; divide by specified power of two; multiply by a user-specified reciprocal value to accomplish an effective division; pass-through full accumulator; and pass-through the accumulator as a canonical size, which is described in more detail below. In one embodiment, the activation function is specified by an NNU activation function instruction. Alternatively, the activation function is specified by the initiate instruction and applied in response to an output instruction, e.g., write AFU output instruction at address 4 of FIG. 4, in which embodiment the activation function instruction at address 3 of FIG. 4 is subsumed by the output instruction.

The reciprocal 2942 value specifies a value that is multiplied by the accumulator 202 value 217 to accomplish a divide of the accumulator 202 value 217. That is, the user specifies the reciprocal 2942 value as the reciprocal of the actual desired divisor. This is useful, for example, in conjunction with convolution and pooling operations, as described herein. Preferably, the user specifies the reciprocal 2942 value in two parts, as described in more detail with respect to FIG. 29C below. In one embodiment, the control register 127 includes a field (not shown) that enables the user to specify division by one of a plurality of built-in divisor values that are the size of commonly used convolution kernels, e.g., 9, 25, 36 or 49. In such an embodiment, the AFU 212 may store reciprocals of the built-in divisors for multiplication by the accumulator 202 value 217.

The shift amount 2944 specifies a number of bits that a shifter of the AFU 212 shifts the accumulator 202 value 217 right to accomplish a divide by a power of two. This may also be useful in conjunction with convolution kernels whose size is a power of two.

The output RAM 2952 value specifies which of the data RAM 122 and the weight RAM 124 is to receive the output result 133.

The output binary point 2954 value indicates the location of the binary point for the output result 133. Preferably, the output binary point 2954 indicates the number of bit positions from the right for the location of the binary point for the output result 133. Stated alternatively, the output binary point 2954 indicates how many of the least significant bits of the output result 133 are fractional bits, i.e., to the right of the binary point. The AFU 212 performs rounding, compression, saturation and size conversion based on the value of the output binary point 2954 (as well as, in most cases, based on the value of the data binary point 2922, the weight binary point 2924, the activation function 2934, and/or the configuration 2902).

The output command 2956 controls various aspects of the output result 133. In one embodiment, the AFU 212 employs the notion of a canonical size, which is twice the size (in bits) of the width specified by the configuration 2902. Thus, for example, if the configuration 2902 implies the size of the input words received from the data RAM 122 and the weight RAM 124 are 8 bits, then the canonical size is 16 bits; for another example, if the configuration 2902 implies the size of the input words received from the data RAM 122 and the weight RAM 124 are 16 bits, then the canonical size is 32 bits. As described herein, the size of the accumulator 202 is large (e.g., the narrow accumulator 202B is 28 bits and the wide accumulator 202A is 41 bits) in order to preserve full precision of the intermediate computations, e.g., 1024 and 512 NNU multiply-accumulate instructions, respectively. Consequently, the accumulator 202 value 217 is larger (in bits) than the canonical size, and the AFU 212 (e.g., CCS 3008 described below with respect to FIG. 30), for most values of the activation function 2934 (except for pass-through full accumulator), compresses the accumulator 202 value 217 down to a value that is the canonical size. A first predetermined value of the output command 2956 instructs the AFU 212 to perform the specified activation function 2934 to generate an internal result that is the same size as the original input words, i.e., half the canonical size, and to output the internal result as the output result 133. A second predetermined value of the output command 2956 instructs the AFU 212 to perform the specified activation function 2934 to generate an internal result that is twice the size as the original input words, i.e., the canonical size, and to output the lower half of the internal result as the output result 133; and a third predetermined value of the output command 2956 instructs the AFU 212 to output the upper half of the canonical size internal result as the output result 133. A fourth predetermined value of the output command 2956 instructs the AFU 212 to output the raw least-significant word (whose width specified by the configuration 2902) of the accumulator 202 as the output result 133; a fifth predetermined value instructs the AFU 212 to output the raw middle-significant word of the accumulator 202 as the output result 133; and a sixth predetermined value instructs the AFU 212 to output the raw most-significant word of the accumulator 202 as the output result 133, as described above with respect to FIGS. 8 through 10. As described above, outputting the full accumulator 202 size or the canonical size internal result may be advantageous, for example, for enabling other execution units 112 of the processor 100 to perform activation functions, such as the softmax activation function.

Although the fields of FIG. 29A (and FIGS. 29B and 29C) are described as residing in the control register 127, in other embodiments one or more of the fields may reside in other parts of the NNU 121. Preferably, many of the fields are included in the NNU instructions themselves and decoded by the sequencer 128 to generate to a micro-operation 3416 (of FIG. 34) that controls the ALUs 204 and/or AFUs 212. Additionally, the fields may be included in a micro-operation 3414 (of FIG. 34) stored in a media register 118 that controls the ALUs 204 and/or AFUs 212. In such embodiments, the use of the initialize NNU instruction is minimized, and in other embodiments the initialize NNU instruction is eliminated.

As described above, an NNU instruction is capable of specifying to perform ALU operations on memory operands (e.g., word from data RAM 122 and/or weight RAM 124) or a rotated operand (e.g., from the mux-regs 208/705). In one embodiment, an NNU instruction may also specify an operand as a registered output of an activation function (e.g., the output of register 3038 of FIG. 30). Additionally, as described above, an NNU instruction is capable of specifying to increment a current row address of the data RAM 122 or weight RAM 124. In one embodiment, the NNU instruction may specify an immediate signed integer delta value that is added to the current row to accomplish incrementing or decrementing by a value other than one.

Referring now to FIG. 29B, a block diagram illustrating an embodiment of the control register 127 of FIG. 1 according to an alternate embodiment is shown. The control register 127 of FIG. 29B is similar to the control register 127 of FIG. 29A; however, the control register 127 of FIG. 29B includes an accumulator binary point 2923. The accumulator binary point 2923 indicates the location of the binary point for the accumulator 202. Preferably, the accumulator binary point 2923 value indicates the number of bit positions from the right for the location of the binary point. Stated alternatively, the accumulator binary point 2923 indicates how many of the least significant bits of the accumulator 202 are fractional bits, i.e., to the right of the binary point. In this embodiment, the accumulator binary point 2923 is specified explicitly, rather than being determined implicitly, as described above with respect to the embodiment of FIG. 29A.

Referring now to FIG. 29C, a block diagram illustrating an embodiment of the reciprocal 2942 of FIG. 29A stored as two parts according to one embodiment is shown. A first part 2962 is a shift value that indicates the number of suppressed leading zeroes 2962 in the true reciprocal value that the user desires to be multiplied by the accumulator 202 value 217. The number of leading zeroes is the number of consecutive zeroes immediately to the right of the binary point. The second part 2694 is the leading zero-suppressed reciprocal 2964 value, i.e., the true reciprocal value with all leading zeroes removed. In one embodiment, the number of suppressed leading zeroes 2962 is stored as four bits and the leading zero-suppressed reciprocal 2964 value is stored as 8-bit unsigned value.

To illustrate by example, assume the user desires the accumulator 202 value 217 to be multiplied by the reciprocal of 49. The binary representation of the reciprocal of 49 represented with 13 fractional bits is 0.0000010100111, which has five leading zeroes. In this case, the user populates the number of suppressed leading zeroes 2962 with a value of five, and populates the leading zero-suppressed reciprocal 2964 with a value of 10100111. After the reciprocal multiplier "divider A" 3014 (of FIG. 30) multiplies the accumulator 202 value 217 and the leading zero-suppressed reciprocal 2964 value, it right-shifts the resulting product by the number of suppressed leading zeroes 2962. Such an embodiment may advantageously accomplish high precision with a relatively small number of bits used to represent the reciprocal 2942 value.

Referring now to FIG. 30, a block diagram illustrating in more detail an embodiment of an AFU 212 of FIG. 2 is shown. The AFU 212 includes the control register 127 of FIG. 1; a positive form converter (PFC) and output binary point aligner (OBPA) 3002 that receives the accumulator 202 value 217; a rounder 3004 that receives the accumulator 202 value 217 and indication of the number of bits shifted out by the OBPA 3002; a random bit source 3003 that generates random bits 3005, as described above; a first mux 3006 that receives the output of the PFC and OBPA 3002 and the output of the rounder 3004; a compressor to canonical size (CCS) and saturator 3008 that receives the output of the first mux 3006; a bit selector and saturator 3012 that receives the output of the CCS and saturator 3008; a rectifier 3018 that receives the output of the CCS and saturator 3008; a reciprocal multiplier 3014 that receives the output of the CCS and saturator 3008; a right shifter 3016 that receives the output of the CCS and saturator 3008; a hyperbolic tangent (tan h) module 3022 that receives the output of the bit selector and saturator 3012; a sigmoid module 3024 that receives the output of the bit selector and saturator 3012; a softplus module 3026 that receives the output of the bit selector and saturator 3012; a second mux 3032 that receives the outputs of the tan h module 3022, the sigmoid module 3024, the softplus module 3026, the rectifier 3108, the reciprocal multiplier 3014, the right shifter 3016 and the passed-through canonical size output 3028 of the CCS and saturator 3008; a sign restorer 3034 that receives the output of the second mux 3032; a size converter and saturator 3036 that receives the output of the sign restorer 3034; a third mux 3037 that receives the output of the size converter and saturator 3036 and the accumulator output 217; and an output register 3038 that receives the output of the mux 3037 and whose output is the result 133 of FIG. 1.

The PFC and OBPA 3002 receive the accumulator 202 value 217. Preferably, the accumulator 202 value 217 is a full precision value, as described above. That is, the accumulator 202 has a sufficient number of bits of storage to hold an accumulated value that is the sum, generated by the integer adder 244, of a series of products generated by the integer multiplier 242 without discarding any of the bits of the individual products of the multiplier 242 or sums of the adder 244 so that there is no loss of precision. Preferably, the accumulator 202 has at least a sufficient number of bits to hold the maximum number of accumulations of the products that an NNU 121 is programmable to perform. For example, referring to the program of FIG. 4 to illustrate, the maximum number of product accumulations the NNU 121 is programmable to perform when in a wide configuration is 512, and the accumulator 202 bit width is 41. For another example, referring to the program of FIG. 20 to illustrate, the maximum number of product accumulations the NNU 121 is programmable to perform when in a narrow configuration is 1024, and the accumulator 202 bit width is 28. To generalize, the full precision accumulator 202 includes at least Q bits, where Q is the sum of M and log 2P, where M is the bit width of the integer product of the multiplier 242 (e.g., 16 bits for a narrow multiplier 242, or 32 bits for a wide multiplier 242) and P is the maximum permissible number of the integer products that may be accumulated into the accumulator 202. Preferably, the maximum number of product accumulations is specified via a programming specification to the programmer of the NNU 121. In one embodiment, the sequencer 128 enforces a maximum value of the count of a multiply-accumulate NNU instruction (e.g., the instruction at address 2 of FIG. 4), for example, of 511, with the assumption of one previous multiply-accumulate instruction that loads the row of data/weight words 206/207 from the data/weight RAM 122/124 (e.g., the instruction at address 1 of FIG. 4).

Advantageously, by including an accumulator 202 that has a large enough bit width to accumulate a full precision value for the maximum number of allowable accumulations, this simplifies the design of the ALU 204 portion of the NPU 126. In particular, it alleviates the need for logic to saturate sums generated by the integer adder 244 that would overflow a smaller accumulator and that would need to keep track of the binary point location of the accumulator to determine whether an overflow has occurred to know whether a saturation was needed. To illustrate by example a problem with a design that included a non-full precision accumulator and instead includes saturating logic to handle overflows of the non-full precision accumulator, assume the following.

(1) The range of the data word values is between 0 and 1 and all the bits of storage are used to store fractional bits. The range of the weight words is between −8 and +8 and all but three of the bits of storage are used to store fractional bits. And, the range of the accumulated values for input to a hyperbolic tangent activation function is between −8 and +8 and all but three of the bits of storage are used to store fractional bits.

(2) The bit width of the accumulator is non-full precision (e.g., only the bit width of the products).

(3) The final accumulated value would be somewhere between −8 and +8 (e.g., +4.2), assuming the accumulator were full precision; however, the products before a "point A" in the series tend to be positive much more frequently, whereas the products after point A tend to be negative much more frequently.

In such a situation, an inaccurate result (i.e., a result other than +4.2) might be obtained. This is because at some point before point A the accumulator may be saturated to the maximum +8 value when it should have been a larger value, e.g., +8.2, causing loss of the remaining +0.2. The accumulator could even remain at the saturated value for more product accumulations resulting in loss of even more positive value. Thus, the final value of the accumulator could be a smaller number than it would have been (i.e., less than +4.2) if the accumulator had a full precision bit width.

The PFC 3002 converts the accumulator 202 value 217 to a positive form, if the value is negative, and generates an additional bit that indicates whether the original value was positive or negative, which is passed down the AFU 212 pipeline along with the value. Converting to a positive form simplifies subsequent operations by the AFU 212. For example, it enables only positive values to be inputted to the tan h 3022 and sigmoid 3024 modules, thus simplifying them. Additionally, it simplifies the rounder 3004 and the saturator 3008.

The OBPA 3002 shifts, or scales, the positive-form value right to align it with the output binary point 2954 specified in the control register 127. Preferably, the OBPA 3002 calculates the shift amount as a difference that is the number of fractional bits of the output (e.g., specified by the output binary point 2954) subtracted from the number of fractional bits of the accumulator 202 value 217 (e.g., specified by the accumulator binary point 2923 or the sum of the data binary point 2922 and the weight binary point 2924). Thus, for example, if the accumulator 202 binary point 2923 is 8 (as in the example above) and the output binary point 2954 is 3, then the OBPA 3002 shifts the positive-form value right 5 bits to generate a result provided to the mux 3006 and to the rounder 3004.

The rounder 3004 rounds the accumulator 202 value 217. Preferably, the rounder 3004 generates a rounded version of the positive-form value generated by the PFC and OBPA 3002 and provides the rounded version to the mux 3006. The rounder 3004 rounds according to the round control 2932 described above, which may include stochastic rounding using the random bit 3005, as described above and below. The mux 3006 selects one of its inputs, i.e., either the positive-form value from the PFC and OBPA 3002 or the rounded version thereof from the rounder 3004, based on the round control 2932 (which may include stochastic rounding, as described herein) and provides the selected value to the CCS and saturator 3008. Preferably, if the round control 2932 specifies no rounding, then the mux 3006 selects the output of the PFC and OBPA 3002, and otherwise selects the output of the rounder 3004. Other embodiments are contemplated in which the AFU 212 performs additional rounding. For example, in one embodiment, the bit selector 3012 rounds based on lost low-order bits when it compresses the bits of the CCS and saturator 3008 output (described below). For another example, in one embodiment, the product of the reciprocal multiplier 3014 (described below) is rounded. For yet another example, in one embodiment, the size converter 3036 rounds when it converts to the proper output size (described below), which may involve losing low-order bits used in the rounding determination.

The CCS 3008 compresses the mux 3006 output value to the canonical size. Thus, for example, if the NPU 126 is in a narrow or funnel configuration 2902, then the CCS 3008 compresses the 28-bit mux 3006 output value to 16 bits; and if the NPU 126 is in a wide configuration 2902, then the CCS 3008 compresses the 41-bit mux 3006 output value to 32 bits. However, before compressing to the canonical size, if the pre-compressed value is greater than the maximum value expressible in the canonical form, the saturator 3008 saturates the pre-compressed value to the maximum value expressible in the canonical form. For example, if any of the bits of the pre-compressed value left of the most-significant canonical form bit has a 1 value, then the saturator 3008 saturates to the maximum value (e.g., to all 1's).

Preferably, the tan h 3022, sigmoid 3024 and softplus 3026 modules comprise lookup tables, e.g., programmable logic arrays (PLA), read-only memories (ROM), combinational logic gates, and so forth. In one embodiment, in order to simplify and reduce the size of the modules 3022/3024/3026, they are provided an input value that has 3.4 form, i.e., three whole bits and four fractional bits, i.e., the input value has four bits to the right of the binary point and three bits to the left of the binary point. These values are chosen because at the extremes of the input value range (−8, +8) of the 3.4 form, the output values asymptotically approach their minimum/maximum values. However, other embodiments are contemplated that place the binary point at a different location, e.g., in a 4.3 form or a 2.5 form. The bit selector 3012 selects the bits of the CCS and saturator 3008 output that satisfy the 3.4 form criteria, which involves compression, i.e., some bits are lost, since the canonical form has a larger number of bits. However, prior to selecting/compressing the CCS and saturator 3008 output value, if the pre-compressed value is greater than the maximum value expressible in the 3.4 form, the saturator 3012 saturates the pre-compressed value to the maximum value expressible in the 3.4 form. For example, if any of the bits of the pre-compressed value left of the most-significant 3.4 form bit has a 1 value, then the saturator 3012 saturates to the maximum value (e.g., to all 1's).

The tan h 3022, sigmoid 3024 and softplus 3026 modules perform their respective activation functions (described above) on the 3.4 form value output by the CCS and saturator 3008 to generate a result. Preferably, the result of the tan h 3022 and sigmoid 3024 modules is a 7-bit result in a 0.7 form, i.e., zero whole bits and seven fractional bits, i.e., the input value has seven bits to the right of the binary point. Preferably, the result of the softplus module 3026 is a 7-bit result in a 3.4 form, e.g., in the same form as the input to the module 3026. Preferably, the outputs of the tan h 3022, sigmoid 3024 and softplus 3026 modules are extended to canonical form (e.g., leading zeroes added as necessary) and aligned to have the binary point specified by the output binary point 2954 value.

The rectifier 3018 generates a rectified version of the output value of the CCS and saturator 3008. That is, if the output value of the CCS and saturator 3008 (its sign is piped down as describe above) is negative, the rectifier 3018 outputs a value of zero; otherwise, the rectifier 3018 outputs its input value. Preferably, the output of the rectifier 3018 is in canonical form and has the binary point specified by the output binary point 2954 value.

The reciprocal multiplier 3014 multiplies the output of the CCS and saturator 3008 by the user-specified reciprocal value specified in the reciprocal value 2942 to generate its canonical size product, which is effectively the quotient of the output of the CCS and saturator 3008 and the divisor that is the reciprocal of the reciprocal 2942 value. Preferably, the output of the reciprocal multiplier 3014 is in canonical form and has the binary point specified by the output binary point 2954 value.

The right shifter 3016 shifts the output of the CCS and saturator 3008 by the user-specified number of bits specified in the shift amount value 2944 to generate its canonical size quotient. Preferably, the output of the right shifter 3016 is in canonical form and has the binary point specified by the output binary point 2954 value.

The mux 3032 selects the appropriate input specified by the activation function 2934 value and provides the selection to the sign restorer 3034, which converts the positive form output of the mux 3032 to a negative form if the original accumulator 202 value 217 was a negative value, e.g., to two's-complement form.

The size converter 3036 converts the output of the sign restorer 3034 to the proper size based on the value of the output command 2956, which values are described above with respect to FIG. 29A. Preferably, the output of the sign restorer 3034 has a binary point specified by the output binary point 2954 value. Preferably, for the first predetermined value of the output command 2956, the size converter 3036 discards the bits of the upper half of the sign restorer 3034 output. Furthermore, if the output of the sign restorer 3034 is positive and exceeds the maximum value expressible in the word size specified by the configuration 2902 or is negative and is less than the minimum value expressible in the word size, the saturator 3036 saturates its output to the respective maximum/minimum value expressible in the word size. For the second and third predetermined values, the size converter 3036 passes through the sign restorer 3034 output.

The mux 3037 selects either the size converter and saturator 3036 output or the accumulator 202 output 217, based on the output command 2956, for provision to the output register 3038. More specifically, for the first and second predetermined values of the output command 2956, the mux 3037 selects the lower word (whose size is specified by the configuration 2902) of the output of the size converter and saturator 3036. For the third predetermined value, the mux 3037 selects the upper word of the output of the size converter and saturator 3036. For the fourth predetermined value, the mux 3037 selects the lower word of the raw accumulator 202 value 217; for the fifth predetermined value, the mux 3037 selects the middle word of the raw accumulator 202 value 217; and for the sixth predetermined value, the mux 3037 selects the upper word of the raw accumulator 202 value 217. As describe above, preferably the AFU 212 pads the upper bits of the upper word of the raw accumulator 202 value 217 to zero.

Referring now to FIG. 31, an example of operation of the AFU 212 of FIG. 30 is shown. As shown, the configuration 2902 is set to a narrow configuration of the NPUs 126. Additionally, the signed data 2912 and signed weight 2914 values are true. Additionally, the data binary point 2922 value indicates the binary point for the data RAM 122 words is located such that there are 7 bits to the right of the binary point, and an example value of the first data word received by one of the NPUs 126 is shown as 0.1001110. Still further, the weight binary point 2924 value indicates the binary point for the weight RAM 124 words is located such that there are 3 bits to the right of the binary point, and an example value of the first weight word received by the one of the NPUs 126 is shown as 00001.010.

The 16-bit product (which is accumulated with the initial zero value of the accumulator 202) of the first data and weight words is shown as 000000.1100001100. Because the data binary point 2912 is 7 and the weight binary point 2914 is 3, the implied accumulator 202 binary point is located such that there are 10 bits to the right of the binary point. In the case of a narrow configuration, the accumulator 202 is 28 bits wide, in the example embodiment. In the example, a value 217 of 000000000000000001.1101010100 of the accumulator 202 after all the ALU operations (e.g., all 1024 multiply-accumulates of FIG. 20) are performed is shown.

The output binary point 2954 value indicates the binary point for the output is located such that there are 7 bits to the right of the binary point. Therefore, after passing through the OBPA 3002 and CCS 3008, the accumulator 202 value 217 is scaled, rounded and compressed to the canonical form value of 000000001.1101011. In the example, the output binary point location indicates 7 fractional bits, and the accumulator 202 binary point location indicates 10 fractional bits. Therefore, the OBPA 3002 calculates a difference of 3 and scales the accumulator 202 value 217 by shifting it right 3 bits. This is indicated in FIG. 31 by the loss of the 3 least significant bits (binary 100) of the accumulator 202 value 217. Further in the example, the round control 2932 value indicates to use stochastic rounding, and in the example it is assumed that the sampled random bit 3005 is true. Consequently, the least significant bit was rounded up because the round bit of the accumulator 202 value 217 (most significant bit of the 3 bits shifted out by the scaling of the accumulator 202 value 217) was one and the sticky bit (Boolean OR of the 2 least significant bits of the 3 bits shifted out by the scaling of the accumulator 202 value 217) was zero, according to the description above.

The activation function 2934 indicates to use a sigmoid function, in the example. Consequently, the bit selector 3012 selects the bits of the canonical form value such that the input to the sigmoid module 3024 has three whole bits and four fractional bits, as described above, i.e., a value of 001.1101, as shown. The sigmoid module 3024 outputs a value that is put in canonical form as shown of 000000000.1101110.

The output command 2956 in the example specifies the first predetermined value, i.e., to output the word size indicated by the configuration 2902, which in this case is a narrow word (8 bits). Consequently, the size converter 3036 converts the canonical sigmoid output value to an 8 bit quantity having an implied binary point located such that 7 bits are to the right of the binary point, yielding an output value of 01101110, as shown.

Referring now to FIG. 32, a second example of operation of the AFU 212 of FIG. 30 is shown. The example of FIG. 32 illustrates operation of the AFU 212 when the activation function 2934 indicates to pass-through the accumulator 202 value 217 in the canonical size. As shown, the configuration 2902 is set to a narrow configuration of the NPUs 126.

In the example, the accumulator 202 is 28 bits wide, and the accumulator 202 binary point is located such that there are 10 bits to the right of the binary point (either because the sum of the data binary point 2912 and the weight binary point 2914 is 10 according to one embodiment, or the accumulator binary point 2923 is explicitly specified as having a value of 10 according to an alternate embodiment, as described above). In the example, FIG. 32 shows a value 217 of 000001100000011011.1101111010 of the accumulator 202 after all the ALU operations are performed.

In the example, the output binary point 2954 value indicates the binary point for the output is located such that there are 4 bits to the right of the binary point. Therefore, after passing through the OBPA 3002 and CCS 3008, the accumulator 202 value 217 is saturated and compressed to the canonical form value of 111111111111.1111, as shown, that is received by the mux 3032 as the canonical size pass-through value 3028.

In the example, two output commands 2956 are shown. The first output command 2956 specifies the second predetermined value, i.e., to output the lower word of the canonical form size. Since the size indicated by the configuration 2902 is a narrow word (8 bits), which implies a canonical size of 16 bits, the size converter 3036 selects the lower 8 bits of the canonical size pass-through value 3028 to yield an 8 bit value of 11111111, as shown. The second output command 2956 specifies the third predetermined value, i.e., to output the upper word of the canonical form size. Consequently, the size converter 3036 selects the upper 8 bits of the canonical size pass-through value 3028 to yield an 8 bit value of 11111111, as shown.

Referring now to FIG. 33, a third example of operation of the AFU 212 of FIG. 30 is shown. The example of FIG. 33 illustrates operation of the AFU 212 when the activation function 2934 indicates to pass-through the full raw accumulator 202 value 217. As shown, the configuration 2902 is set to a wide configuration of the NPUs 126 (e.g., 16-bit input words).

In the example, the accumulator 202 is 41 bits wide, and the accumulator 202 binary point is located such that there are 8 bits to the right of the binary point (either because the sum of the data binary point 2912 and the weight binary point 2914 is 8 according to one embodiment, or the accumulator binary point 2923 is explicitly specified as having a value of 8 according to an alternate embodiment, as described above). In the example, FIG. 33 shows a value 217 of 001000000000000000001100000011011.11011110 of the accumulator 202 after all the ALU operations are performed.

In the example, three output commands 2956 are shown. The first output command 2956 specifies the fourth predetermined value, i.e., to output the lower word of the raw accumulator 202 value; the second output command 2956 specifies the fifth predetermined value, i.e., to output the middle word of the raw accumulator 202 value; and the third output command 2956 specifies the sixth predetermined value, i.e., to output the upper word of the raw accumulator 202 value. Since the size indicated by the configuration 2902 is a wide word (16 bits), FIG. 33 shows that in response to the first output command 2956, the mux 3037 selects the 16-bit value of 0001101111011110; in response to the second output command 2956, the mux 3037 selects the 16-bit value of 0000000000011000; and in response to the third output command 2956, the mux 3037 selects the 16-bit value of 0000000001000000.

As discussed above, advantageously the NNU 121 operates on integer data rather than floating-point data. This has the advantage of simplifying each NPU 126, or at least the ALU 204 portion. For example, the ALU 204 need not include adders that would be needed in a floating-point implementation to add the exponents of the multiplicands for the multiplier 242. Similarly, the ALU 204 need not include shifters that would be needed in a floating-point implementation to align binary points of the addends for the adder 234. As one skilled in the art will appreciate, floating point units are generally very complex; thus, these are only examples of simplifications to the ALU 204, and other simplifications are enjoyed by the instant integer embodiments with hardware fixed-point assist that enable the user to specify the relevant binary points. The fact that the ALUs 204 are integer units may advantageously result in a smaller (and faster) NPU 126 than a floating-point embodiment, which further advantageously facilitates the incorporation of a large array of NPUs 126 into the NNU 121. The AFU 212 portion deals with scaling and saturating the accumulator 202 value 217 based on the, preferably user-specified, number of fractional bits desired in the accumulated value and number of fractional bits desired in the output value. Advantageously, any additional complexity and accompanying increase in size, power consumption and/or time in the fixed-point hardware assist of the AFUs 212 may be amortized by sharing the AFUs 212 among the ALU 204 portions, as described with respect to the embodiment of FIG. 11, for example, since the number of AFUs 1112 may be reduced in a shared embodiment.

Advantageously, embodiments described herein enjoy many of the benefits associated with reduced complexity of hardware integer arithmetic units over floating-point arithmetic units, while still providing arithmetic operations on fractional numbers, i.e., numbers with a binary point. An advantage of floating-point arithmetic is that it accommodates arithmetic operations on data whose individual values may be anywhere within a very wide range of values (which is effectively limited only by the size of the exponent range, which may be very large). That is, each floating-point number has its own potentially unique exponent value. However, embodiments are described here that recognize and take advantage of the fact that there are certain applications in which the input data is highly parallelized and whose values are within a relatively narrow range such that the "exponent" for all the parallelized values can be the same. Therefore, the embodiments enable the user to specify the binary point location once for all the input values and/or accumulated values. Similarly, the embodiments enable the user to specify the binary point location once for all the output values, recognizing and taking advantage of similar range characteristics of the parallelized outputs. An artificial neural network is an example of such an application, although the embodiments may be employed to perform computations for other applications. By specifying the binary point location for the inputs once, rather than for each individual input number, the embodiments provide more efficient use of memory space (e.g., require less memory) over a floating-point implementation and/or provide an increase in precision for a similar amount of memory since the bits that would be used for an exponent in a floating-point implementation can be used to specify more precision in the magnitude.

Further advantageously, the embodiments recognize the potential loss of precision that could be experienced during the accumulation of a large series of integer operations (e.g., overflow or loss of fractional bits of lesser significance) and provide a solution, primarily in the form of a sufficiently large accumulator to avoid loss of precision.

Direct Execution of NNU Micro-Operation

Figure 34:
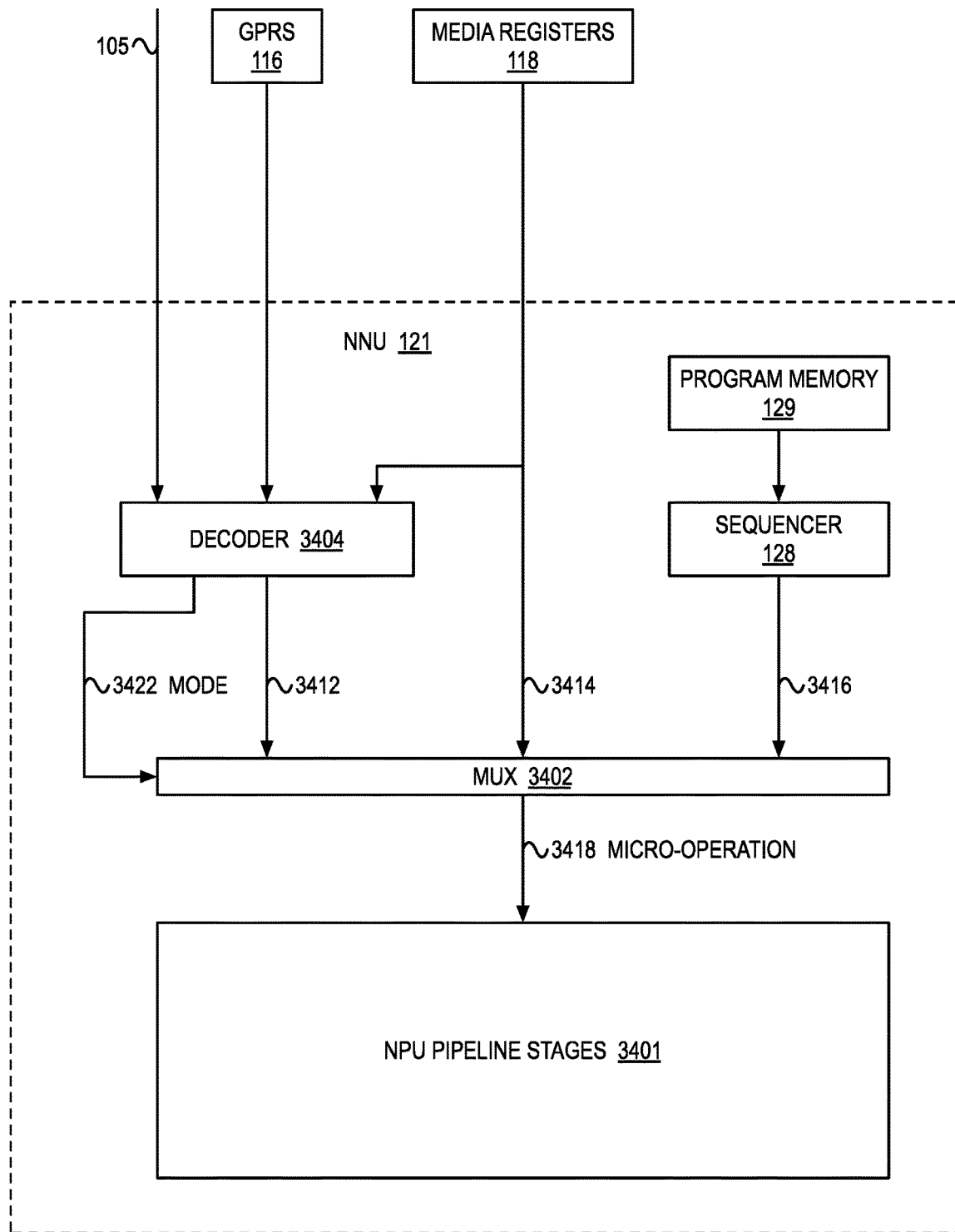
FIG. 34 is a block diagram illustrating the processor of FIG. 1 and in more detail portions of the NNU of FIG. 1.

Referring now to FIG. 34, a block diagram illustrating the processor 100 of FIG. 1 and in more detail portions of the NNU 121 of FIG. 1 is shown. The NNU 121 includes pipeline stages 3401 of the NPUs 126. The pipeline stages 3401, separated by staging registers, include combinatorial logic that accomplish the operation of the NPUs 126 as described herein, such as Boolean logic gates, multiplexers, adders, multipliers, comparators, and so forth. The pipeline stages 3401 receive a micro-operation 3418 from a mux 3402. The micro-operation 3418 flows down the pipeline stages 3401 and controls their combinatorial logic. The micro-operation 3418 is a collection of bits. Preferably the micro-operation 3418 includes the bits of the data RAM 122 memory address 123, the weight RAM 124 memory address 125, the program memory 129 memory address 131, the mux-reg 208/705 control signals 213/713, the mux 802 control signals 803, and many of the fields of the control register 127 (e.g., of FIGS. 29A through 29C, for example, among others. In one embodiment, the micro-operation 3418 comprises approximately 120 bits. The mux 3402 receives a micro-operation from three different sources and selects one of them as the micro-operation 3418 for provision to the pipeline stages 3401.

One micro-operation source to the mux 3402 is the sequencer 128 of FIG. 1. The sequencer 128 decodes the NNU instructions received from the program memory 129 and in response generates a micro-operation 3416 provided to a first input of the mux 3402.

A second micro-operation source to the mux 3402 is a decoder 3404 that receives microinstructions 105 from a reservation station 108 of FIG. 1, along with operands from the GPR 116 and media registers 118. Preferably, the microinstructions 105 are generated by the instruction translator 104 in response to translating MTNN instructions 1400 and MFNN instructions 1500, as described above. The microinstructions 105 may include an immediate field that specifies a particular function (which was specified by an MTNN instruction 1400 or an MFNN instruction 1500), such as starting and stopping execution of a program in the program memory 129, directly executing a micro-operation from the media registers 118, or reading/writing a memory of the NNU 121, as described above. The decoder 3404 decodes the microinstructions 105 and in response generates a micro-operation 3412 provided to a second input of the mux 3402. Preferably, in response to some functions 1432/1532 of an MTNN/MFNN 1400/1500 instruction, it is not necessary for the decoder 3404 to generate a micro-operation 3412 to send down the pipeline 3401, for example, writing to the control register 127, starting execution of a program in the program memory 129, pausing the execution of a program in the program memory 129, waiting for completion of the execution of a program in the program memory 129, reading from the status register 127 and resetting the NNU 121.

A third micro-operation source to the mux 3402 is the media registers 118 themselves. Preferably, as described above with respect to FIG. 14, a MTNN instruction 1400 may specify a function that instructs the NNU 121 to directly execute a micro-operation 3414 provided from the media registers 118 to a third input of the mux 3402. The direct execution of a micro-operation 3414 provided by the architectural media registers 118 may be particularly useful for test, e.g., built-in self test (BIST), and debug of the NNU 121.

Preferably, the decoder 3404 generates a mode indicator 3422 that controls the mux 3402 selection. When an MTNN instruction 1400 specifies a function to start running a program from the program memory 129, the decoder 3404 generates a mode indicator 3422 value that causes the mux 3402 to select the micro-operation 3416 from the sequencer 128 until either an error occurs or until the decoder 3404 encounters an MTNN instruction 1400 that specifies a function to stop running a program from the program memory 129. When an MTNN instruction 1400 specifies a function that instructs the NNU 121 to directly execute a micro-operation 3414 provided from a media register 118, the decoder 3404 generates a mode indicator 3422 value that causes the mux 3402 to select the micro-operation 3414 from the specified media register 118. Otherwise, the decoder 3404 generates a mode indicator 3422 value that causes the mux 3402 to select the micro-operation 3412 from the decoder 3404.

Variable Rate Neural Network Unit

There may be situations in which the NNU 121 runs a program and then sits idle waiting for the processor 100 to do something it needs before it can run its next program. For example, assume a situation similar to that described with respect to FIGS. 3 through 6A in which the NNU 121 runs two or more successive instances of a multiply-accumulate-activation function program (which may also be referred to as a feed forward neural network layer program). It may take the processor 100 significantly longer to write 512 KB worth of weight values into the weight RAM 124 that will be used by the next run of the NNU program than it will take for the NNU 121 to run the program. Stated alternatively, the NNU 121 may run the program in a relatively short amount of time and then sit idle while the processor 100 finishes writing the next weight values into the weight RAM 124 for the next run of the program. This situation is visually illustrated in FIG. 36A, which is described in more detail below. In such situations, it may be advantageous to run the NNU 121 at a slower rate and take longer to execute the program and thereby spread out over more time the energy consumption required for the NNU 121 to run the program, which may tend to keep the temperature of the NNU 121 lower and perhaps of the processor 100 in general. This situation is referred to as relaxed mode and is visually illustrated in FIG. 36B, which is described in more detail below.

Figure 35:
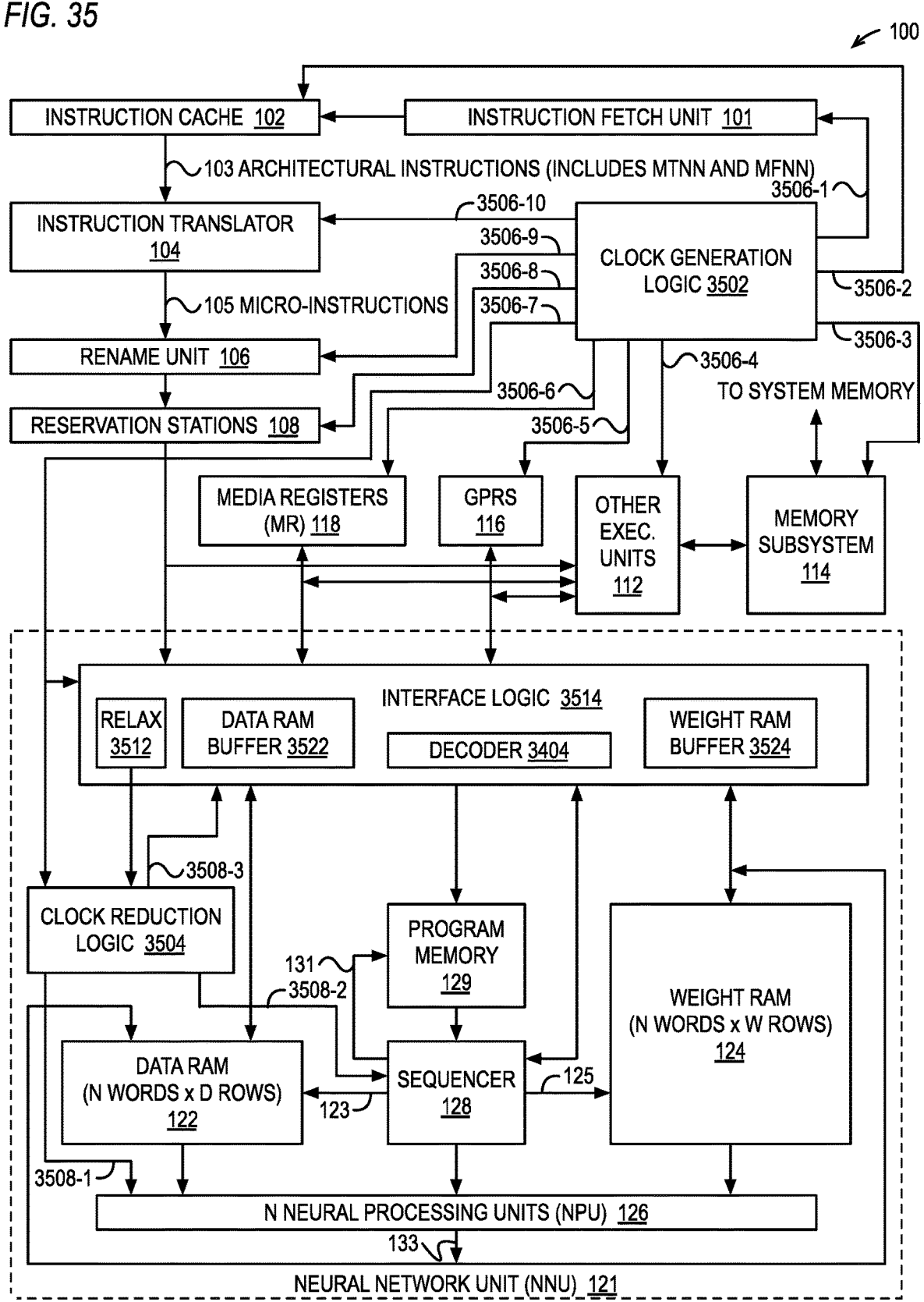
FIG. 35 is a block diagram illustrating a processor that includes a variable rate NNU.

Referring now to FIG. 35, a block diagram illustrating a processor 100 that includes a variable rate NNU 121 is shown. The processor 100 is similar to the processor 100 of FIG. 1 in many respects and like-numbered elements are similar. The processor 100 of FIG. 35 also includes clock generation logic 3502 coupled to the functional units of the processor 100, namely, the instruction fetch unit 101, the instruction cache 102, the instruction translator 104, the rename unit 106, the reservation stations 108, the NNU 121, the other execution units 112, the memory subsystem 114, the general purpose registers 116 and the media registers 118. The clock generation logic 3502 includes a clock generator, such as a phase-locked loop (PLL), that generates a clock signal having a primary clock rate, or clock frequency. For example, the primary clock rate may be 1 GHz, 1.5 GHz, 2 GHz and so forth. The clock rate indicates the number of cycles, e.g., oscillations between a high and low state, of the clock signal per second. Preferably, the clock signal has a balanced duty cycle, i.e., high half the cycle and low the other half of the cycle; alternatively, the clock signal has an unbalanced duty cycle in which the clock signal is in the high state longer than it is in the low state, or vice versa. Preferably, the PLL is configurable to generate the primary clock signal at multiple clock rates. Preferably, the processor 100 includes a power management module that automatically adjusts the primary clock rate based on various factors including the dynamically detected operating temperature of the processor 100, utilization, and commands from system software (e.g., operating system, BIOS) indicating desired performance and/or power savings indicators. In one embodiment, the power management module includes microcode of the processor 100.

The clock generation logic 3502 also includes a clock distribution network, or clock tree. The clock tree distributes the primary clock signal to the functional units of the processor 100, which are indicated in FIG. 35 as clock signal 3506-1 to the instruction fetch unit 101, clock signal 3506-2 to the instruction cache 102, clock signal 3506-10 to the instruction translator 104, clock signal 3506-9 to the rename unit 106, clock signal 3506-8 to the reservation stations 108, clock signal 3506-7 to the NNU 121, clock signal 3506-4 to the other execution units 112, clock signal 3506-3 to the memory subsystem 114, clock signal 3506-5 to the general purpose registers 116 and clock signal 3506-6 to the media registers 118, and which are referred to collectively as clock signals 3506. The clock tree includes nodes, or wires, that transmit the primary clock signals 3506 to their respective functional units. Additionally, preferably the clock generation logic 3502 includes clock buffers that re-generate the primary clock signal as needed to provide cleaner clock signals and/or boost the voltage levels of the primary clock signal, particularly for long nodes. Additionally, each functional unit may also include its own sub-clock tree, as needed, that re-generates and/or boosts the respective primary clock signal 3506 it receives.

The NNU 121 includes clock reduction logic 3504 that receives a relax indicator 3512 and that receives the primary clock signal 3506-7 and, in response, generates a secondary clock signal. The secondary clock signal has a clock rate that is either the same clock rate as the primary clock rate or, when in relaxed mode, that is reduced relative to the primary clock rate by an amount programmed into the relax indicator 3512, which potentially provides thermal benefits. The clock reduction logic 3504 is similar in many respects to the clock generation logic 3502 in that it includes a clock distribution network, or clock tree, that distributes the secondary clock signal to various blocks of the NNU 121, which are indicated as clock signal 3508-1 to the array of NPUs 126, clock signal 3508-2 to the sequencer 128 and clock signal 3508-3 to the interface logic 3514, and which are referred to collectively or individually as secondary clock signal 3508. Preferably, the NPUs 126 include a plurality of pipeline stages 3401, as described with respect to FIG. 34, that include pipeline staging registers that receive the secondary clock signal 3508-1 from the clock reduction logic 3504.

The NNU 121 also includes interface logic 3514 that receives the primary clock signal 3506-7 and secondary clock signal 3508-3. The interface logic 3514 is coupled between the lower portions of the front end of the processor 100 (e.g., the reservation stations 108, media registers 118, and general purpose registers 116) and the various blocks of the NNU 121, namely the clock reduction logic 3504, the data RAM 122, the weight RAM 124, the program memory 129 and the sequencer 128. The interface logic 3514 includes a data RAM buffer 3522, a weight RAM buffer 3524, the decoder 3404 of FIG. 34 and the relax indicator 3512. The relax indicator 3512 holds a value that specifies how much slower, if any, the array of NPUs 126 will execute NNU program instructions. Preferably, the relax indicator 3512 specifies a divisor value, N, by which the clock reduction logic 3504 divides the primary clock signal 3506-7 to generate the secondary clock signal 3508 such that the secondary clock signal 3508 has a rate that is 1/N. Preferably, the value of N may be programmed to any one of a plurality of different predetermined values to cause the clock reduction logic 3504 to generate the secondary clock signal 3508 at a corresponding plurality of different rates that are less than the primary clock rate.

In one embodiment, the clock reduction logic 3504 comprises a clock divider circuit to divide the primary clock signal 3506-7 by the relax indicator 3512 value. In one embodiment, the clock reduction logic 3504 comprises clock gates (e.g., AND gates) that gate the primary clock signal 3506-7 with an enable signal that is true once only every N cycles of the primary clock signal 3506-7. For example, a circuit that includes a counter that counts up to N may be used to generate the enable signal. When accompanying logic detects the output of the counter matches N, the logic generates a true pulse on the secondary clock signal 3508 and resets the counter. Preferably the relax indicator 3512 value is programmable by an architectural instruction, such as an MTNN 1400 instruction of FIG. 14. Preferably, the architectural program running on the processor 100 programs the relax value into the relax indicator 3512 just prior to instructing the NNU 121 to start running the NNU program, as described in more detail with respect to FIG. 37.

The weight RAM buffer 3524 is coupled between the weight RAM 124 and media registers 118 for buffering transfers of data between them. Preferably, the weight RAM buffer 3524 is similar to one or more of the embodiments of the buffer 1704 of FIG. 17. Preferably, the portion of the weight RAM buffer 3524 that receives data from the media registers 118 is clocked by the primary clock signal 3506-7 at the primary clock rate and the portion of the weight RAM buffer 3524 that receives data from the weight RAM 124 is clocked by the secondary clock signal 3508-3 at the secondary clock rate, which may or may not be reduced relative to the primary clock rate depending upon the value programmed into the relax indicator 3512, i.e., depending upon whether the NNU 121 is operating in relaxed or normal mode. In one embodiment, the weight RAM 124 is single-ported, as described above with respect to FIG. 17, and is accessible both by the media registers 118 via the weight RAM buffer 3524 and by the NPUs 126 or the row buffer 1104 of FIG. 11 in an arbitrated fashion. In an alternate embodiment, the weight RAM 124 is dual-ported, as described above with respect to FIG. 16, and each port is accessible both by the media registers 118 via the weight RAM buffer 3524 and by the NPUs 126 or the row buffer 1104 in a concurrent fashion.

Similarly, the data RAM buffer 3522 is coupled between the data RAM 122 and media registers 118 for buffering transfers of data between them. Preferably, the data RAM buffer 3522 is similar to one or more of the embodiments of the buffer 1704 of FIG. 17. Preferably, the portion of the data RAM buffer 3522 that receives data from the media registers 118 is clocked by the primary clock signal 3506-7 at the primary clock rate and the portion of the data RAM buffer 3522 that receives data from the data RAM 122 is clocked by the secondary clock signal 3508-3 at the secondary clock rate, which may or may not be reduced relative to the primary clock rate depending upon the value programmed into the relax indicator 3512, i.e., depending upon whether the NNU 121 is operating in relaxed or normal mode. In one embodiment, the data RAM 122 is single-ported, as described above with respect to FIG. 17, and is accessible both by the media registers 118 via the data RAM buffer 3522 and by the NPUs 126 or the row buffer 1104 of FIG. 11 in an arbitrated fashion. In an alternate embodiment, the data RAM 122 is dual-ported, as described above with respect to FIG. 16, and each port is accessible both by the media registers 118 via the data RAM buffer 3522 and by the NPUs 126 or the row buffer 1104 in a concurrent fashion.

Preferably, the interface logic 3514 includes the data RAM buffer 3522 and weight RAM buffer 3524, regardless of whether the data RAM 122 and/or weight RAM 124 are single-ported or dual-ported, in order to provide synchronization between the primary clock domain and the secondary clock domain. Preferably, each of the data RAM 122, weight RAM 124 and program memory 129 comprises a static RAM (SRAM) that includes a respective read enable, write enable and memory select signal.

As described above, the NNU 121 is an execution unit of the processor 100. An execution unit is a functional unit of a processor that executes microinstructions into which architectural instructions are translated, such as the microinstructions 105 into which the architectural instructions 103 of FIG. 1 are translated, or that executes architectural instructions 103 themselves. An execution unit receives operands from general purpose registers of the processor, such as GPRs 116 and media registers 118. An execution unit generates results in response to executing microinstructions or architectural instructions that may be written to the general purpose registers. Examples of the architectural instructions 103 are the MTNN instruction 1400 and the MFNN instruction 1500 described with respect to FIGS. 14 and 15, respectively. The microinstructions implement the architectural instructions. More specifically, the collective execution by the execution unit of the one or more microinstructions into which an architectural instruction is translated performs the operation specified by the architectural instruction on inputs specified by the architectural instruction to produce a result defined by the architectural instruction.

Figure 36A:
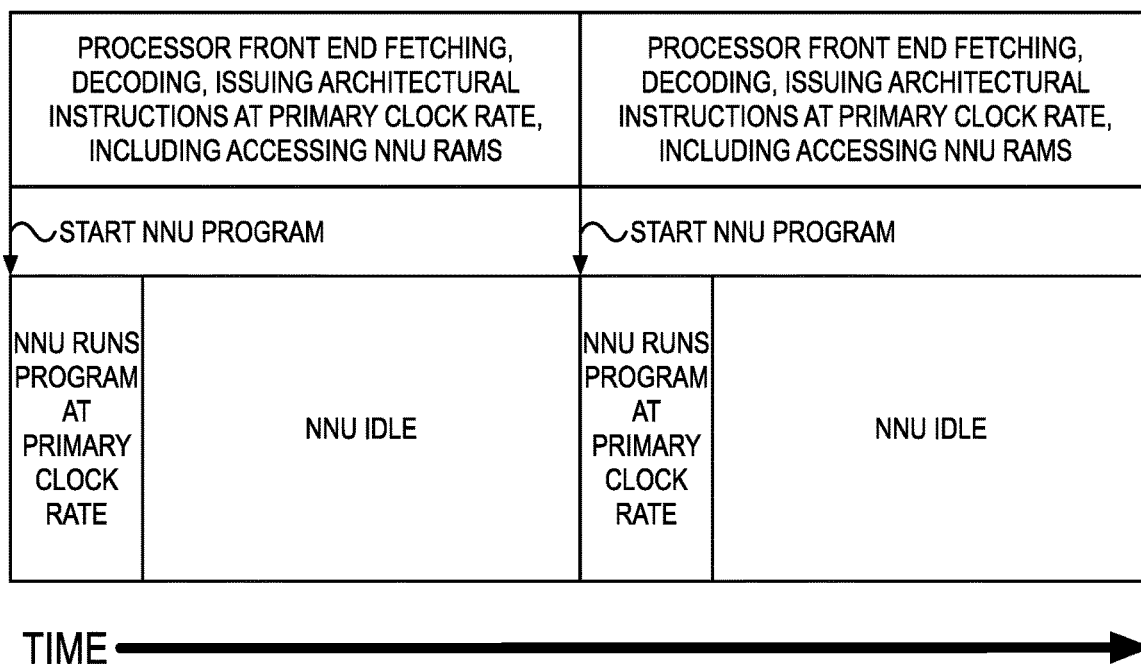
FIG. 36A is a timing diagram illustrating an example of operation of the processor with the NNU operating in normal mode, i.e., at the primary clock rate.

Referring now to FIG. 36A, a timing diagram illustrating an example of operation of the processor 100 with the NNU 121 operating in normal mode, i.e., at the primary clock rate, is shown. Time progresses from left to right in the timing diagram. The processor 100 is running an architectural program at the primary clock rate. More specifically, the processor 100 front end (e.g., instruction fetch unit 101, instruction cache 102, instruction translator 104, rename unit 106, reservation stations 108) fetches, decodes and issues architectural instructions to the NNU 121 and other execution units 112 at the primary clock rate.

Initially, the architectural program executes an architectural instruction (e.g., MTNN instruction 1400) that the front end 100 issues to the NNU 121 that instructs the NNU 121 to start running an NNU program in its program memory 129. Prior, the architectural program executed an architectural instruction to write the relax indicator 3512 with a value that specifies the primary clock rate, i.e., to put the NNU 121 in normal mode. More specifically, the value programmed into the relax indicator 3512 causes the clock reduction logic 3504 to generate the secondary clock signal 3508 at the primary clock rate of the primary clock signal 3506. Preferably, in this case clock buffers of the clock reduction logic 3504 simply boost the primary clock signal 3506. Additionally prior, the architectural program executed architectural instructions to write to the data RAM 122 and the weight RAM 124 and to write the NNU program into the program memory 129. In response to the start NNU program MTNN instruction 1400, the NNU 121 starts running the NNU program at the primary clock rate, since the relax indicator 3512 was programmed with the primary rate value. After starting the NNU 121 running, the architectural program continues executing architectural instructions at the primary clock rate, including and predominately MTNN instructions 1400 to write and/or read the data RAM 122 and weight RAM 124 in preparation for the next instance, or invocation or run, of an NNU program.

As shown in the example in FIG. 36A, the NNU 121 finishes running the NNU program in significantly less time (e.g., one-fourth the time) than the architectural program takes to finish writing/reading the data RAM 122 and weight RAM 124. For example, the NNU 121 may take approximately 1000 clock cycles to run the NNU program, whereas the architectural program takes approximately 4000 clock cycles to run, both at the primary clock rate. Consequently, the NNU 121 sits idle the remainder of the time, which is a significantly long time in the example, e.g., approximately 3000 primary clock rate cycles. As shown in the example in FIG. 36A, this pattern continues another time, and may continue for several more times, depending upon the size and configuration of the neural network. Because the NNU 121 may be a relatively large and transistor-dense functional unit of the processor 100, it may generate a significant amount of heat, particularly when running at the primary clock rate.

Figure 36B:
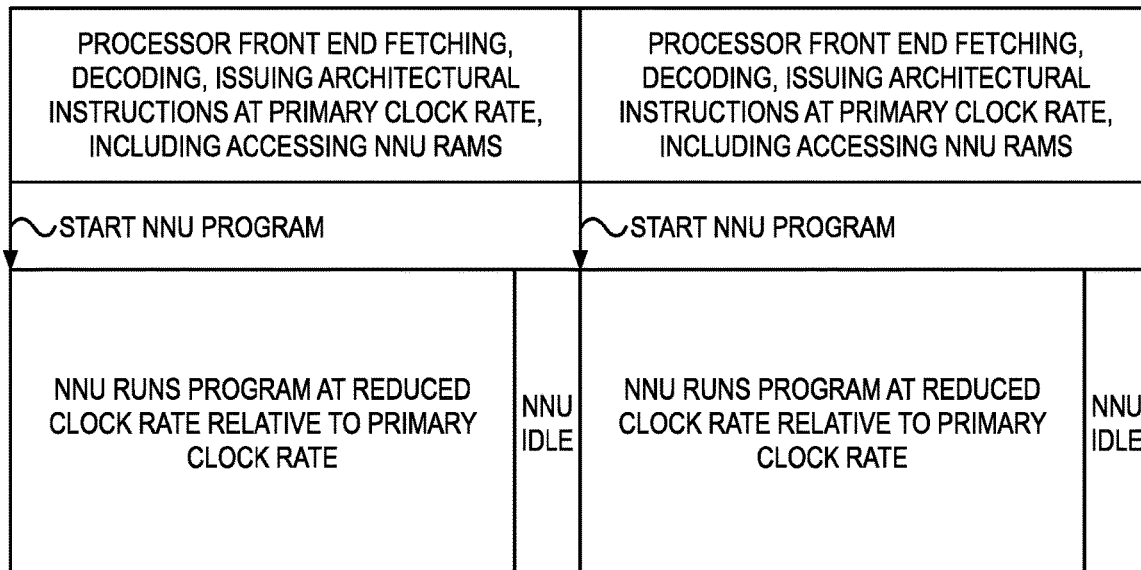
FIG. 36B is a timing diagram illustrating an example of operation of the processor with the NNU operating in relaxed mode, i.e., at a rate that is less than the primary clock rate.

Referring now to FIG. 36B, a timing diagram illustrating an example of operation of the processor 100 with the NNU 121 operating in relaxed mode, i.e., at a rate that is less than the primary clock rate, is shown. The timing diagram of FIG. 36B is similar in many respects to the timing diagram of FIG. 36A in that the processor 100 is running an architectural program at the primary clock rate. And it is assumed in the example that the architectural program and the NNU program of FIG. 36B are the same as those of FIG. 36A. However, prior to starting the NNU program, the architectural program executed an MTNN instruction 1400 that programmed the relax indicator 3512 with a value that causes the clock reduction logic 3504 to generate the secondary clock signal 3508 at a secondary clock rate that is less than the primary clock rate. That is, the architectural program puts the NNU 121 in relaxed mode in FIG. 36B rather than in normal mode as in FIG. 36A. Consequently, the NPUs 126 execute the NNU program at the secondary clock rate, which in the relaxed mode is less than the primary clock rate. In the example, assume the relax indicator 3512 is programmed with a value that specifies the secondary clock rate is one-fourth the primary clock rate. As a result, the NNU 121 takes approximately four times longer to run the NNU program in relaxed mode than it does to run the NNU program in normal mode, as may be seen by comparing FIGS. 36A and 36B, making the amount of time the NNU 121 is idle relatively short. Consequently, the energy used to run the NNU program is consumed by the NNU 121 in FIG. 36B over a period that is approximately four times longer than when the NNU 121 ran the program in normal mode in FIG. 36A. Accordingly, the NNU 121 generates heat to run the NNU program at approximately one-fourth the rate in FIG. 36B as in FIG. 36A, which may have thermal benefits as described herein.

Figure 37:
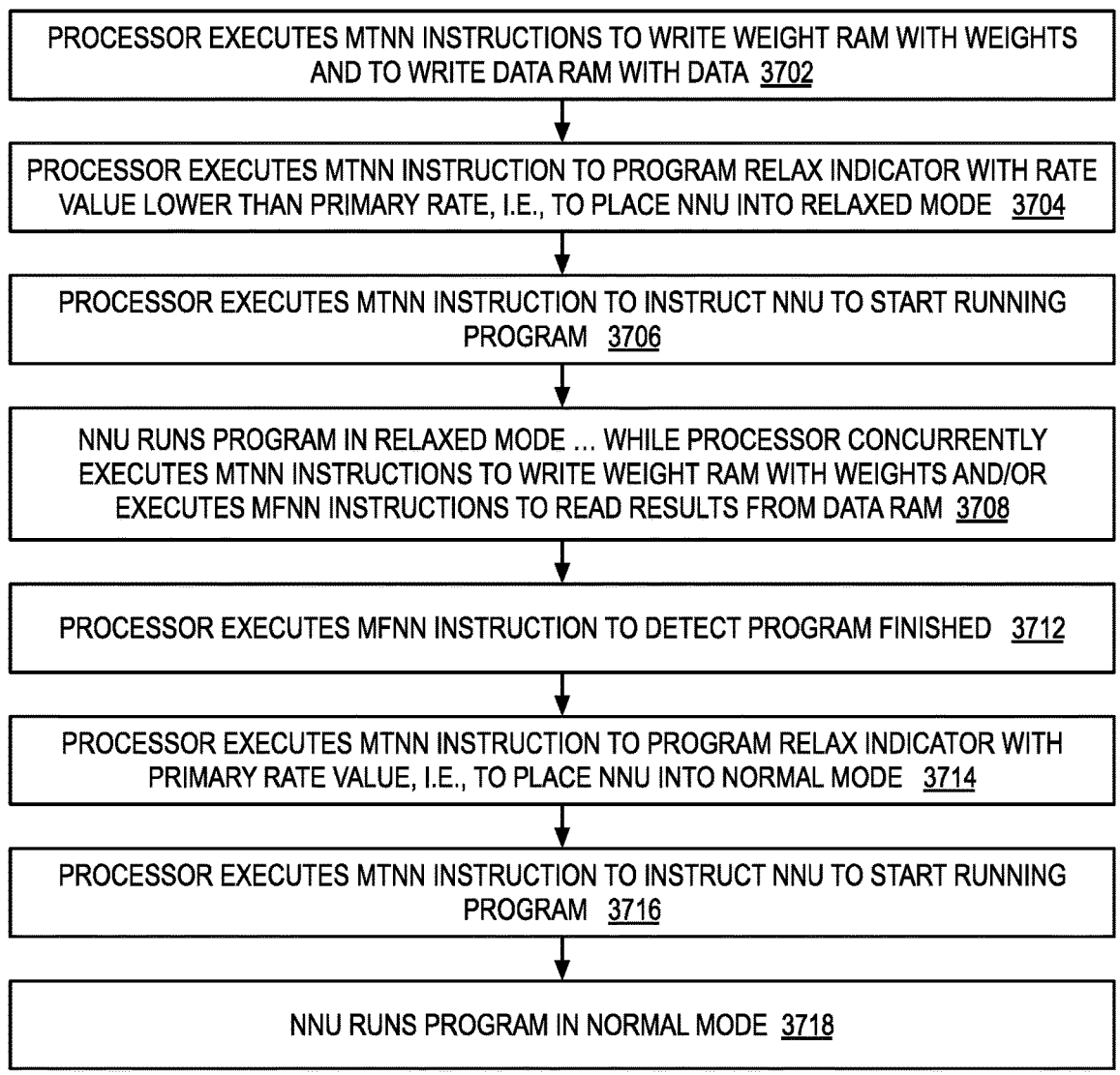
FIG. 37 is a flowchart illustrating operation of the processor of FIG. 35.

Referring now to FIG. 37, a flowchart illustrating operation of the processor 100 of FIG. 35 is shown. The flowchart illustrates operation in many respects similar to the operation described above with respect to FIGS. 35, 36A and 36B. Flow begins at block 3702.

At block 3702, the processor 100 executes MTNN instructions 1400 to write the weight RAM 124 with weights and to write the data RAM 122 with data. Flow proceeds to block 3704.

At block 3704, the processor 100 executes an MTNN instruction 1400 to program the relax indicator 3512 with a value that specifies a lower rate than the primary clock rate, i.e., to place the NNU 121 into relaxed mode. Flow proceeds to block 3706.

At block 3706, the processor 100 executes an MTNN instruction 1400 to instruct the NNU 121 to start running an NNU program, similar to the manner visualized in FIG. 36B. Flow proceeds to block 3708.

At block 3708, the NNU 121 begins to run the NNU program. In parallel, the processor 100 executes MTNN instructions 1400 to write the weight RAM 124 with new weights (and potentially the data RAM 122 with new data) and/or executes MFNN instructions 1500 to read results from the data RAM 122 (and potentially from the weight RAM 124). Flow proceeds to block 3712.

At block 3712, the processor 100 executes a MFNN instruction 1500 (e.g., read the status register 127) to detect that the NNU 121 is finished running its program. Assuming the architectural program selected a good value of the relax indicator 3512, it should take the NNU 121 about the same amount of time to run the NNU program as it takes the processor 100 to execute the portion of the architectural program that accesses the weight RAM 124 and/or data RAM 122, as visualized in FIG. 36B. Flow proceeds to block 3714.

At block 3714, the processor 100 executes an MTNN instruction 1400 to program the relax indicator 3512 with a value that specifies the primary clock rate, i.e., to place the NNU 121 into normal mode. Flow proceeds to block 3716.

At block 3716, the processor 100 executes an MTNN instruction 1400 to instruct the NNU 121 to start running an NNU program, similar to the manner visualized in FIG. 36A. Flow proceeds to block 3718.

At block 3718, the NNU 121 begins to run the NNU program in normal mode. Flow ends at block 3718.

As described above, running the NNU program in relaxed made spreads out the time over which the NNU runs the program relative to the time over which the NNU runs the program in normal mode (i.e., at the primary clock rate of the processor), which may provide thermal benefits. More specifically, the devices (e.g., transistors, capacitors, wires) will likely operate at lower temperatures while the NNU runs the program in relaxed mode because the NNU generates at a slower rate the heat that is dissipated by the NNU (e.g., the semiconductor devices, metal layers, underlying substrate) and surrounding package and cooling solution (e.g., heat sink, fan). This may also lower the temperature of the devices in other portions of the processor die in general. The lower operating temperature of the devices, in particular their junction temperatures, may have the benefit of less leakage current. Furthermore, since the amount of current drawn per unit time is less, the inductive noise and IR drop noise may be reduced. Still further, the lower temperature may have a positive effect on the negative-bias temperature instability (NBTI) and positive-bias temperature instability (PBTI) of MOSFETs of the processor, thereby increasing the reliability and/or lifetime of the devices and consequently the processor part. The lower temperature may also reduce Joule heating and electromigration in metal layers of the processor.

Communication Mechanism Between Architectural Program and Non-Architectural Program Regarding Shared Resources of NNU As described above, for example with respect to FIGS. 24 through 28 and 35 through 37, the data RAM 122 and weight RAM 124 are shared resources. Both the NPUs 126 and the front-end of the processor 100 share the data RAM 122 and weight RAM 124. More specifically, both the NPUs 126 and the front-end of the processor 100, e.g., the media registers 118, write and read the data RAM 122 and the weight RAM 124. Stated alternatively, the architectural program running on the processor 100 shares the data RAM 122 and weight RAM 124 with the NNU program running on the NNU 121, and in some situations this requires the control of flow between the architectural program and the NNU program, as described above. This resource sharing is also true of the program memory 129 to some extent because the architectural program writes it and the sequencer 128 reads it. Embodiments are described above and below that provide a high performance solution to control the flow of access to the shared resources between the architectural program and the NNU program.

Embodiments are described in which the NNU programs are also referred to as non-architectural programs, the NNU instructions are also referred to as non-architectural instructions, and the NNU instruction set (also referred to above as the NPU instruction set) is also referred to as the non-architectural instruction set. The non-architectural instruction set is distinct from the architectural instruction set. In embodiments in which the processor 100 includes an instruction translator 104 that translates architectural instructions into microinstructions, the non-architectural instruction set is also distinct from the microinstruction set.

Figures 38, 39:
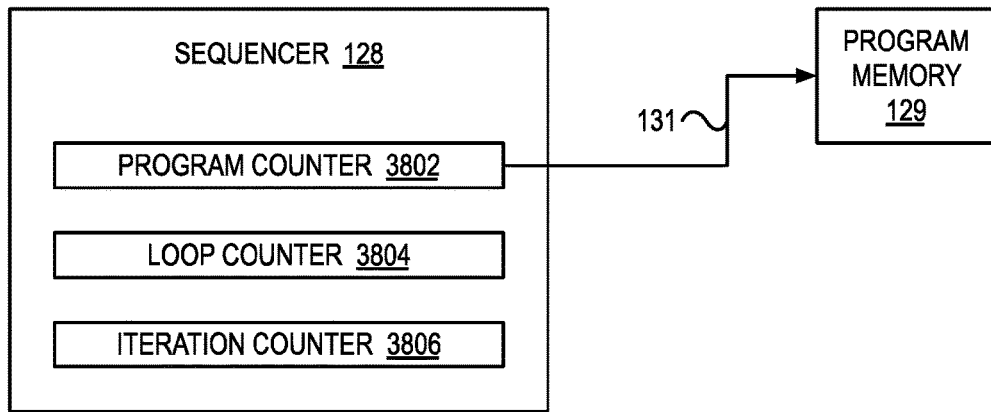
FIG. 38 is a block diagram illustrating the sequence of the NNU in more detail.
FIG. 39 is a block diagram illustrating certain fields of the control and status register of the NNU.

Referring now to FIG. 38, a block diagram illustrating the sequencer 128 of the NNU 121 in more detail is shown. The sequencer 128 provides the memory address 131 to the program memory 129 to select a non-architectural instruction that is provided to the sequencer 128, as described above. The memory address 131 is held in a program counter 3802 of the sequencer 128 as shown in FIG. 38. The sequencer 128 generally increments through sequential addresses of the program memory 129 unless the sequencer 128 encounters a non-architectural control instruction, such as a loop or branch instruction, in which case the sequencer 128 updates the program counter 3802 to the target address of the control instruction, i.e., to the address of the non-architectural instruction at the target of the control instruction. Thus, the address 131 held in the program counter 3802 specifies the address in the program memory 129 of the non-architectural instruction of the non-architectural program currently being fetched for execution by the NPUs 126. Advantageously, the value of the program counter 3802 may be obtained by the architectural program via the NNU program counter field 3912 of the status register 127, as described below with respect to FIG. 39. This enables the architectural program to make decisions about where to read/write data from/to the data RAM 122 and/or weight RAM 124 based on the progress of the non-architectural program.

The sequencer 128 also includes a loop counter 3804 that is used in conjunction with a non-architectural loop instruction, such as the loop to 1 instruction at address 10 of FIG. 26A and the loop to 1 instruction at address 11 of FIG. 28, for examples. In the examples of FIGS. 26A and 28, the loop counter 3804 is loaded with a value specified in the non-architectural initialize instruction at address 0, e.g., with a value of 400. Each time the sequencer 128 encounters the loop instruction and jumps to the target instruction (e.g., the multiply-accumulate instruction at address 1 of FIG. 26A or the maxwacc instruction at address 1 of FIG. 28), the sequencer 128 decrements the loop counter 3804. Once the loop counter 3804 reaches zero, the sequencer 128 proceeds to the next sequential non-architectural instruction. In an alternate embodiment, when a loop instruction is first encountered, the loop counter 3804 is loaded with a loop count value specified in the loop instruction, obviating the need for initialization of the loop counter 3804 via a non-architectural initialize instruction. Thus, the value of the loop counter 3804 indicates how many more times a loop body of the non-architectural program will be executed. Advantageously, the value of the loop counter 3804 may be obtained by the architectural program via the loop count 3914 field of the status register 127, as described below with respect to FIG. 39. This enables the architectural program to make decisions about where to read/write data from/to the data RAM 122 and/or weight RAM 124 based on the progress of the non-architectural program. In one embodiment, the sequencer 128 includes three additional loop counters to accommodate nested loops in the non-architectural program, and the values of the other three loop counters are also readable via the status register 127. A bit in the loop instruction indicates which of the four loop counters is used for the instant loop instruction.

The sequencer 128 also includes an iteration counter 3806. The iteration counter 3806 is used in conjunction with non-architectural instructions such as the multiply-accumulate instruction at address 2 of FIGS. 4, 9, 20 and 26A, and the maxwacc instruction at address 2 of FIG. 28, for examples, which will be referred to hereafter as "execute" instructions. In the examples above, each of the execute instructions specifies an iteration count of 511, 511, 1023, 2, and 3, respectively. When the sequencer 128 encounters an execute instruction that specifies a non-zero iteration count, the sequencer 128 loads the iteration counter 3806 with the specified value. Additionally, the sequencer 128 generates an appropriate micro-operation 3418 to control the logic in the NPU 126 pipeline stages 3401 of FIG. 34 for execution and decrements the iteration counter 3806. If the iteration counter 3806 is greater than zero, the sequencer 128 again generates an appropriate micro-operation 3418 to control the logic in the NPUs 126 and decrements the iteration counter 3806. The sequencer 128 continues in this fashion until the iteration counter 3806 reaches zero. Thus, the value of the iteration counter 3806 indicates how many more times the operation specified in the non-architectural execute instruction (e.g., multiply-accumulate, maximum, sum of the accumulator and a data/weight word) will be performed. Advantageously, the value of the iteration counter 3806 may be obtained by the architectural program via the iteration count 3916 field of the status register 127, as described below with respect to FIG. 39. This enables the architectural program to make decisions about where to read/write data from/to the data RAM 122 and/or weight RAM 124 based on the progress of the non-architectural program.

Referring now to FIG. 39, a block diagram illustrating certain fields of the control and status register 127 of the NNU 121 is shown. The fields include the address of the most recently written weight RAM row 2602 by the NPUs 126 executing the non-architectural program, the address of the most recently read weight RAM row 2604 by the NPUs 126 executing the non-architectural program, the address of the most recently written data RAM row 2606 by the NPUs 126 executing the non-architectural program, and the address of the most recently read data RAM row 2604 by the NPUs 126 executing the non-architectural program, which are described above with respect to FIG. 26B. Additionally, the fields include an NNU program counter 3912, a loop count 3914 and an iteration count 3916. As described above, the status register 127 is readable by the architectural program into the media registers 118 and/or general purpose registers 116, e.g., by MFNN instructions 1500, including the NNU program counter 3912, loop count 3914 and iteration count 3916 field values. The program counter 3912 value reflects the value of the program counter 3802 of FIG. 38. The loop count 3914 value reflects the value of the loop counter 3804. The iteration count 3916 value reflects the value of the iteration counter 3806. In one embodiment, the sequencer 128 updates the program counter 3912, loop count 3914 and iteration count 3916 field values each time it modifies the program counter 3802, loop counter 3804, or iteration counter 3806 so that the field values are current when the architectural program reads them. In another embodiment, when the NNU 121 executes an architectural instruction that reads the status register 127, the NNU 121 simply obtains the program counter 3802, loop counter 3804, and iteration counter 3806 values and provides them back to the architectural instruction (e.g., into a media register 118 or general purpose register 116).

As may be observed from the forgoing, the values of the fields of the status register 127 of FIG. 39 may be characterized as information that indicates progress made by the non-architectural program during its execution by the NNU 121. Specific aspects of the non-architectural program's progress have been described above, such as the program counter 3802 value, the loop counter 3804 value, the iteration counter 3806 value, the weight RAM 124 address 125 most recently written/read 2602/2604, and the data RAM 122 address 123 most recently written/read 2606/2608. The architectural program executing on the processor 100 may read the non-architectural program progress values of FIG. 39 from the status register 127 and use the information to make decisions, e.g., by architectural instructions, such as compare and branch instructions. For example, the architectural program decides which rows to write/read data/weights into/from the data RAM 122 and/or weight RAM 124 to control the flow of data in and out of the data RAM 122 or weight RAM 124, particularly for large data sets and/or for overlapping execution instances of different non-architectural programs. Examples of the decisions made by the architectural program are described above and below.

For example, as described above with respect to FIG. 26A, the architectural program configures the non-architectural program to write back the results of the convolutions to rows of the data RAM 122 above the convolution kernel 2402 (e.g., above row 8), and the architectural program reads the results from the data RAM 122 as the NNU 121 writes them by using the address of the most recently written data RAM 122 row 2606.

For another example, as described above with respect to FIG. 26B, the architectural program uses the information from the status register 127 fields of FIG. 38 to determine the progress of a non-architectural program to perform a convolution of the data array 2404 of FIG. 24 in 5 chunks of 512×1600. The architectural program writes a first 512×1600 chunk of the 2560×1600 data array 2404 into the weight RAM 124 and starts the non-architectural program, which has a loop count of 1600 and an initialized weight RAM 124 output row of 0. As the NNU 121 executes the non-architectural program, the architectural program reads the status register 127 to determine the most recently written weight RAM row 2602 so that it may read the valid convolution results written by the non-architectural program and write the next 512×1600 chunk over the valid convolution results after the architectural program has read them, so that when the NNU 121 completes the non-architectural program on the first 512×1600 chunk, the processor 100 can immediately update the non-architectural program as needed and start it again to process the next 512×1600 chunk.

For another example, assume the architectural program is having the NNU 121 perform a series of classic neural network multiply-accumulate-activation function operations in which the weights are stored in the weight RAM 124 and the results are written back to the data RAM 122. In this case, once the non-architectural program has read a row of the weight RAM 124 it will not be reading it again. So, the architectural program may be configured to begin overwriting the weights in the weight RAM 124 with new weights for a next execution instance of a non-architectural program (e.g., for a next neural network layer) once the current weights have been read/used by the non-architectural program. In this case, the architectural program reads the status register 127 to obtain the address of the most recently read weight ram row 2604 to decide where it may write the new set of weights into the weight RAM 124.

For another example, assume the architectural program knows that the non-architectural program includes an execute instruction with a large iteration count, such as the non-architectural multiply-accumulate instruction at address 2 of FIG. 20. In such cases, the architectural program may need to know the iteration count 3916 in order to know approximately how many more clock cycles it will take to complete the non-architectural instruction so that the architectural program can decide which of two or more actions to take. For example, the architectural program may relinquish control to another architectural program, such as the operating system, if the time is long. Similarly, assume the architectural program knows that the non-architectural program includes a loop body with a relatively large loop count, such as the non-architectural program of FIG. 28. In such cases, the architectural program may need to know the loop count 3914 in order to know approximately how many more clock cycles it will take to complete the non-architectural program so that the architectural program can decide which of two or more actions to take.

For another example, assume the architectural program is having the NNU 121 perform a pooling operation similar to that described with respect to FIGS. 27 and 28 in which the data to be pooled is stored in the weight RAM 124 and the results are written back to the weight RAM 124. However, assume that, unlike the example of FIGS. 27 and 28, the results are written back to the top 400 rows of the weight RAM 124, e.g., rows 1600 to 1999. In this case, once the non-architectural program has read four rows of the weight RAM 124 that it pools, it will not be reading it again. So, the architectural program may be configured to begin overwriting the data in the weight RAM 124 with new data (e.g., weights for a next execution instance of a non-architectural program, e.g., to perform classic multiply-accumulate-activation function operations on the pooled data) once the current four rows have been read/used by the non-architectural program. In this case, the architectural program reads the status register 127 to obtain the address of the most recently read weight ram row 2604 to decide where it may write the new set of weights into the weight RAM 124.

Recurrent Neural Network Acceleration

A traditional feed-forward neural network includes no memory of previous inputs to the network. Feed-forward neural network are generally used to perform tasks in which the various inputs to the network over time are independent of one another, as are the outputs. In contrast, recurrent neural networks (RNN) are generally helpful to perform tasks in which there is significance to the sequence of the inputs to the network over time. (The sequence is commonly referred to as time steps.) Consequently, RNNs include a notion of memory, or internal state, that holds information based on calculations made by the network in response to previous inputs in the sequence, and the output of the RNN is dependent upon the internal state as well as the input of the next time step. Speech recognition, language modeling, text generation, language translation, image description generation, and certain forms of handwriting recognition are examples of tasks that tend to be performed well by RNNs.

Three well-known examples are Elman RNNs, Jordan RNNs and Long Short Term Memory (LSTM) networks. An Elman RNN includes context nodes that remember the state of a hidden layer of the RNN for a current time step, which is provided as an input to the hidden layer for the next time step. Jordan RNNs are similar, except the context nodes remember the state of the output layer of the RNN rather than the hidden layer. LSTM networks include an LSTM layer of LSTM cells. Each LSTM cell has a current state and a current output of a current time step and a new state and a new output of a new, or next, time step. The LSTM cell includes an input gate and an output gate, as well as a forget gate that enables the cell to forget its remembered state. These three types of RNNs are described in more detail below.

In the context of the present disclosure, with respect to a recurrent neural network (RNN) such as an Elman or Jordan RNN, the NNU performs a time step each instance in which it takes a set of input layer node values and performs the computations necessary to propagate them through the RNN to generate the output layer node values, as well as the hidden layer and context layer node values. Thus, input layer node values are associated with the time step in which they are used to compute hidden, output and context layer node values; and the hidden, output and context layer node values are associated with the time step in which they are generated. Input layer node values are sampled values of the system being modeled by the RNN, e.g., an image, a speech sample, a snapshot of financial market data. With respect to an LSTM network, the NNU performs a time step each instance in which it takes a set of memory cell input values and performs the computations necessary to generate the memory cell output values (as well as the cell state and input gate, forget gate and output gate values), which may also be referred to as propagating the cell input values through the LSTM layer cells. Thus, cell input values are associated with the time step in which they are used to compute the cell state and input gate, forget gate and output gate values; and the cell state and input gate, forget gate and output gate values are associated with the time step in which they are generated.

A context layer node value, also referred to as a state node, is state of the neural network, and the state is based on the input layer node values associated with previous time steps, not just the input layer node value associated with the current time step. The computations performed by the NNU for a time step (e.g., the hidden layer node value computations for an Elman or Jordan RNN) are a function of the context layer node values generated in the previous time step. Therefore, the state of the network (context node values) at the beginning of a time step influences the output layer node values generated during the time step. Furthermore, the state of the network at the end of the time step is affected by both the input node values of the time step and the state of the network at the beginning of the time step. Similarly, with respect to an LSTM cell, a cell state value is based on the memory cell input values associated with previous time steps, not just the memory cell input value associated with the current time step. Because the computations performed by the NNU for a time step (e.g., the next cell state) are a function of the cell state values generated in the previous time step, the state of the network (cell state values) at the beginning of the time step influences the cell output values generated during the time step, and the state of the network at the end of the time step is affected by both the cell input values of the time step and the previous state of the network.

Figure 40:
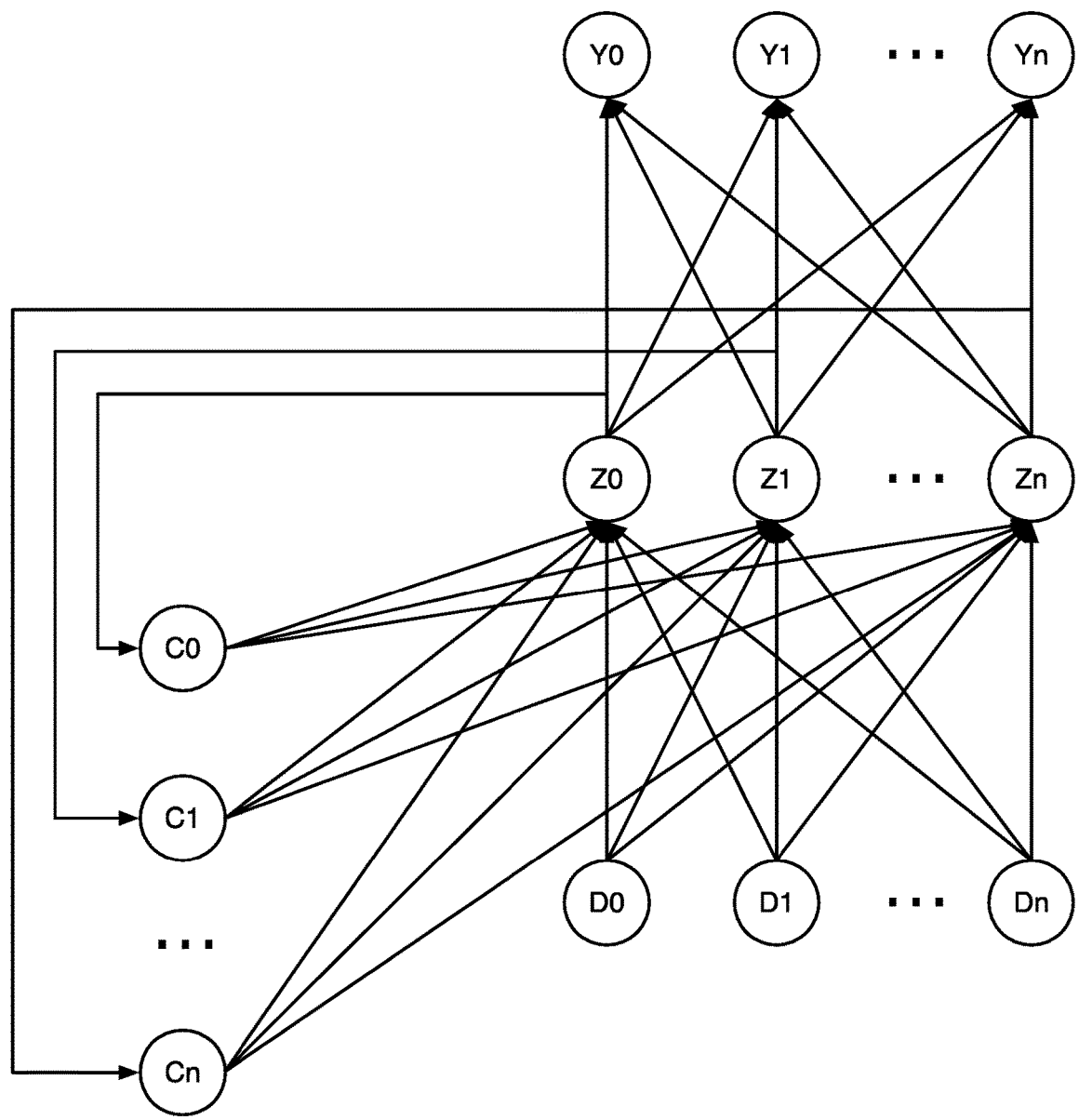
FIG. 40 is a block diagram illustrating an example of an Elman RNN.

Referring now to FIG. 40, a block diagram illustrating an example of an Elman RNN is shown. The Elman RNN of FIG. 40 includes input layer nodes, or neurons, denoted D0, D1 through Dn, referred to collectively as input layer nodes D and individually generically as input layer node D; hidden layer nodes/neurons denoted Z0, Z1 through Zn, referred to collectively as hidden layer nodes Z and individually generically as hidden layer node Z; output layer nodes/neurons denoted Y0, Y1 through Yn, referred to collectively as output layer nodes Y and individually generically as output layer node Y; and context layer nodes/neurons denoted C0, C1 through Cn, referred to collectively as context layer nodes C and individually generically as context layer node C. In the example Elman RNN of FIG. 40, each of the hidden layer nodes Z has an input connection with the output of each of the input layer nodes D and has an input connection with the output of each of the context layer nodes C; each of the output layer nodes Y has an input connection with the output of each of the hidden layer nodes Z; and each of the context layer nodes C has an input connection with the output of a corresponding hidden layer node Z.

In many ways, the Elman RNN operates similarly to a traditional feed-forward artificial neural network. That is, for a given node, there is a weight associated with each input connection to the node; the value received by the node on an input connection is multiplied by its associated weight to generate a product; the node adds the products associated with all of the input connections to generate a sum (there may also be a bias term included in the sum); typically, an activation function is performed on the sum to generate an output value of the node, sometimes referred to as the node's activation. For a traditional feed forward network, the data always flow in one direction: from the input layer to the output layer. That is, the input layer provides a value to the hidden layer (typically multiple hidden layers), which generates its output value that is provided to the output layer, which generates an output that may be captured.

However, in contrast to a traditional feed-forward network, the Elman RNN includes some connections that feed backward, namely the connections from the hidden layer nodes Z to the context layer nodes C of FIG. 40. The Elman RNN operates such that when the input layer nodes D provide an input value to the hidden layer nodes Z in a new time step, the context nodes C provide a value to the hidden layer Z that was the output value of the hidden layer nodes Z in response to the previous input, referred to as the current time step. In this sense, the context nodes C of the Elman RNN are a memory based on the input values of previous time steps. Operation of embodiments of the NNU 121 to perform computations associated with the Elman RNN of FIG. 40 will now be described with respect to FIGS. 41 and 42.

For purposes of the present disclosure, an Elman RNN is a recurrent neural network comprising at least an input node layer, a hidden node layer, an output node layer, and a context node layer. For a given time step, the context node layer stores results fed back by the hidden node layer to the context node layer that the hidden node layer generated in the previous time step. The results fed back to the context layer may be the results of an activation function or they may be results of the accumulations performed by the hidden node layer without performance of an activation function.

Referring now to FIG. 41, a block diagram illustrating an example of the layout of data within the data RAM 122 and weight RAM 124 of the NNU 121 as it performs calculations associated with the Elman RNN of FIG. 40 is shown. In the example of FIG. 41, the Elman RNN of FIG. 40 is assumed to have 512 input nodes D, 512 hidden nodes Z, 512 context nodes C, and 512 output nodes Y. Furthermore, it is assumed the Elman RNN is fully connected, i.e., all 512 input nodes D are connected as inputs to each of the hidden nodes Z, all 512 context nodes C are connected as inputs to each of the hidden nodes Z, and all 512 hidden nodes Z are connected as inputs to each of the output nodes Y. Additionally, the NNU 121 is configured as 512 NPUs 126, or neurons, e.g., in a wide configuration. Finally, it is assumed that the weights associated with the connections from the context nodes C to the hidden nodes Z all have a value of 1; consequently, there is no need to store these unitary weight values.

The lower 512 rows of the weight RAM 124 (rows 0 through 511) hold the weight values associated with the connections between the input nodes D and the hidden nodes Z, as shown. More specifically, as shown, row 0 holds the weights associated with the input connections to the hidden nodes Z from input node D0, i.e., word 0 holds the weight associated with the connection between input node D0 and hidden node Z0, word 1 holds the weight associated with the connection between input node D0 and hidden node Z1, word 2 holds the weight associated with the connection between input node D0 and hidden node Z2, and so forth to word 511 holds the weight associated with the connection between input node D0 and hidden node Z511; row 1 holds the weights associated with the input connections to the hidden nodes Z from input node D1, i.e., word 0 holds the weight associated with the connection between input node D1 and hidden node Z0, word 1 holds the weight associated with the connection between input node D1 and hidden node Z1, word 2 holds the weight associated with the connection between input node D1 and hidden node Z2, and so forth to word 511 holds the weight associated with the connection between input node D1 and hidden node Z511; through row 511 holds the weights associated with the input connections to the hidden nodes Z from input node D511, i.e., word 0 holds the weight associated with the connection between input node D511 and hidden node Z0, word 1 holds the weight associated with the connection between input node D511 and hidden node Z1, word 2 holds the weight associated with the connection between input node D511 and hidden node Z2, and so forth to word 511 holds the weight associated with the connection between input node D511 and hidden node Z511. This is similar to the layout and use described above with respect to FIGS. 4 through 6A.

In a similar fashion, the next 512 rows of the weight RAM 124 (rows 512 through 1023) hold the weight values associated with the connections between the hidden nodes Z and the output nodes Y, as shown.

The data RAM 122 holds the Elman RNN node values for a sequence of time steps. More specifically, a triplet of three rows holds the node values for a given time step. In an embodiment in which the data RAM 122 has 64 rows, the data RAM 122 can hold the node values for 20 different time steps, as shown. In the example of FIG. 41, rows 0 through 2 hold the node values for time step 0, rows 3 through 5 hold the node values for time step 1, and so forth to rows 57 through 59 hold the node values for time step 19. The first row of a triplet holds the input node D values of the time step. The second row of a triplet holds the hidden node Z value of the time step. The third row of a triplet holds the output node Y values of the time step. As shown, each column in the data RAM 122 holds the node values for its corresponding neurons, or NPUs 126. That is, column 0 holds the node values associated with nodes D0, Z0 and Y0, whose computations are performed by NPU 0; column 1 holds the node values associated with nodes D1, Z1 and Y1, whose computations are performed by NPU 1; and so forth to column 511 holds the node values associated with nodes D511, Z511 and Y511, whose computations are performed by NPU 511, as described in more detail below with respect to FIG. 42.

As indicated in FIG. 41, the hidden node Z values in the second row of a triplet associated with a given time step are the context node C values for the next time step. That is, the Z value that a NPU 126 computes and writes during the time step becomes the C value used by the NPU 126 (along with the next time step's input node D value) to compute the Z value during the next time step. The initial value of the context nodes C (i.e., the C value used to compute the Z value in row 1 for time step 0) is assumed to be zero. This is described in more detail below with respect to the non-architectural program of FIG. 42.

Preferably, the input node D values (in rows 0, 3, and so forth to 57 in the example of FIG. 41) are written/populated in the data RAM 122 by the architectural program running on the processor 100 via MTNN instructions 1400 and are read/used by the non-architectural program running on the NNU 121, such as the non-architectural program of FIG. 42. Conversely, the hidden/output node Z/Y values (in rows 1 and 2, 4 and 5, and so forth to 58 and 59 in the example of FIG. 41) are written/populated in the data RAM 122 by the non-architectural program running on the NNU 121 and are read/used by the architectural program running on the processor 100 via MFNN instructions 1500. The example of FIG. 41 assumes the architectural program: (1) populates the data RAM 122 with the input node D values for 20 different time steps (rows 0, 3, and so forth to 57); (2) starts the non-architectural program of FIG. 42; (3) detects the non-architectural program has completed; (4) reads out of the data RAM 122 the output node Y values (rows 2, 5, and so forth to 59); and (5) repeats steps (1) through (4) as many times as needed to complete a task, e.g., computations used to perform the recognition of a statement made by a user of a mobile phone.

In an alternative approach, the architectural program: (1) populates the data RAM 122 with the input node D values for a single time step (e.g., row 0); (2) starts the non-architectural program (a modified version of FIG. 42 that does not require the loop and accesses a single triplet of data RAM 122 rows); (3) detects the non-architectural program has completed; (4) reads out of the data RAM 122 the output node Y values (e.g., row 2); and (5) repeats steps (1) through (4) as many times as needed to complete a task. Either of the two approaches may be preferable depending upon the manner in which the input values to the RNN are sampled. For example, if the task tolerates sampling the input for multiple time steps (e.g., on the order of 20) and performing the computations, then the first approach may be preferable since it is likely more computational resource efficient and/or higher performance, whereas, if the task cannot only tolerate sampling at a single time step, the second approach may be required.

A third embodiment is contemplated that is similar to the second approach but in which, rather than using a single triplet of data RAM 122 rows, the non-architectural program uses multiple triplets of rows, i.e., a different triplet for each time step, similar to the first approach. In the third embodiment, preferably the architectural program includes a step prior to step (2) in which it updates the non-architectural program before starting it, e.g., by updating the data RAM 122 row in the instruction at address 1 to point to the next triplet.

Referring now to FIG. 42, a table illustrating a program for storage in the program memory 129 of and execution by the NNU 121 to accomplish an Elman RNN and using data and weights according to the arrangement of FIG. 41 is shown. Some of the instructions of the non-architectural program of FIG. 42 (and FIGS. 45, 48, 51, 54 and 57) have been described in detail above (e.g., MULT-ACCUM, LOOP, INITIALIZE instructions), and those descriptions are assumed in the following description unless otherwise noted.

The example program of FIG. 42 includes 13 non-architectural instructions at addresses 0 through 12. The instruction at address 0 (INITIALIZE NPU, LOOPCNT=20) clears the accumulator 202 and initializes the loop counter 3804 to a value of 20 to cause the loop body (the instructions of addresses 4 through 11) to be performed 20 times. Preferably, the initialize instruction also puts the NNU 121 in a wide configuration such that the NNU 121 is configured as 512 NPUs 126. As may be observed from the description below, the 512 NPUs 126 correspond to and operate as the 512 hidden layer nodes Z during the execution of the instructions of addresses 1 through 3 and 7 through 11, and correspond to and operate as the 512 output layer nodes Y during the execution of the instructions of addresses 4 through 6.

The instructions at addresses 1 through 3 are outside the program loop body and are executed only once. They compute an initial value of the hidden layer nodes Z and write them to row 1 of the data RAM 122 to be used by the first execution instance of the instructions at addresses 4 through 6 to calculate the output layer nodes Y of the first time step (time step 0). Additionally, the hidden layer node Z values computed and written to row 1 of the data RAM 122 by the instructions at addresses 1 through 3 become the context layer node C values to be used by the first execution instance of the instructions at addresses 7 and 8 in the calculation of the hidden layer node Z values for the second time step (time step 1).

During the execution of the instructions at addresses 1 and 2, each NPU 126 of the 512 NPUs 126 performs 512 multiply operations of the 512 input node D values in row 0 of the data RAM 122 by the NPU's 126 respective column of weights from rows 0 through 511 of the weight RAM 124 to generate 512 products that are accumulated in the accumulator 202 of the respective NPU 126. During execution of the instruction at address 3, the 512 accumulator 202 values of the 512 NPUs 126 are passed through and written to row 1 of the data RAM 122. That is, the output instruction of address 3 writes to row 1 of the data RAM 122 the accumulator 202 value of each of the 512 NPUs 126, which is the initial hidden layer Z values, and then clears the accumulator 202.

The operations performed by the instructions at addresses 1 through 2 of the non-architectural program of FIG. 42 are in many ways similar to the operations performed by the instructions at addresses 1 through 2 of the non-architectural program of FIG. 4. More specifically, the instruction at address 1 (MULT-ACCUM DR ROW 0) instructs each of the 512 NPUs 126 to read into its mux-reg 208 the respective word of row 0 of the data RAM 122, to read into its mux-reg 705 the respective word of row 0 of the weight RAM 124, to multiply the data word and the weight word to generate a product and to add the product to the accumulator 202. The instruction at address 2 (MULT-ACCUM ROTATE, WR ROW+1, COUNT=511) instructs each of the 512 NPUs 126 to rotate into its mux-reg 208 the word from the adjacent NPU 126 (using the 512-word rotater formed by the collective operation of the 512 mux-regs 208 of the NNU 121 into which the data RAM 122 row was just read by the instruction at address 1), to read into its mux-reg 705 the respective word of the next row of the weight RAM 124, to multiply the data word and the weight word to generate a product and to add the product to the accumulator 202, and to perform this operation 511 times.

Furthermore, the single non-architectural output instruction of address 3 of FIG. 42 (OUTPUT PASSTHRU, DR OUT ROW 1, CLR ACC) combines the operations of the activation function instruction and the write output instruction of addresses 3 and 4 of FIG. 4 (although in the program of FIG. 42 the accumulator 202 value is passed through whereas in the program of FIG. 4 an activation function is performed on the accumulator 202 value). That is, in the program of FIG. 42, the activation function, if any, performed on the accumulator 202 value is specified in the output instruction (also in the output instructions of addresses 6 and 11) rather than in a distinct non-architectural activation function instruction as in the program of FIG. 4. An alternate embodiment of the non-architectural program of FIG. 4 (and FIGS. 20, 26A and 28) is contemplated in which the operations of the activation function instruction and the write output instruction (e.g., of addresses 3 and 4 of FIG. 4) are combined into a single non-architectural output instruction as in FIG. 42. The example of FIG. 42 assumes the nodes of the hidden layer (Z) perform no activation function on the accumulator values. However, other embodiments are contemplated in which the hidden layer (Z) performs an activation function on the accumulator values, in which case the instructions at addresses 3 and 11 do so, e.g., sigmoid, tan h, rectify.

In contrast to the single execution instance of the instructions at addresses 1 through 3, the instructions at addresses 4 through 11 are inside the program loop body and are executed the number of times indicated in the loop count (e.g., 20). The first 19 execution instances of the instructions at addresses 7 through 11 compute the value of the hidden layer nodes Z and write them to the data RAM 122 to be used by the second through twentieth execution instances of the instructions at addresses 4 through 6 to calculate the output layer nodes Y of the remaining time steps (time steps 1 through 19). (The last/twentieth execution instance of the instructions at addresses 7 through 11 computes the value of the hidden layer nodes Z and writes them to row 61 of the data RAM 122, but they are not used.)

During the first execution instance of the instructions at addresses 4 and 5 (MULT-ACCUM DR ROW+1, WR ROW 512 and MULT-ACCUM ROTATE, WR ROW+1, COUNT=511) (for time step 0), each NPU 126 of the 512 NPUs 126 performs 512 multiply operations of the 512 hidden node Z values in row 1 of the data RAM 122 (which were generated and written by the single execution instance of the instructions of addresses 1 through 3) by the NPU's 126 respective column of weights from rows 512 through 1023 of the weight RAM 124 to generate 512 products that are accumulated into the accumulator 202 of the respective NPU 126. During the first execution instance of the instruction at address 6 (OUTPUT ACTIVATION FUNCTION, DR OUT ROW+1, CLR ACC), an activation function (e.g., sigmoid, tan h, rectify) is performed on the 512 accumulated values to compute the output node Y layer values and the results are written to row 2 of the data RAM 122.

During the second execution instance of the instructions at addresses 4 and 5 (for time step 1), each NPU 126 of the 512 NPUs 126 performs 512 multiply operations of the 512 hidden node Z values in row 4 of the data RAM 122 (which were generated and written by the first execution instance of the instructions of addresses 7 through 11) by the NPU's 126 respective column of weights from rows 512 through 1023 of the weight RAM 124 to generate 512 products that are accumulated into the accumulator 202 of the respective NPU 126, and during the second execution instance of the instruction at address 6, the activation function is performed on the 512 accumulated values to compute the output node Y layer values that are written to row 5 of the data RAM 122; during the third execution instance of the instructions at addresses 4 and 5 (for time step 2), each NPU 126 of the 512 NPUs 126 performs 512 multiply operations of the 512 hidden node Z values in row 7 of the data RAM 122 (which were generated and written by the second execution instance of the instructions of addresses 7 through 11) by the NPU's 126 respective column of weights from rows 512 through 1023 of the weight RAM 124 to generate 512 products that are accumulated into the accumulator 202 of the respective NPU 126, and during the third execution instance of the instruction at address 6, the activation function is performed on the 512 accumulated values to compute the output node Y layer values and the results are written to row 8 of the data RAM 122; and so forth until during the twentieth execution instance of the instructions at addresses 4 and 5 (for time step 19), each NPU 126 of the 512 NPUs 126 performs 512 multiply operations of the 512 hidden node Z values in row 58 of the data RAM 122 (which were generated and written by the nineteenth execution instance of the instructions of addresses 7 through 11) by the NPU's 126 respective column of weights from rows 512 through 1023 of the weight RAM 124 to generate 512 products that are accumulated into the accumulator 202 of the respective NPU 126, and during the twentieth execution instance of the instruction at address 6, the activation function is performed on the 512 accumulated values to compute the output node Y layer values and the results are written to row 59 of the data RAM 122.

During the first execution instance of the instructions at addresses 7 and 8, each of the 512 NPUs 126 accumulates into its accumulator 202 the 512 context node C values of row 1 of the data RAM 122 that were generated by the single execution instance of the instructions of addresses 1 through 3. More specifically, the instruction at address 7 (ADD_D_ACC DR ROW+0) instructs each of the 512 NPUs 126 to read into its mux-reg 208 the respective word of the current row of the data RAM 122 (row 0 during the first execution instance) and add the word to the accumulator 202. The instruction at address 8 (ADD_D_ACC ROTATE, COUNT=511) instructs each of the 512 NPUs 126 to rotate into its mux-reg 208 the word from the adjacent NPU 126 (using the 512-word rotater formed by the collective operation of the 512 mux-regs 208 of the NNU 121 into which the data RAM 122 row was just read by the instruction at address 7) and add the word to the accumulator 202, and to perform this operation 511 times.

During the second execution instance of the instructions at addresses 7 and 8, each of the 512 NPUs 126 accumulates into its accumulator 202 the 512 context node C values of row 4 of the data RAM 122, which were generated and written by the first execution instance of the instructions of addresses 9 through 11; during the third execution instance of the instructions at addresses 7 and 8, each of the 512 NPUs 126 accumulates into its accumulator 202 the 512 context node C values of row 7 of the data RAM 122, which were generated and written by the second execution instance of the instructions of addresses 9 through 11; and so forth until during the twentieth execution instance of the instructions at addresses 7 and 8, each of the 512 NPUs 126 accumulates into its accumulator 202 the 512 context node C values of row 58 of the data RAM 122, which were generated and written by the nineteenth execution instance of the instructions of addresses 9 through 11.

As stated above, the example of FIG. 42 assumes the weights associated with the connections from the context nodes C to the hidden layer nodes Z all have a unitary value. However, in an alternate embodiment Elman RNN in which these connections have non-zero weight values, the weights are placed into the weight RAM 124 (e.g., in rows 1024 through 1535) prior to execution of the program of FIG. 42 and the program instruction at address 7 is MULT-ACCUM DR ROW+0, WR ROW 1024, and the program instruction at address 8 is MULT-ACCUM ROTATE, WR ROW+1, COUNT=511. Preferably, the instruction at address 8 does not access the weight RAM 124, but instead rotates the values read into the mux-regs 705 from the weight RAM 124 by the instruction at address 7. Not accessing the weight RAM 124 during the 511 clock cycles of the execution of the instruction at address 8 may be advantageous because it leaves more bandwidth for the architectural program to access the weight RAM 124.

During the first execution instance of the instructions at addresses 9 and 10 (MULT-ACCUM DR ROW+2, WR ROW 0 and MULT-ACCUM ROTATE, WR ROW+1, COUNT=511) (for time step 1), each NPU 126 of the 512 NPUs 126 performs 512 multiply operations of the 512 input node D values in row 3 of the data RAM 122 by the NPU's 126 respective column of weights from rows 0 through 511 of the weight RAM 124 to generate 512 products that, along with the accumulation of the 512 context C node values performed by the instructions at addresses 7 and 8, are accumulated into the accumulator 202 of the respective NPU 126 to compute the hidden node Z layer values, and during the first execution of the instruction at address 11 (OUTPUT PASSTHRU, DR OUT ROW+2, CLR ACC), the 512 accumulator 202 values of the 512 NPUs 126 are passed through and written to row 4 of the data RAM 122 and the accumulator 202 is cleared; during the second execution instance of the instructions at addresses 9 and 10 (for time step 2), each NPU 126 of the 512 NPUs 126 performs 512 multiply operations of the 512 input node D values in row 6 of the data RAM 122 by the NPU's 126 respective column of weights from rows 0 through 511 of the weight RAM 124 to generate 512 products that, along with the accumulation of the 512 context C node values performed by the instructions at addresses 7 and 8, are accumulated into the accumulator 202 of the respective NPU 126 to compute the hidden node Z layer values, and during the second execution of the instruction at address 11, the 512 accumulator 202 values of the 512 NPUs 126 are passed through and written to row 7 of the data RAM 122 and the accumulator 202 is cleared; and so forth until during the nineteenth execution instance of the instructions at addresses 9 and 10 (for time step 19), each NPU 126 of the 512 NPUs 126 performs 512 multiply operations of the 512 input node D values in row 57 of the data RAM 122 by the NPU's 126 respective column of weights from rows 0 through 511 of the weight RAM 124 to generate 512 products that, along with the accumulation of the 512 context C node values performed by the instructions at addresses 7 and 8, are accumulated into the accumulator 202 of the respective NPU 126 to compute the hidden node Z layer values, and during the nineteenth execution of the instruction at address 11, the 512 accumulator 202 values of the 512 NPUs 126 are passed through and written to row 58 of the data RAM 122 and the accumulator 202 is cleared. As alluded to above, the hidden node Z layer values generated during the twentieth execution instance of the instructions at addresses 9 and 10 and written to row 61 of the data RAM 122 are not used.

The instruction at address 12 (LOOP 4) decrements the loop counter 3804 and loops back to the instruction at address 4 if the new the loop counter 3804 value is greater than zero.

Figure 43:
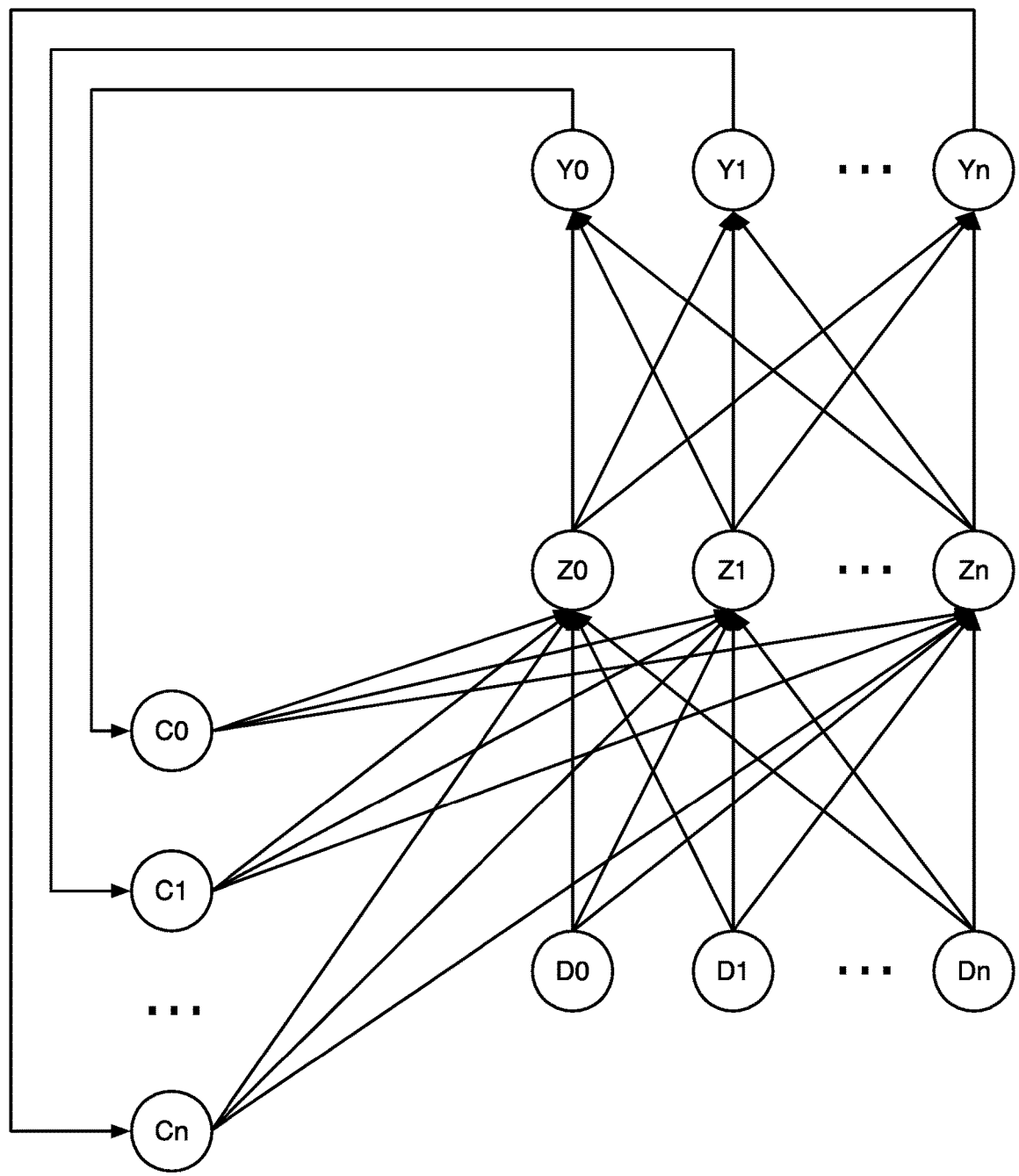
FIG. 43 is a block diagram illustrating an example of a Jordan RNN.

Referring now to FIG. 43, a block diagram illustrating an example of a Jordan RNN is shown. The Jordan RNN of FIG. 43 is similar in many respects to the Elman RNN of FIG. 40 in that it includes input layer nodes/neurons D, hidden layer nodes/neurons Z, output layer nodes/neurons Y, and context layer nodes/neurons C. However, in the Jordan RNN of FIG. 43, the context layer nodes C have their input connections that feed backward from outputs of the corresponding output layer nodes Y, rather than from the outputs of the hidden layer nodes Z as in the Elman RNN of FIG. 40.

For purposes of the present disclosure, a Jordan RNN is a recurrent neural network comprising at least an input node layer, a hidden node layer, an output node layer, and a context node layer. At the beginning of a given time step, the context node layer contains results fed back by the output node layer to the context node layer that the output node layer generated in the previous time step. The results fed back to the context layer may be the results of an activation function or they may be results of the accumulations performed by the output node layer without performance of an activation function.

Referring now to FIG. 44, a block diagram illustrating an example of the layout of data within the data RAM 122 and weight RAM 124 of the NNU 121 as it performs calculations associated with the Jordan RNN of FIG. 43 is shown. In the example of FIG. 44, the Jordan RNN of FIG. 43 is assumed to have 512 input nodes D, 512 hidden nodes Z, 512 context nodes C, and 512 output nodes Y. Furthermore, it is assumed the Jordan RNN is fully connected, i.e., all 512 input nodes D are connected as inputs to each of the hidden nodes Z, all 512 context nodes C are connected as inputs to each of the hidden nodes Z, and all 512 hidden nodes Z are connected as inputs to each of the output nodes Y. In the example Jordan RNN of FIG. 44, although an activation function is applied to the accumulator 202 values to generate the output layer node Y values, it is assumed that the accumulator 202 values prior to the application of the activation function are passed through to the context layer nodes C rather than the actual output layer node Y values. Additionally, the NNU 121 is configured as 512 NPUs 126, or neurons, e.g., in a wide configuration. Finally, it is assumed that the weights associated with the connections from the context nodes C to the hidden nodes Z all have a value of 1; consequently, there is no need to store these unitary weight values.

Like the example of FIG. 41, the lower 512 rows of the weight RAM 124 (rows 0 through 511) hold the weight values associated with the connections between the input nodes D and the hidden nodes Z, and the next 512 rows of the weight RAM 124 (rows 512 through 1023) hold the weight values associated with the connections between the hidden nodes Z and the output nodes Y, as shown.

The data RAM 122 holds the Jordan RNN node values for a sequence of time steps similar to the example of FIG. 41; however, a quadruplet of four rows holds the node values for a given time step for the example of FIG. 44. In an embodiment in which the data RAM 122 has 64 rows, the data RAM 122 can hold the node values for 15 different time steps, as shown. In the example of FIG. 44, rows 0 through 3 hold the node values for time step 0, rows 4 through 7 hold the node values for time step 1, and so forth to rows 60 through 63 hold the node values for time step 15. The first row of a quadruplet holds the input node D values of the time step. The second row of a quadruplet holds the hidden node Z value of the time step. The third row of a quadruplet holds the context node C values of the time step. The fourth row of a quadruplet holds the output node Y values of the time step. As shown, each column in the data RAM 122 holds the node values for its corresponding neurons, or NPUs 126. That is, column 0 holds the node values associated with nodes D0, Z0, C0 and Y0, whose computations are performed by NPU 0; column 1 holds the node values associated with nodes D1, Z1, C1 and Y1, whose computations are performed by NPU 1; and so forth to column 511 holds the node values associated with nodes D511, Z511, C511 and Y511, whose computations are performed by NPU 511, as described in more detail below with respect to FIG. 44.

The context node C values shown in FIG. 44 for a given time step are generated in that time step and are used as inputs in the next time step. That is, the C value that a NPU 126 computes and writes during the time step becomes the C value used by the NPU 126 (along with the next time step's input node D value) to compute the Z value during the next time step. The initial value of the context nodes C (i.e., the C value used to compute the Z value in row 1 for time step 0) is assumed to be zero. This is described in more detail below with respect to the non-architectural program of FIG. 45.

As described above with respect to FIG. 41, preferably the input node D values (in rows 0, 4, and so forth to 60 in the example of FIG. 44) are written/populated in the data RAM 122 by the architectural program running on the processor 100 via MTNN instructions 1400 and are read/used by the non-architectural program running on the NNU 121, such as the non-architectural program of FIG. 45. Conversely, the hidden/context/output node Z/C/Y values (in rows 1/2/3, 4/5/6, and so forth to 60/61/62 in the example of FIG. 44) are written/populated in the data RAM 122 by the non-architectural program running on the NNU 121 and are read/used by the architectural program running on the processor 100 via MFNN instructions 1500. The example of FIG. 44 assumes the architectural program: (1) populates the data RAM 122 with the input node D values for 15 different time steps (rows 0, 4, and so forth to 60); (2) starts the non-architectural program of FIG. 45; (3) detects the non-architectural program has completed; (4) reads out of the data RAM 122 the output node Y values (rows 3, 7, and so forth to 63); and (5) repeats steps (1) through (4) as many times as needed to complete a task, e.g., computations used to perform the recognition of a statement made by a user of a mobile phone.

In an alternative approach, the architectural program: (1) populates the data RAM 122 with the input node D values for a single time step (e.g., row 0); (2) starts the non-architectural program (a modified version of FIG. 45 that does not require the loop and accesses a single quadruplet of data RAM 122 rows); (3) detects the non-architectural program has completed; (4) reads out of the data RAM 122 the output node Y values (e.g., row 3); and (5) repeats steps (1) through (4) as many times as needed to complete a task. Either of the two approaches may be preferable depending upon the manner in which the input values to the RNN are sampled. For example, if the task tolerates sampling the input for multiple time steps (e.g., on the order of 15) and performing the computations, then the first approach may be preferable since it is likely more computational resource efficient and/or higher performance, whereas, if the task cannot only tolerate sampling at a single time step, the second approach may be required.

A third embodiment is contemplated that is similar to the second approach but in which, rather than using a single quadruplet of data RAM 122 rows, the non-architectural program uses multiple quadruplets of rows, i.e., a different quadruplet for each time step, similar to the first approach. In the third embodiment, preferably the architectural program includes a step prior to step (2) in which it updates the non-architectural program before starting it, e.g., by updating the data RAM 122 row in the instruction at address 1 to point to the next quadruplet.

Referring now to FIG. 45, a table illustrating a program for storage in the program memory 129 of and execution by the NNU 121 to accomplish a Jordan RNN and using data and weights according to the arrangement of FIG. 44 is shown. The non-architectural program of FIG. 45 is similar in many respects to the non-architectural of FIG. 42, although differences are described.

The example program of FIG. 45 includes 14 non-architectural instructions at addresses 0 through 13. The instruction at address 0 is an initialize instruction that clears the accumulator 202 and initializes the loop counter 3804 to a value of 15 to cause the loop body (the instructions of addresses 4 through 12) to be performed 15 times. Preferably, the initialize instruction also puts the NNU 121 in a wide configuration such that the NNU 121 is configured as 512 NPUs 126. As may be observed, the 512 NPUs 126 correspond to and operate as the 512 hidden layer nodes Z during the execution of the instructions of addresses 1 through 3 and 8 through 12, and correspond to and operate as the 512 output layer nodes Y during the execution of the instructions of addresses 4, 5 and 7.

The instructions at addresses 1 through 5 and 7 are the same as the instructions at addresses 1 through 6 of FIG. 42 and perform the same functions. The instructions at addresses 1 through 3 compute an initial value of the hidden layer nodes Z and write them to row 1 of the data RAM 122 to be used by the first execution instance of the instructions at addresses 4, 5 and 7 to calculate the output layer nodes Y of the first time step (time step 0).

During the first execution instance of the output instruction at address 6, the 512 accumulator 202 values accumulated by the instructions at addresses 4 and 5 (which are subsequently used by the output instruction at address 7 to compute and write the output node Y layer values) are passed through and written to row 2 of the data RAM 122, which are the context layer node C values produced in the first time step (time step 0) and used during the second time step (time step 1); during the second execution instance of the output instruction at address 6, the 512 accumulator 202 values accumulated by the instructions at addresses 4 and 5 (which are subsequently used by the output instruction at address 7 to compute and write the output node Y layer values) are passed through and written to row 6 of the data RAM 122, which are the context layer node C values produced in the second time step (time step 1) and used during the third time step (time step 2); and so forth until during the fifteenth execution instance of the output instruction at address 6, the 512 accumulator 202 values accumulated by the instructions at addresses 4 and 5 (which are subsequently used by the output instruction at address 7 to compute and write the output node Y layer values) are passed through and written to row 58 of the data RAM 122, which are the context layer node C values produced in the fifteenth time step (time step 14) (and which are read by the instruction at address 8, but they are not used).

The instructions at addresses 8 through 12 are the same as the instructions at addresses 7 through 11 of FIG. 42, with one difference, and perform the same functions. The difference is the instruction at address 8 of FIG. 45 the data RAM 122 row is incremented by one (ADD_D_ACC DR ROW+1), whereas in the instruction at address 7 of FIG. 42 the data RAM 122 row is incremented by zero (ADD_D_ACC DR ROW+0). This is due to the difference in layout of the data in the data RAM 122, specifically, that the layout in FIG. 44 includes a separate row in the quadruplet for the context layer node C values (e.g., rows 2, 6, 10, etc.) whereas the layout in FIG. 41 does not include a separate row in the triplet for the context layer node C values but instead the context layer node C values share a row with the hidden layer node Z values (e.g., rows 1, 4, 7, etc.). The 15 execution instances of the instructions at addresses 8 through 12 compute the value of the hidden layer nodes Z and write them to the data RAM 122 (at rows 5, 9, 13 and so forth to 57) to be used by the second through sixteenth execution instances of the instructions at addresses 4, 5 and 7 to calculate the output layer nodes Y of the second through fifteenth time steps (time steps 1 through 14). (The last/fifteenth execution instance of the instructions at addresses 8 through 12 computes the value of the hidden layer nodes Z and writes them to row 61 of the data RAM 122, but they are not used.)

The loop instruction at address 13 decrements the loop counter 3804 and loops back to the instruction at address 4 if the new the loop counter 3804 value is greater than zero.

In an alternate embodiment, the Jordan RNN is designed such that the context nodes C hold the activation function values of the output nodes Y, i.e., the accumulated values upon which the activation function has been performed. In such an embodiment, the non-architectural instruction at address 6 is not included in the non-architectural program since the values of the output nodes Y are the same as the values of the context nodes C. Hence, fewer rows of the data RAM 122 are consumed. To be more precise, each of the rows of FIG. 44 that hold context node C values (e.g., 2, 6, 59) are not present. Additionally, each time step requires only three rows of the data RAM 122, such that 20 time steps are accommodated, rather than 15, and the addressing of the instructions of the non-architectural program of FIG. 45 is modified appropriately.

LSTM Cells

The notion of a Long Short Term Memory (LSTM) cell for use in recurrent neural networks has been long known. See, for example, Long Short-Term Memory, Sepp Hochreiter and Jürgen Schmidhuber, Neural Computation, Nov. 15, 1997, Vol. 9, No. 8, Pages 1735-1780; Learning to Forget: Continual Prediction with LSTM, Felix A. Gers, Jürgen Schmidhuber, and Fred Cummins, Neural Computation, October 2000, Vol. 12, No. 10, Pages 2451-2471; both available from MIT Press Journals. LSTM cells may be constructed in various forms. The LSTM cell 4600 described below with respect to FIG. 46 is modeled after the LSTM cell described in the tutorial found at http://deeplearning.net/tutorial/lstm.html entitled LSTM Networks for Sentiment Analysis, a copy of which was downloaded on Oct. 19, 2015 (hereafter "the LSTM tutorial") and is provided in an Information Disclosure Statement (IDS) provided herewith. The LSTM cell 4600 is provided as a means to illustrate the ability of embodiments of the NNU 121 described herein to efficiently perform computations associated with LSTMs generally. It should be understood that the NNU 121, including the embodiment described with respect to FIG. 49, may be employed to efficiently perform computations associated with other LSTM cells than that described in FIG. 46.

Preferably, the NNU 121 may be employed to perform computations for a recurrent neural network that includes a layer of LSTM cells connected to other layers. For example, in the LSTM tutorial, the network includes a mean pooling layer that receives the outputs (H) of the LSTM cells of the LSTM layer and a logistic regression layer that receives the output of the mean pooling layer.

Referring now to FIG. 46, a block diagram illustrating an embodiment of an LSTM cell 4600 is shown.

The LSTM cell 4600 includes a memory cell input (X), a memory cell output (H), an input gate (I), an output gate (O), a forget gate (F), a cell state (C) and a candidate cell state (C'), as shown. The input gate (I) gates the memory cell input (X) to the cell state (C) and the output gate (O) gates the cell state (C) to the memory cell output (H). The cell state (C) is fed back as the candidate cell state (C') of a time step. The forget gate (F) gates the candidate cell state (C') which is fed back and become the cell state (C) for the next time step.

In the embodiment of FIG. 46, the following equations are used to compute the various values specified above:

$$I = \text{SIGMOID}(Wi*X + Ui*H + Bi) \tag{1}$$

$$F = \text{SIGMOID}(Wf*X + Uf*H + Bf) \tag{2}$$

$$C' = \text{TAN } H(Wc*X + Uc*H + Bc) \tag{3}$$

$$C = I*C' + F*C \tag{4}$$

$$O = \text{SIGMOID}(Wo*X + Uo*H + Bo) \tag{5}$$

$$H = O*\text{TAN } H(C) \tag{6}$$

Wi and Ui are weight values associated with the input gate (I) and Bi is a bias value associated with the input gate (I). Wf and Uf are weight values associated with the forget gate (F) and Bf is a bias value associated with the forget gate (F). Wo and Uo are weight values associated with the output gate (O) and Bo is a bias value associated with the output gate (O). As shown, equations (1), (2) and (5) compute the input gate (I), forget gate (F), and output gate (O), respectively. Equation (3) computes the candidate cell state (C'), and equation (4) computes the candidate cell state (C') using the current cell state (C) as input, i.e., using the cell state (C) of the current time step. Equation (6) computes the cell output (H). Other embodiments of an LSTM cell that employ different computations for the input gate, forget gate, output gate, candidate cell state, cell state and cell output are contemplated.

For purposes of the present disclosure, an LSTM cell comprises a memory cell input, a memory cell output, a cell state, a candidate cell state, an input gate, an output gate and a forget gate. For each time step, the input gate, output gate, forget gate and candidate cell state are functions of the current time step memory cell input and the previous time step memory cell output and associated weights. The cell state of the time step is a function of the previous time step cell state, the candidate cell state, the input gate and the forget gate. In this sense, the cell state is fed back and used in the computation of the next time step cell state. The memory cell output of the time step is a function of the cell state computed for the time step and the output gate. An LSTM network is a neural network that includes a layer of LSTM cells.

Figure 47:
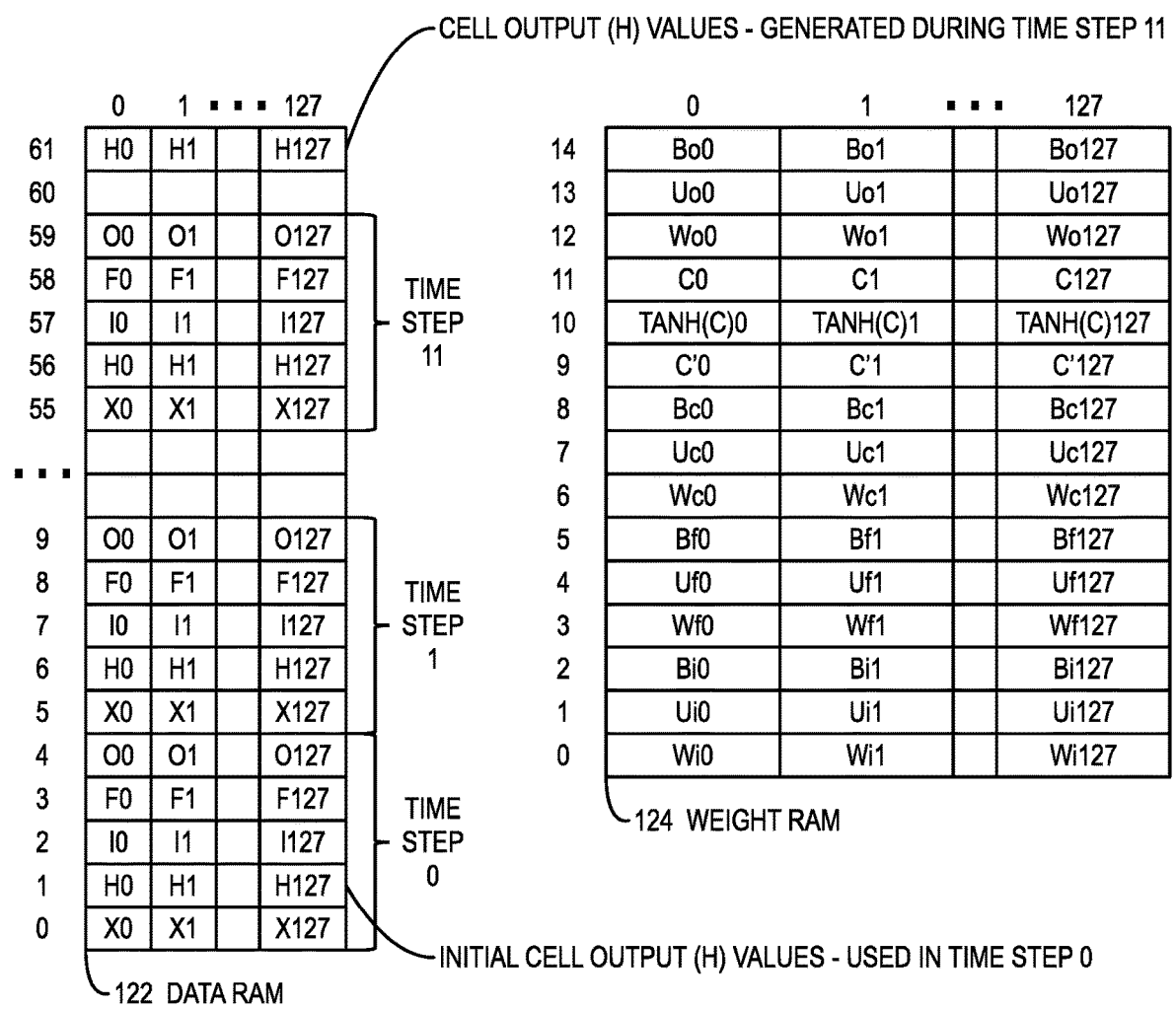
FIG. 47 is a block diagram illustrating an example of the layout of data within the data RAM and weight RAM of the NNU as it performs calculations associated with a layer of LSTM cells of FIG. 46.

Referring now to FIG. 47, a block diagram illustrating an example of the layout of data within the data RAM 122 and weight RAM 124 of the NNU 121 as it performs calculations associated with a layer of 128 LSTM cells 4600 of FIG. 46 is shown. In the example of FIG. 47, the NNU 121 is configured as 512 NPUs 126, or neurons, e.g., in a wide configuration, however the values generated by only 128 NPUs 126 (e.g., NPUs 0 through 127) are used since in the example there are only 128 LSTM cells 4600 in the LSTM layer.

As shown, the weight RAM 124 holds weight, bias and intermediate values for corresponding NPUs 0 through 127 of the NNU 121. Columns 0 through 127 of the weight RAM 124 hold weight, bias and intermediate values for corresponding NPUs 0 through 127 of the NNU 121. Rows 0 through 14 each hold 128 of the following respective values of equations (1) through (6) above for provision to NPUs 0 through 127: Wi, Ui, Bi, Wf, Uf, Bf, Wc, Uc, Bc, C', TAN H(C), C, Wo, Uo, Bo. Preferably, the weight and bias values—Wi, Ui, Bi, Wf, Uf, Bf, Wc, Uc, Bc, Wo, Uo, Bo (in rows 0 through 8 and 12 through 14)—are written/populated in the weight RAM 124 by the architectural program running on the processor 100 via MTNN instructions 1400 and are read/used by the non-architectural program running on the NNU 121, such as the non-architectural program of FIG. 48. Preferably, the intermediate values—C', TAN H(C), C (in rows 9 through 11)—are written/populated in the weight RAM 124 and are also read/used by the non-architectural program running on the NNU 121, as described in more detail below.

As shown, the data RAM 122 holds input (X), output (H), input gate (I), forget gate (F) and output gate (O) values for a sequence of time steps. More specifically, a quintuplet of five rows holds the X, H, I, F and O values for a given time step. In an embodiment in which the data RAM 122 has 64 rows, the data RAM 122 can hold the cell values for 12 different time steps, as shown. In the example of FIG. 47, rows 0 through 4 hold the cell values for time step 0, rows 5 through 9 hold the cell values for time step 1, and so forth to rows 55 through 59 hold the cell values for time step 11. The first row of a quintuplet holds the X values of the time step. The second row of a quintuplet holds the H values of the time step. The third row of a quintuplet holds the I values of the time step. The fourth row of a quintuplet holds the F values of the time step. The fifth row of a quintuplet holds the O values of the time step. As shown, each column in the data RAM 122 holds the values for its corresponding neurons, or NPUs 126. That is, column 0 holds the values associated with LSTM cell 0, whose computations are performed by NPU 0; column 1 holds the values associated with LSTM cell 1, whose computations are performed by NPU 1; and so forth to column 127 holds the values associated with LSTM cell 127, whose computations are performed by NPU 127, as described in more detail below with respect to FIG. 48.

Preferably, the X values (in rows 0, 5, 9 and so forth to 55) are written/populated in the data RAM 122 by the architectural program running on the processor 100 via MTNN instructions 1400 and are read/used by the non-architectural program running on the NNU 121, such as the non-architectural program of FIG. 48. Preferably, the I, F and O values (in rows 2/3/4, 7/8/9, 12/13/14 and so forth to 57/58/59) are written/populated in the data RAM 122 and are also read/used by the non-architectural program running on the NNU 121, as described in more detail below. Preferably, the H values (in rows 1, 6, 10 and so forth to 56) are written/populated in the data RAM 122 and are also read/used by the non-architectural program running on the NNU 121, and are read by the architectural program running on the processor 100 via MFNN instructions 1500.

The example of FIG. 47 assumes the architectural program: (1) populates the data RAM 122 with the input X values for 12 different time steps (rows 0, 5, and so forth to 55); (2) starts the non-architectural program of FIG. 48; (3) detects the non-architectural program has completed; (4) reads out of the data RAM 122 the output H values (rows 1, 6, and so forth to 59); and (5) repeats steps (1) through (4) as many times as needed to complete a task, e.g., computations used to perform the recognition of a statement made by a user of a mobile phone.

In an alternative approach, the architectural program: (1) populates the data RAM 122 with the input X values for a single time step (e.g., row 0); (2) starts the non-architectural program (a modified version of FIG. 48 that does not require the loop and accesses a single quintuplet of data RAM 122 rows); (3) detects the non-architectural program has completed; (4) reads out of the data RAM 122 the output H values (e.g., row 1); and (5) repeats steps (1) through (4) as many times as needed to complete a task. Either of the two approaches may be preferable depending upon the manner in which the input X values to the LSTM layer are sampled. For example, if the task tolerates sampling the input for multiple time steps (e.g., on the order of 12) and performing the computations, then the first approach may be preferable since it is likely more computational resource efficient and/or higher performance, whereas, if the task cannot only tolerate sampling at a single time step, the second approach may be required.

A third embodiment is contemplated that is similar to the second approach but in which, rather than using a single quintuplet of data RAM 122 rows, the non-architectural program uses multiple quintuplet of rows, i.e., a different quintuplet for each time step, similar to the first approach. In the third embodiment, preferably the architectural program includes a step prior to step (2) in which it updates the non-architectural program before starting it, e.g., by updating the data RAM 122 row in the instruction at address 0 to point to the next quintuplet.

Referring now to FIG. 48, a table illustrating a program for storage in the program memory 129 of and execution by the NNU 121 to accomplish computations associated with an LSTM cell layer and using data and weights according to the arrangement of FIG. 47 is shown. The example program of FIG. 48 includes 24 non-architectural instructions at addresses 0 through 23. The instruction at address 0 (INITIALIZE NPU, CLR ACC, LOOPCNT=12, DR IN ROW=–

1, DR OUT ROW=2) clears the accumulator 202 and initializes the loop counter 3804 to a value of 12 to cause the loop body (the instructions of addresses 1 through 22) to be performed 12 times. The initialize instruction also initializes the data RAM 122 row to be read (e.g., register 2608 of FIGS. 26/39) to a value of −1, which will be incremented to zero by the first execution instance of the instruction at address 1. The initialize instruction also initializes the data RAM 122 row to be written (e.g., register 2606 of FIGS. 26/39) to row 2. Preferably, the initialize instruction also puts the NNU 121 in a wide configuration such that the NNU 121 is configured as 512 NPUs 126. As may be observed from the description below, 128 of the 512 NPUs 126 correspond to and operate as 128 LSTM cells 4600 during the execution of the instructions of addresses 0 through 23.

During the first execution instance of the instructions at addresses 1 through 4, each of the 128 NPUs 126 (i.e., NPUs 126 0 through 127) computes the input gate (I) value for its corresponding LSTM cell 4600 for the first time step (time step 0) and writes the I value to the corresponding word of row 2 of the data RAM 122; during the second execution instance of the instructions at addresses 1 through 4, each of the 128 NPUs 126 computes the I value for its corresponding LSTM cell 4600 for the second time step (time step 1) and writes the I value to the corresponding word of row 7 of the data RAM 122; and so forth until during the twelfth execution instance of the instructions at addresses 1 through 4, each of the 128 NPUs 126 computes the I value for its corresponding LSTM cell 4600 for the twelfth time step (time step 11) and writes the I value to the corresponding word of row 57 of the data RAM 122, as shown in FIG. 47.

More specifically, the multiply-accumulate instruction at address 1 reads the next row after the current data RAM 122 row (row 0 during first execution instance, row 5 during second execution instance, and so forth to row 55 of the twelfth execution instance) that contains the cell input (X) values associated with the current time step and reads row 0 of the weight RAM 124 that contains the Wi values and multiplies them to generate a first product accumulated into the accumulator 202, which was just cleared by either the initialize instruction at address 0 or the instruction at address 22. Next, the multiply-accumulate instruction at address 2 reads the next data RAM 122 row (row 1 during first execution instance, row 6 during second execution instance, and so forth to row 56 of the twelfth execution instance) that contains the cell output (H) values associated with the current time step and reads row 1 of the weight RAM 124 that contains the Ui values and multiplies them to generate a second product added to the accumulator 202. The H values associated with the current time step, which are read from the data RAM 122 by the instruction at address 2 (and the instructions at addresses 6, 10 and 18), are generated during the previous time step and written to the data RAM 122 by the output instruction at address 22; however, in the case of the first execution instance of the instruction at address 2, the H values in row 1 of the data RAM 122 are written with an initial value. Preferably the architectural program (e.g., using a MTNN instruction 1400) writes the initial H values to row 1 of the data RAM 122 prior to starting the non-architectural program of FIG. 48; however, other embodiments are contemplated in which the non-architectural program includes initial instructions that write the initial H values to row 1 of the data RAM 122. In one embodiment, the initial H values are zero. Next, the add weight word to accumulator instruction at address 3 (ADD_W_ACC WR ROW 2) reads row 2 of the weight RAM 124 that contains the Bi values and adds them to the accumulator 202. Finally, the output instruction at address 4 (OUTPUT SIGMOID, DR OUT ROW+0, CLR ACC) performs a sigmoid activation function on the accumulator 202 values and writes the results to the current data RAM 122 output row (row 2 for the first execution instance, row 7 for the second execution instance, and so forth to row 57 for the twelfth execution instance) and clears the accumulator 202.

During the first execution instance of the instructions at addresses 5 through 8, each of the 128 NPUs 126 computes the forget gate (F) value for its corresponding LSTM cell 4600 for the first time step (time step 0) and writes the F value to the corresponding word of row 3 of the data RAM 122; during the second execution instance of the instructions at addresses 5 through 8, each of the 128 NPUs 126 computes the F value for its corresponding LSTM cell 4600 for the second time step (time step 1) and writes the F value to the corresponding word of row 8 of the data RAM 122; and so forth until during the twelfth execution instance of the instructions at addresses 5 through 8, each of the 128 NPUs 126 computes the F value for its corresponding LSTM cell 4600 for the twelfth time step (time step 11) and writes the F value to the corresponding word of row 58 of the data RAM 122, as shown in FIG. 47. The instructions at addresses 5 through 8 compute the F value in a manner similar to the instructions at addresses 1 through 4 as described above, however the instructions at addresses 5 through 7 read the Wf, Uf and Bf values from rows 3, 4 and 5, respectively, of the weight RAM 124 to perform the multiply and/or add operations.

During the twelve execution instances of the instructions at addresses 9 through 12, each of the 128 NPUs 126 computes the candidate cell state (C') value for its corresponding LSTM cell 4600 for a corresponding time step and writes the C' value to the corresponding word of row 9 of the weight RAM 124. The instructions at addresses 9 through 12 compute the C' value in a manner similar to the instructions at addresses 1 through 4 as described above, however the instructions at addresses 9 through 11 read the Wc, Uc and Bc values from rows 6, 7 and 8, respectively, of the weight RAM 124 to perform the multiply and/or add operations. Additionally, the output instruction at address 12 performs a tan h activation function rather than a sigmoid activation function (as the output instruction at address 4 does).

More specifically, the multiply-accumulate instruction at address 9 reads the current data RAM 122 row (row 0 during first execution instance, row 5 during second execution instance, and so forth to row 55 of the twelfth execution instance) that contains the cell input (X) values associated with the current time step and reads row 6 of the weight RAM 124 that contains the Wc values and multiplies them to generate a first product accumulated into the accumulator 202, which was just cleared by the instruction at address 8. Next, the multiply-accumulate instruction at address 10 reads the next data RAM 122 row (row 1 during first execution instance, row 6 during second execution instance, and so forth to row 56 of the twelfth execution instance) that contains the cell output (H) values associated with the current time step and reads row 7 of the weight RAM 124 that contains the Uc values and multiplies them to generate a second product added to the accumulator 202. Next, the add weight word to accumulator instruction at address 11 reads row 8 of the weight RAM 124 that contains the Bc values and adds them to the accumulator 202. Finally, the output instruction at address 12 (OUTPUT TAN H, WR OUT ROW 9, CLR ACC) performs a tan h activation function on the accumulator 202 values and writes the results to row 9 of the weight RAM 124 and clears the accumulator 202.

During the twelve execution instances of the instructions at addresses 13 through 16, each of the 128 NPUs 126 computes the new cell state (C) value for its corresponding LSTM cell 4600 for a corresponding time step and writes the new C value to the corresponding word of row 11 of the weight RAM 124 and computes tan h(C) and writes it to the corresponding word of row 10 of the weight RAM 124. More specifically, the multiply-accumulate instruction at address 13 reads the next row after the current data RAM 122 row (row 2 during the first execution instance, row 7 during the second execution instance, and so forth to row 57 of the twelfth execution instance) that contains the input gate (I) values associated with the current time step and reads row 9 of the weight RAM 124 that contains the candidate cell state (C') values (just written by the instruction at address 12) and multiplies them to generate a first product accumulated into the accumulator 202, which was just cleared by the instruction at address 12. Next, the multiply-accumulate instruction at address 14 reads the next data RAM 122 row (row 3 during first execution instance, row 8 during second execution instance, and so forth to row 58 of the twelfth execution instance) that contains the forget gate (F) values associated with the current time step and reads row 11 of the weight RAM 124 that contains the current cell state (C) values computed during the previous time step (written by the most recent execution instance of the instruction at address 15) and multiplies them to generate a second product added to the accumulator 202. Next, the output instruction at address 15 (OUTPUT PASSTHRU, WR OUT ROW 11) passes through the accumulator 202 values and writes them to row 11 of the weight RAM 124. It should be understood that the C value read from row 11 of the data RAM 122 by the instruction at address 14 is the C value generated and written by the most recent execution instance of the instructions at addresses 13 through 15. The output instruction at address 15 does not clear the accumulator 202 so that their values can be used by the instruction at address 16. Finally, the output instruction at address 16 (OUTPUT TAN H, WR OUT ROW 10, CLR ACC) performs a tan h activation function on the accumulator 202 values and writes the results to row 10 of the weight RAM 124 for use by the instruction at address 21 that computes the cell output (H) values. The instruction at address 16 clears the accumulator 202.

During the first execution instance of the instructions at addresses 17 through 20, each of the 128 NPUs 126 computes the output gate (O) value for its corresponding LSTM cell 4600 for the first time step (time step 0) and writes the 0 value to the corresponding word of row 4 of the data RAM 122; during the second execution instance of the instructions at addresses 17 through 20, each of the 128 NPUs 126 computes the 0 value for its corresponding LSTM cell 4600 for the second time step (time step 1) and writes the 0 value to the corresponding word of row 9 of the data RAM 122; and so forth until during the twelfth execution instance of the instructions at addresses 17 through 20, each of the 128 NPUs 126 computes the 0 value for its corresponding LSTM cell 4600 for the twelfth time step (time step 11) and writes the 0 value to the corresponding word of row 58 of the data RAM 122, as shown in FIG. 47. The instructions at addresses 17 through 20 compute the 0 value in a manner similar to the instructions at addresses 1 through 4 as described above, however the instructions at addresses 17 through 19 read the Wo, Uo and Bo values from rows 12, 13 and 14, respectively, of the weight RAM 124 to perform the multiply and/or add operations.

During the first execution instance of the instructions at addresses 21 through 22, each of the 128 NPUs 126 computes the cell output (H) value for its corresponding LSTM cell 4600 for the first time step (time step 0) and writes the H value to the corresponding word of row 6 of the data RAM 122; during the second execution instance of the instructions at addresses 21 through 22, each of the 128 NPUs 126 computes the H value for its corresponding LSTM cell 4600 for the second time step (time step 1) and writes the H value to the corresponding word of row 11 of the data RAM 122; and so forth until during the twelfth execution instance of the instructions at addresses 21 through 22, each of the 128 NPUs 126 computes the H value for its corresponding LSTM cell 4600 for the twelfth time step (time step 11) and writes the H value to the corresponding word of row 60 of the data RAM 122, as shown in FIG. 47.

More specifically, the multiply-accumulate instruction at address 21 reads the third next row after the current data RAM 122 row (row 4 during first execution instance, row 9 during second execution instance, and so forth to row 59 during the twelfth execution instance) that contains the output gate (O) values associated with the current time step and reads row 10 of the weight RAM 124 that contains the tan h(C) values (written by the instruction at address 16) and multiplies them to generate a product accumulated into the accumulator 202, which was just cleared by the instruction at address 20. Then, the output instruction at address 22 passes through the accumulator 202 values and writes them to the second next output row 11 of the data RAM 122 (row 6 during the first execution instance, row 11 during the first execution instance, and so forth to row 61 during the twelfth execution instance) and clears the accumulator 202. It should be understood that the H value written to a row of the data RAM 122 by the instruction at address 22 (row 6 during the first execution instance, row 11 during the second execution instance, and so forth to row 61 of the twelfth execution instance) is the H value consumed/read by the following execution instance of the instructions at addresses 2, 6, 10 and 18. However, the H value written to row 61 of the twelfth execution instance is not consumed/read by an execution instance of the instructions at addresses 2, 6, 10 and 18; rather, preferably it is consumed/read by the architectural program.

The instruction at address 23 (LOOP 1) decrements the loop counter 3804 and loops back to the instruction at address 1 if the new the loop counter 3804 value is greater than zero.

Figure 49:
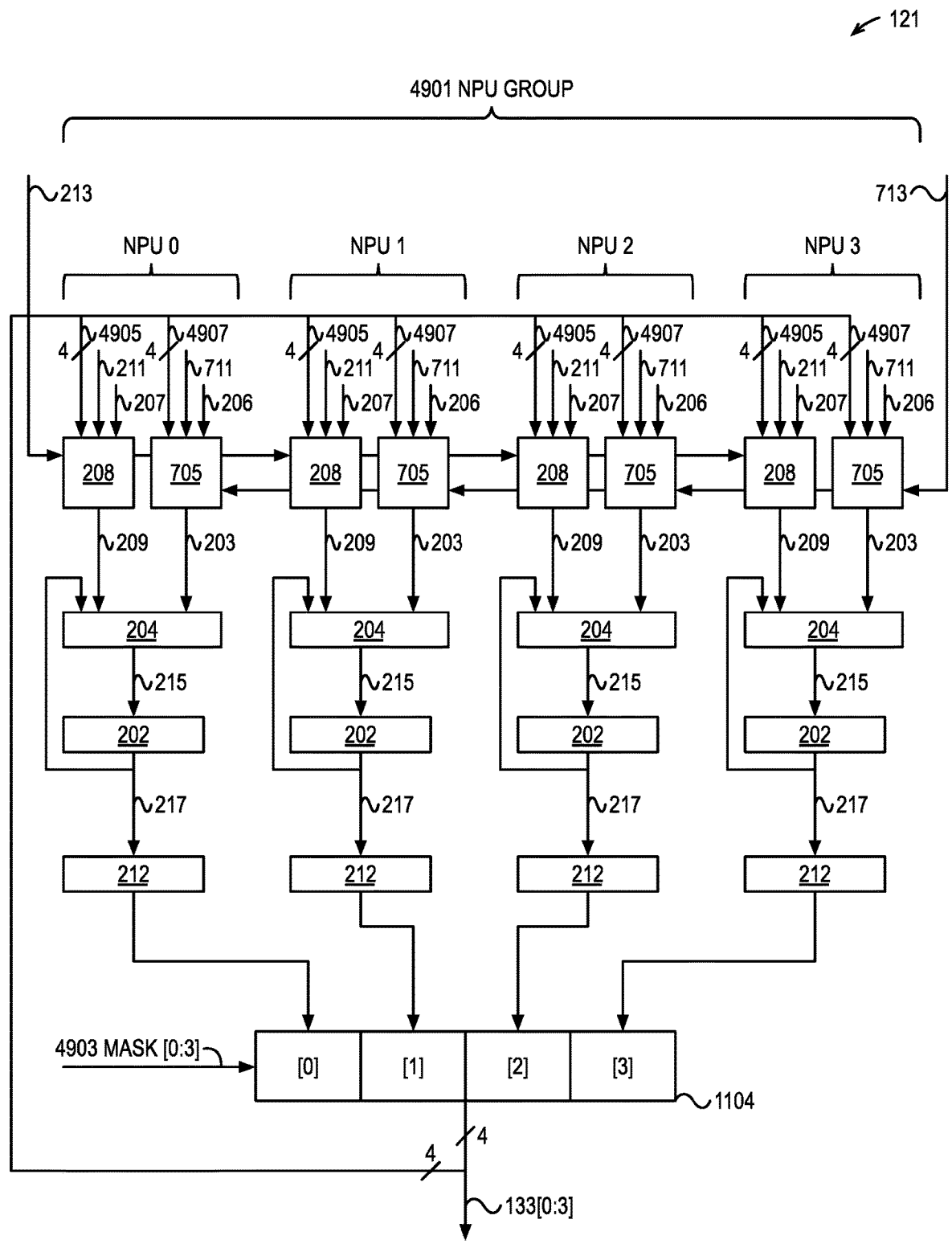
FIG. 49 is a block diagram illustrating an NNU embodiment with output buffer masking and feedback capability within NPU groups.

Referring now to FIG. 49, a block diagram illustrating an NNU 121 embodiment with output buffer masking and feedback capability within NPU groups is shown. FIG. 49 illustrates a single NPU group 4901 of four NPUs 126. Although FIG. 49 illustrates a single NPU group 4901, it should be understood that each of the NPUs 126 of the NNU 121 is included in a NPU group 4901 such that there are N/J NPU groups 4901, where N is the number of NPUs 126 (e.g., 512 in a wide configuration or 1024 in a narrow configuration) and J is the number of NPUs 126 in a group 4901 (e.g., four in the embodiment of FIG. 49). FIG. 49 refers to the four NPUs 126 of the NPU group 4901 as NPU 0, NPU 1, NPU 2 and NPU 3.

Each NPU 126 in the embodiment of FIG. 49 is similar to the NPU 126 described with respect to FIG. 7 above and like-numbered elements are similar. However, the mux-reg 208 is modified to include four additional inputs 4905, the mux-reg 705 is modified to include four additional inputs

4907, the selection input 213 is modified to select from among the original inputs 211 and 207 as well as the additional inputs 4905 for provision on output 209, and the selection input 713 is modified to select from among the original inputs 711 and 206 as well as the additional inputs 4907 for provision on output 203.

A portion of the row buffer 1104 of FIG. 11, referred to as output buffer 1104 in FIG. 49, is shown. More specifically, words 0, 1, 2, and 3 of the output buffer 1104 are shown, which receive the respective outputs of the four AFUs 212 associated with NPUs 0, 1, 2, and 3. The portion of the output buffer 1104 comprising N words corresponding to an NPU group 4901 is referred to as an output buffer word group. In the embodiment of FIG. 49, N is four. The four words of the output buffer 1104 are fed back and received as the four additional inputs 4905 to the mux-reg 208 and as the four additional inputs 4907 to the mux-reg 705. The feeding back of output buffer word groups to their respective NPU groups 4901 provides the ability for an arithmetic instruction of a non-architectural program to select for its inputs one or two of the words of the output buffer 1104 associated with the NPU group 4901 (i.e., of the output buffer word group), examples of which are described below with respect to the non-architectural program of FIG. 51, e.g., at addresses 4, 8, 11, 12 and 15. That is, the word of the output buffer 1104 specified in the non-architectural instruction determines the value generated on the selection inputs 213/713. This capability effectively enables the output buffer 1104 to serve as a scratch pad memory of sorts, which may enable a non-architectural program to reduce the number of writes to the data RAM 122 and/or weight RAM 124 and subsequent reads therefrom, e.g., of intermediately generated and used values. Preferably, the output buffer 1104, or row buffer 1104, comprises a one-dimensional array of registers that may be configured to store either 1024 narrow words or 512 wide words. Preferably, the output buffer 1104 may be read in a single clock cycle and written in a single clock cycle. Unlike the data RAM 122 and weight RAM 124, which are accessible by both the architectural program and the non-architectural program, the output buffer 1104 is not accessible by the architectural program, but is instead only accessible by the non-architectural program.

The output buffer 1104 is modified to receive a mask input 4903. Preferably, the mask input 4903 includes four bits corresponding to the four words of the output buffer 1104 associated with the four NPUs 126 of the NPU group 4901. Preferably, if the mask input 4903 bit corresponding to a word of the output buffer 1104 is true, the word of the output buffer 1104 retains its current value; otherwise, the word of the output buffer 1104 is updated with the AFU 212 output. That is, if the mask input 4903 bit corresponding to a word of the output buffer 1104 is false, the AFU 212 output is written to the word of the output buffer 1104. This provides the ability for an output instruction of a non-architectural program to selectively write the AFU 212 output to some words of the output buffer 1104 and to retain the current values of other words of the output buffer 1104, examples of which are described below with respect to the instructions of the non-architectural program of FIG. 51, e.g., at addresses 6, 10, 13 and 14. That is, the words of the output buffer 1104 specified in the non-architectural instruction determine the value generated on the mask input 4903.

For simplicity, FIG. 49 does not show the inputs 1811 (of FIGS. 18, 19 and 23, for example) to the mux-regs 208/705. However, embodiments are contemplated that support both dynamically configurable NPUs 126 and feedback/masking of the output buffer 1104. Preferably, in such embodiments the output buffer word groups are correspondingly dynamically configurable.

Figure 52:
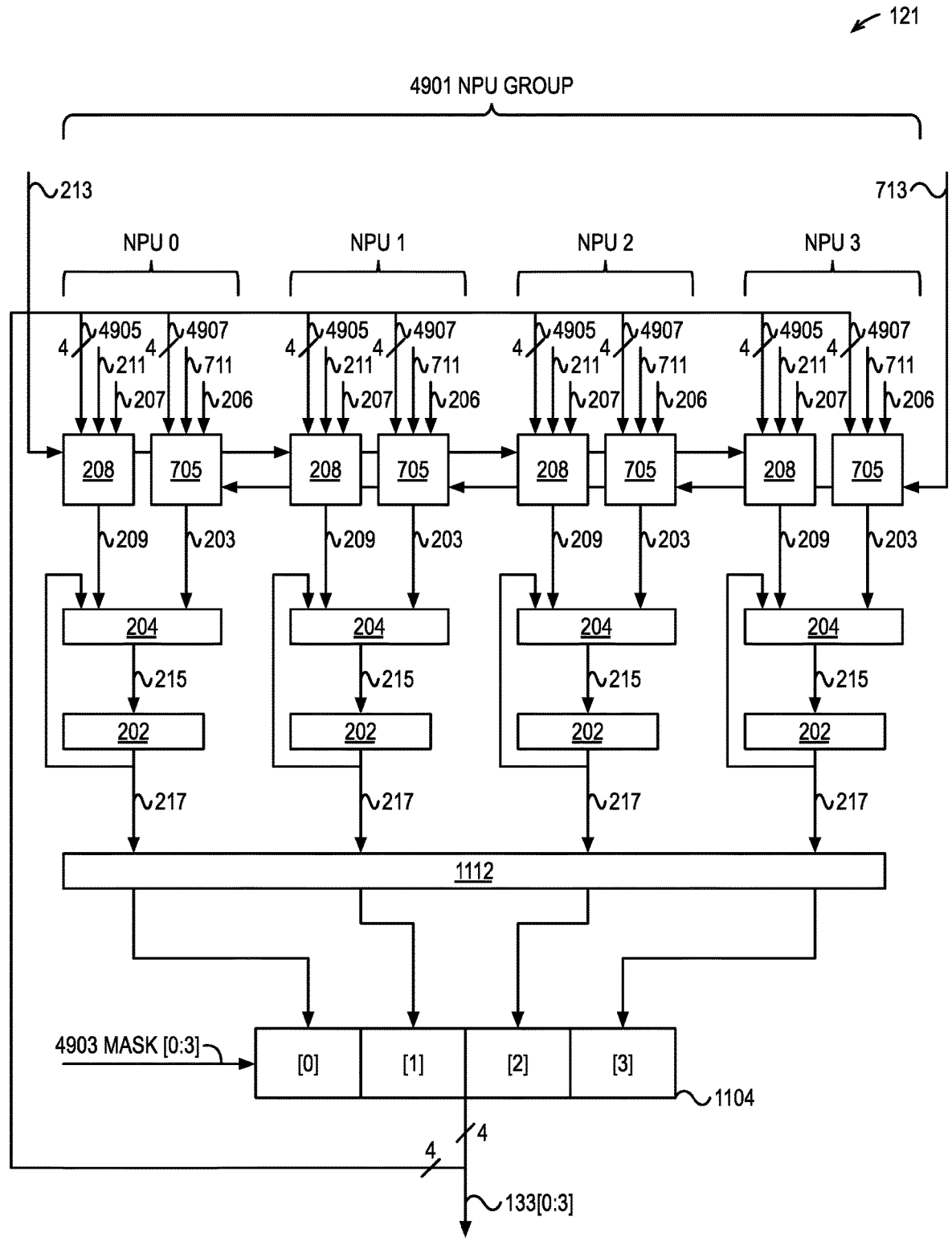
FIG. 52 is a block diagram illustrating an NNU embodiment with output buffer masking and feedback capability within NPU groups and which employs shared AFUs.

It should be understood that although an embodiment is described in which the number of NPUs 126 in a NPU group 4901 is four, other embodiments are contemplated in which the number is greater or smaller. Furthermore, in an embodiment that includes shared AFUs 1112, such as shown in FIG. 52, there may be a synergistic relationship between the number of NPUs 126 in a NPU group 4901 and the number of NPUs 126 in an AFU 212 group. The output buffer 1104 masking and feedback capability within NPU groups is particularly beneficial for efficiently performing computations associated with LSTM cells 4600, as described in more detail with respect to FIGS. 50 and 51.

Referring now to FIG. 50, a block diagram illustrating an example of the layout of data within the data RAM 122, weight RAM 124 and output buffer 1104 of the NNU 121 of FIG. 49 as it performs calculations associated with a layer of 128 LSTM cells 4600 of FIG. 46 is shown. In the example of FIG. 50, the NNU 121 is configured as 512 NPUs 126, or neurons, e.g., in a wide configuration. Like the example of FIGS. 47 and 48, in the example of FIGS. 50 and 51 there are only 128 LSTM cells 4600 in the LSTM layer. However, in the example of FIG. 50, the values generated by all 512 NPUs 126 (e.g., NPUs 0 through 127) are used. Advantageously, each NPU group 4901 operates collectively as an LSTM cell 4600 when executing the non-architectural program of FIG. 51.

As shown, the data RAM 122 holds cell input (X) and output (H) values for a sequence of time steps. More specifically, a pair of two rows holds the X and H values for a given time step. In an embodiment in which the data RAM 122 has 64 rows, the data RAM 122 can hold the cell values for 31 different time steps, as shown. In the example of FIG. 50, rows 2 and 3 hold the values for time step 0, rows 4 and 5 hold the cell values for time step 1, and so forth to rows 62 and 63 hold the cell values for time step 30. The first row of a pair holds the X values of the time step and the second row of a pair holds the H values of the time step. As shown, each group of four columns corresponding to a NPU group 4901 in the data RAM 122 holds the values for its corresponding LSTM cell 4600. That is, columns 0-3 hold the values associated with LSTM cell 0, whose computations are performed by NPUs 0-3, i.e., NPU group 0; columns 4-7 hold the values associated with LSTM cell 1, whose computations are performed by NPUs 4-7, i.e., NPU group 1; and so forth to columns 508-511 hold the values associated with LSTM cell 127, whose computations are performed by NPUs 508-511, i.e., NPU group 127, as described in more detail below with respect to FIG. 51. As shown, row 1 is unused, and row 0 holds initial cell output (H) values, preferably populated by the architectural program with zero values, although embodiments are contemplated in which initial instructions of the non-architectural populate the initial cell output (H) values of row 0.

Preferably, the X values (in rows 2, 4, 6 and so forth to 62) are written/populated in the data RAM 122 by the architectural program running on the processor 100 via MTNN instructions 1400 and are read/used by the non-architectural program running on the NNU 121, such as the non-architectural program of FIG. 50. Preferably, the H values (in rows 3, 5, 7 and so forth to 63) are written/populated in the data RAM 122 and are also read/used by the non-architectural program running on the NNU 121, as described in more detail below. Preferably, the H values are also read by the architectural program running on the processor 100 via MFNN instructions 1500. It is noted that the non-architectural program of FIG. 51 assumes that within each group of four columns corresponding to a NPU group 4901 (e.g., columns 0-3, 4-7, 5-8 and so forth to 508-511) the four X values in a given row are populated (e.g., by the architectural program) with the same value. Similarly, the non-architectural program of FIG. 51 computes and writes within each group of four columns corresponding to a NPU group 4901 in a given row the same value for the four H values.

As shown, the weight RAM 124 holds weight, bias and cell state (C) values for the NPUs of the NNU 121. Within each group of four columns corresponding to a NPU group 4901 (e.g., columns 0-3, 4-7, 5-8 and so forth to 508-511): (1) the column whose index mod 4 equals 3, holds the Wc, Uc, Bc, and C values in rows 0, 1, 2, and 6, respectively; (2) the column whose index mod 4 equals 2, holds the Wo, Uo, and Bo values in rows 3, 4, and 5, respectively; (3) the column whose index mod 4 equals 1, holds the Wf, Uf, and Bf values in rows 3, 4, and 5, respectively; and (4) the column whose index mod 4 equals 0, holds the Wi, Ui, and Bi values in rows 3, 4, and 5, respectively. Preferably, the weight and bias values—Wi, Ui, Bi, Wf, Uf, Bf, Wc, Uc, Bc, Wo, Uo, Bo (in rows 0 through 5)—are written/populated in the weight RAM 124 by the architectural program running on the processor 100 via MTNN instructions 1400 and are read/used by the non-architectural program running on the NNU 121, such as the non-architectural program of FIG. 51. Preferably, the intermediate C values are written/populated in the weight RAM 124 and are read/used by the non-architectural program running on the NNU 121, as described in more detail below.

The example of FIG. 50 assumes the architectural program: (1) populates the data RAM 122 with the input X values for 31 different time steps (rows 2, 4, and so forth to 62); (2) starts the non-architectural program of FIG. 51; (3) detects the non-architectural program has completed; (4) reads out of the data RAM 122 the output H values (rows 3, 5, and so forth to 63); and (5) repeats steps (1) through (4) as many times as needed to complete a task, e.g., computations used to perform the recognition of a statement made by a user of a mobile phone.

In an alternative approach, the architectural program: (1) populates the data RAM 122 with the input X values for a single time step (e.g., row 2); (2) starts the non-architectural program (a modified version of FIG. 51 that does not require the loop and accesses a single pair of data RAM 122 rows); (3) detects the non-architectural program has completed; (4) reads out of the data RAM 122 the output H values (e.g., row 3); and (5) repeats steps (1) through (4) as many times as needed to complete a task. Either of the two approaches may be preferable depending upon the manner in which the input X values to the LSTM layer are sampled. For example, if the task tolerates sampling the input for multiple time steps (e.g., on the order of 31) and performing the computations, then the first approach may be preferable since it is likely more computational resource efficient and/or higher performance, whereas, if the task cannot only tolerate sampling at a single time step, the second approach may be required.

A third embodiment is contemplated that is similar to the second approach but in which, rather than using a single pair of data RAM 122 rows, the non-architectural program uses multiple pair of rows, i.e., a different pair for each time step, similar to the first approach. In the third embodiment, preferably the architectural program includes a step prior to step (2) in which it updates the non-architectural program before starting it, e.g., by updating the data RAM 122 row in the instruction at address 1 to point to the next pair.

As shown, the output buffer 1104 holds intermediate values of the cell output (H), candidate cell state (C'), input gate (I), forget gate (F), output gate (O), cell state (C), and tan h(C) after the execution of an instruction at different addresses of the non-architectural program of FIG. 51 for corresponding NPUs 0 through 511 of the NNU 121, as shown. Within each output buffer word group (e.g., group of four words of the output buffer 1104 corresponding to a NPU group 4901, e.g., words 0-3, 4-7, 5-8 and so forth to 508-511), the word whose index mod 4 equals 3 is referred to as OUTBUF[3], the word whose index mod 4 equals 2 is referred to as OUTBUF[2], the word whose index mod 4 equals 1 is referred to as OUTBUF[1], and the word whose index mod 4 equals 0 is referred to as OUTBUF[0].

As shown, after execution of the instruction at address 2 of the non-architectural program of FIG. 51, for each NPU group 4901, all four words of the output buffer 1104 are written with the initial cell output (H) values for the corresponding LSTM cell 4600. After execution of the instruction at address 6, for each NPU group 4901, OUTBUF[3] is written with the candidate cell state (C') value for the corresponding LSTM cell 4600 and the other three words of the output buffer 1104 retain their previous values. After execution of the instruction at address 10, for each NPU group 4901, OUTBUF[0] is written with the input gate (I) value, OUTBUF[1] is written with the forget gate (F) value, OUTBUF[2] is written with the output gate (O) value, for the corresponding LSTM cell 4600, and OUTBUF[3] retains its previous value. After execution of the instruction at address 13, for each NPU group 4901, OUTBUF[3] is written with the new cell state (C) value (as the output buffer 1104, including the C value in slot 3, is written to row 6 of the weight RAM 124, as described in more detail below with respect to FIG. 51) for the corresponding LSTM cell 4600 and the other three words of the output buffer 1104 retain their previous values. After execution of the instruction at address 14, for each NPU group 4901, OUTBUF[3] is written with the tan h(C) value for the corresponding LSTM cell 4600 and the other three words of the output buffer 1104 retain their previous values. After execution of the instruction at address 16, for each NPU group 4901, all four words of the output buffer 1104 are written with the new cell output (H) values for the corresponding LSTM cell 4600. The pattern repeats from address 6 through address 16 (i.e., excluding the execution at address 2, since it is outside the program loop) thirty more times as the program loops at address 17 back to address 3.

Referring now to FIG. 51, a table illustrating a program for storage in the program memory 129 of and execution by the NNU 121 of FIG. 49 to accomplish computations associated with an LSTM cell layer and using data and weights according to the arrangement of FIG. 50 is shown. The example program of FIG. 51 includes 18 non-architectural instructions at addresses 0 through 17. The instruction at address 0 is an initialize instruction that clears the accumulator 202 and initializes the loop counter 3804 to a value of 31 to cause the loop body (the instructions of addresses 1 through 17) to be performed 31 times. The initialize instruction also initializes the data RAM 122 row to be written (e.g., register 2606 of FIGS. 26/39) to a value of 1, which will be incremented to 3 by the first execution instance of the instruction at address 16. Preferably, the initialize instruction also puts the NNU 121 in a wide configuration such that the NNU 121 is configured as 512 NPUs 126. As may be observed from the description below, each of the 128 NPU groups 4901 of the 512 NPUs 126 correspond to and operate as one of the 128 LSTM cells 4600 during the execution of the instructions of addresses 0 through 17.

The instructions at addresses 1 and 2 are outside the loop body and execute only once. They generate and write the initial cell output (H) value (e.g., zero value) to all words of the output buffer 1104. The instruction at address 1 reads the initial H values from row 0 of the data RAM 122 and puts them into the accumulator 202, which was cleared by the instruction at address 0. The instruction at address 2 (OUTPUT PASSTHRU, NOP, CLR ACC) passes through the accumulator 202 value to the output buffer 1104, as shown in FIG. 50. The designation of the "NOP" in the output instruction at address 2 (and other output instructions of FIG. 51) indicates that the value being output is written only to the output buffer 1104 but not written to memory, i.e., neither to the data RAM 122 nor to the weight RAM 124. The instruction at address 2 also clears the accumulator 202.

The instructions at addresses 3 through 17 are inside the loop body and execute the loop count number of times (e.g., 31).

Each execution instance of the instructions at addresses 3 through 6 computes and writes the tan h(C') value for the current time step to OUTBUF[3], which will be used by the instruction at address 11. More specifically, the multiply-accumulate instruction at address 3 reads the cell input (X) value associated with the time step from the current data RAM 122 read row (e.g., 2, 4, 6 and so forth to 62) and reads the We values from row 0 of the weight RAM 124 and multiplies them to generate a product added to the accumulator 202, which was cleared by the instruction at address 2.

The multiply-accumulate instruction at address 4 (MULT-ACCUM OUTBUF[0], WR ROW 1) reads (i.e., all 4 NPUs 126 of the NPU group 4901) the H value from OUTBUF[0] and reads the Uc values from row 1 of the weight RAM 124 and multiplies them to generate a second product added to the accumulator 202.

The add weight word to accumulator instruction at address 5 (ADD_W_ACC WR ROW 2) reads the Bc values from row 2 of the weight RAM 124 and adds them to the accumulator 202.

The output instruction at address 6 (OUTPUT TAN H, NOP, MASK[0:2], CLR ACC) performs a tan h activation function on the accumulator 202 value and the result is written only to OUTBUF[3] (i.e., only the NPU 126 of the NPU group 4901 whose index mod 4 equals 3 writes its result), and the accumulator 202 is cleared. That is, the output instruction at address 6 masks OUTBUF[0], OUTBUF[1] and OUTBUF[2] (as indicated by the MASK[0:2] nomenclature) to cause them to retain their current values, as shown in FIG. 50. Additionally, the output instruction at address 6 does not write to memory (as indicated by the NOP nomenclature).

Each execution instance of the instructions at addresses 7 through 10 computes and writes the input gate (I), forget gate (F), and output gate (O) values for the current time step to OUTBUF[0], OUTBUF[1], OUTBUF[2], respectively, which will be used by the instructions at addresses 11, 12, and 15, respectively. More specifically, the multiply-accumulate instruction at address 7 reads the cell input (X) value associated with the time step from the current data RAM 122 read row (e.g., 2, 4, 6 and so forth to 62) and reads the Wi, Wf, and Wo values from row 3 of the weight RAM 124 and multiplies them to generate a product added to the accumulator 202, which was cleared by the instruction at address 6. More specifically, within an NPU group 4901, the NPU 126 whose index mod 4 equals 0 computes the product of X and Wi, the NPU 126 whose index mod 4 equals 1 computes the product of X and Wf, and the NPU 126 whose index mod 4 equals 2 computes the product of X and Wo.

The multiply-accumulate instruction at address 8 reads (i.e., all 4 NPUs 126 of the NPU group 4901) the H value from OUTBUF[0] and reads the Ui, Uf, and Uo values from row 4 of the weight RAM 124 and multiplies them to generate a second product added to the accumulator 202. More specifically, within an NPU group 4901, the NPU 126 whose index mod 4 equals 0 computes the product of H and Ui, the NPU 126 whose index mod 4 equals 1 computes the product of H and Uf, and the NPU 126 whose index mod 4 equals 2 computes the product of H and Uo.

The add weight word to accumulator instruction at address 9 reads the Bi, Bf, and Bo values from row 5 of the weight RAM 124 and adds them to the accumulator 202. More specifically, within an NPU group 4901, the NPU 126 whose index mod 4 equals 0 adds the Bi value, the NPU 126 whose index mod 4 equals 1 adds the Bf value, and the NPU 126 whose index mod 4 equals 2 adds the Bo value.

The output instruction at address 10 (OUTPUT SIGMOID, NOP, MASK[3], CLR ACC) performs a sigmoid activation function on the accumulator 202 value and writes the computed I, F and O values to OUTBUF[0], OUTBUF[1], and OUTBUF[2], respectively, and clears the accumulator 202, without writing to memory. That is, the output instruction at address 10 masks OUTBUF[3] (as indicated by the MASK[3] nomenclature) to cause it to retain its current value (which is C'), as shown in FIG. 50.

Each execution instance of the instructions at addresses 11 through 13 computes and writes the new cell state (C) values generated by the current time step to row 6 of the weight RAM 124, more specifically, to the word of row 6 whose index mod 4 equals 3 within the four columns corresponding to a NPU group 4901, for use in the next time step (i.e., by the instruction at address 12 during the next loop iteration). Additionally, each execution instance of the instruction at address 14 writes the tan h(C) value to OUTBUF[3], which will be used by the instruction at address 15.

More specifically, the multiply-accumulate instruction at address 11 (MULTACCUM OUTBUF[0], OUTBUF[3]) reads the input gate (I) value from OUTBUF[0] and reads the candidate cell state (C') value from OUTBUF[3] and multiplies them to generate a first product added to the accumulator 202, which was cleared by the instruction at address 10. More specifically, each of the four NPUs 126 within an NPU group 4901 computes the first product of I and C'.

The multiply-accumulate instruction at address 12 (MULT-ACCUM OUTBUF[1], WR ROW 6) instructs the NPUs 126 to read the forget gate (F) value from OUTBUF[1] and to read its respective word from row 6 of the weight RAM 124 and multiplies them to generate a second product added to the first product in the accumulator 202 generated by the instruction at address 11. More specifically, the word read from row 6 is the current cell state (C) value computed in the previous time step in the case of the NPU 126 of the NPU group 4901 whose index mod 4 equals 3 such that the sum of the first and second products is the new cell state (C). However, the words read from row 6 are don't-care values for the other three NPUs 126 of the NPU group 4901 since their resulting accumulated values will not be used, i.e., will not be put into the output buffer 1104 by the instructions at addresses 13 and 14 and will be cleared by the instruction at address 14. That is, only the resulting new cell state (C) value generated by the NPU 126 of the NPU group 4901 whose index mod 4 equals 3 will be used, namely per the instructions at addresses 13 and 14. In the case of the second through thirty-first execution instances of the instruction at address 12, the C value read from row 6 of the weight RAM 124 was written by the instruction at address 13 during the previous iteration of the loop body. However, for the first execution instance of the instruction at address 12, the C values in row 6 are written with initial values, either by the architectural program prior to starting the non-architectural program of FIG. 51 or by a modified version of the non-architectural program.

The output instruction at address 13 (OUTPUT PASS-THRU, WR ROW 6, MASK[0:2]) passes through the accumulator 202 value, i.e., the computed C value, only to OUTBUF[3] (i.e., only the NPU 126 of the NPU group 4901 whose index mod 4 equals 3 writes its computed C value to the output buffer 1104) and row 6 of the weight RAM 124 is written with the updated output buffer 1104, as shown in FIG. 50. That is, the output instruction at address 13 masks OUTBUF[0], OUTBUF[1] and OUTBUF[2] to cause them to retain their current values (which are I, F, and O). As described above, only the C value in the word of row 6 within each group of four columns corresponding to a NPU group 4901 whose index mod 4 equals 3 is used, namely by the instruction at address 12; thus, the non-architectural program does not care about the values in columns 0-2, 4-6, and so forth to 508-510 of row 6 of the weight RAM 124, as shown in FIG. 50 (which are the I, F, and O values).

The output instruction at address 14 (OUTPUT TAN H, NOP, MASK[0:2], CLR ACC) performs a tan h activation function on the accumulator 202 value and writes the computed tan h(C) values to OUTBUF[3], and clears the accumulator 202, without writing to memory. The output instruction at address 14, like the output instruction at address 13, masks OUTBUF[0], OUTBUF[1], and OUTBUF[2] to cause them to retain their current values, as shown in FIG. 50.

Each execution instance of the instructions at addresses 15 through 16 computes and writes the cell output (H) values generated by the current time step to the second next row after the current output row of the data RAM 122, which will be read by the architectural program and used in the next time step (i.e., by the instructions at addresses 3 and 7 during the next loop iteration). More specifically, the multiply-accumulate instruction at address 15 reads the output gate (O) value from OUTBUF[2] and reads the tan h(C) value from OUTBUF[3] and multiplies them to generate a product added to the accumulator 202, which was cleared by the instruction at address 14. More specifically, each of the four NPUs 126 within an NPU group 4901 computes the product of O and tan h(C).

The output instruction at address 16 passes through the accumulator 202 value and writes the computed H values to row 3 during the first execution instance, to row 5 during the second execution instance, and so forth to row 63 during the thirty-first execution instance, as shown in FIG. 50, which are subsequently used by the instructions at addresses 4 and 8. Additionally, the computed H values are put into the output buffer 1104, as shown in FIG. 50, for subsequent use by the instructions at addresses 4 and 8. The output instruction at address 16 also clears the accumulator 202. In one embodiment, the LSTM cell 4600 is designed such that the output instruction at address 16 (and/or the output instruction at address 22 of FIG. 48) has an activation function, e.g., sigmoid or tan h, rather than passing through the accumulator 202 value.

The loop instruction at address 17 decrements the loop counter 3804 and loops back to the instruction at address 3 if the new the loop counter 3804 value is greater than zero.

As may be observed, the number of instructions in the loop body of the non-architectural program of FIG. 51 is approximately 34% less than that of the non-architectural of FIG. 48, which is facilitated by the output buffer 1104 feedback and masking capability of the NNU 121 embodiment of FIG. 49. Additionally, the memory layout in the data RAM 122 of the non-architectural program of FIG. 51 accommodates approximately three times the number of time steps as that of FIG. 48, which is also facilitated by the output buffer 1104 feedback and masking capability of the NNU 121 embodiment of FIG. 49. Depending upon the particular architectural program application employing the NNU 121 to perform LSTM cell layer computations, these improvements may be helpful, particularly in applications in which the number of LSTM cells 4600 in an LSTM layer is less than or equal to 128.

In the embodiment of FIGS. 47 through 51, it is assumed the weight and bias values remain the same across time steps. However, other embodiments are contemplated in which the weight and bias values vary across time steps in which case rather than the weight RAM 124 being populated with a single set of the weight and bias values as shown in FIGS. 47 and 50, the weight RAM 124 is populated with a different set of the weight and bias values for each time step and the weight RAM 124 addresses of the non-architectural programs of FIGS. 48 and 51 are modified accordingly.

The embodiments of FIGS. 47 through 51 have been described in which, generally speaking, the weight, bias and intermediate values (e.g., C, C') are stored in the weight RAM 124 and the input and output values (e.g., X, H) are stored in the data RAM 122. This may be advantageous for embodiments in which the data RAM 122 is dual-ported and the weight RAM 124 is single-ported since there is more traffic from the non-architectural and architectural programs to the data RAM 122. However, since the weight RAM 124 is larger, embodiments are contemplated in which the non-architectural and architectural programs are written to swap the memories (i.e., the data RAM 122 and weight RAM 124) in which the values are stored. That is, the W, U, B, C', tan h(C) and C values are stored in the data RAM 122 and the X, H, I, F and O values are stored in the weight RAM 124 (modified embodiment of FIG. 47); and the W, U, B, C values are stored in the data RAM 122 and the X and H values are stored in the weight RAM 124 (modified embodiment of FIG. 50). For these embodiments, a larger number of time steps may be processed together in a batch since the weight RAM 124 is larger. This may be advantageous for some architectural program application making use of the NNU 121 to perform computations that benefit from the larger number of time steps and for which a single-ported memory (e.g., the weight RAM 124) provides sufficient bandwidth.

Referring now to FIG. 52, a block diagram illustrating an NNU 121 embodiment with output buffer masking and feedback capability within NPU groups and which employs shared AFUs 1112 is shown. The NNU 121 of FIG. 52 is similar in many respects to the NNU 121 of FIG. 49 and like-numbered elements are similar. However, the four AFUs 212 of FIG. 49 are replaced by a single shared AFU 1112 that receives the four outputs 217 of the four accumulators 202 and generates four outputs to OUTBUF[0], OUTBUF[1], OUTBUF[2], and OUTBUF[3]. The NNU 121 of FIG. 52 operates in a manner similar to that described above with respect to FIGS. 49 through 51 and similar to the manner described above with respect to FIGS. 11 through 13 with respect to operation of the shared AFU 1112.

Figure 53:
FIG. 53 is a block diagram illustrating an example of the layout of data within the data RAM, weight RAM and output buffer of the NNU of FIG. 49 as it performs calculations associated with a layer of LSTM cells of FIG. 46 according to an alternate embodiment.

Referring now to FIG. 53, a block diagram illustrating an example of the layout of data within the data RAM 122, weight RAM 124 and output buffer 1104 of the NNU 121 of FIG. 49 as it performs calculations associated with a layer of 128 LSTM cells 4600 of FIG. 46 according to an alternate embodiment is shown. The example of FIG. 53 is similar in many respects to the example of FIG. 50. However, in FIG. 53, the Wi, Wf and Wo values are in row 0 (rather than in row 3 as in FIG. 50); the Ui, Uf and Uo values are in row 1 (rather than in row 4 as in FIG. 50); the Bi, Bf and Bo values are in row 2 (rather than in row 5 as in FIG. 50); and the C values are in row 3 (rather than in row 6 as in FIG. 50). Additionally, the output buffer 1104 contents are the same in FIG. 53 as in FIG. 50, however, the contents of the third row (i.e., the I, F, O and C' values) are present in the output buffer 1104 after execution of the instruction at 7 (rather than 10 in FIG. 50); the contents of the fourth row (i.e., the I, F, O and C values) are present in the output buffer 1104 after execution of the instruction at 10 (rather than 13 in FIG. 50); the contents of the fifth row (i.e., the I, F, O and tan h(C) values) are present in the output buffer 1104 after execution of the instruction at 11 (rather than 14 in FIG. 50); and the contents of the sixth row (i.e., the H values) are present in the output buffer 1104 after execution of the instruction at 13 (rather than 16 in FIG. 50), due to the differences in the non-architectural program of FIG. 54 from that of FIG. 51, which are described in more detail below.

Referring now to FIG. 54, a table illustrating a program for storage in the program memory 129 of and execution by the NNU 121 of FIG. 49 to accomplish computations associated with an LSTM cell layer and using data and weights according to the arrangement of FIG. 53 is shown. The example program of FIG. 54 is similar in many ways to the program of FIG. 51. More specifically, the instructions at addresses 0 through 5 are the same in FIGS. 54 and 51; the instructions at address 7 and 8 of FIG. 54 are the same as the instructions at address 10 and 11 of FIG. 51; and the instructions at addresses 10 through 14 of FIG. 54 are the same as the instructions at addresses 13 through 17 of FIG. 51.

However, the instruction at address 6 of FIG. 54 does not clear the accumulator 202 (whereas the instruction at address 6 of FIG. 51 does). Furthermore, the instructions at addresses 7 through 9 are not present in the non-architectural of FIG. 54. Finally, the instruction at address 9 of FIG. 54 is the same as the instruction at address 12 of FIG. 51 except that the instruction at address 9 of FIG. 54 reads from row 3 of the weight RAM 124, whereas, the instruction at address 12 of FIG. 51 reads from row 6 of the weight RAM 124.

As a result of the differences between the non-architectural programs of FIGS. 54 and 51, the layout of FIG. 53 uses three less rows of weight RAM 124 and includes three fewer instructions in the program loop. Indeed, the size of the loop body of the non-architectural program of FIG. 54 is essentially half the size of the loop body of the non-architectural program of FIG. 48 and approximately 80% the size of the loop body of the non-architectural program of FIG. 51.

Referring now to FIG. 55, a block diagram illustrating portions of an NPU 126 according to an alternate embodiment is shown. More specifically, for a single NPU 126 of the NPUs 126 of FIG. 49, the mux-reg 208 and its associated inputs 207, 211, and 4905, and the mux-reg 705 its associated inputs 206, 711, and 4907 are shown. In addition to the inputs of FIG. 49, the mux-reg 208 and the mux-reg 705 of the NPU 126 each receive an index_within_group input 5599. The index_within_group input 5599 indicates the index of the particular NPU 126 within its NPU group 4901. Thus, for example, in an embodiment in which each NPU group 4901 has four NPUs 126, within each NPU group 4901, one of the NPUs 126 receives a value of zero on its index_within_group input 5599, one of the NPUs 126 receives a value of one on its index_within_group input 5599, one of the NPUs 126 receives a value of two on its index_within_group input 5599, and one of the NPUs 126 receives a value of three on its index_within_group input 5599. Stated alternatively, the index_within_group input 5599 value received by an NPU 126 is its index within the NNU 121 mod J, where J is the number of NPUs 126 in an NPU group 4901. Thus, for example, NPU 73 receives a value of one on its index_within_group input 5599, NPU 353 receives a value of three on its index_within_group input 5599, and NPU 6 receives a value of two on its index_within_group input 5599.

Additionally, when the control input 213 specifies a predetermined value, referred to herein as "SELF," the mux-reg 208 selects the output buffer 1104 input 4905 corresponding to the index_within_group input 5599 value. Thus, advantageously, when a non-architectural instruction specifies to receive data from the output buffer 1104 with a value of SELF (denoted OUTBUF[SELF] in the instructions at addresses 2 and 7 of FIG. 57), the mux-reg 208 of each NPU 126 receives its corresponding word from the output buffer 1104. Thus, for example, when the NNU 121 executes the non-architectural instruction at addresses 2 and 7 of FIG. 57, the mux-reg 208 of NPU 73 selects the second (index 1) of the four inputs 4905 to receive word 73 from the output buffer 1104, the mux-reg 208 of NPU 353 selects the fourth (index 3) of the four inputs 4905 to receive word 353 from the output buffer 1104, and the mux-reg 208 of NPU 6 selects the third (index 2) of the four inputs 4905 to receive word 6 from the output buffer 1104. Although not employed in the non-architectural program of FIG. 57, a non-architectural instruction may specify to receive data from the output buffer 1104 with a value of SELF (OUTBUF[SELF]) to cause the control input 713 to specify the predetermined value to cause the mux-reg 705 of each NPU 126 to receive its corresponding word from the output buffer 1104.

Referring now to FIG. 56, a block diagram illustrating an example of the layout of data within the data RAM 122 and weight RAM 124 of the NNU 121 as it performs calculations associated with the Jordan RNN of FIG. 43 but employing the benefits afforded by the embodiments of FIG. 55 is shown. The layout of the weights within the weight RAM 124 is the same as that of FIG. 44. The layout of the values within the data RAM 122 is similar to that of FIG. 44, except that each time step has an associated pair of rows that hold input layer node D values and output layer node Y values, rather than a quadruplet of rows as in FIG. 44. That is, the hidden layer Z and context layer C values are not written to the data RAM 122. Rather, the output buffer 1104 is used as a scratchpad for the hidden layer Z and context layer C values, as described in more detail with respect to the non-architectural program of FIG. 57. Advantageously, the OUTBUF[SELF] output buffer 1104 feedback feature potentially enables the non-architectural program to be faster (due to the replacement of two writes and two reads from the data RAM 122 with two writes and two reads from the output buffer 1104) and enables each time step to use less data RAM 122 space, which enables the data RAM 122 to hold approximately twice as many time steps as the embodiment of FIGS. 44 and 45, in particular 32 time steps, as shown.

Referring now to FIG. 57, a table illustrating a program for storage in the program memory 129 of and execution by the NNU 121 to accomplish a Jordan RNN and using data and weights according to the arrangement of FIG. 56 is shown. The non-architectural program of FIG. 57 is similar in some respects to the non-architectural of FIG. 45, and differences are described.

The example program of FIG. 57 includes 12 non-architectural instructions at addresses 0 through 11. The initialize instruction at address 0 clears the accumulator 202 and initializes the loop counter 3804 to a value of 32 to cause the loop body (the instructions of addresses 2 through 11) to be performed 32 times. The output instruction at address 1 puts the zero values of the accumulator 202 (cleared by the initialize instruction at address 0) into the output buffer 1104. As may be observed, the 512 NPUs 126 correspond to and operate as the 512 hidden layer nodes Z during the execution of the instructions of addresses 2 through 6, and correspond to and operate as the 512 output layer nodes Y during the execution of the instructions of addresses 7 through 10. That is, the 32 execution instances of the instructions at addresses 2 through 6 compute the value of the hidden layer nodes Z for the 32 corresponding time steps and put them into the output buffer 1104 to be used by the corresponding 32 execution instances of the instructions at addresses 7 through 9 to calculate and write to the data RAM 122 the output layer nodes Y of the corresponding 32 time steps and to be used by the corresponding 32 execution instances of the instructions at address 10 to put the context layer nodes C of the corresponding 32 time steps in the output buffer 1104. (The context layer nodes C of the thirty-second time step put into the output buffer 1104 is not used.)

During the first execution instance of the instructions at addresses 2 and 3 (ADD_D_ACC OUTBUF[SELF] and ADD_D_ACC ROTATE, COUNT=511), each of the 512 NPUs 126 accumulates into its accumulator 202 the 512 context node C values of the output buffer 1104, which were generated and written by the execution of the instructions of addresses 0 through 1. During the second and subsequent execution instances of the instructions at addresses 2 and 3, each of the 512 NPUs 126 accumulates into its accumulator 202 the 512 context node C values of the output buffer 1104, which were generated and written by the execution of the instructions of addresses 7 through 8 and 10. More specifically, the instruction at address 2 instructs the mux-reg 208 of each NPU 126 to select its corresponding the output buffer 1104 word, as described above, and to add it to the accumulator 202; the instruction at address 3 instructs the NPU 126 to rotate the context node C values in the 512-word rotater collectively formed by the connected mux-regs 208 of the 512 NPUs 126 among the 512 NPUs 126 to enable each NPU 126 to accumulate the 512 context node C values into its accumulator 202. The instruction at address 3 does not clear the accumulator 202, which enables the instructions at addresses 4 and 5 to accumulate the input layer nodes D (multiplied by their corresponding weights) with the context node C values accumulated by execution of the instructions at addresses 2 and 3.

During each execution instance of the instructions at addresses 4 and 5 (MULTACCUM DR ROW+2, WR ROW 0 and MULT-ACCUM ROTATE, WR ROW+1, COUNT=511), each NPU 126 of the 512 NPUs 126 performs 512 multiply operations of the 512 input node D values in the row of the data RAM 122 associated with the current time step (e.g., row 0 for time step 0, row 2 for time step 1, and so forth to row 62 for time step 31) by the NPU's 126 respective column of weights from rows 0 through 511 of the weight RAM 124 to generate 512 products that, along with the accumulation of the 512 context C node values performed by the instructions at addresses 2 and 3, are accumulated into the accumulator 202 of the respective NPU 126 to compute the hidden node Z layer values.

During each execution of the instruction at address 6 (OUTPUT PASSTHRU, NOP, CLR ACC), the 512 accumulator 202 values of the 512 NPUs 126 are passed through and written to their respective words of the output buffer 1104, and the accumulator 202 is cleared.

During each execution instance of the instructions at addresses 7 and 8 (MULT-ACCUM OUTBUF[SELF], WR ROW 512 and MULT-ACCUM ROTATE, WR ROW+1, COUNT=511), each NPU 126 of the 512 NPUs 126 performs 512 multiply operations of the 512 hidden node Z values in the output buffer 1104 (which were generated and written by the corresponding execution instance of the instructions at addresses 2 through 6) by the NPU's 126 respective column of weights from rows 512 through 1023 of the weight RAM 124 to generate 512 products that are accumulated into the accumulator 202 of the respective NPU 126.

During the each execution instance of the instruction at address 9 (OUTPUT ACTIVATION FUNCTION, DR OUT ROW+2), an activation function (e.g., tan h, sigmoid, rectify) is performed on the 512 accumulated values to compute the output node Y layer values that are written to the row of the data RAM 122 associated with the current time stamp (e.g., row 1 for time step 0, row 3 for time step 1, and so forth to row 63 for time step 31). The output instruction at address 9 does not clear the accumulator 202.

During the each execution instance of the instruction at address 10 (OUTPUT PASSTHRU, NOP, CLR ACC), the 512 values accumulated by the instructions at addresses 7 and 8 are put into the output buffer 1104 for use by the next execution instance of the instructions at addresses 2 and 3, and the accumulator 202 is cleared.

The loop instruction at address 11 decrements the loop counter 3804 and loops back to the instruction at address 2 if the new the loop counter 3804 value is greater than zero.

As described with respect to FIG. 44, in the example Jordan RNN performed by the non-architectural program of FIG. 57, although an activation function is applied to the accumulator 202 values to generate the output layer node Y values, it is assumed that the accumulator 202 values prior to the application of the activation function are passed through to the context layer nodes C rather than the actual output layer node Y values. However, for a Jordan RNN in which an activation function is applied to the accumulator 202 values to generate the context layer nodes C, the instruction at address 10 would be eliminated from the non-architectural program of FIG. 57. Although embodiments have been described in which an Elman or Jordan RNN includes a single hidden node layer (e.g., FIGS. 40 and 42), it should be understood that embodiments of the processor 100 and NNU 121 are configured to efficiently perform the computations associated with an RNN that includes multiple hidden layers in manners similar to those described herein.

As described with respect to FIG. 2 above, advantageously each NPU 126 is configured to operate as a neuron in an artificial neural network, and all the NPUs 126 of the NNU 121 operate in a massively parallel fashion to efficiently compute the neuron output values for a layer of the network. The parallel fashion in which the NNU operates, in particular by employing the collective NPU mux-reg rotator, is perhaps counter-intuitive to the conventional manner of computing neuron layer output values. More specifically, the conventional manner typically involves performing the computations associated with a single neuron, or a relatively small subset of neurons, (e.g., using parallel arithmetic units to perform the multiplies and adds), then moving on to performing the computations associated with the next neuron in the layer, and so forth in a serial fashion until the computations have been performed for all the neurons in the layer. In contrast, each clock cycle all the NPUs 126 (neurons) of the NNU 121 in parallel perform a small subset of the computations (e.g., a single multiply and accumulate) associated with the generation of all the neuron outputs. Advantageously, by the end of the approximately M clock cycles—where M is the number of nodes connected in to the current layer—the NNU 121 has computed the output of all the neurons. For many artificial neural network configurations, due to the large number of NPUs 126, the NNU 121 may be able to compute the neuron output values for all the neurons of the entire layer in by the end of the M clock cycles. As may be observed from the descriptions herein, this computation efficiency is useful for all sorts of artificial neural network computations, including but not limited to feed-forward and recurrent neural networks, such as Elman, Jordan and LSTM networks. Finally, although embodiments are described in which the NNU 121 is configured as 512 NPUs 126 (e.g., in a wide word configuration) to perform recurrent neural network computations, other embodiments are contemplated in which the NNU 121 is configured as 1024 NPUs 126 (e.g., in a narrow word configuration) to perform recurrent neural network computations and, as described above, embodiments of the NNU 121 are contemplated having different numbers of NPUs 126 than 512 or 1024.

Neural Processing Unit

Figure 58:
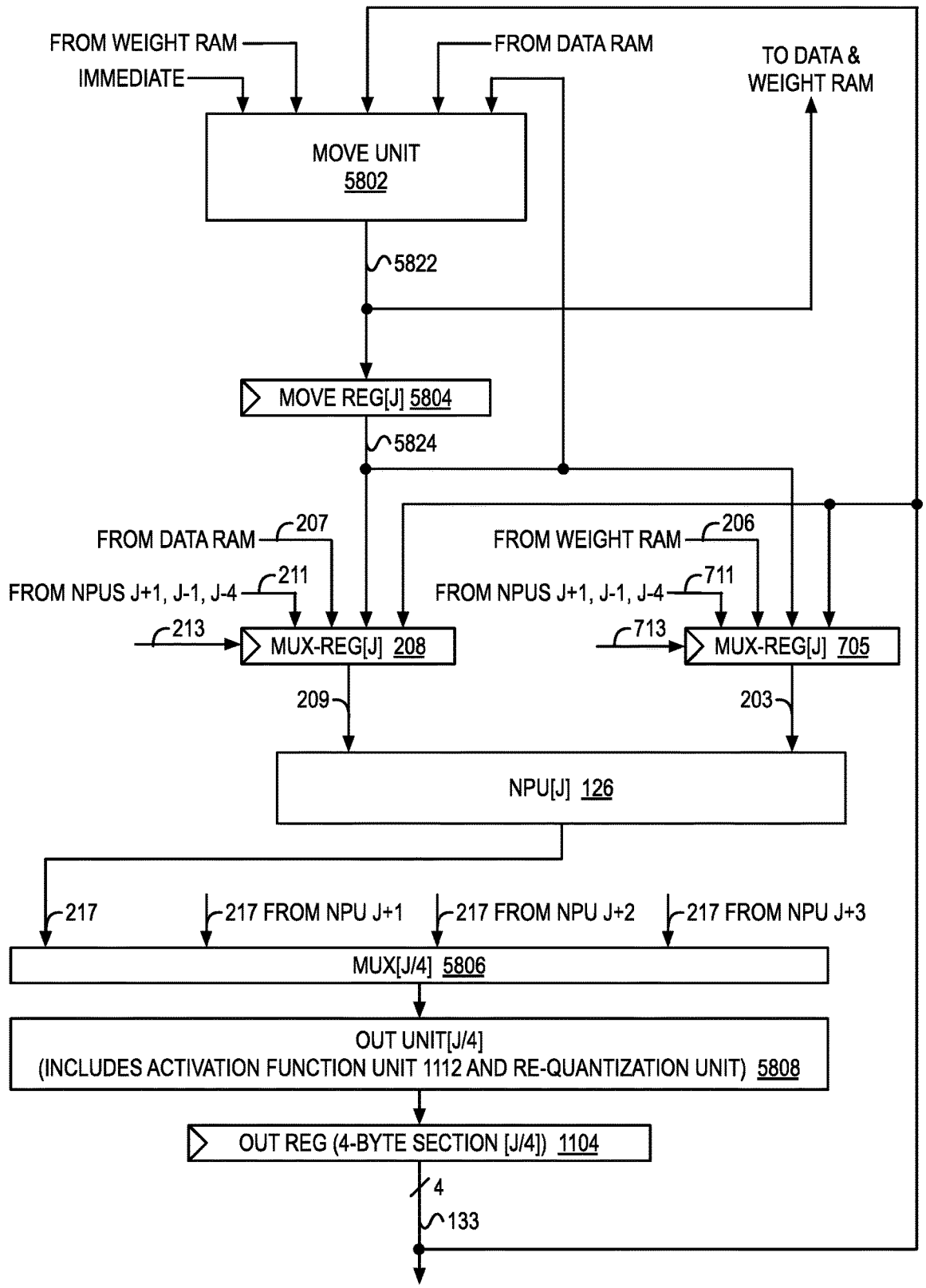
FIG. 58 is a block diagram illustrating an embodiment of portions of the NNU.

Referring now to FIG. 58, a block diagram illustrating an embodiment of portions of the NNU 121 is shown. The NNU 121 includes a move unit 5802, a move register 5804, a data mux-reg 208, a weight mux-reg 705, an NPU 126, a multiplexer 5806, out units 5808 and an out register 1104. The data mux-reg 208 and weight mux-reg 705 are similar to those described above, but modified to additionally receive an input from the move register 5804 and from additional adjacent NPUs 126. In one embodiment, the data mux-reg 208 also receives on inputs 211 the output 209 from NPUs J−1 and J−4 in addition to output 209 from J+1 as described above; similarly, the weight mux-reg 705 also receives on inputs 711 the output 203 from NPUs J−1 and J−4 in addition to output 203 from J+1 as described above. The out register 1104 is similar to that described above where referred to as the row buffer 1104 and output buffer 1104. The out units 5808 are similar in many respects to the activation function units 212/1112 described above in that they may include activation functions (e.g., sigmoid, tan h, rectify, softplus); however, preferably the out units 5808 also include a re-quantization unit that re-quantizes the accumulator 202 values, embodiments of which are described below. The NPU 126 is similar in many respects to those described above; however, aspects of the NPU 126 are described in more detail in the Figures following FIG. 58. As described above, different embodiments are contemplated in which the data and weight word widths may be various sizes (e.g., 8-bit, 9-bit, 12-bit or 16-bit) and multiple word sizes may be supported by a given embodiment (e.g., 8-bit and 16-bit). However, representative embodiments are shown with respect to the following Figures in which the data and weight word widths held in the memories 122/124, move register 5804, mux-regs 208/705 and out register 1104 are 8-bit words, i.e., bytes.

FIG. 58 illustrates a cross-section of the NNU 121. For example, the NPU 126 shown is representative of the array of NPUs 126, such as those described above. The representative NPU 126 is referred to as NPU[J] 126 of N NPUs 126, where J is between 0 and N−1. As described above, N is a large number, and preferably a power of two. As described above, N may be 512, 1024 or 2048. In one embodiment, N is 4096. Due to the large number of NPUs 126 in the array, it is advantageous that each NPU 126 is as small as possible to keep the size of the NNU 121 within desirable limits and/or to accommodate more NPUs 126 to increase the acceleration of neural network-related computations by the NNU 121. Details of embodiments of the NPU 126 that facilitate a relatively small size, while still providing many functions useful in neural network computations, are described below with respect to FIGS. 59 through 61.

Furthermore, although the move unit 5802 and the move register 5804 are each N bytes wide, only a portion of the move register 5804 is shown. Specifically, the portion of the move register 5804 whose output 5824 provides a byte to the mux-regs 208/705 of NPU[J] 126 is shown, which is denoted move reg[J] 5804. Furthermore, although the output 5822 of the move unit 5802 provides N bytes (to the memories 122/124 and to the move register 5804), only byte J is provided for loading into move reg[J] 5804, which move reg[J] 5804 subsequently provides on its output 5824 to the data mux-reg 208 and to the weight mux-reg 705.

Still further, although the NNU 121 includes a plurality of out units 5808, only a single out unit 5808 is shown in FIG. 58, namely the out unit 5808 that operates on the accumulator output 217 of NPU[J] 126 and the NPUs 126 within its NPU group, such as described above with respect to FIGS. 11 and 52. The out unit 5808 is referred to as out unit[J/4] because each out unit 5808 is shared by a group of four NPUs 126 in the embodiment of FIG. 58, similar to the embodiment of FIG. 52. Similarly, although the NNU 121 includes a plurality of multiplexers 5806, only a single multiplexer 5806 is shown in FIG. 58, namely the multiplexer 5806 that receives the accumulator output 217 of NPU[J] 126 and the NPUs 126 within its NPU group. Similarly, the multiplexer 5806 is referred to as multiplexer [J/4] because it selects one of the four accumulator 202 outputs 217 for provision to out unit[J/4] 5808.

Finally, although the out register 1104 is N bytes wide, only a single 4-byte section is shown in FIG. 58, denoted out register[J/4] 1104, which receives the four quantized bytes generated by out unit[J/4] 5808 from the four NPUs 126 of the NPU group that includes NPU[J] 126. All N bytes of the output 133 of the out register 1104 are provided to the move unit 5802, although only the four bytes of the four-byte section of out register[J/4] 1104 are shown in FIG. 58. Additionally, the four bytes of the four-byte section of out register[J/4] 1104 are provided as inputs to the mux-regs 208/705 as described in more detail with respect to FIGS. 49 and 52 above.

Although the mux-regs 208/705 are shown in FIG. 58 as distinct from the NPU 126, there is a pair of respective mux-regs 208/705 associated with each NPU 126, and the mux-regs 208/705 may be considered part of the NPU 126, as described above with respect to FIGS. 2, 7 49 and 52, for example.

The output 5822 of the move unit 5802 is coupled to the move register 5804, the data RAM 122 and the weight RAM 124, to each of which the output 5822 may be written. The move unit 5802 output 5822, the move register 5804, the data RAM 122 and the weight RAM 124 are all N bytes wide (e.g., N is 4096). The move unit 5802 receives N quantized bytes from five different sources and selects one of them as its input: the data RAM 122, the weight RAM 124, the move register 5804, the out register 1104, and an immediate value. Preferably, the move unit 5802 comprises many multiplexers that are interconnected to be able to perform operations on its input to generate its output 5822, which operations which will now be described.

The operations the move unit 5802 performs on its inputs include: passing the input through to the output; rotating the input by a specified amount; and extracting and packing specified bytes of the input. The operation is specified in a MOVE instruction fetched from the program memory 129. In one embodiment, the rotate amounts that may be specified are 8, 16, 32 and 64 bytes. In one embodiment, the rotate direction is left, although other embodiments are contemplated in which the rotate direction is right, or either direction. In one embodiment, the extract and pack operation is performed within blocks of the input of a predetermined size. The block size is specified by the MOVE instruction. In one embodiment, the predetermined block sizes are 16, 32 and 64 bytes, and blocks are located on aligned boundaries of the specified block size. Thus, for example when the MOVE instruction specifies a block size of 32, the move unit 5802 extracts the specified bytes within each 32-byte block of the N bytes of the input (e.g., if N is 4096, then there are 128 blocks) and packs them within the respective 32-byte block (preferably at one end of the block). In one embodiment, the NNU 121 also includes an N-bit mask register (not shown) associated with the move register 5804. A MOVE instruction specifying a load mask register operation may specify as its source a row of the data RAM 122 or the weight RAM 124. In response to the MOVE instruction specifying a load mask register operation, the move unit 5802 extracts bit 0 from each of the N words of the RAM row and stores the N bits into its respective bit of the N-bit mask register. The bits of the bit mask serve as a write enable/disable for respective bytes of the move register 5804 during execution of a subsequent MOVE instruction that writes to the move register 5804. In an alternate embodiment, a 64-bit mask is specified by an INITIALIZE instruction for loading into a mask register prior to execution of a MOVE instruction that specifies an extract and pack function; in response to the MOVE instruction, the move unit 5802 extracts the bytes within each block (of the 128 blocks, for example) that are specified by the 64-bit mask stored in the mask register. In an alternate embodiment, a MOVE instruction that specifies an extract and pack operation also specifies a stride and an offset; in response to the MOVE instruction, the move unit 5802 extracts every Nth byte within each block starting at the byte specified by the offset, where N is the stride, and compresses the extracted bytes together. For example, if the MOVE instruction specifies a stride of 3 and an offset of 2, then the move unit 5802 extracts every third by starting at byte 2 within each block.

Figure 59:
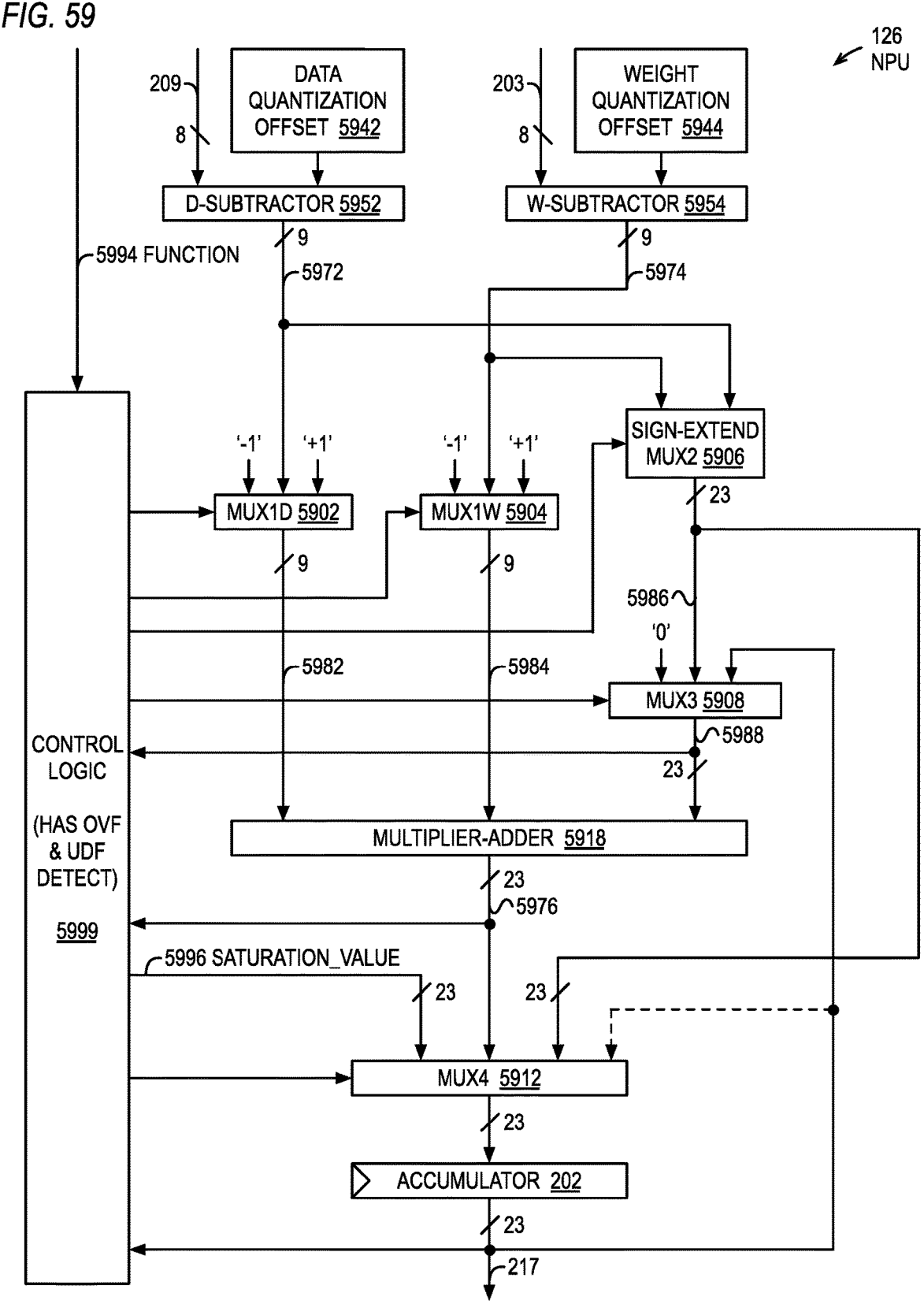
FIG. 59 is a block diagram illustrating an embodiment of a NPU.

Referring now to FIG. 59, a block diagram illustrating an embodiment of a NPU 126 is shown. The NPU 126 includes control logic 5999, a register that holds a data quantization offset 5942, a register that holds a weight quantization offset 5944, a D-subtractor 5952, a W-subtractor 5954, first multiplexer denoted mux1D 5902, a second multiplexer denoted mux1W 5904, a third multiplexer denoted mux2 5906, a fourth multiplexer denoted mux3 5908, a fifth multiplexer denoted mux4 5912, a multiplier-adder 5918, and an accumulator 202.

The D-subtractor 5952 subtracts the data quantization offset 5942 from the quantized data word 209 received from the mux-reg 208 of FIG. 58 to generate a first difference 5972, or first operand 5972, that is provided as an input to mux1D 5902. The W-subtractor 5954 subtracts the weight quantization offset 5944 from the quantized weight word 203 received from the weight mux-reg 705 of FIG. 58 to generate a second difference 5974, or second operand 5974, that is provided as an input to mux1W 5904. Preferably, the data quantization offset 5942 and weight quantization offset 5944 are programmable, either via an architectural store instruction (e.g., MTNN instruction of FIG. 14 or a memory store instruction in an embodiment in which the NNU 121 is a peripheral device, such as the ring bus-coupled embodiments described with respect to FIG. 62) or by an instruction stored in the program memory 129 and fetched by the sequencer 128 (e.g., an INITIALIZE instruction). Preferably, the data word 209, the weight word 203, the data quantization offset 5942 and the weight quantization offset 5944 are 8-bit unsigned values, and the first and second operands 5972/5974 are 9-bit signed values.

The mux1D 5902, in addition to the first operand 5972, also receives a positive one value (e.g., signed 9-bit value) and a negative one value (e.g., signed 9-bit value). Under control of the control logic 5999, the mux1D 5902 selects one of its three inputs for provision as a signed 9-bit first factor 5982 to a first input of the multiplier-adder 5918. The mux1W 5904, in addition to the second operand 5974, also receives a positive one value (e.g., signed 9-bit value) and a negative one value (e.g., signed 9-bit value). Under control of the control logic 5999, the mux1W 5904 selects one of its three inputs for provision as a signed 9-bit second factor 5984 to a second input of the multiplier-adder 5918.

The mux2 5906 receives the first operand 5972 and the second operand 5974, sign-extends them (preferably to 23 bits) and, under control of the control logic 5999, selects one of them for provision as a signed 23-bit third operand 5986 to an input of mux3 5908.

The mux3 5908, in addition to receiving the third operand 5986, also receives a zero (e.g., signed 23-bit value) and the output 217 of the accumulator 202, which is also a signed 23-bit value. Under control of the control logic 5999, the mux3 5908 selects one of its three inputs for provision as a signed 23-bit addend 5988 to a third input of the multiplier-adder 5918. The addend 5988 is also provided to the control logic 5999.

The multiplier-adder 5918 generates a signed 23-bit sum 5976 of the addend 5988 and the product of the first factor 5982 and the second factor 5984 and provides the sum 5976 as an input to the mux4 5912. The sum 5976 is also provided to the control logic 5999. A multiplier-adder is a hardware logic circuit that has at least three input operands and an output. A multiplier-adder generates a sum of one of the input operands and a product of the other two input operands. A multiplier-adder provides the sum on its output. A multiplier-adder may have additional input operands in which case it provides on its output the sum of the product of two input operands and the other input operands. For example, in the case that the multiplier-adder has four input operands, it provides on its output the sum of the product and the other two input operands.

Preferably, the multiplier-adder 5918 includes a sign 9-bit×signed 9-bit multiplier portion that generates a signed 17-bit product. Preferably, the multiplier-adder 5918 includes an adder portion that adds the signed 17-bit product and a word that is the width of the accumulator 202, which, in one embodiment, is a signed 23-bit value. Advantageously, having a multiplier-adder that is smaller relative to a conventional multiplier-adder (e.g., 16-bit×16-bit multiplier and 32-bit+32-bit adder) enables each NPU 126 to be relatively small which enables the number of NPUs 126 in the array to be larger. This may significantly increase the performance of neural network calculations performed by the NNU 121. Preferably, the multiplier-adder 5918 per- In addition to receiving the addend 5988, the sum 5976 and the accumulator 202 output 217, the control logic 5999 also receives a function 5994. The function 5994 specifies the operation, or function, the NPU 126 is commanded to perform. Preferably, the function 5994 is part of the micro-operation 3418 provided to the NPU 126, e.g., as described above with respect to FIG. 34. The control logic 5999 provides the appropriate saturation value 5996 and controls mux1D 5902, mux1W 5904, mux2 5906, mux3 5908, and mux4 5912 to accomplish the specified operation/function as will now be described below with respect to Table 1.

TABLE 1

| FUNCTION | OPCODE NAME | 1D | 1W | 2 | 3 | 4 |
|---|---|---|---|---|---|---|
| ACC = D*W + ACC | D_TIMES_W_ACC | D | W | X | ACC | SV if OVF/UDF, else SUM |
| ACC = D*W | D_TIMES_W | D | W | X | 0 | SUM |
| ACC = D + ACC | D_PLUS_ACC | D | +1 | X | ACC | SV if OVF/UDF, else SUM |
| ACC = D | D_ONLY | D | +1 | X | 0 | SUM |
| ACC = W + ACC | W_PLUS_ACC | +1 | W | X | ACC | SV if OVF/UDF, else SUM |
| ACC = W | W_ONLY | +1 | W | X | 0 | SUM |
| ACC = ACC − D | ACC_MINUS_D | D | −1 | X | ACC | SV if OVF/UDF, else SUM |
| ACC = −D | MINUS_D | D | −1 | X | 0 | SUM |
| ACC = ACC − W | ACC_MINUS_W | −1 | W | X | ACC | SV if OVF/UDF, else SUM |
| ACC = −W | MINUS_W | −1 | W | X | 0 | SUM |
| ACC = MAX(D, ACC) | D_MAX_ACC | D | −1 | D | ACC | M2 if new sign negative; else ACC |
| ACC = MAX(W, ACC) | W_MAX_ACC | −1 | W | W | ACC | M2 if new sign negative; else ACC |
| ACC = MIN(D, ACC) | D_MIN_ACC | D | −1 | D | ACC | M2 if new sign positive; else ACC |
| ACC = MIN(W, ACC) | W_MIN_ACC | −1 | W | W | ACC | M2 if new sign positive; else ACC |
| ACC = D + W | D_PLUS_W | +1 | W | D | M2 | SV if OVF/UDF, else SUM |
| ACC = D − W | D_MINUS_W | −1 | W | D | M2 | SV if OVF/UDF, else SUM |
| ACC = W − D | W_MINUS_D | D | −1 | W | M2 | SV if OVF/UDF, else SUM |
| ACC = 0 | ACC_EQ_0 | D | −1 | D | 0 | SUM | forms the function performed by the combination of the multiplier 242 and adder 244 of FIGS. 1 and 7, for example.

In one embodiment, the multiplier-adder 5918 of FIG. 59 is hardware logic synthesized by a logic synthesis tool (e.g., well-known synthesis tools developed by Synopsys, Inc. of Mountain View, Calif. or by Cadence Design Systems, Inc. of San Jose, Calif.) from a Verilog statement such as:

assign $D=(A*B)+C$;

where A is the output of multiplexer 1D 5902 (first factor 5982), B is the output of multiplexer 1W 5904 (second factor 5984), C is the output of multiplexer 3 5908 (addend 5988), and D is the output of the multiplier-adder 5918 (sum 5976). Preferably, A and B are declared as signed 9-bit logic values, and C and D are declared as signed 23-bit logic values.

The mux4 5912, in addition to the sum 5976, also receives the third operand 5986 from mux2 5906 on a second input and receives a saturation value 5996 from the control logic 5999 on a third input. Under the control of the control logic 5999, mux4 5912 selects one of its inputs for provision to the input of the accumulator 202. In one embodiment, the accumulator 202 is a register, and the mux4 5912 also receives the output 217 of the accumulator 202 on a fourth input, which enables the accumulator 202 to retain its current value by writing the current value back to itself. In an alternate embodiment, rather than updating the accumulator 202 with the output of mux4 5912, the accumulator 202 is simply clock gated, i.e., does not update, in cases where it is desired to retain the current accumulator 202 value. Such an example is when the accumulator 202 is the greater value of a max function or is the smaller value of a min function, as described in more detail below. This may save power since the accumulator 202 does not toggle most of its gates. In this embodiment, there is no need for a feedback path from the accumulator 202 into mux4 5912.

In Table 1, the FUNCTION column specifies the mathematical function, or operation, performed by the NPU 126 in response to an instruction, or command, that specifies the function 5994 denoted in the OPCODE NAME column. The 1D, 1W, 2, 3, and 4 columns correspond with mux1D 5902, mux1W 5904, mux2 5906, mux3 5908, and mux4 5912, respectively. The values in these columns specify which input the control logic 5999 controls the given multiplexer to select in response to an instruction/command that specifies the function/operation listed in the given row of Table 1. In Table 1:

1. MAX(X,Y) refers to the maximum of the two specified inputs;
2. MIN(X,Y) refers to the minimum of the two specified inputs;
3. ACC refers to the accumulator 202 output 217;
4. D refers to the first operand 5972 output of the D-subtractor 5952;
5. W refers to the second operand 5974 output of the W-subtractor 5954;
6. +1 refers to the positive one input of mux1D 5902 or mux1W 5902;
7. −1 refers to the negative one input of mux1D 5902 or mux1W 5902;
8. X refers to a don't care condition;
9. M2 refers to the third operand 5986 output of mux2 5906, which is either D or W;
10. SV refers to the saturation value 5996;
11. SUM refers to the sum 5976 output of the multiplier-adder 5918;
12. new sign refers to the sign of the sum 5976; and
13. OVF/UDF refers to an overflow/underflow condition detected by the control logic 5999.

So, for example, when the instruction fetched from the program memory 129 and executed by the NPU 126 specifies the D_TIMES_W_ACC function, as described in Table 1:

1. mux1D 5902 selects the first operand 5972;
2. mux1W 5904 selects the second operand 5974;
3. mux2 5906 is a don't care;
4. mux3 5908 selects the accumulator 202 output 217; and
5. mux4 5912 selects the saturation value 5996 if the control logic 5999 detects and overflow/underflow, and otherwise selects the sum 5976.

For another example, when the instruction fetched from the program memory 129 and executed by the NPU 126 specifies the D_MAX_ACC function, as described in Table 1:
1. mux1D 5902 selects the first operand 5972;
2. mux1W 5904 selects the negative one;
3. mux2 5906 selects the first operand 5972;
4. mux3 5908 selects the accumulator 202 output 217; and
5. mux4 5912 selects the third operand 5986 (which in this case is the first operand 5972 selected by mux2 5906) if the sign of the sum 5976 is negative (e.g., if the upper bit of the sum 5976 is a binary one), and otherwise the control logic 5999 causes the current value of the accumulator 202 to be retained.

For yet another example, when the instruction fetched from the program memory 129 and executed by the NPU 126 specifies the D_PLUS_W function, as described in Table 1:
1. mux1D 5902 selects the positive one;
2. mux1W 5904 selects the second operand 5974;
3. mux2 5906 selects the first operand 5972;
4. mux3 5908 selects the third operand 5986 output by mux2 5906; and
5. mux4 5912 selects the saturation value 5996 if the control logic 5999 detects and overflow/underflow, and otherwise selects the sum 5976.

The W_MAX_ACC function is used in the max-pooling operation of FIG. 28 (there referred to as MAXWACC), for example. The D_PLUS_ACC function is used in the recurrent neural network calculations described in FIGS. 42, 45, 51, 54 and 57 (there referred to as ADD_D_ACC), for example.

Preferably, the control logic 5999 includes overflow/underflow logic that is advantageously simplified by recognizing that the sizes of the two values being added by the multiplier-adder 5918 have different sizes. For example, the addend 5988 is preferably 23 bits, whereas the product of the first and second factors 5982/5984 is fewer bits, e.g., 17 bits. The overflow/underflow logic of the embodiment of FIG. 59 only examines the top two bit of the addend 5988 and the sign of the sum 5976. More specifically, if the top two bits of the addend 5988 are a binary 01 and the sign of the sum 5976 is negative, then the control logic 5999 detects an overflow; and if the top two bits of the addend 5988 are a binary 10 and the sign of the sum 5976 is positive, then the control logic 5999 detects an underflow.

If the control logic 5999 detects an overflow, then it outputs the most positive representable number as the saturation value 5996; if the control logic 5999 detects an underflow, then it outputs the most negative representable number as the saturation value 5996.

Figure 60:
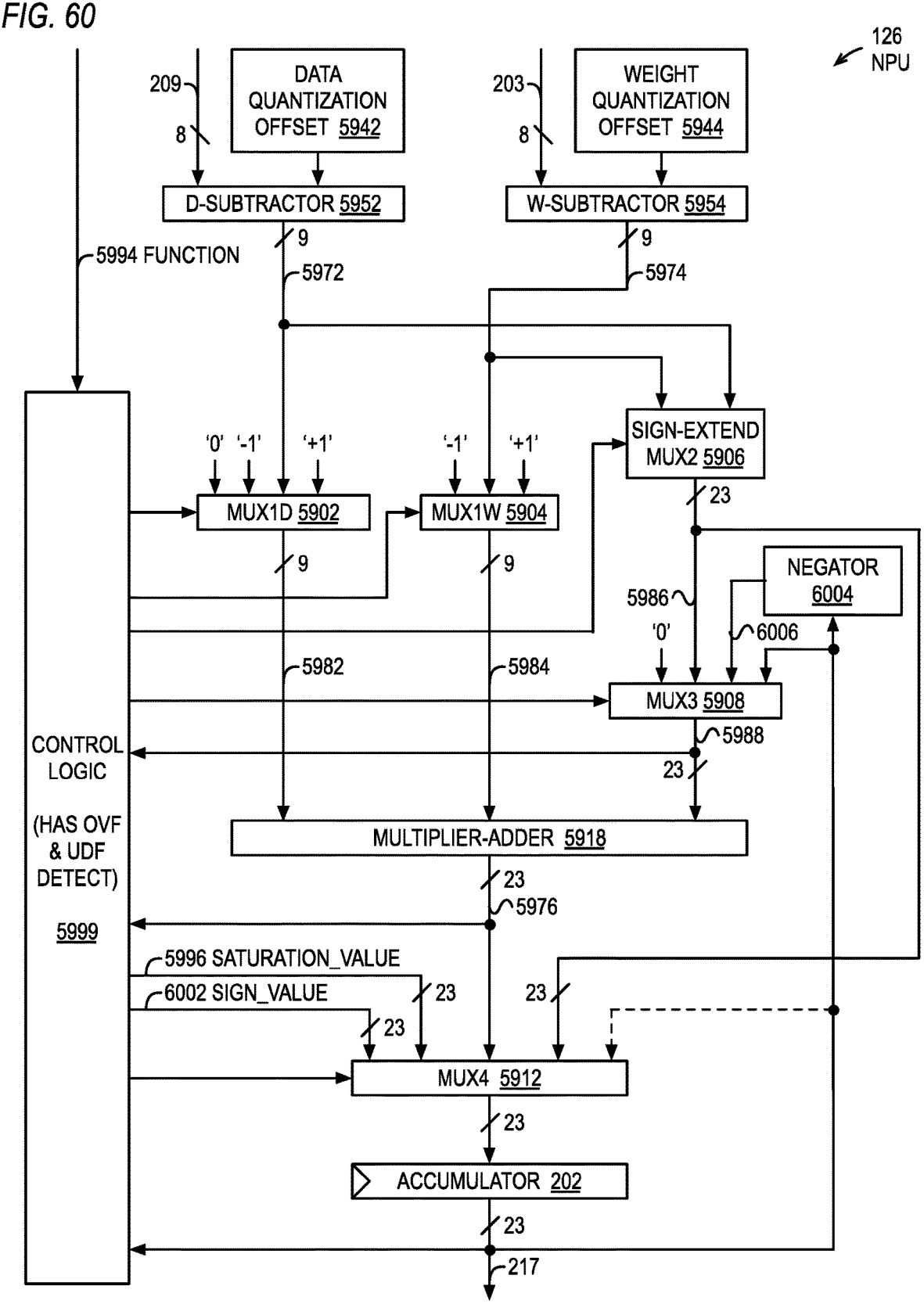
FIG. 60 is a block diagram illustrating an alternate embodiment of a NPU.

In one embodiment, the NPU 126 includes additional staging registers (not shown). For example, mux1D 5902, mux1W 5902 and mux2 5906 may be multiplexed-registers. Referring now to FIG. 60, a block diagram illustrating an alternate embodiment of a NPU 126 is shown. The NPU 126 of FIG. 60 is similar in many respects to the NPU 126 of FIG. 59. However, the NPU 126 of FIG. 60 also includes a negator 6004, mux1D 5902 also receives a zero value, and the control logic 5999 provides a sign value 6002 as an additional input to mux4 5912. The negator 6004 receives the accumulator output 217 and outputs its two's-complement, i.e., the arithmetic negative of the accumulator output 217, also referred to as the negated value of the accumulator 202. The sign value 6002 is one of three distinct predetermined values that indicate whether the input (e.g., accumulator 202) is positive, negative or zero. In one embodiment, the sign value 6002 is zero when the accumulator 202 is zero, is binary 01 when the accumulator 202 is positive, and is binary 11 when the accumulator 202 is negative. The negator 6004, the zero input to mux1D 5902 and the sign value 6002 enable the NPU 126 of FIG. 60 to support at least three additional functions/operations specified on the function 5994 input to the control logic 5999, namely an absolute value, a negate and a sign of the accumulator 202. Table 2 below describes the operation of the control logic 5999 to control the multiplexers 5902/5904/5906/5908/5912 for the three additional functions.

TABLE 2

| FUNCTION | OPCODE NAME | 1D | 1W | 2 | 3 | 4 |
|---|---|---|---|---|---|---|
| ACC = ABS(ACC) | ACC_ABS | Z | X | X | N | SUM if old sign negative, else ACC |
| ACC = NEG(ACC) | ACC_NEG | Z | X | X | N | SUM |
| ACC = SIGN(ACC) | ACC_SIGN | X | X | X | X | SIGN_VALUE |

In Table 2:
1. ABS(X) refers to the absolute value of the input;
2. NEG(X) refers to the arithmetic negative of the input;
3. SIGN(X) refers to indicating whether the input is positive, negative or zero;
4. Z refers to the zero input to mux1D 5902;
5. N refers to the negator 6004 output 6006 (arithmetic negative of the accumulator 202);
6. SIGN_VALUE refers to the sign value 6002; and
7. old sign refers to the sign of the addend 5988, which is the accumulator 202 output 217 in the case of ABS (ACC) because mux3 5908 selects it.

So, when the instruction fetched from the program memory 129 and executed by the NPU 126 specifies the ABS ACC function, as described in Table 2:
1. mux1D 5902 selects the zero input;
2. mux3 5908 selects the negator 6004 output 6006 (arithmetic negative of the accumulator 202); and
3. mux4 5912 selects the sum 5976 if the control logic 5999 detects the old/current value of the accumulator 202 is negative, and otherwise the control logic 5999 causes the current value of the accumulator 202 to be retained.

And, when the instruction fetched from the program memory 129 and executed by the NPU 126 specifies the ABS_NEG function, as described in Table 2:
1. mux1D 5902 selects the zero input;
2. mux3 5908 selects the negator 6004 output 6006 (arithmetic negative of the accumulator 202); and
3. mux4 5912 selects the sum 5976.

Finally, when the instruction fetched from the program memory 129 and executed by the NPU 126 specifies the ABS_SIGN function, as described in Table 2:

1. the control logic 5999 outputs a sign value 6002 of zero when the accumulator 202 is zero, of binary 01 when the accumulator 202 is positive, and of binary 11 when the accumulator 202 is negative; and
2. mux4 5912 selects the sign value 6002.

As may be observed from the above, when the function 5996 specifies ACC_ABS or ACC_NEG, the multiplier-adder 5918 will add zero to the addend 5988 since the product of the first and second factors 5982/5984 will be zero because the first factor 5982 will be zero because mux1D 5902 selects the zero input. This results in the sum 5976 simply being the addend 5988 value, which is the negated accumulator 202 value 6006 when the function 5996 specifies ACC_NEG or specifies ACC_ABS when the accumulator 202 is negative; whereas, when the function specifies ACC_ABS when the accumulator 202 is positive, the control logic 5999 causes the current value of the accumulator 202 to be retained. In an alternate embodiment, mux1W 5904 receives the zero value, rather than mux1D 5902, to accomplish the same purpose.

Figure 61:
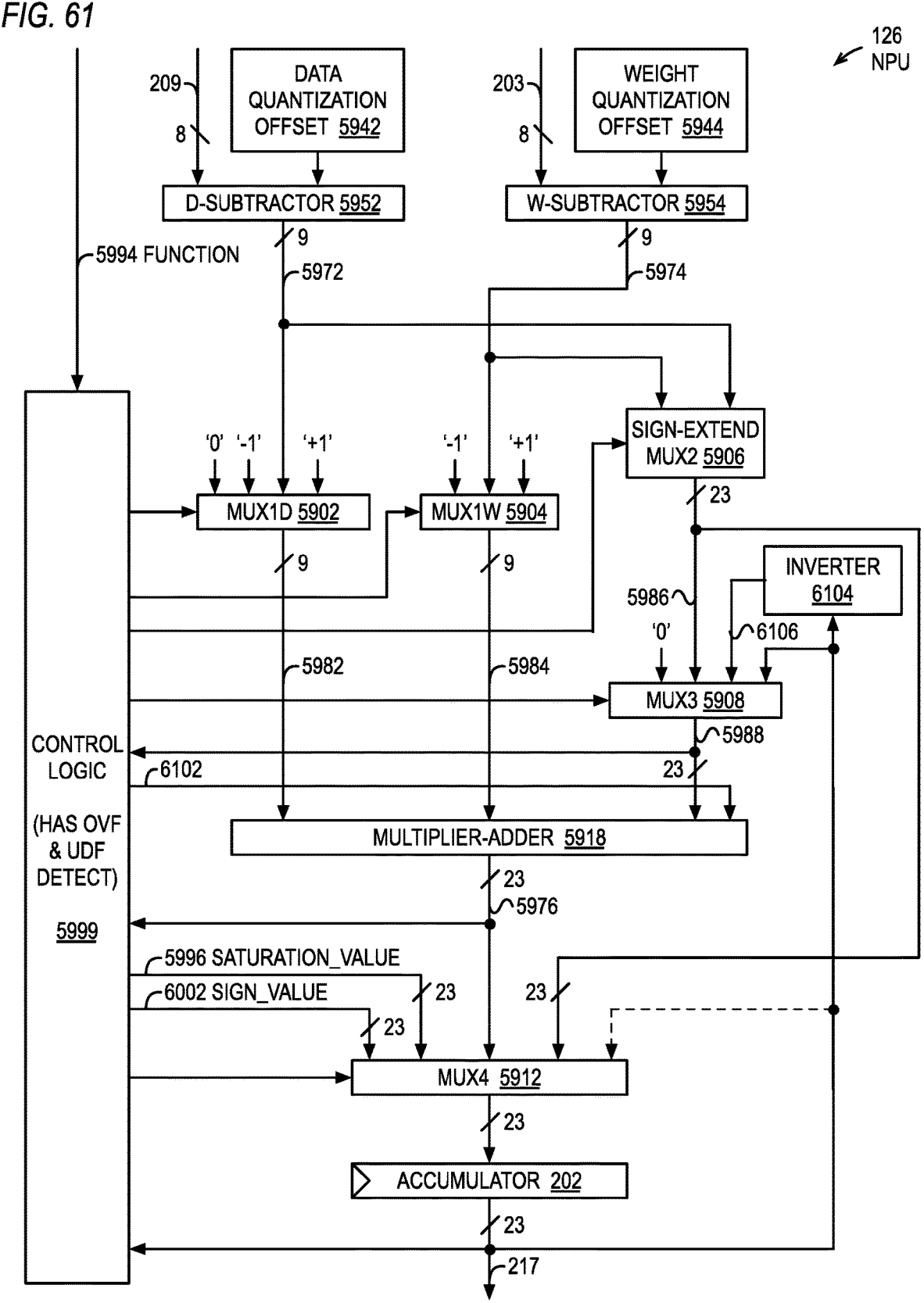
FIG. 61 is a block diagram illustrating an alternate embodiment of a NPU.

Referring now to FIG. 61, a block diagram illustrating an alternate embodiment of a NPU 126 is shown. In the alternate embodiment of FIG. 61, the negator 6004 of FIG. 60 is replaced with an inverter 6104 whose output is provided to multiplexer 3 5908. The output 6106 of the inverter 6104 is the one's-complement of the accumulator output 217, i.e., each bit of the accumulator output 217 is inverted, also referred to as the inverted value of the accumulator 202. Additionally, the control logic 5999 provides an additional one-bit addend 6102 to the multiplier-adder 5918 into the least significant place of the multiplier-adder 5918. The one-bit addend 6102 is a binary one when the opcode is ACC_NEG or when the opcode is ACC_ABS and accumulator output 217 is negative; otherwise, the one-bit addend 6102 is a binary zero. When the opcode is ACC_ABS and accumulator output 217 is negative, the addition of the binary one addend 6102 to the bitwise inverted value 6106 of the accumulator 202 (and to the zero product) by the multiplier-adder 5918 generates a sum 5976 that is the two's complement of the accumulator output 217. The embodiment of FIG. 61 may have the advantage of being a smaller NPU 126 than the embodiment of FIG. 60.

Ring Bus-Coupled Neural Network Unit; Slave and Multiple Master Interfaces; DMA Controllers Programmable by Both Slave and Neural Network Program; Multiple Micro-Operation Sources Embodiments have been described above in which the NNU 121 is an execution unit of a processor 100. Embodiments will now be described in which the NNU 121 resides on a ring bus along with more conventional processing cores of a multi-core processor to operate as a neural network accelerator shared by the other cores to perform neural network-related computations on behalf of the cores in a more expeditious manner than the cores can perform them. In many respects, the NNU 121 operates like a peripheral device in that programs running on the cores may control the NNU 121 to perform the neural network-related computations. Preferably, the multi-core processor and NNU 121 are fabricated on a single integrated circuit. Because the size of the NNU 121 may be significantly large, particularly for embodiments in which the number of NPUs 126 and size of the memories 122/124 is large (e.g., 4096 NPUs 126 with 4096 byte-wide data RAM 122 and weight RAM 124), such an embodiment may provide the advantage that it does not increase the size of each core by the size of the NNU 121, but instead there are fewer NNUs 121 than cores and the cores share the NNU 121, which enables the integrated circuit to be smaller, albeit in exchange for potentially less performance.

Figure 62:
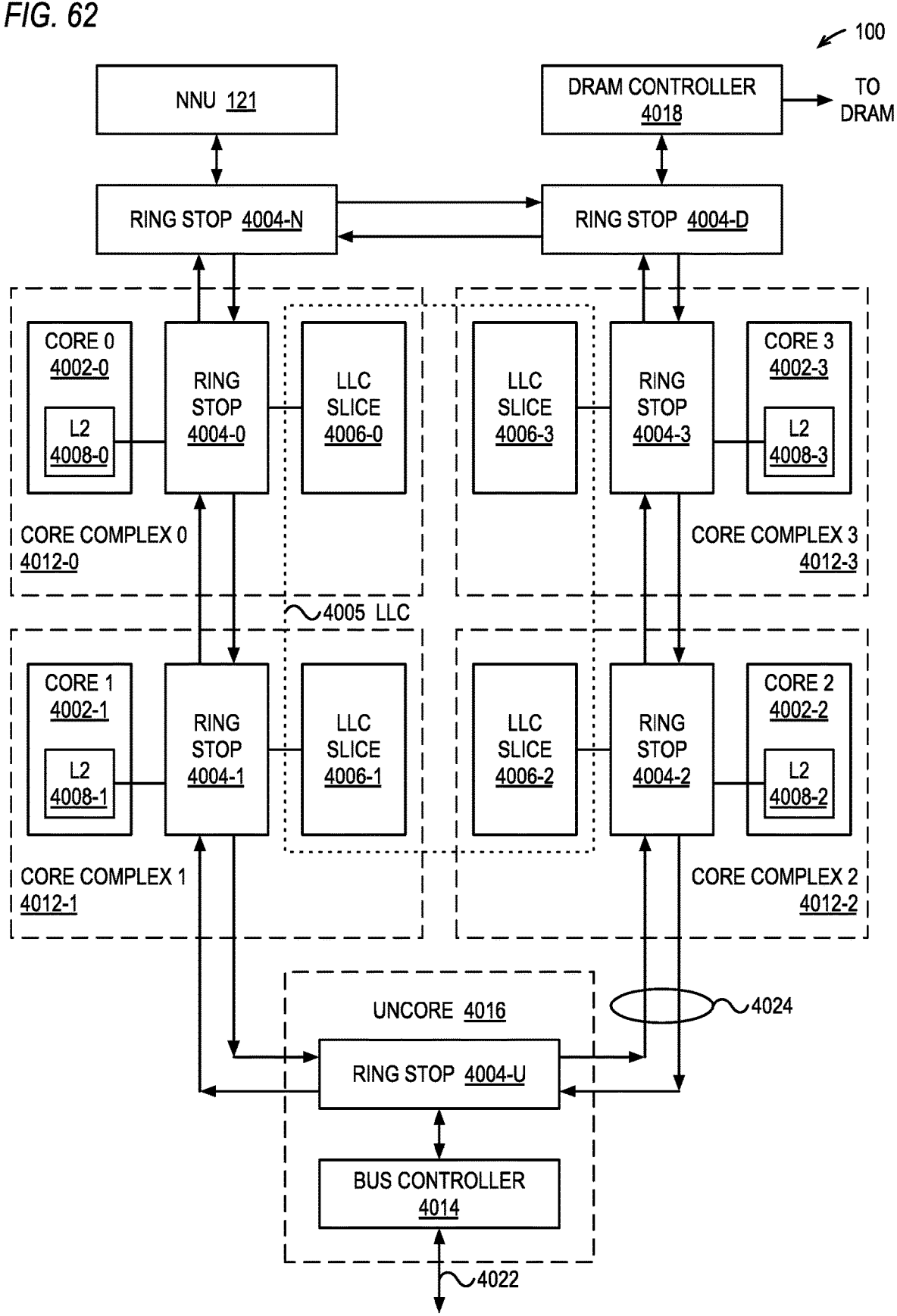
FIG. 62 is a block diagram illustrating a processor.

Referring now to FIG. 62, a block diagram illustrating a processor 100 is shown. The processor 100 includes a plurality of ring stops 4004 connected to one another in a bidirectional fashion to form a ring bus 4024. The embodiment of FIG. 40 includes seven ring stops denoted 4004-0, 4004-1, 4004-2, 4004-3, 4004-M, 4004-D and 4004-U. The processor 100 includes four core complexes 4012, referred to individually as core complex 0 4012-0, core complex 1 4012-1, core complex 2 4012-2 and core complex 3 4012-3, which include the four ring stops 4004-0, 40041, 4004-2 and 4004-3 respectively, that couple the core complexes 4012 to the ring bus 4024. The processor 100 also includes an uncore portion 4016, which includes the ring stop 4004-U that couples the uncore 4016 to the ring bus 4024. Finally, the processor 100 includes a dynamic random access memory (DRAM) controller 4018 that is coupled to the ring bus 4024 by the ring stop 4004-D. Finally, the processor 100 includes a NNU 121 that is coupled to the ring bus 4024 by the ring stop 4004-M. In one embodiment, described in U.S. Non-Provisional application Ser. Nos. 15/366,027, 15/366,053 and 15/366,057, hereinafter referred to as the "Dual Use NNU Memory Array Applications," each filed on Dec. 1, 2016, and each of which is hereby incorporated by reference herein in its entirety, the NNU 121 includes a memory array that may be employed as either a memory used by the array of NPUs 126 of the NNU 121 (e.g., weight RAM 124 of FIG. 1) or as a cache memory shared by the core complexes 4012, e.g., as a victim cache or as a slice of a last-level cache (LLC), as described therein. Although the example of FIG. 40 includes four core complexes 4012, other embodiments are contemplated with different numbers of core complexes 4012. For example, in one embodiment the processor 100 includes eight core complexes 4012.

The uncore 4016 includes a bus controller 4014 that controls access by the processor 100 to a system bus 4022 to which peripheral devices may be coupled, for example, such as video controllers, disk controllers, peripheral bus controllers (e.g., PCI-E), etc. In one embodiment, the system bus 4022 is the well-known V4 bus. The uncore 4016 may also include other functional units, such as a power management unit and private RAM (e.g., non-architectural memory used by microcode of the cores 4002). In an alternate embodiment, the DRAM controller 4018 is coupled to the system bus, and the NNU 121 accesses system memory via the ring bus 4024, bus controller 4014 and DRAM controller 4018.

The DRAM controller 4018 controls DRAM (e.g., asynchronous DRAM or synchronous DRAM (SDRAM) such as double data rate synchronous DRAM, direct Rambus DRAM or reduced latency DRAM) that is the system memory. The core complexes 4012, uncore 4016 and NNU 121 access the system memory via the ring bus 4024. More specifically, the NNU 121 reads neural network weights and data from the system memory into the data RAM 122 and weight RAM 124 and writes neural network results from the data RAM 122 and weight RAM 124 to the system memory via the ring bus 4024. Additionally, when operating as a victim cache, the memory array (e.g., data RAM 122 or weight RAM 124), under the control of cache control logic, evicts cache lines to the system memory. Furthermore, when operating as a LLC slice, the memory array and cache control logic fill cache lines from the system memory and write back and evict cache lines to the system memory.

The four core complexes 4012 include respective LLC slices 4012-0, 4012-1, 4012-2 and 4012-3, each of which is coupled to the ring stop 4004, and which are referred to individually generically as LLC slice 4006 and collectively as LLC slices 4006. Each core 4002 includes a cache memory, such as a level-2 (L2) cache 4008 coupled to the ring stop 4004. Each core 4002 may also include a level-1 cache (not shown). In one embodiment, the cores 4002 are x86 instruction set architecture (ISA) cores, although other embodiments are contemplated in which the cores 4002 are of another ISA, e.g., ARM, SPARC, MIPS.

The LLC slices 4006-0, 4006-1, 4006-2 and 4006-3 collectively form a LLC 4005 of the processor 100 shared by the core complexes 4012, as shown in FIG. 40. Each LLC slice 4006 includes a memory array and cache control logic. A mode indicator may be set such that the memory array of the NNU 121 operates as an additional (e.g., fifth or ninth) slice 4006-4 of the LLC 4005, as described in the Dual Use NNU Memory Array Applications incorporated by reference above. In one embodiment, each LLC slice 4006 comprises a 2 MB memory array, although other embodiments are contemplated with different sizes. Furthermore, embodiments are contemplated in which the sizes of the memory array and the LLC slices 4006 are different. Preferably, the LLC 4005 is inclusive of the L2 caches 4008 and any other caches in the cache hierarchy (e.g., L1 caches).

The ring bus 4024, or ring 4024, is a scalable bidirectional interconnect that facilitates communication between coherent components including the DRAM controller 4018, the uncore 4016, and the LLC slices 4006. The ring 4024 comprises two unidirectional rings, each of which further comprises five sub-rings: Request, for transporting most types of request packets including loads; Snoop, for transporting snoop request packets; Acknowledge, for transporting response packets; Data, for transporting data packets and certain request items including writes; and Credit, for emitting and obtaining credits in remote queues. Each node attached to the ring 4024 is connected via a ring stop 4004, which contains queues for sending and receiving packets on the ring 4024, e.g., as described in more detail with respect to FIGS. 63 through 65. Queues are either egress queues that initiate requests on the ring 4024 on behalf of an attached component, or ingress queues that receive requests from the ring 4024 to be forwarded to an attached component. Before an egress queue initiates a request on the ring, it first obtains a credit on the Credit ring from the remote destination ingress queue. This ensures that the remote ingress queue has resources available to process the request upon its arrival. When an egress queue wishes to send a transaction packet on the ring 4024, it can only do so if it would not preempt an incoming packet ultimately destined to a remote node. When an incoming packet arrives in a ring stop 4004 from either direction, the packet's destination ID is interrogated to determine if this ring stop 4004 is the packet's ultimate destination. If the destination ID is not equal to the ring stop's 4004 node ID, the packet continues to the next ring stop 4004 in the subsequent clock. Otherwise, the packet leaves the ring 4024 in the same clock to be consumed by whichever ingress queue is implicated by the packet's transaction type.

Generally, the LLC 4005 comprises N LLC slices 4006, where each of the N slices 4006 is responsible for caching a distinct approximately 1/Nth of the processor's 100 physical address space determined by a hashing algorithm, or hash algorithm, or simply hash. The hash is a function that takes as input a physical address and selects the appropriate LLC slice responsible for caching the physical address. When a request must be made to the LLC 4005, either from a core 4002 or snooping agent, the request must be sent to the appropriate LLC slice 4006 that it responsible for caching the physical address of the request. The appropriate LLC slice 4006 is determined by applying the hash to the physical address of the request.

A hash algorithm is a subjective function whose domain is the set of physical addresses, or a subset thereof, and whose range is the number of currently included LLC slices 4006. More specifically, the range is the set of indexes of the LLC slices 4006, e.g., 0 through 7 in the case of eight LLC slices 4006. The function may be computed by examining an appropriate subset of the physical address bits. For example, in a system with eight LLC slices 4006, the output of the hashing algorithm may be simply PA[10:8], which is three of the physical address bits, namely bits 8 through 10. In another embodiment in which the number of LLC slices 4006 is eight, the output of the hash is a logical function of other address bits, e.g., three bits generated as {PA[17], PA[14], PA[12]^PA[10]^PA[9]}.

All requestors of the LLC 4005 must have the same hash algorithm before any LLC 4005 caching is done. Because the hash dictates where addresses are cached and where snoops will be sent during operation, the hash is only changed through coordination between all cores 4002, LLC slices 4006, and snooping agents. As described in the Dual Use NNU Memory Array Applications, updating the hash algorithm essentially comprises: (1) synchronizing all cores 4002 to prevent new cacheable accesses; (2) performing a write-back-invalidate of all LLC slices 4006 currently included in the LLC 4005, which causes modified cache lines to be written back to system memory and all cache lines to be invalidated (the write-back-invalidate may be a selective writeback-invalidate, described below, in which only those cache lines whose addresses the new hash algorithm will hash to a different slice than the old hash algorithm are evicted, i.e., invalidated and, if modified, written back before being invalidated); (3) broadcasting a hash update message to each core 4002 and snoop source, which commands them to change to a new hash (either from inclusive hash to exclusive hash, or vice versa, as described below); (4) updating the mode input to selection logic that controls access to the memory array; and (5) resuming execution with the new hash algorithm.

The hash algorithms described above are useful when the number of LLC slices 4006, N, is 8, which is a power of 2, and those algorithms may be modified to easily accommodate other powers of 2, e.g., PA[9:8] for 4 slices or PA[11:8] for 16 slices. However, depending upon whether the NNU LLC slice 4006-4 is included in the LLC 4005 (and the number of core complexes 4012), N may or may not be a power of 2. Therefore, as described in the Dual Use NNU Memory Array Applications, at least two different hashes may be used when the NNU 121 memory array has a dual use.

In an alternate embodiment, the NNU 121 and DRAM controller 4018 are both coupled to a single ring stop 4004. The single ring stop 4004 includes an interface that enables the NNU 121 and DRAM controller 4018 to transfer requests and data between each other rather than doing so over the ring bus 4024. This may be advantageous because it may reduce traffic on the ring bus 4024 and provide increased performance of transfers between the NNU 121 and system memory.

Preferably, the processor 100 is fabricated on a single integrated circuit, or chip. Thus, data transfers may be accomplished between the system memory and/or LLC 4005 and the NNU 121 at a very high sustainable rate, which may be very advantageous for neural network applications, particularly in which the amount of weights and/or data is relatively large. That is, the NNU 121, although not an execution unit of a core 4002 as in the embodiment of FIG. 1, is tightly coupled to the cores 4002, which may provide a significant memory performance advantage over, for example, a neural network unit that couples to a peripheral bus, such as a PCIe bus.

Figure 63:
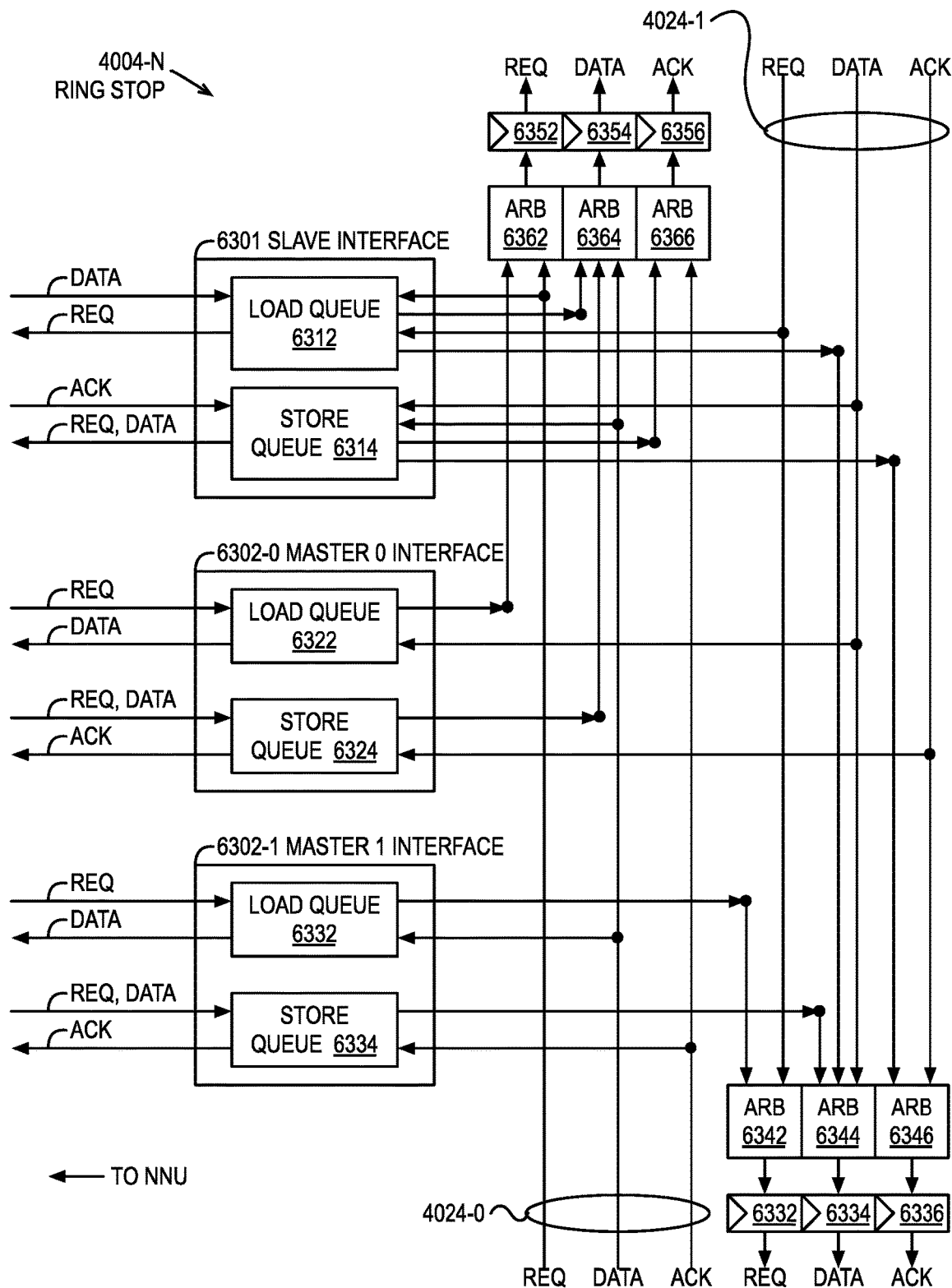
FIG. 63 is a block diagram illustrating the ring stop of FIG. 62 in more detail.

Referring now to FIG. 63, a block diagram illustrating the ring stop 4004-N of FIG. 62 in more detail is shown. The ring stop 4004-N includes a slave interface 6301, a first master interface referred to as master interface 0 6302-0, and a second master interface referred to as master interface 1 6302-1. Master interface 0 6302-0 and master interface 1 6302-1 are referred to generically individually as master interface 6302 and collectively as master interfaces 6302. The ring stop 4004-N also includes three arbiters 6362, 6364 and 6366 coupled to respective buffers 6352, 6354 and 6356 that respectively provide an outgoing request (REQ), data (DATA) and acknowledgement (ACK) on a first unidirectional ring 4024-0 of the ring bus 4024; the three arbiters 6362, 6364 and 6366 respectively receive an incoming request (REQ), data (DATA) and acknowledgement (ACK) on the first unidirectional ring 4024-0. The ring stop 4004-N includes an additional three arbiters 6342, 6344 and 6346 coupled to additional respective buffers 6332, 6334 and 6336 that respectively provide an outgoing request (REQ), data (DATA) and acknowledgement (ACK) on the second unidirectional ring 4024-1 of the ring bus 4024; the three arbiters 6342, 6344 and 6346 respectively receive an incoming request (REQ), data (DATA) and acknowledgement (ACK) on the second unidirectional ring 4024-1. The Request, Data and Acknowledgement sub-rings of each unidirectional ring of the ring bus 4024 are described above. The Snoop and Credit sub-rings are not shown, although the slave interface 6301 and master interfaces 6302 are also coupled to the Snoop and Credit sub-rings.

The slave interface 6301 includes a load queue 6312 and a store queue 6314; the master interface 0 6302-0 includes a load queue 6322 and a store queue 6324; and the master interface 1 6302-1 includes a load queue 6332 and a store queue 6334. The slave interface 6301 load queue 6312 receives and queues requests from both unidirectional rings 4024-0 and 4024-1 of the ring bus 4024 and provides queued data to each of the respective arbiters 6364 and 6344 of the ring bus 4024. The slave interface 6301 store queue 6314 receives and queues data from both directions of the ring bus 4024 and provides acknowledgements to each of the respective arbiters 6366 and 6346 of the ring bus 4024. The master interface 0 6302-0 load queue 6322 receives data from the second unidirectional ring 4024-1 and provides queued requests to arbiter 6362 of the first unidirectional ring 4024-0. The master interface 0 6302-0 store queue 6324 receives acknowledgements from the second unidirectional ring 4024-1 and provides queued data to arbiter 6364 of the first unidirectional ring 4024-0. The master interface 1 6302-1 load queue 6332 receives data from the first unidirectional ring 4024-0 and provides queued requests to arbiter 6342 of the second unidirectional ring 4024-1. The master interface 1 6302-1 store queue 6334 receives acknowledgements from the first unidirectional ring 4024-0 and provides queued data to arbiter 6344 of the second unidirectional ring 4024-1. The slave interface 6301 load queue 6312 provides queued requests to the NNU 121 and receives data from the NNU 121. The slave interface 6301 store queue 6314 provides queued requests and data to the NNU 121 and receives acknowledgements from the NNU 121. The first master interface 0 6302-0 load queue 6322 receives and queues requests from the NNU 121 and provides data to the NNU 121. The first master interface 0 6302-0 store queue 6324 receives and queues requests and data from the NNU 121 and provides acknowledgements to the NNU 121. The second master interface 1 6302-1 load queue 6332 receives and queues requests from the NNU 121 and provides data to the NNU 121. The second master interface 1 6302-2 store queue 6334 receives and queues requests and data from the NNU 121 and provides acknowledgements to the NNU 121.

Typically, the slave interface 6301 receives requests made by a core 4002 to load data from the NNU 121 (which are received by the load queue 6312) and receives requests made by a core 4002 to store data to the NNU 121 (which are received by the store queue 6314), although the slave interface 6301 may also receive such requests from other ring bus 4024 agents. For example, via the slave interface 6301, the core 4002 may write control data to and read status data from the control/status registers 127; write instructions to the program memory 129; write/read data/weights to/from the data RAM 122 and weight RAM 124; and write control words to the bus controller memory 6636 to program the DMA controllers 6602 (see FIG. 66) of the NNU 121. More specifically, in embodiments in which the NNU 121 resides on the ring bus 4024 rather than as a core 4002 execution unit, the core 4002 may write to the control/status registers 127 to instruct the NNU 121 to perform operations similar to those described with respect to the MTNN instructions 1400 of FIG. 14 and may read from the control/status registers 127 to instruct the NNU 121 to perform operations similar to those described with respect to the MFNN instructions 1500 of FIG. 15. The list of operations includes, but is not limited to, starting execution of a program in the program memory 129, pausing the execution of a program in the program memory 129, requesting notification (e.g., interrupt) of completion of the execution of a program in the program memory 129, resetting the NNU 121, writing to DMA base registers, and writing to a strobe address to cause a row buffer to be written to or read from the data/weight RAM 122/124. Additionally, the slave interface 6301 may generate an interrupt (e.g., a PCI interrupt) to each of the cores 4002 at the request of the NNU 121. Preferably, the sequencer 128 instructs the slave interface 6301 to generate the interrupt, e.g., in response to decoding an instruction fetched from the program memory 129. Alternatively, the DMACs 6602 may instruct the slave interface 6301 to generate the interrupt, e.g., in response to completing a DMA operation (e.g., after writing data words that are the result of a neural network layer computation from the data RAM 122 to system memory). In one embodiment, the interrupt includes a vector, such as an 8-bit x86 interrupt vector. Preferably, a flag in a control word read by a DMAC 6602 from the bus control memory 6636 specifies whether or not the DMAC 6602 is to instruct the slave interface 6301 to generate an interrupt at completion of a DMA operation.

Typically, the NNU 121 generates requests via the master interfaces 6302 (which are received by the store queues 6324/6334) to write data to system memory and generates requests via the master interfaces 6302 (which are received by the load queues 6322/6332) to read data from system memory (e.g., via the DRAM controller 4018), although the master interfaces 6302 may also receive requests from the NNU 121 to write/read data to/from other ring bus 4024 agents. For example, via the master interfaces 6302, the NNU 121 may transfer data/weights from system memory to the data RAM 122 and weight RAM 124, and may transfer data to system memory from the data RAM 122 and weight RAM 124.

Preferably, the various entities of the NNU 121 that are accessible via the ring bus 4024, such as the data RAM 122, weight RAM 124, program memory 129, bus control memory 6636, and control/status registers 127, are memory-mapped within the system memory space. In one embodiment, the accessible NNU 121 entities are memory mapped via PCI configuration registers of the well-known Peripheral Component Interconnect (PCI) configuration protocol.

An advantage of having two master interfaces 6302 to the ring stop 4004-N is that it enables the NNU 121 to concurrently transmit to and/or receive from both system memory (via the DRAM controller 4018) and the various L3 slices 4006, or alternatively to concurrently transmit to and/or receive from the system memory at twice the bandwidth of an embodiment that has a single master interface.

In one embodiment, the data RAM 122 is 64 KB arranged as 16 rows of 4 KB each and therefore requires four bits to specify its row address; the weight RAM 124 is 8 MB arranged as 2K rows of 4 KB each and therefore requires eleven bits to specify its row address; the program memory 129 is 8 KB arranged as 1K rows of 64 bits each and therefore requires 10 bits to specify its row address; the bus control memory 6636 is 1 KB arranged as 128 rows of 64 bits each and therefore requires 7 bits to specify its row address; each of the queues 6312/6314/6322/6324/6332/6334 includes 16 entries and therefore requires four bits to specifies the index of an entry. Additionally, the Data sub-ring of a unidirectional ring 4024 of the ring bus 4024 is 64 bytes wide. A quantum of 64 bytes will therefore be referred to herein as a block, data block, block of data, etc. ("data" may be used generically to refer to both data and weights). Thus, a row of the data RAM 122 or weight RAM 124, although not addressable at a block level, is subdivided into 64 blocks each; furthermore, each of the data/weight write buffers 6612/6622 (of FIG. 66) and data/weight read buffers 6614/6624 (of FIG. 66) is also subdivided into 64 blocks of 64 bytes each and is addressable at a block level; therefore, six bits are required to specify an address of a block within a row/buffer. The following descriptions assume these sizes for ease of illustration; however, other embodiments are contemplated in which the various sizes are different.

Figure 64:
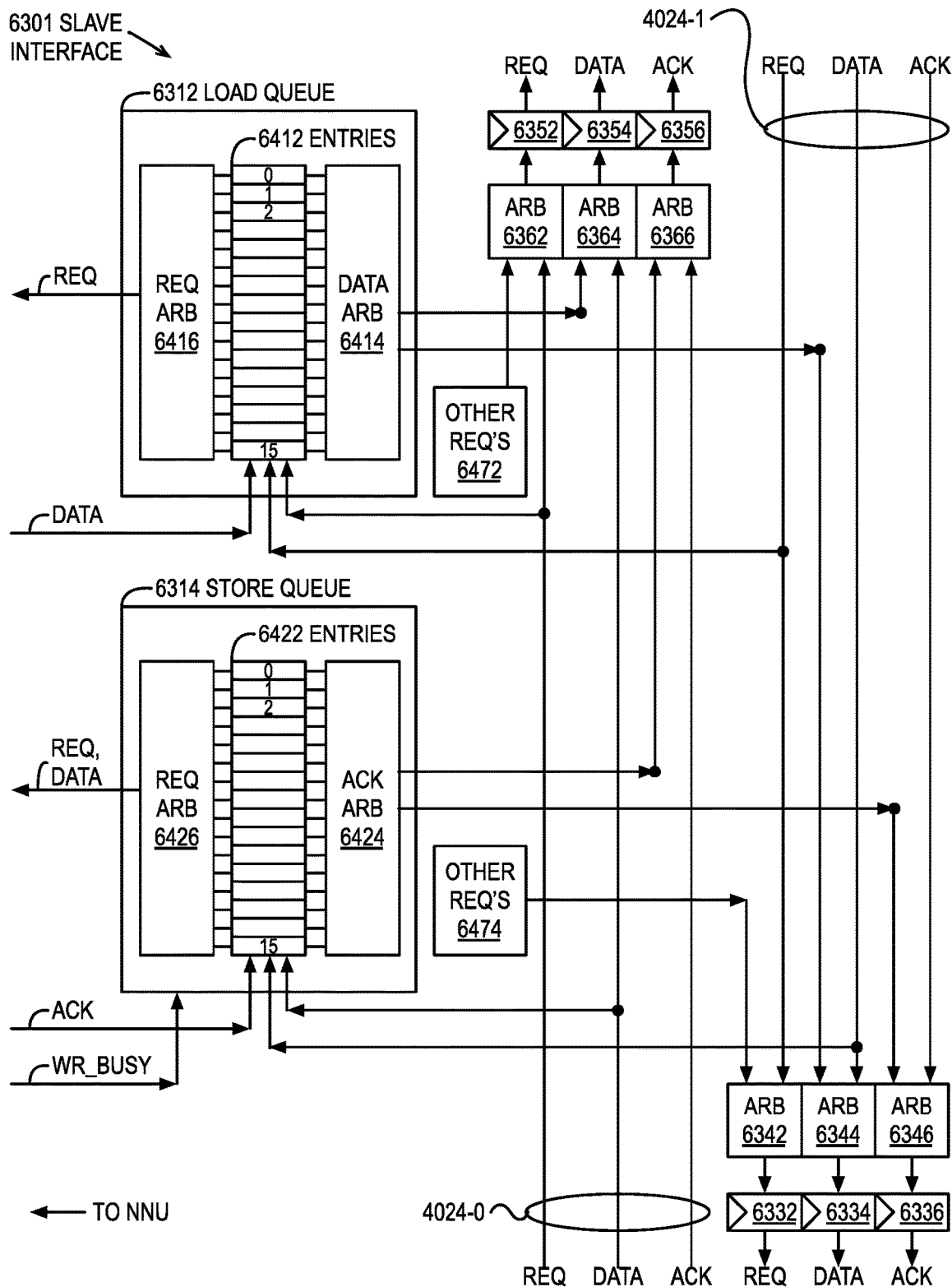
FIG. 64 is a block diagram illustrating in more detail the slave interface of FIG. 63.

Referring now to FIG. 64, a block diagram illustrating in more detail the slave interface 6301 of FIG. 63 is shown. The slave interface 6301 includes the load queue 6312 and store queue 6314 and arbiters 6342, 6344, 6346, 6362, 6364 and 6366 and buffers 6332, 6334, 6336, 6352, 6354 and 6356 coupled to the ring bus 4024 of FIG. 63. FIG. 64 also includes other requestors 6472 (e.g., master interface 0 6302-0) that generate requests to arbiter 6362 and other requestors 6474 (e.g., master interface 1 6302-1) that generate requests to arbiter 6342.

The slave load queue 6312 includes a queue of entries 6412 coupled to a request arbiter 6416 and a data arbiter 6414. In the embodiment shown, the queue includes 16 entries 6412. Each entry 6412 includes storage for an address, a source identifier, a direction, a transaction identifier, and a block of data associated with the request. The address specifies the location within the NNU 121 from which the requested data is to be loaded for returning to the requesting ring bus 4024 agent (e.g., a core 4002). The address may specify a control/status register 127 or a block location within the data RAM 122 or weight RAM 124. When the address specifies a block location within the data/weight RAM 122/124, the upper bits specify a row of the data/weight RAM 122/124, and the lower bits (e.g., 6 bits) specify a block within the specified row. Preferably, the lower bits are used to control the data/weight read buffer multiplexer 6615/6625 (see FIG. 66) to select the appropriate block within the data/weight read buffer 6614/6624 (see FIG. 66). The source identifier specifies the requesting ring bus 4024 agent. The direction specifies which of the two unidirectional rings 4024-0 or 4024-1 upon which the data is to be sent back to the requesting agent. The transaction identifier is specified by the requesting agent and is returned by the ring stop 4004-N to the requesting agent along with the requested data.

Each entry 6412 also has an associated state. A finite state machine (FSM) updates the state. In one embodiment, the FSM operates as follows. When the load queue 6312 detects a load request on the ring bus 4024 destined for itself, the load queue 6312 allocates an available entry 6412 and populates the allocated entry 6412, and the FSM updates the allocated entry 6412 state to requesting-NNU. The request arbiter 6416 arbitrates among the requesting-NNU entries 6412. When the allocated entry 6412 wins arbitration and is sent as a request to the NNU 121, the FSM marks the entry 6412 as pending-NNU-data. When the NNU 121 responds with data for the request, the load queue 6312 loads the data into the entry 6412 and marks the entry 6412 as requesting-data-ring. The data arbiter 6414 arbitrates among the requesting data-ring-entries 6412. When the entry 6412 wins arbitration and the data is sent on the ring bus 4024 to the ring bus 4024 agent that requested the data, the FSM marks the entry 6412 available and emits a credit on its credit ring.

The slave store queue 6314 includes a queue of entries 6422 coupled to a request arbiter 6426 and an acknowledge arbiter 6424. In the embodiment shown, the queue includes 16 entries 6422. Each entry 6422 includes storage for an address, a source identifier, and data associated with the request. The address specifies the location within the NNU 121 to which the data provided by the requesting ring bus 4024 agent (e.g., a core 4002) is to be stored. The address may specify a control/status register 127, a block location within the data RAM 122 or weight RAM 124, a location within the program memory 129, or a location within the bus control memory 6636. When the address specifies a block location within the data/weight RAM 122/124, the upper bits specify a row of the data/weight RAM 122/124, and the lower bits (e.g., 6 bits) specify a block within the specified row. Preferably, the lower bits are used to control the data/weight demultiplexer 6611/6621 to select the appropriate block within the data/weight write buffer 6612/6622 to write (see FIG. 66). The source identifier specifies the requesting ring bus 4024 agent.

Each entry 6422 also has an associated state. A finite state machine (FSM) updates the state. In one embodiment, the FSM operates as follows. When the store queue 6314 detects a store request on the ring bus 4024 destined for itself, the store queue 6314 allocates an available entry 6422 and populates the allocated entry 6422, and the FSM updates the allocated entry 6422 state to requesting-NNU. The request arbiter 6426 arbitrates among the requesting-NNU entries 6422. When the entry 6422 wins arbitration and is sent to the NNU 121 along with the data of the entry 6422, the FSM marks the entry 6422 as pending-NNU-acknowledge. When the NNU 121 responds with an acknowledgement, the store FSM marks the entry 6422 as requesting-acknowledge-ring. The acknowledge arbiter 6424 arbitrates among the requesting-acknowledge-ring entries 6422. When the entry 6422 wins arbitration and an acknowledgment is sent on the acknowledge ring to the ring bus 4024 agent that requested to store the data, the FSM marks the entry 6422 available and emits a credit on its credit ring. The store queue 6314 also receives a wr_busy signal from the NNU 121 that instructs the store queue 6314 not to request from the NNU 121 until the wr_busy signal is no longer active.

Figure 65:
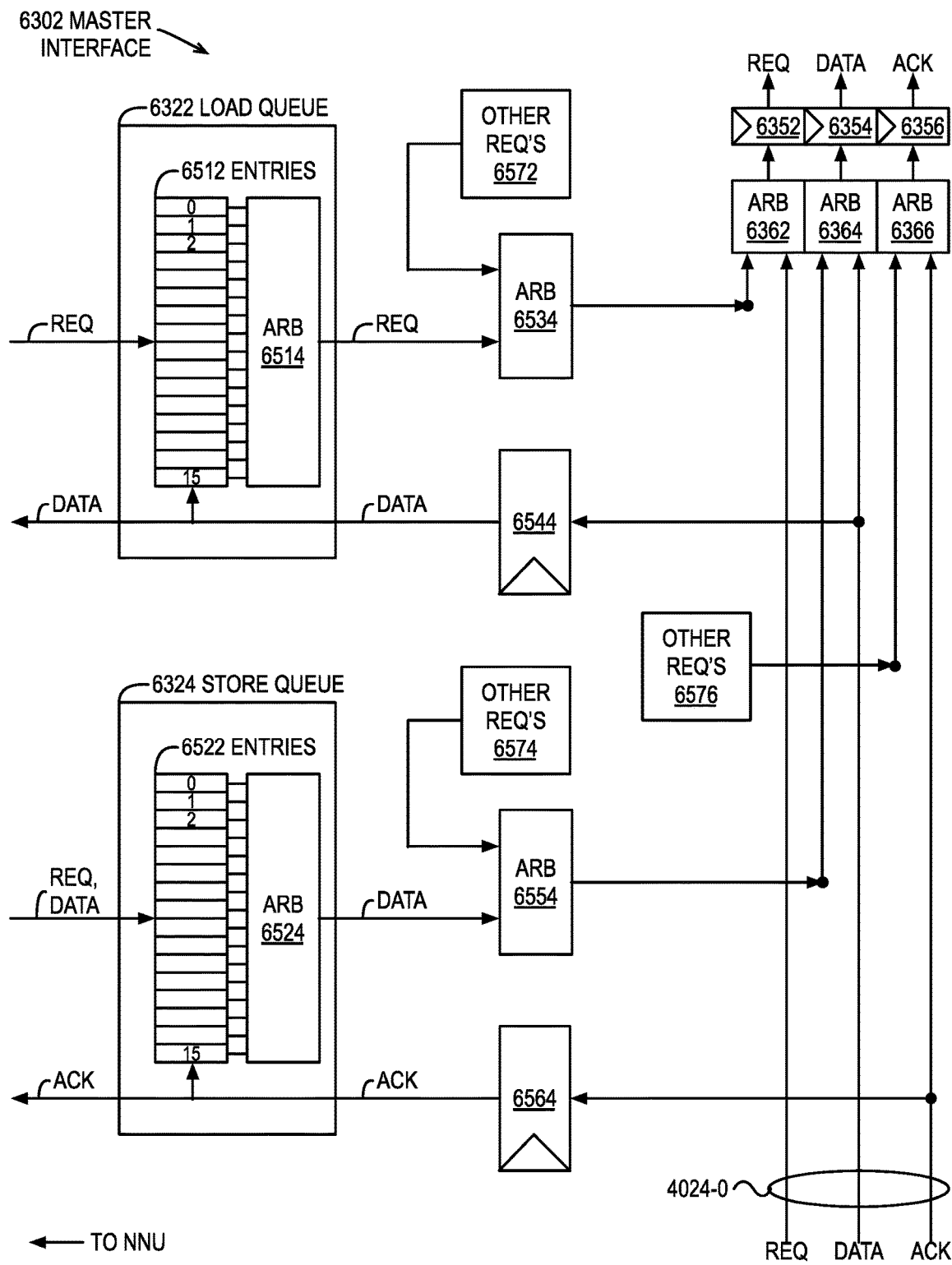
FIG. 65 is a block diagram illustrating in more detail the master interface of FIG. 63.

Referring now to FIG. 65, a block diagram illustrating in more detail the master interface 0 6302-0 of FIG. 63 is shown. Although FIG. 65 illustrates master interface 0 6302-0, it is also representative of the details of the master interface 1 6302-1 of FIG. 63 and will therefore be referred to generically as master interface 6302. The master interface 6302 includes the load queue 6322 and store queue 6324 and arbiters 6362, 6364 and 6366 and buffers 6352, 6354 and 6356 coupled to the ring bus 4024 of FIG. 63. FIG. 65 also illustrates other acknowledge requestors 6576 (e.g., slave interface 6301) that generate acknowledge requests to arbiter 6366.

The master interface 6302 also includes an arbiter 6534 (not shown in FIG. 63) that receives the requests from the load queue 6322 as well as from other requestors 6572 (e.g., the DRAM controller 4018 in an embodiment in which the NNU 121 and DRAM controller 4018 share the ring stop 4004-N), and presents the arbitration-winning request to arbiter 6362 of FIG. 63. The master interface 6302 also includes a buffer 6544 that receives data associated with a load queue 6312 entry 6512 from the ring bus 4024 and provides it to the NNU 121. The master interface 6302 also includes an arbiter 6554 (not shown in FIG. 63) that receives data from the store queue 6324 as well as from other requestors 6574 (e.g., the DRAM controller 4018 in an embodiment in which the NNU 121 and DRAM controller 4018 share the ring stop 4004-N), and presents the arbitration-winning data to arbiter 6364 of FIG. 63. The master interface 6302 also includes a buffer 6564 that receives an acknowledge associated with a store queue 6314 entry 6522 from the ring bus 4024 and provides it to the NNU 121.

The load queue 6322 includes a queue of entries 6512 coupled to an arbiter 6514. In the embodiment shown, the queue includes 16 entries 6512. Each entry 6512 includes storage for an address and destination identifier. The address specifies an address in the ring bus 4024 address space (e.g., of a system memory location), which is 46 bits in one embodiment. The destination identifier specifies the ring bus 4024 agent from which the data will be loaded (e.g., system memory).

The load queue 6322 receives master load requests from the NNU 121 (e.g., from a DMAC 6602) to load data from a ring bus 4024 agent (e.g., system memory) into the data RAM 122 or weight RAM 124. The master load request specifies the destination identifier, the ring bus address and the index of the load queue 6322 entry 6512 to be used. When the load queue 6322 receives a master load request from the NNU 121, the load queue 6322 populates the indexed entry 6512, and the FSM updates the entry 6512 state to requesting credit. When the load queue 6322 obtains from the credit ring a credit to send a request for data to the destination ring bus 4024 agent (e.g., system memory), the FSM updates the state to requesting-request-ring. The arbiter 6514 arbitrates among the requesting-request-ring entries 6512 (and arbiter 6534 arbitrates among the load queue 6322 and the other requestors 6572). When the entry 6512 is granted the request ring, the request is sent on the request ring to the destination ring bus 4024 agent (e.g., system memory), and the FSM updates the state to pending-data-ring. When the ring bus 4024 responds with the data (e.g., from system memory), it is received in buffer 6544 and provided to the NNU 121 (e.g., to the data RAM 122, weight RAM 124, program memory 129 or bus control memory 6636), and the FSM updates the entry 6512 state to available. Preferably, the index of the entry 6512 is included within the data packet to enable the load queue 6322 to determine the entry 6512 with which the data packet is associated. Preferably, the load queue 6322 provides the entry 6512 index to the NNU 121 along with the data to enable the NNU 121 to determine which entry 6512 the data is associated with and to enable the NNU 121 to reuse the entry 6512.

The master store queue 6324 includes a queue of entries 6522 coupled to an arbiter 6524. In the embodiment shown, the queue includes 16 entries 6522. Each entry 6522 includes storage for an address, a destination identifier, a data field for holding the data to be stored, and a coherent flag. The address specifies an address in the ring bus 4024 address space (e.g., of a system memory location). The destination identifier specifies the ring bus 4024 agent to which the data will be stored (e.g., system memory). The coherent flag is sent to the destination agent along with the data. If the coherent flag is set, it instructs the DRAM controller 4018 to snoop the LLC 4005 and to invalidate the copy in the LLC 4005 if present there. Otherwise, the DRAM controller 4018 writes the data to system memory without snooping the LLC 4005.

The store queue 6324 receives master store requests from the NNU 121 (e.g., from a DMAC 6602) to store data to a ring bus 4024 agent (e.g., system memory) from the data RAM 122 or weight RAM 124. The master store request specifies the destination identifier, the ring bus address, the index of the store queue 6324 entry 6522 to be used, and the data to be stored. When the store queue 6324 receives a master store request from the NNU 121, the store queue 6324 populates the allocated entry 6522, and the FSM updates the entry 6522 state to requesting credit. When the store queue 6324 obtains from the credit ring a credit to send data to the destination ring bus 4024 agent (e.g., system memory), the FSM updates the state to requesting-data-ring. The arbiter 6524 arbitrates among the requesting-data-ring entries 6522 (and arbiter 6554 arbitrates among the store queue 6324 and the other requestors 6574). When the entry 6522 is granted the data ring, the data is sent on the data ring to the destination ring bus 4024 agent (e.g., system memory), and the FSM updates the state to pending-acknowledgment-ring. When the ring bus 4024 responds with an acknowledge (e.g., from system memory) of the data, it is received in buffer 6564. The store queue 6324 then provides the acknowledge to the NNU 121 to notify it that the store has been performed, and the FSM updates the entry 6522 state to available. Preferably, the store queue 6324 does not have to arbitrate to provide the acknowledge to the NNU 121 (e.g., there is a DMAC 6602 for each store queue 6324, as in the embodiment of FIG. 66). However, in an embodiment in which the store queue 6324 must arbitrate to provide the acknowledge, the FSM updates the entry 6522 state to requesting-NNU-done when the ring bus 4024 responds with the acknowledge, and once the entry 6522 wins arbitration and provides the acknowledge to the NNU 121, the FSM updates the entry 6522 state to available. Preferably, the index of the entry 6522 is included within the acknowledge packet received from the ring bus 4024 which enables the store queue 6324 to determine the entry 6522 with which the acknowledge packet is associated. The store queue 6324 provides the entry 6522 index to the NNU 121 along with the acknowledge to enable the NNU 121 to determine which entry 6522 the data is associated with and to enable the NNU 121 to reuse the entry 6522.

Figure 66:
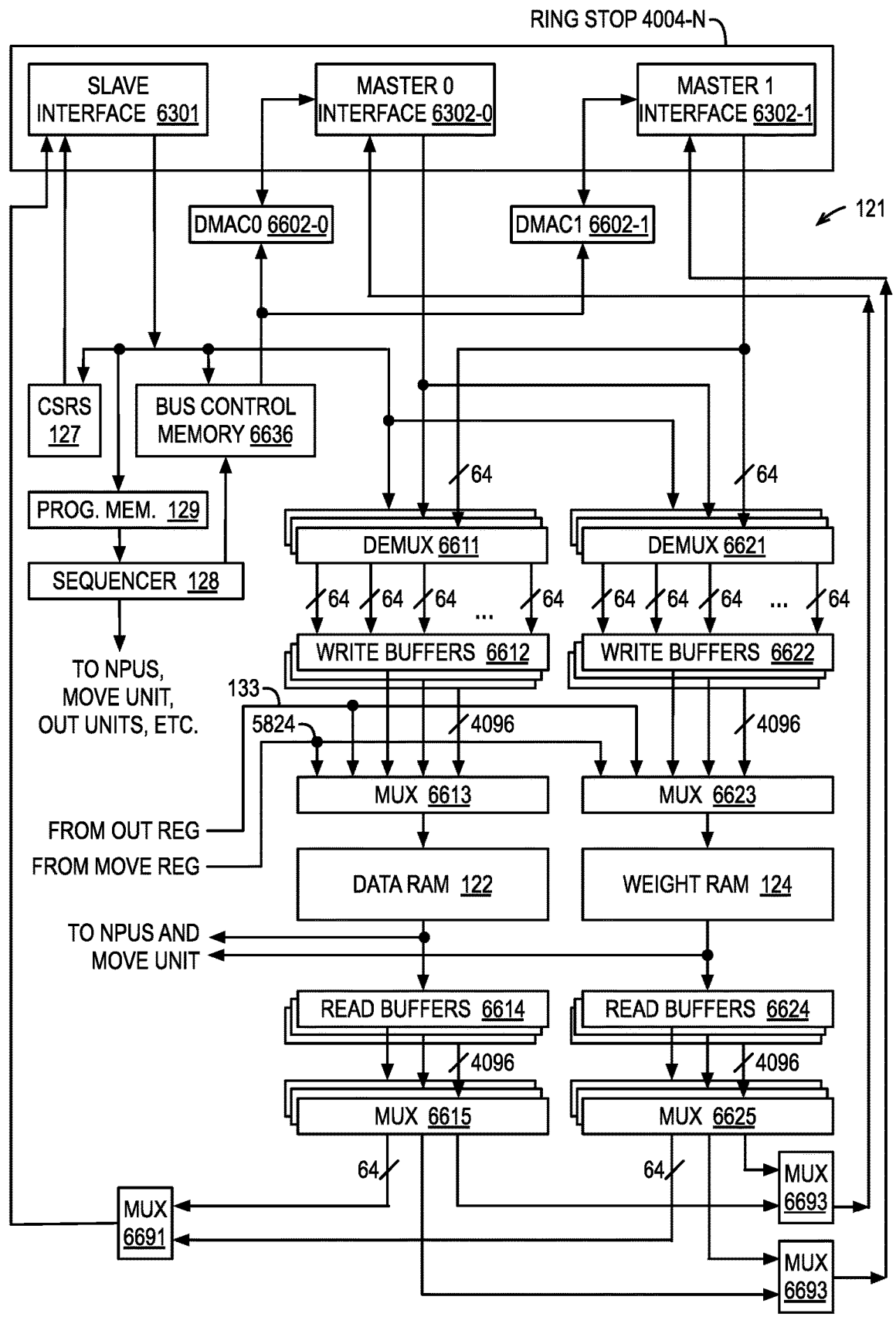
FIG. 66 is a block diagram illustrating the ring stop of FIG. 63 and portions of a ring bus-coupled embodiment of the NNU.

Referring now to FIG. 66, a block diagram illustrating the ring stop 4004-N of FIG. 63 and portions of a ring bus-coupled embodiment of the NNU 121 is shown. The slave interface 6301, master interface 0 6302-0 and master interface 1 6302-1 of the ring stop 4004-N are shown. The ring bus-coupled embodiment of the NNU 121 of FIG. 66 includes the data RAM 122, weight RAM 124, program memory 129, sequencer 128, control/status registers 127 embodiments of which are described in detail above. The ring bus-coupled embodiment of the NNU 121 is similar in many respects to the execution unit embodiments described above and for brevity those aspects will not be re-described. The ring bus-coupled embodiment of the NNU 121 also includes the elements described in FIG. 58, e.g., the move unit 5802, move register 5804, mux-regs 208/705, NPUs 126, muxes 5806, out units 5808, and out register 1104. The NNU 121 also includes a first direct memory access controller (DMAC0) 6602-0, a second direct memory access controller (DMAC1) 6602-1, the bus control memory 6636, data demultiplexers 6611, data write buffers 6612, a data RAM multiplexer 6613, data read buffers 6614, data read buffer multiplexers 6615, weight demultiplexers 6621, weight write buffers 6622, a weight RAM multiplexer 6623, weight read buffers 6624, weight read buffer multiplexers 6625, a slave multiplexer 6691, a master 0 multiplexer 6693, and a master 1 multiplexer 6692. In one embodiment, there are three each of the data demultiplexers 6611, data write buffers 6612, data read buffers 6614, data read buffer multiplexers 6615, weight demultiplexers 6621, weight write buffers 6622, weight read buffers 6624, and weight read buffer multiplexers 6625 respectively associated with the slave interface 6301, the master interface 0 6302-0 and the master interface 1 6302-1 of the ring bus 4024. In one embodiment, there is a pair of three each of the data demultiplexers 6611, data write buffers 6612, data read buffers 6614, data read buffer multiplexers 6615, weight demultiplexers 6621, weight write buffers 6622, weight read buffers 6624, and weight read buffer multiplexers 6625 respectively associated with the slave interface 6301, the master interface 0 6302-0 and the master interface 1 6302-1 of the ring bus 4024 to support data transfers in a double-buffering fashion.

The data demultiplexers 6611 are respectively coupled to receive data blocks from the slave interface 6301, the master interface 0 6302-0 and the master interface 1 6302-1. The data demultiplexers 6611 are also respectively coupled to the data write buffers 6612, which are coupled to the data RAM multiplexer 6613, which is coupled to the data RAM 122, which is coupled to the data read buffers 6614, which are respectively coupled to the data read buffer multiplexers 6615, which are coupled to the slave mux 6691, the master 0 multiplexer 6693 and the master 1 multiplexer 6692. The slave mux 6691 is coupled to the slave interface 6301, the master 0 multiplexer 6693 is coupled to the master interface 0 6302-0, and the master 1 multiplexer 6692 is coupled to the master interface 1 6302-1. The weight demultiplexers 6621 are respectively coupled to receive data blocks from the slave interface 6301, the master interface 0 6302-0, and the master interface 1 6302-1. The weight demultiplexers 6621 are also respectively coupled to the weight write buffers 6622, which are coupled to the weight RAM multiplexer 6623, which is coupled to the weight RAM 124, which is coupled to the weight read buffers 6624, which are respectively coupled to the weight read buffer multiplexers 6625, which are coupled to the slave mux 6691, the master 0 multiplexer 6693 and the master 1 multiplexer 6692. The data RAM multiplexer 6613 and weight RAM multiplexer 6623 are also coupled to the out register 1104 and move register 5804. The data RAM 122 and weight RAM 124 are also coupled to the move unit 5802 and the data mux-regs 208 and weight mux-regs 705, respectively, of the NPUs 126. The control/status registers 127 are coupled to the slave interface 6301. The bus control memory 6636 is coupled to the slave interface 6301, sequencer 128, DMAC0 6602-0, and DMAC1 6602-1. The program memory 129 is coupled to the slave interface 6301 and sequencer 128. The sequencer 128 is coupled to the program memory 129, bus control memory 6636, NPUs 126, move unit 5802, and out units 5808. DMAC0 6602-0 is also coupled to master interface 0 6302-0, and DMAC1 6602-1 is also coupled to master interface 1 6302-1.

The data write buffers 6612, data read buffers 6614, weight write buffers 6622 and weight read buffers 6624 are the width of the data RAM 122 and weight RAM 124, which is the width of the NPU 126 array, typically referred to as N herein. Thus, for example, in one embodiment there are 4096 NPUs 126 and the data write buffers 6612, data read buffers 6614, weight write buffers 6622 and weight read buffers 6624 are 4096 bytes wide, although other embodiments are contemplated in which N is other than 4096. The data RAM 122 and weight RAM 124 are written an entire N-word row at a time. The out register 1104, the move register 5804, and the data write buffers 6612 write to the data RAM 122 via the data RAM multiplexer 6613, which selects one of them for writing a row of words to the data RAM 122. The out register 1104, the move register 5804, and the weight write buffers 6622 write to the weight RAM 124 via the weight RAM multiplexer 6623, which selects one of them for writing a row of words to the weight RAM 124. Control logic (not shown) controls the data RAM multiplexer 6613 to arbitrate between the data write buffers 6612, the move register 5804 and the out register 1104 for access to the data RAM 122, and controls the weight RAM multiplexer 6623 to arbitrate between the weight write buffers 6622, the move register 5804 and the out register 1104 for access to the weight RAM 124. The data RAM 122 and weight RAM 124 are also read an entire N-word row at a time. The NPUs 126, the move unit 5802, and the data read buffers 6614 read a row of words from the data RAM 122. The NPUs 126, the move unit 5802, and the weight read buffers 6624 read a row of words from the weight RAM 124. The control logic also controls the NPUs 126 (data mux-regs 208 and weight mux-regs 705), the move unit 5802, and the data read buffers 6614 to determine which of them, if any, reads a row of words output by the data RAM 122. In one embodiment, the micro-operation 3418 described with respect to FIG. 34 may include at least some of the control logic signals that control the data RAM multiplexer 6613, weight RAM multiplexer 6623, NPUs 126, move unit 5802, move register 5804, out register 1104, data read buffers 6614, and weight read buffers 6624.

The data write buffers 6612, data read buffers 6614, weight write buffers 6622 and weight read buffers 6624 are addressable in blocks that are block-size aligned. Preferably, the block size of the data write buffers 6612, data read buffers 6614, weight write buffers 6622 and weight read buffers 6624 matches the width of the ring bus 4024 Data sub-ring. This accommodates the ring bus 4024 to read/write the data/weight RAM 122/124 as follows. Typically, the ring bus 4024 performs block-sized writes to each block of a data write buffer 6612 and, once all the blocks of the data write buffer 6612 have been filled, the data write buffer 6612 writes its N-word contents to an entire row of the data RAM 122. Similarly, the ring bus 4024 performs block-sized writes to each block of a weight write buffer 6622 and, once all the blocks of the weight write buffer 6622 have been filled, the weight write buffer 6622 writes its N-word contents to an entire row of the weight RAM 124. Conversely, an N-word row is read from the data RAM 122 into a data read buffer 6614; then the ring bus 4024 performs block-sized reads from each block of the data read buffer 6614. Similarly, an N-word row is read from the weight RAM 124 into a weight read buffer 6624; then the ring bus 4024 performs block-sized reads from each block of the weight read buffer 6624. Although the data RAM 122 and weight RAM 124 appear as dual-ported memories in FIG. 66, preferably they are single-ported memories such that the single data RAM 122 port is shared by the data RAM multiplexer 6613 and the data read buffers 6614, and single weight RAM 124 port is shared by the weight RAM multiplexer 6623 and the weight read buffers 6624. Thus, an advantage of the entire row read/write arrangement is that it enables the data RAM 122 and weight RAM 124 to be smaller by having a single port (in one embodiment, the weight RAM 124 is 8 MB and the data RAM 122 is 64 KB) and yet the writes to and reads from the data RAM 122 and weight RAM 124 by the ring bus 4024 consume less bandwidth than they otherwise would if individual blocks were written, thus freeing up more bandwidth for the NPUs 126, out register 1104, move register 5804, and move unit 5802 to make their N-word-wide row accesses.

The control/status registers 127 are provided to the slave interface 6301. The slave mux 6691 receives the output of the data read buffer multiplexer 6615 associated with the slave interface 6301 and the output of the weight read buffer multiplexer 6625 associated with the slave interface 6301 and selects one of them for provision to the slave interface 6301. In this manner, the slave load queue 6312 receives data for responding to load requests made by the slave interface 6301 to the control/status registers 127, data RAM 122 or weight RAM 124. The master 0 multiplexer 6693 receives the output of the data read buffer multiplexer 6615 associated with the master interface 0 6302-0 and the output of the weight read buffer multiplexer 6625 associated with the master interface 0 6302-0 and selects one of them for provision to the master interface 0 6302-0. In this manner, the master interface 0 6302-0 receives data for responding to store requests made by the master interface 0 6302-0 store queue 6324. The master 1 multiplexer 6692 receives the output of the data read buffer multiplexer 6615 associated with the master interface 1 6302-1 and the output of the weight read buffer multiplexer 6625 associated with the master interface 1 6302-1 and selects one of them for provision to the master interface 1 6302-1. In this manner, the master interface 1 6302-1 receives data for responding to store requests made by the master interface 1 6302-1 store queue 6324. If the slave interface 6301 load queue 6312 requests to read from the data RAM 122, the slave multiplexer 6691 selects the output of the data read buffer multiplexer 6615 associated with the slave interface 6301; whereas, if the slave interface 6301 load queue 6312 requests to read from the weight RAM 124, the slave multiplexer 6691 selects the output of the weight read buffer multiplexer 6625 associated with the slave interface 6301. Similarly, if the master interface 0 6302-0 store queue requests to read data from the data RAM 122, the master 0 multiplexer 6693 selects the output of the data read buffer multiplexer 6615 associated with the master interface 0 6302-0; whereas, if the master interface 0 6302-0 store queue requests to read data from the weight RAM 124, the master 0 multiplexer 6693 selects the output of the weight read buffer multiplexer 6625 associated with the master interface 0 6302-0. Finally, if the master interface 1 6302-1 store queue requests to read data from the data RAM 122, the master 1 multiplexer 6692 selects the output of the data read buffer multiplexer 6615 associated with the master interface 1 6302-1; whereas, if the master interface 1 6302-1 store queue requests to read data from the weight RAM 124, the master 1 multiplexer 6692 selects the output of the weight read buffer multiplexer 6625 associated with the master interface 1 6302-1. Thus, a ring bus 4024 agent (e.g., a core 4002) may read from the control/status registers 127, data RAM 122 or weight RAM 124 via the slave interface 6301 load queue 6312. Additionally, a ring bus 4024 agent (e.g., a core 4002) may write to the control/status registers 127, data RAM 122, weight RAM 124, program memory 129, or bus control memory 6636 via the slave interface 6301 store queue 6314. More specifically, a core 4002 may write a program (e.g., that performs fully-connected, convolution, pooling, LSTM or other recurrent neural network layer computations) to the program memory 129 and then write to a control/status register 127 to start the program. Additionally, a core 4002 may write control words to the bus control memory 6636 to cause the DMACs 6602 to perform DMA operations between the data RAM 122 or weight RAM 124 and a ring bus 4024 agent, e.g., system memory or the LLC 4005. The sequencer 128 may also write control words to the bus control memory 6636 to cause the DMACs 6602 to perform DMA operations between the data RAM 122 or weight RAM 124 and a ring bus 4024 agent. Finally, the DMACs 6602 may perform DMA operations to perform transfers between a ring bus 4024 agent (e.g., system memory or the LLC 4005) and the data/weight RAM 122/124, as described in more detail below.

The slave interface 6301, master interface 0 6302-0 and master interface 1 6302-1 are each coupled to provide a block of data to their respective data demultiplexer 6611 and respective weight demultiplexer 6621. Arbitration logic (not shown) arbitrates between the out register 1104, the move register 5804 and the slave interface 6301, master interface 0 6302-0 and master interface 1 6302-1 data write buffers 6612 and for access to the data RAM 122 and arbitrates between the out register 1104, the move register 5804 and the slave interface 6301, master interface 0 6302-0 and master interface 1 6302-1 weight write buffers 6622 and for access to the weight RAM 124. In one embodiment, the write buffers 6612/6622 have priority over the out register 1104 and the move register 5804, and the slave interface 6301 has priority over the master interfaces 6302. In one embodiment, each of the data demultiplexers 6611 has 64 outputs (preferably 64 bytes each) coupled to the 64 blocks of its respective data write buffer 6612. The data demultiplexer 6611 provides the received block on the output coupled to the appropriate block of the data write buffer 6612. Similarly, each of the weight demultiplexers 6621 has 64 outputs (preferably 64 bytes each) coupled to the 64 blocks of its respective weight write buffer 6622. The weight demultiplexer 6621 provides the received block on the output coupled to the appropriate block of the weight write buffer 6622.

When the slave store queue 6314 provides a data block to its data/weight demultiplexer 6611/6621, it also provides as the control input to the data/weight demultiplexer 6611/6621 the address of the appropriate block of the data/weight write buffer 6612/6622 that is to be written. The block address is the lower six bits of the address held in the entry 6422, which was specified by the ring bus 4024 agent (e.g., core 4002) that generated the slave store transaction. Conversely, when the load store queue 6312 requests a data block from its data/weight read buffer multiplexer 6615/6625, it also provides as the control input to the data/weight read buffer multiplexer 6615/6625 the address of the appropriate block of the data/weight read buffer 6614/6624 that is to be read. The block address is the lower six bits of the address held in the entry 6412, which was specified by the ring bus 4024 agent (e.g., core 4002) that generated the slave load transaction. Preferably, a core 4002 may perform a slave store transaction via the slave interface 6301 (e.g., to a predetermined ring bus 4024 address) to cause the NNU 121 to write the contents of the data/weight write buffer 6612/6622 to the data/weight RAM 122/124; conversely, a core 4002 may perform a slave store transaction via the slave interface 6301 (e.g., to a predetermined ring bus 4024 address) to cause the NNU 121 to read a row of the data/weight RAM 122/124 into a data/weight read buffer 6614/6624.

When a master interface 6302 load queue 6322/6332 provides a data block to its data/weight demultiplexer 6611/6621, it also provides the index of the entry 6512 to the corresponding DMAC 6602 that issued the load request to the load queue 6322/6332. To transfer an entire 4 KB of data from the system memory to a row of the data/weight RAM 122/124, the DMAC 6602 must generate 64 master load requests to the load queue 6322/6332. The DMAC 6602 logically groups the 64 master load requests into four groups of sixteen requests each. The DMAC 6602 makes the sixteen requests within a group to the respective sixteen entries 6512 of the load queue 6322/6322. The DMAC 6602 maintains state associated with each entry 6512 index. The state indicates which group of the four groups for which the entry is currently being used to load a block of data. Thus, when the DMAC 6602 receives the entry 6512 index from the load queue 6322/6322, logic of the DMAC 6602 constructs the block address by concatenating the group number to the index and provides the constructed block address as the control input to the data/weight demultiplexer 6611/6621, as described in more detail below.

Conversely, when a master interface 6302 store queue 6324/6334 requests a data block from its data/weight read buffer multiplexer 6615/6625, it also provides the index of the entry 6522 to the corresponding DMAC 6602 that issued the store request to the store queue 6324/6334. To transfer an entire 4 KB of data to the system memory from a row of the data/weight RAM 122/124, the DMAC 6602 must generate 64 master store requests to the store queue 6324/6334. The DMAC 6602 logically groups the 64 store requests into four groups of sixteen requests each. The DMAC 6602 makes the sixteen requests within a group to the respective sixteen entries 6522 of the store queue 6324/6334. The DMAC 6602 maintains state associated with each entry 6522 index. The state indicates which group of the four groups for which the entry is currently being used to store a block of data. Thus, when the DMAC 6602 receives the entry 6522 index from the store queue 6324/6334, logic of the DMAC 6602 constructs the block address by concatenating the group number to the index and provides the constructed block address as the control input to the data/weight read buffer multiplexer 6615/6625, as described in more detail below.

Figure 67:
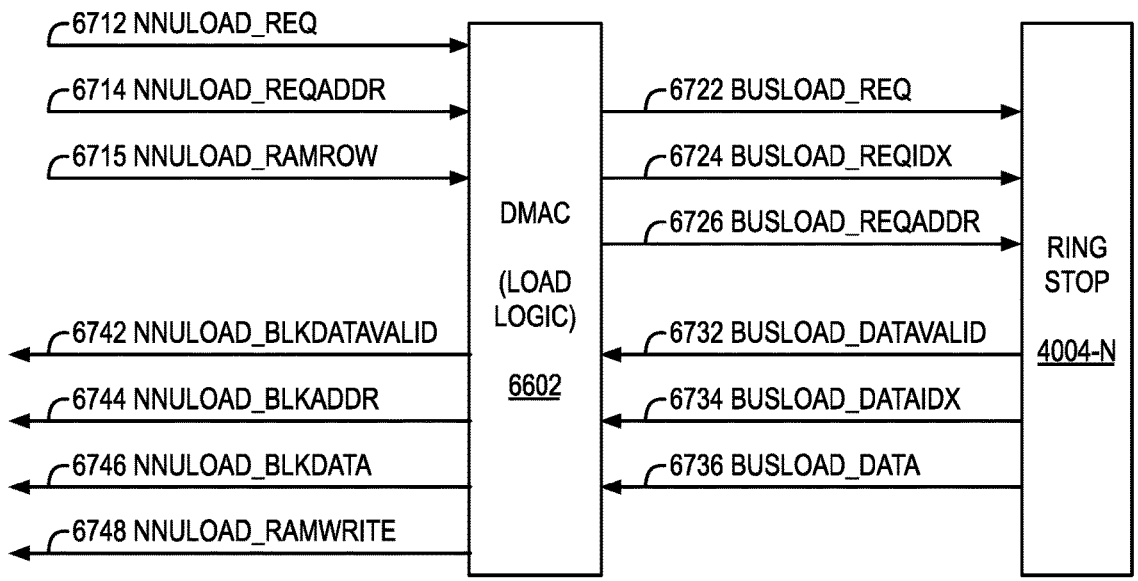
FIG. 67 is a block diagram illustrating a direct memory access controller (DMAC) of FIG. 66.

Referring now to FIG. 67, a block diagram illustrating a DMAC 6602 of FIG. 66 is shown. The DMAC 6602 is coupled to the ring stop 4004-N of FIG. 66. More specifically, FIG. 67 illustrates a portion of the DMAC 6602 that performs a master load operation, i.e., data transfer from a ring bus 4024 agent (e.g., from system memory or LLC 4005) to the NNU 121 (e.g., to data/weight RAM 122/124). As an illustrative example, a master load operation will be described with respect to FIGS. 67 and 68 in which the DMAC 6602 transfers a full row of data from system memory to the weight RAM 124. In the example, the transfer is 4 KB, and the block size is 64 bytes, such that the DMAC 6602 performs 64 block transfers from the system memory to the write buffer 6622 and then causes the write buffer 6622 to write its contents to the weight RAM 124. However, it should be understood that the DMAC 6602 performs a similar operation when transferring data from the LLC 4005 and/or to the data RAM 122. Furthermore, it should be understood that both DMAC 6602-0 and DMAC 6602-1 may perform a similar operation such that the transactions may be performed on both directions 4204-0 and 4204-1 of the ring bus 4024. The row-sized master load operation may be part of a larger DMA operation requested by the NNU 121. For example, a program that the sequencer 128 fetches from the program memory 129 and executes may write a control word to the bus control memory 6636 that requests 500 rows to be transferred from the system memory to the weight RAM 124. In such case, the DMAC 6602 will perform 500 of the 4 KB master load operations described here. Preferably, the DMAC 6602 includes another portion that receives the control words from the bus control memory 6636 and makes the 4 KB-sized master load requests to the portion of the DMAC 6602 described in FIG. 67. The other portion of the DMAC 6602 also notifies the program that the larger DMA operation has completed.

The DMAC 6602 receives a nnuload_req 6712 signal to request a master load operation. A nnuload_reqaddr 6714 signal specifies the ring bus 4024 address of the 4 KB worth of data to be loaded. Preferably, the address is aligned on a 4 KB boundary and the number of bytes is implied to be 4 KB. A nnuload_ramrow 6715 signal specifies the weight RAM 124 row into which the data is to be loaded.

Figure 68:
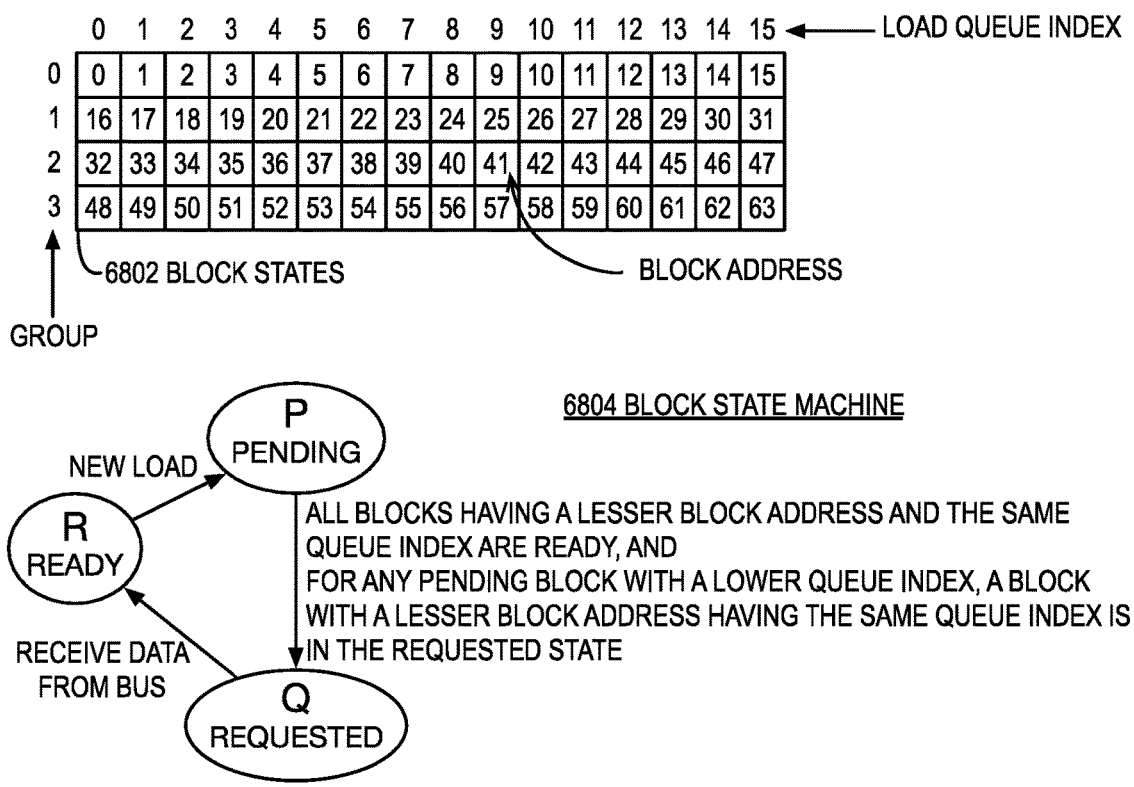
FIG. 68 is a block diagram illustrating block states of the DMAC of FIG. 67 and a block state machine that uses the block states.

In response to the request, the DMAC 6602 asserts busload_req 6722, busload_reqidx 6724, and busload_reqaddr 6726 signals to the ring stop 4004-N (i.e., to the master interface 6302 load queue 6322/6332) to request a master load transaction from system memory as described above, e.g., with respect to FIG. 65. The busload_reqidx 6724 specifies the index of the entry 6512 to be used to perform the master load transaction. The busload_reqaddr 6726 specifies the ring bus 4024 address of the system memory location from which the data is to be read. The DMAC 6602 makes 64 such 64-byte master load transaction requests, each for a different one of the 64 blocks of the requested row. As alluded to above, in embodiments in which N—the width of the data RAM 122, weight RAM 124, and NPU 126 array—is different than 4096 and/or in which the block size is different than 64, the number of master load transactions the DMAC 6602 must perform may be different. FIG. 68 describes in more detail the handling of the individual block requests.

The ring stop 4004-N responds with busload_datavalid 6732, busload_dataidx 6734, and busload_data 6736 signals for each block of data. The busload_dataidx 6734 specifies the index of the entry 6512 used to perform the master load transaction and that is associated with the block of data provided on the busload_data 6736 signal. It should be understood that the ring bus 4024 may return the various data blocks in a different order than the load queue 6322/6332 requested them, as described in more detail below with respect to FIG. 68.

In response, the DMAC 6602 sends nnuload_blkdatavalid 6742, nnuload_blkaddr 6744 and nnuload_blkdata 6746 signals. The nnuload_blkdata 6746 signal provides the data block returned by the ring stop 4004-N. The nnuload_blkaddr 6744 specifies the address of the data block within the weight write buffer 6622 and is used to control the weight demultiplexer 6621 and weight write buffer 6622 to write the correct block of data therein, particularly in response to the assertion of nnuload_blkdatavalid 6742.

Once all 64 of the data blocks have been returned from the system memory and written into the weight write buffer 6622, i.e., once the weight write buffer 6622 is full, the DMAC 6602 asserts nnuload_ramwrite 6748 to cause the weight write buffer 6622 contents to be written to the weight RAM 124 row specified by the nnuload_ramrow 6715.

Referring now to FIG. 68, a block diagram illustrating block states 6802 of the DMAC 6602 of FIG. 67 and a block state machine 6804 that uses the block states 6802 are shown. Each block state 6802 specifies the state of a data block, namely: pending (P), requested (Q), or ready (R), as described in more detail below. The block states 6802 are shown as an array of four rows and sixteen columns for a total of 64 block states 6802 corresponding to the 64 data blocks of the master load operation described in FIG. 67, which are numbered 0 through 63 corresponding to the address of the data block within the weight write buffer 6622 (or data write buffer 6612). Each of the 16 columns of the array is associated with one of the 16 entries 6512 of the load queue 6322/6332, i.e., entry indexes 0 through 15. Each row of the array corresponds to a different group of 16 data blocks. More specifically, group 0 includes data blocks 0 through 15, group 1 includes data blocks 16 through 31, group 2 includes data blocks 32 through 47, and group 3 includes data blocks 48 through 63. Preferably, the block states 6802 are held in flip-flops or other state storage of the DMAC 6602.

At reset, all 64 block states 6802 are placed in the R state. When the DMAC 6602 receives a new master load request (e.g., via the nnuload_req 6712 signal), the state machine 6804 transitions all the block states 6802 to the P state, to indicate that a request to load the corresponding data block from system memory is pending. The state machine 6804 then arbitrates among the 64 pending data block requests as follows. The state machine 6804 grants a data block permission to send the ring stop 4004-N its load request and transitions the data block's block state 6802 to the Q state when: (1) the instant block is in the P state, (2) all blocks having a lesser block address and the same load queue index (i.e., all blocks above the instant block in its column, i.e., in a group having a smaller group number) are in the R state (i.e., they have already received their data from the ring bus 4024), and (3) for any pending block with a lower load queue index than the instant block (i.e., any P-state block in a column to the left of the instant block's column), a block with a lesser block address having the same load queue index as the instant block (i.e., above the instant block in its column, i.e., in a group having a smaller group number) is in the Q state. Advantageously, this provides efficient use of the load queue 6322/6332 entries 6512 and may accomplish access to the system memory in a highly-utilized manner. When a data block is received back from the ring bus 4024 and written into the weight write buffer 6622, the state machine 6804 transitions its block state 6802 to R. Once the block states 6802 for all 64 of the data blocks is in the R state, the DMAC 6602 asserts the nnuload_ramwrite 6748.

Figure 69:
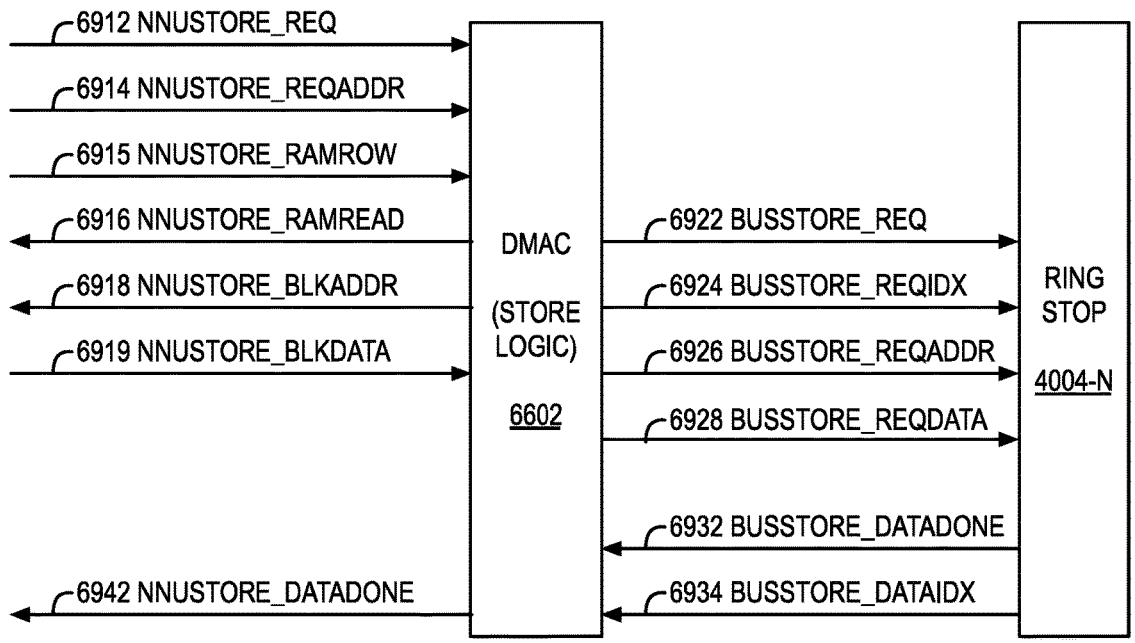
FIG. 69 is a block diagram illustrating a DMAC of FIG. 66.

Referring now to FIG. 69, a block diagram illustrating a DMAC 6602 of FIG. 66 is shown. The DMAC 6602 is coupled to the ring stop 4004-N of FIG. 66. More specifically, FIG. 69 illustrates a portion of the DMAC 6602 that performs a master store operation, i.e., data transfer to a ring bus 4024 agent (e.g., from system memory or LLC 4005) from the NNU 121 (e.g., from data/weight RAM 122/124). As an illustrative example, a master store operation will be described with respect to FIGS. 69 and 70 in which the DMAC 6602 transfers a full row of data to system memory from the data RAM 122. In the example, the transfer is 4 KB, and the block size is 64 bytes, such that, after the DMAC 6602 causes a row of data to be read from the data RAM 122 into the read buffer 6614, the DMAC 6602 performs 64 block transfers from the read buffer 6622 to the system memory. However, it should be understood that the DMAC 6602 performs a similar operation when transferring data to the LLC 4005 and/or from the weight RAM 124. Furthermore, it should be understood that both DMAC 6602-0 and DMAC 6602-1 may perform a similar operation such that the transactions may be performed on both directions 4204-0 and 4204-1 of the ring bus 4024. The row-sized master store operation may be part of a larger DMA operation requested by the NNU 121. For example, a program that the sequencer 128 fetches from the program memory 129 and executes may write a control word to the bus control memory 6636 that requests 500 rows to be transferred to the system memory from the data RAM 122. In such case, the DMAC 6602 will perform 500 of the 4 KB master store operations described here. Preferably, the DMAC 6602 includes another portion that receives the control words from the bus control memory 6636 and makes the 4 KB-sized master store requests to the portion of the DMAC 6602 described in FIG. 69. The other portion of the DMAC 6602 also notifies the program that the larger DMA operation has completed.

The DMAC 6602 receives a nnustore_req 6912 signal to request a master store operation. A nnustore_reqaddr 6914 signal specifies the ring bus 4024 address of the 4 KB worth of data to be stored, and a nnustore_ramrow 6915 signal specifies the row of data from the data RAM 122 to be written to the system memory. Preferably, the address is aligned on a 4 KB boundary and the number of bytes is implied to be 4 KB.

In response to the request, the DMAC 6602 asserts a nnustore_ramread 6916 signal to cause the row of the data RAM 122 specified by the nnustore_ramrow 6915 signal to be read into the data read buffer 6614. Alternatively, another portion of the DMAC 6602 causes the data RAM 122 row to be read into the read buffer 6614 prior to making a request to the master store operation portion.

After the row is read into the data read buffer 6614, the DMAC 6602 asserts a nnustore_blkaddr 6919 to specify the address of a block of data within the read buffer 6614 and receives the specified data block on a nnustore_blkdata 6919 signal. More specifically, the DMAC 6602 asserts 64 different block addresses on nnustore_blkaddr 6919 to read all 64 data blocks from the read buffer 6614 to perform the master store operation, as described in more detail with respect to FIG. 70. The nnustore_blkaddr 6918 is used to control the data read buffer multiplexer 6615 to read the correct block of data from it.

Figure 70:
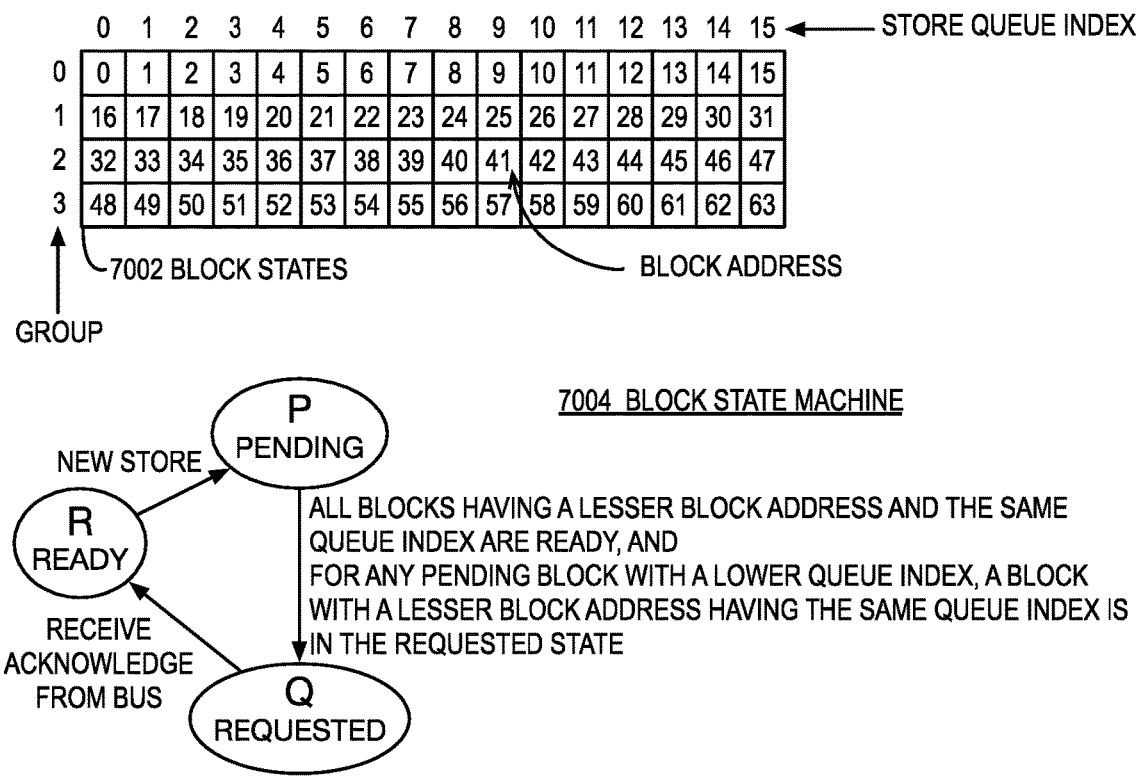
FIG. 70 is a block diagram illustrating block states of the DMAC of FIG. 69 and a block state machine that uses the block states.

For each data block received from the read buffer 6614, the DMAC 6602 asserts busstore_req 6922, busstore_reqidx 6924, busstore_reqaddr 6926, and busstore_reqdata 6928 signals to the ring stop 4004-N (i.e., to the master interface 6302 store queue 6324/6334) to request a master store transaction to system memory as described above, e.g., with respect to FIG. 65. The busstore_reqidx 6924 specifies the index of the entry 6522 to be used to perform the master store transaction. The busstore_reqaddr 6926 specifies the ring bus 4024 address of the system memory location to which the data is to be written, which is provided on busstore_reqdata 6928. That is, the DMAC 6602 makes 64 such 64-byte master store transaction requests, each for a different one of the 64 blocks of the row read from the data RAM 122. As alluded to above, in embodiments in which N—the width of the data RAM 122, weight RAM 124, and NPU 126 array—is different than 4096 and/or in which the block size is different than 64, the number of master store transactions the DMAC 6602 must perform may be different. FIG. 70 describes in more detail the handling of the individual block requests.

The ring stop 4004-N responds with busstore_datadone 6932 and busstore_dataidx 6934 signals for each block of data written. The busstore_dataidx 6934 specifies the index of the entry 6522 used to perform the master store transaction and that is associated with the acknowledge received from the ring bus 4024 for a block of data previously provided on the busstore_reqdata 6928 signal. It should be understood that the ring bus 4024 may return the acknowledge for the various data blocks in a different order than the store queue 6324/6334 sent them, as described in more detail below with respect to FIG. 70.

Once an acknowledge for all 64 of the data blocks have been returned from the system memory, the DMAC 6602 asserts nnustore_datadone 6942 to indicate the master store operation has completed.

Referring now to FIG. 70, a block diagram illustrating block states 7002 of the DMAC 6602 of FIG. 69 and a block state machine 7004 that uses the block states 7002 are shown. Each block state 7002 specifies the state of a data block, namely: pending (P), requested (Q), or ready (R), as described in more detail below. The block states 7002 are shown as an array of four rows and sixteen columns for a total of 64 block states 7002 corresponding to the 64 data blocks of the master store operation described in FIG. 69, which are numbered 0 through 63 corresponding to the address of the data block within the data read buffer 6614 (or weight read buffer 6624). Each of the 16 columns of the array is associated with one of the 16 entries 6522 of the store queue 6324/6334, i.e., entry indexes 0 through 15. Each row of the array corresponds to a different group of 16 data blocks. More specifically, group 0 includes data blocks 0 through 15, group 1 includes data blocks 16 through 31, group 2 includes data blocks 32 through 47, and group 3 includes data blocks 48 through 63. Preferably, the block states 7002 are held in flip-flops or other state storage of the DMAC 6602.

At reset, all 64 block states 7002 are placed in the R state. When the DMAC 6602 receives a new master store request (e.g., via the nnustore_req 6912 signal), the state machine 7004 transitions all the block states 7002 to the P state, to indicate that a request to store the corresponding data block to system memory is pending. The state machine 7004 then arbitrates among the 64 pending data block requests as follows. The state machine 7004 grants a data block permission to send the ring stop 4004-N its store request and transitions the data block's block state 7002 to the Q state when: (1) the instant block is in the P state, (2) all blocks having a lesser block address and the same store queue index (i.e., all blocks above the instant block in its column, i.e., in a group having a smaller group number) are in the R state (i.e., they have already sent their data to the ring bus 4024), and (3) for any pending block with a lower store queue index than the instant block (i.e., any P-state block in a column to the left of the instant block's column), a block with a lesser block address having the same store queue index as the instant block (i.e., above the instant block in its column, i.e., in a group having a smaller group number) is in the Q state. Advantageously, this provides efficient use of the store queue 6324/6334 entries 6522 and may accomplish access to the system memory in a highly-utilized manner. When an acknowledge is received back from the ring bus 4024, the state machine 7004 transitions its block state 7002 to R. Once the block states 7002 for all 64 of the data blocks is in the R state, the DMAC 6602 asserts the nnustore_datadone 6942.

Referring now to FIG. 71, a block diagram illustrating base address registers 7198 and a DMA control word (DCW) 7104 is shown. In one embodiment, as shown in FIG. 71, the NNU 121 includes four base address registers 7198 associated with the master interface 0 6302-0 load queue 6322, the master interface 0 6302-0 store queue 6324, the master interface 1 6302-1 load queue 6332, and the master interface 1 6302-1 store queue 6334. The DMACs 6602 use the base address registers 7198 to construct a ring bus 4024 address. Preferably, each of the base address registers 7198 is 22 bits. Preferably, a device driver of the NNU 121 allocates four regions of system memory, each of which is 16 MB in size and is 16 MB-aligned, and performs a store via the slave interface 6301 to write the base address (e.g., the upper 22 bits of the 46-bit ring bus 4024 address) of the four system memory regions into a respective one of the four base address registers 7198. When a load/store queue 6322/6324/6332/6334 generates a transaction on the ring bus 4024, it constructs the ring bus 4024 address by placing the contents of the appropriate base address register 7198 as the upper 22 bits. The lower six bits are zero because accesses are in 64-byte blocks. The middle 18 bits are provided by the DMAC 6602 when it makes its load/store request to the master interface 6302. In the alternate embodiment described above in which there is a pair of each of the data demultiplexers 6611, data write buffers 6612, data read buffers 6614, data read buffer multiplexers 6615, weight demultiplexers 6621, weight write buffers 6622, weight read buffers 6624, and weight read buffer multiplexers 6625 respectively associated with the master interface 0 6302-0 and the master interface 1 6302-1 of the ring bus 4024 to support data transfers in a double-buffering fashion, there is a pair of base address registers 7198 associated with each of the master interface 0 6302-0 load queue 6322, the master interface 0 6302-0 store queue 6324, the master interface 1 6302-1 load queue 6332, and the master interface 1 6302-1 store queue 6334.

FIG. 71 also illustrates a DCW 7104. In one embodiment, a DCW 7104 includes a ring bus address 7112; a data/weight RAM 122/124 address 7114; a NNU memory space indicator 7116; a direction indicator 7118; a count 7122; a coherent indicator 7124; an interrupt flag 7126; and a wait tag 7128. As described above, a core 4002 may perform a slave store operation to write a DCW 7104 to the bus control memory 6636 to cause a DMAC 6602 to perform a DMA operation; and, a program in the program memory 129 may execute an instruction to write a DCW 7104 to the bus control memory 6636 to cause a DMAC 6602 to perform a DMA operation.

The ring bus address 7112 specifies the location in the ring bus 4024 address space of the data to be transferred (e.g., a system memory address). The data/weight RAM 122/124 address 7114 specifies the row in the data/weight RAM 122/124 to be read or written. The NNU memory space indicator 7116 specifies whether the data RAM 122 or weight RAM 124 is the target/source of the DMA operation.

The direction indicator 7118 indicates whether the DMA operation is from the data/weight RAM 122/124 to the ring bus 4024 or from the ring bus 4024 to the data/weight RAM 122/124. The count 7122 specifies the number of rows of the data/weight RAM 122/124 to be transferred. The coherent indicator 7124 specifies whether or not the LLC 4005 should snoop the ring bus 4024 address. If the ring stop 4004-N performs a master load transaction to a ring bus 4024 address found in the LLC 4005, then the corresponding data in the LLC 4005 is returned to the NNU 121; otherwise, the data is returned from the system memory, however the data is not placed into the LLC 4005. The interrupt flag 7126 specifies whether or not the slave interface 6301 will send an interrupt to a core 4002 upon completion of the DMA operation.

The wait tag 7128 specifies a value associated with the DMA operation specified by the DCW 7104. An instruction of the program subsequent to the instruction that wrote the DCW 7104 to the bus control memory 6636 may specify the same tag value, in which case the sequencer 128 will cause the subsequent instruction to wait to be executed until the DMA operation associated with the wait tag value completes. In one embodiment, while waiting for the DMA operation associated with wait tag value to complete, unused portions of the NNU 121 are placed into a lower power mode. For example, the NPUs 126 may have their clocks removed until the DMAC 6602 indicates the DMA operation is complete.

In one embodiment, the DCW 7104 also includes a chain field that chains the DCW 7104 to another DCW 7104 in the bus control memory 6636 thereby enabling the programmer to effectively create a DMA operation program.

Figure 72:
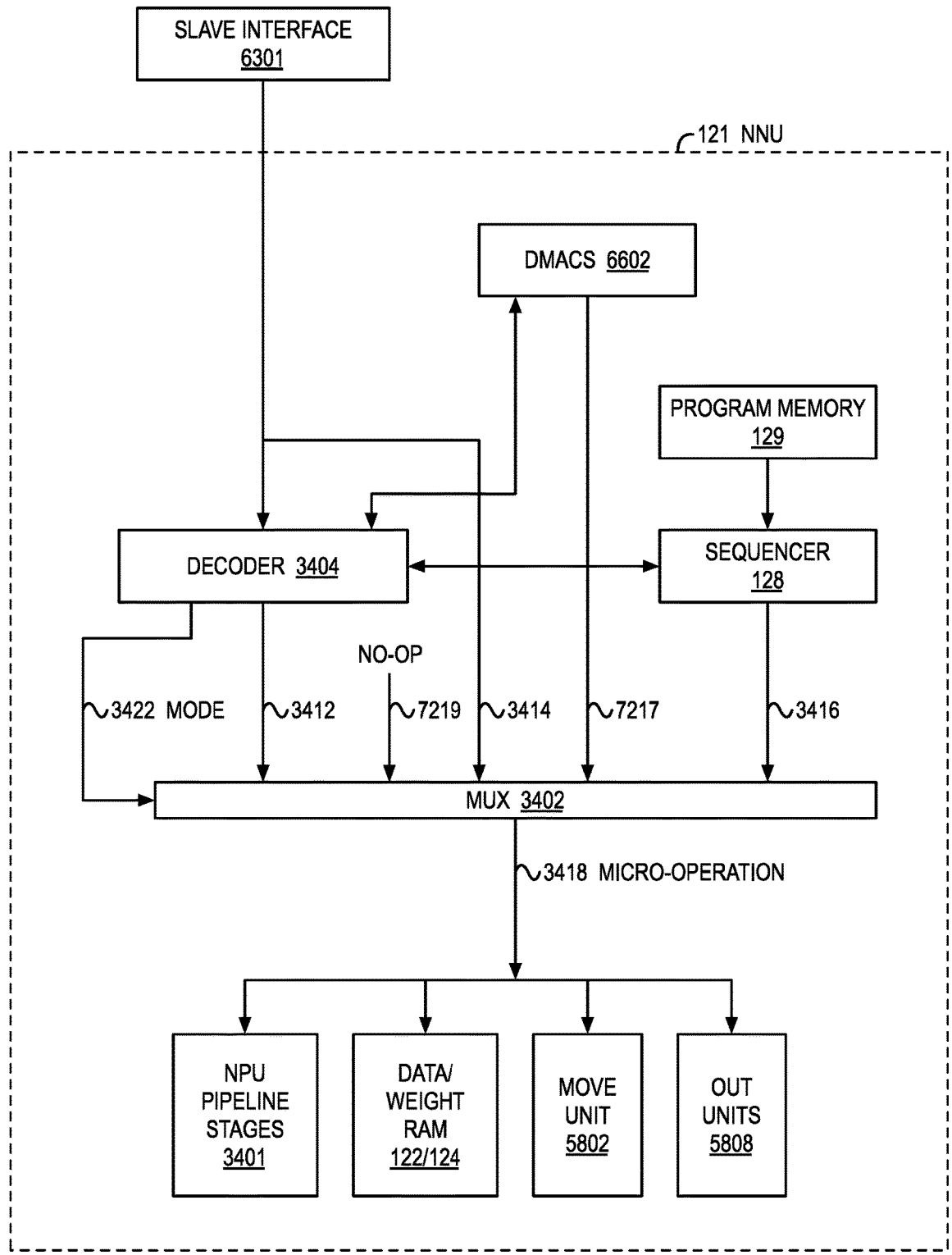
FIG. 72 is a block diagram illustrating a ring bus-coupled embodiment of the NNU.

Referring now to FIG. 72, a block diagram illustrating a ring bus-coupled embodiment of the NNU 121 is shown. FIG. 72 is similar in some ways to FIG. 34 and similarly numbered elements are similar. Like FIG. 34, FIG. 72 illustrates the capability of the NNU 121 to receive micro-operations from multiple sources for provision to its pipeline. However, in the embodiment of FIG. 72, the NNU 121 is coupled to cores 4002 via the ring bus 4024 as in FIG. 62, and differences will now be described.

In the embodiment of FIG. 72, the multiplexer 3402 receives a micro-operation from five different sources. The multiplexer 3402 provides the selected micro-operation 3418 to the NPU 126 pipeline stages 3401, the data RAM 122 and weight RAM 124, the move unit 5802, and out units 5808 to control them, as described above. The first source is the sequencer 128 that generates a micro-operation 3416, as described with respect to FIG. 34. The second source is a modified version of the decoder 3404 of FIG. 34 that receives a data block of a store request from the slave interface 6301 store queue 6314 stored by a core 4002. The data block may include information similar to the microinstruction translated from an MTNN instruction 1400 or MFNN instruction 1500, as described above with respect to FIG. 34. The decoder 3404 decodes the data block and in response generates a micro-operation 3412. An example is a micro-operation 3412 generated in response to a request received from the slave interface 6301 store queue 6314 to write data to the data/weight RAM 122/124 or in response to a request received from the slave interface 6301 load queue 6312 to read data from the data/weight RAM 122/124. The third source is a direct data block of a store request from the slave interface 6301 store queue 6314 stored by a core 4002 that includes a micro-operation 3414 that the NNU 121 directly executes, as described above with respect to FIG. 34. Preferably, the core 4002 stores to different memory-mapped addresses in the ring bus 4024 address space to enable the decoder 3404 to distinguish between the second and third micro-operation sources. The fourth source is a micro-operation 7217 generated by the DMACs 6602. The fifth source is a no-operation micro-operation 7219, in response to which the NNU 121 retains its state.

In one embodiment, the five sources have a priority scheme enforced by the decoder 3404 in which the direct micro-operation 3414 has highest priority; the micro-operation 3412 generated by the decoder 3404 in response to the slave store operation by the slave interface 6301 has second highest priority; the micro-operation 7217 generated by a DMAC 6602 has next highest priority; the micro-operation 3416 generated by the sequencer 128 has next highest priority; and the no-op micro-operation is the default, i.e., lowest priority, source which the multiplexer 3402 selects when none of the other sources are requesting. According to one embodiment, when a DMAC 6602 or the slave interface 6301 needs to access the data RAM 122 or weight RAM 124, it has priority over the program running on the sequencer 128, and the decoder 3404 causes the sequencer 128 to pause until the DMAC 6602 and slave interface 6301 have completed their accesses.

While various embodiments of the present invention have been described herein, they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished using general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line or another communications medium. Embodiments of the apparatus and method described herein may be included in a semiconductor intellectual property core, such as a processor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a processor device that may be used in a general-purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

What is claimed is:

1. A hardware processing unit, comprising:
    an accumulator having an input and an output;
    a multiplier-adder, having an output and first, second and third inputs, that receives on the first and second inputs respective first and second factors and that receives on the third input an addend, the multiplier-adder generates a sum of the addend and a product of the first and second factors and provides the sum on its output;

a first multiplexer, having an output coupled to the multiplier-adder first input and that receives a first operand, a positive one, and a negative one and selects one of them for provision as the first factor to the multiplier-adder;

a second multiplexer, having an output coupled to the multiplier-adder second input and that receives a second operand, a positive one, and a negative one and selects one of them for provision as the second factor to the multiplier-adder;

a third multiplexer, having an output, that receives the first operand and the second operand and selects one of them for provision on its output; and a fourth multiplexer, having an output coupled to the accumulator input, that receives the third multiplexer output and the sum and selects one of them for provision to the accumulator.

2. The hardware processing unit of claim 1, further comprising:

control logic that, in response to a first command to write to the accumulator a sum of the accumulator and a product of the first and second operands:
controls the first multiplexer to select the first operand;
controls the second multiplexer to select the second operand; and
controls the fourth multiplexer to select the sum; and wherein the control logic, in response to a second command to cause the accumulator to contain the maximum of the first operand and the accumulator:
controls the first multiplexer to select the first operand;
controls the second multiplexer to select the negative one;
controls the third multiplexer to select the first operand; and
controls the fourth multiplexer to select the first operand if the sum is negative and otherwise causes the accumulator to retain its value.

3. The hardware processing unit of claim 2, further comprising:

a fifth multiplexer, having an output coupled to the multiplier-adder third input, that receives the third multiplexer output and the accumulator output and selects one of them for provision as the addend to the multiplier-adder; and wherein the control logic, in response to a third command to write to the accumulator a difference of the second operand from the first operand:
controls the first multiplexer to select the negative one;
controls the second multiplexer to select the second operand;
controls the third multiplexer to select the first operand;
controls the fifth multiplexer to select the third multiplexer output; and
controls the fourth multiplexer to select the sum.

4. The hardware processing unit of claim 3, further comprising:

wherein the control logic, in response to a fourth command to write to the accumulator a sum of the second operand and the accumulator:
controls the first multiplexer to select the positive one;
controls the second multiplexer to select the second operand;
controls the fifth multiplexer to select the accumulator output; and
controls the fourth multiplexer to select the sum.

5. The hardware processing unit of claim 3, further comprising:

the fifth multiplexer further receives a zero and selects one of the zero, the third multiplexer output and the accumulator output for provision as the addend to the multiplier-adder; and wherein the control logic, in response to a fourth command to write to the accumulator a product of the first and second operands:
controls the first multiplexer to select the first operand;
controls the second multiplexer to select the second operand;
controls the fifth multiplexer to select the zero; and
controls the fourth multiplexer to select the sum.

6. The hardware processing unit of claim 3, further comprising:

the first multiplexer further receives a zero and selects one of the zero, the first operand, the positive one, and the negative one for provision as the first factor to the multiplier-adder;

the fifth multiplexer further receives a negated version of the accumulator output and selects one of the negated version of the accumulator output, the third multiplexer output and the accumulator output for provision as the addend to the multiplier-adder; and wherein the control logic, in response to a fourth command to cause the accumulator to contain its absolute value:
controls the first multiplexer to select the zero;
controls the fifth multiplexer to select the negated version of the accumulator output; and
controls the fourth multiplexer to select the sum when the accumulator is negative and otherwise causes the accumulator to retain its value.

7. The hardware processing unit of claim 3, further comprising:

the first multiplexer further receives a zero and selects one of the zero, the first operand, the positive one, and the negative one for provision as the first factor to the multiplier-adder;

the fifth multiplexer further receives an inverted version of the accumulator output and selects one of the inverted version of the accumulator output, the third multiplexer output and the accumulator output for provision as the addend to the multiplier-adder;

wherein the multiplier-adder has a fourth input that receives a second addend, the multiplier-adder generates a sum of the first and second addends and the product of the first and second factors and provides the sum on its output; and wherein the control logic, in response to a fourth command to cause the accumulator to contain its absolute value:
controls the first multiplexer to select the zero;
controls the fifth multiplexer to select the inverted version of the accumulator output;
provides a positive one as the second addend when the accumulator is negative and otherwise provides a zero; and
controls the fourth multiplexer to select the sum when the accumulator is negative and otherwise causes the accumulator to retain its value.

8. The hardware processing unit of claim 3, further comprising:

the first multiplexer further receives a zero and selects one of the zero, the first operand, the positive one, and the negative one for provision as the first factor to the multiplier-adder;

the fifth multiplexer further receives an inverted version of the accumulator output and selects one of the inverted version of the accumulator output, the third multiplexer output and the accumulator output for provision as the addend to the multiplier-adder;

wherein the multiplier-adder has a fourth input that receives a second addend, the multiplier-adder generates a sum of the first and second addends and the product of the first and second factors and provides the sum on its output; and wherein the control logic, in response to a fourth command to cause the accumulator to load a negated version of the accumulator:
  controls the first multiplexer to select the zero;
  controls the fifth multiplexer to select the inverted version of the accumulator output;
  provides a positive one as the second addend; and
  controls the fourth multiplexer to select the sum.

9. The hardware processing unit of claim 2, further comprising:
the fourth multiplexer further receives a sign value and selects one of the sign value, the third multiplexer output and the sum for provision to the accumulator; and wherein the control logic, in response to a third command to cause the accumulator to contain either a first, second or third predetermined value based on a sign of the accumulator:
  provides the sign value as the first predetermined value when the accumulator is zero, the second predetermined value when the accumulator is a positive integer, and the third predetermined value when the accumulator is a negative integer; and
  controls the fourth multiplexer to select the sign value.

10. The hardware processing unit of claim 2, further comprising:
wherein the fourth multiplexer further receives a saturation value; and wherein the control logic, when it detects an overflow/underflow when the multiplier-adder generated the sum in response to the first command:
  provides a most-positive/negative value as the saturation value; and
  controls the fourth multiplexer to select the saturation value for provision to the accumulator.

11. The hardware processing unit of claim 1, further comprising:
  a first subtractor that subtracts a first offset from a quantized data word to generate the first operand; and
  a second subtractor that subtracts a second offset from a quantized weight word to generate the second operand.

12. The hardware processing unit of claim 11, wherein the quantized data and weight words are 8-bit unsigned words and the first and second operands are 9-bit signed words.

13. The hardware processing unit of claim 12, wherein the accumulator holds a 23-bit signed value.

14. The hardware processing unit of claim 1, wherein the first and second operands are 9-bit signed values and the addend is a 23-bit signed value.

15. The hardware processing unit of claim 14, wherein the sum is a 23-bit signed value.

16. A neural network unit, comprising:
an array of N hardware processing units, each comprising:
  an accumulator having an input and an output;
  a multiplier-adder, having an output and first, second and third inputs, that receives on the first and second inputs respective first and second factors and that receives on the third input an addend, the multiplier-adder generates a sum of the addend and a product of the first and second factors and provides the sum on its output;
  a first multiplexer, having an output coupled to the multiplier-adder first input and that receives a first operand, a positive one, and a negative one and selects one of them for provision as the first factor to the multiplier-adder;
  a second multiplexer, having an output coupled to the multiplier-adder second input and that receives a second operand, a positive one, and a negative one and selects one of them for provision as the second factor to the multiplier-adder;
  a third multiplexer, having an output, that receives the first operand and the second operand and selects one of them for provision on its output; and
  a fourth multiplexer, having an output coupled to the accumulator input, that receives the third multiplexer output and the sum and selects one of them for provision to the accumulator; and
wherein N is at least 1024.

17. The neural network unit of claim 16, further comprising:
  a first memory having rows of N data words;
  N first multiplexed-registers that each receive a respective data word of the N data words from the first memory and receive a data word from an adjacent first multiplexed-register of the N first multiplexed-registers and selects one of the data words for provision to a respective one of the N hardware processing units;
  a second memory having rows of N weight words; and
  N second multiplexed-registers that each receive a respective weight word of the N weight words from the second memory and receive a weight word from an adjacent second multiplexed-register of the N second multiplexed-registers and selects one of the weight words for provision to a respective one of the N hardware processing units.

18. The neural network unit of claim 17,
wherein the selected data word provided by each of the N first multiplexed-registers is a quantized data word;
wherein the selected weight word provided by each of the N second multiplexed-registers is a quantized weight word;
wherein each of the N hardware processing units further comprises:
  a first subtractor that subtracts a first offset from the quantized data word received from the respective first multiplexed-register to generate the first operand; and
  a second subtractor that subtracts a second offset from the quantized weight word received from the respective second multiplexed-register to generate the second operand.

19. The neural network unit of claim 17, further comprising:
  an N-word wide output register;
  a plurality of output units that perform an activation function on the N accumulator outputs to generate the N words for storage into the output register; and
wherein the first multiplexed-register of each of the N first multiplexed-registers further receives a respective word from the N-word wide output register and selects one of the respective output register word, the respective data word from the first memory and the data word from the adjacent first multiplexed-register for provision to the respective one of the N hardware processing units.

20. The neural network unit of claim 19,
wherein the plurality of output units also quantize results of the activation function performed on the N accumulator outputs to generate the N words for storage into the output register.

21. The neural network unit of claim 19, further comprising:
an N-word wide move register;
a move unit that rotates a row of the N data words from the first memory to provide the N words for storage into the move register; and
wherein the first multiplexed-register of each of the N first multiplexed-registers further receives a respective word from the N-word wide move register and selects one of the respective move register word, the respective output register word, the respective data word from the first memory and the data word from the adjacent first multiplexed-register for provision to the respective one of the N hardware processing units.

22. A computer program product encoded in at least one non-transitory computer usable medium for use with a computing device, the computer program product comprising:
computer usable program code embodied in said medium, for specifying a hardware processing unit, the computer usable program code comprising:
first program code for specifying an accumulator having an input and an output;
second program code for specifying a multiplier-adder, having an output and first, second and third inputs, that receives on the first and second inputs respective first and second factors and that receives on the third input an addend, the multiplier-adder generates a sum of the addend and a product of the first and second factors and provides the sum on its output;
third program code for specifying a first multiplexer, having an output coupled to the multiplier-adder first input and that receives a first operand, a positive one, and a negative one and selects one of them for provision as the first factor to the multiplier-adder;
fourth program code for specifying a second multiplexer, having an output coupled to the multiplier-adder second input and that receives a second operand, a positive one, and a negative one and selects one of them for provision as the second factor to the multiplier-adder;
fifth program code for specifying a third multiplexer, having an output, that receives the first operand and the second operand and selects one of them for provision on its output; and
sixth program code for specifying a fourth multiplexer, having an output coupled to the accumulator input, that receives the third multiplexer output and the sum and selects one of them for provision to the accumulator.

\* \* \* \* \*